US009049633B2

(12) United States Patent
Das et al.

(10) Patent No.: US 9,049,633 B2
(45) Date of Patent: *Jun. 2, 2015

(54) PROVIDING FOR MOBILITY FOR FLEXIBLE BANDWIDTH CARRIER SYSTEMS

(71) Applicant: QUALCOMM Incorporated, San Diego, CA (US)

(72) Inventors: Soumya Das, San Diego, CA (US); Olufunmilola O. Awoniyi, San Diego, CA (US); Edwin C. Park, San Diego, CA (US); Samir Salib Soliman, Poway, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/707,297

(22) Filed: Dec. 6, 2012

(65) Prior Publication Data

US 2013/0148628 A1 Jun. 13, 2013

Related U.S. Application Data

(60) Provisional application No. 61/568,742, filed on Dec. 9, 2011, provisional application No. 61/621,904, filed on Apr. 9, 2012.

(51) Int. Cl.
*H04W 36/00* (2009.01)
*H04W 36/14* (2009.01)
(Continued)

(52) U.S. Cl.
CPC ............ *H04W 36/14* (2013.01); *H04W 36/385* (2013.01); *H04W 36/24* (2013.01); *H04W 36/0022* (2013.01)

(58) Field of Classification Search
CPC .......................... H04W 36/385; H04W 36/14
See application file for complete search history.

(56) References Cited

U.S. PATENT DOCUMENTS 6,236,647 B1   5/2001   Amalfitano
6,829,227 B1   12/2004  Pitt et al.
(Continued)

FOREIGN PATENT DOCUMENTS

EP   1213868 A1   6/2002
EP   2317816 A1   5/2011
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) ", 3GPP Standard; 3GPP TS 36.300, 3rd Generation Partnership Project (3GPP), Mobile Competence Centre ; 650, Route Des Lucioles ; F-06921 Sophiaantipolis Cedex; France, vol. RAN WG2, No. V10.5.0, Sep. 28, 2011, pp. 1-194.

(Continued)

*Primary Examiner* — John Blanton
(74) *Attorney, Agent, or Firm* — Jeffrey D. Jacobs

(57) ABSTRACT

Methods, systems, and devices for facilitating mobility between flexible bandwidth systems and other bandwidth systems are provided. These tools and techniques that provide mobility between different bandwidth systems may facilitate supporting circuit-switched (CS) services, such as CS voice services. Some embodiments provide for determining flexible bandwidth capable devices, such as user equipment. Some embodiments involve core network redirection where a core network may direct the handling of circuit-switched services when a flexible bandwidth system does not support the CS services. Some examples provide for radio access network determined handling of CS services when a flexible bandwidth system may not support the CS services. Some embodiments provide for transitioning to a flexible bandwidth system. Some embodiments provide for transitioning from flexible bandwidth systems to non-flexible bandwidth systems that have no support for some or all CS services, other flexible bandwidth systems, and/or systems that natively support CS voice services.

36 Claims, 70 Drawing Sheets

(51) Int. Cl.
*H04W 36/38* (2009.01)
*H04W 36/24* (2009.01)

(56) References Cited

U.S. PATENT DOCUMENTS

| | | | |
|---|---|---|---|
| 7,010,300 | B1 | 3/2006 | Jones et al. |
| 7,069,035 | B2 | 6/2006 | Chen et al. |
| 7,123,710 | B2 | 10/2006 | Ravishankar |
| 7,123,910 | B2 | 10/2006 | Lucidarme et al. |
| 7,145,876 | B2 | 12/2006 | Huang et al. |
| 7,193,982 | B2 | 3/2007 | Frerking et al. |
| 7,263,365 | B2 | 8/2007 | Rudowicz et al. |
| 7,324,553 | B1 | 1/2008 | Varier et al. |
| 7,796,632 | B2 | 9/2010 | Hasty et al. |
| 7,865,359 | B2 | 1/2011 | Chang |
| 7,898,947 | B2 | 3/2011 | Briscoe et al. |
| 8,054,893 | B2 | 11/2011 | Mizusawa |
| 8,085,713 | B2 | 12/2011 | Kang |
| 8,085,731 | B2 | 12/2011 | Zhao et al. |
| 8,547,840 | B1 | 10/2013 | Kumar et al. |
| 2001/0012271 | A1 | 8/2001 | Berger |
| 2002/0110101 | A1 | 8/2002 | Gopalakrishnan et al. |
| 2002/0159501 | A1 | 10/2002 | Agami et al. |
| 2003/0224730 | A1 | 12/2003 | Muszynski et al. |
| 2006/0171424 | A1 | 8/2006 | Choi |
| 2006/0291429 | A1 | 12/2006 | Matusz |
| 2007/0049307 | A1 | 3/2007 | Mueckenheim et al. |
| 2008/0026752 | A1 | 1/2008 | Flore et al. |
| 2008/0144612 | A1 | 6/2008 | Honkasalo et al. |
| 2008/0298442 | A1 | 12/2008 | Deng et al. |
| 2009/0094650 | A1 | 4/2009 | Carmichael |
| 2009/0141689 | A1 | 6/2009 | Parekh et al. |
| 2009/0258671 | A1* | 10/2009 | Kekki et al. .............. 455/552.1 |
| 2010/0246480 | A1 | 9/2010 | Aggarwal et al. |
| 2010/0255849 | A1 | 10/2010 | Ore |
| 2010/0260105 | A1 | 10/2010 | Keller et al. |
| 2010/0279691 | A1 | 11/2010 | Dwyer et al. |
| 2010/0303039 | A1 | 12/2010 | Zhang et al. |
| 2011/0013550 | A1 | 1/2011 | Wu |
| 2011/0013578 | A1 | 1/2011 | Shimizu et al. |
| 2011/0019556 | A1 | 1/2011 | Hsin et al. |
| 2011/0021216 | A1 | 1/2011 | Pudney et al. |
| 2011/0103243 | A1 | 5/2011 | Larsson et al. |
| 2011/0134831 | A1* | 6/2011 | Pirskanen ................... 370/328 |
| 2011/0205976 | A1 | 8/2011 | Roessel et al. |
| 2011/0217980 | A1* | 9/2011 | Faurie et al. .............. 455/435.1 |
| 2011/0244870 | A1 | 10/2011 | Lee |
| 2011/0267978 | A1 | 11/2011 | Etemad |
| 2011/0268045 | A1 | 11/2011 | Heo et al. |
| 2011/0269453 | A1 | 11/2011 | Ranta-Aho et al. |
| 2011/0276701 | A1 | 11/2011 | Purnadi et al. |
| 2011/0310835 | A1 | 12/2011 | Cho et al. |
| 2012/0015656 | A1* | 1/2012 | Tiwari ........................ 455/436 |
| 2012/0063421 | A1* | 3/2012 | Wu ............................ 370/332 |
| 2012/0102162 | A1 | 4/2012 | Devireddy |
| 2012/0113982 | A1 | 5/2012 | Akselin et al. |
| 2012/0120789 | A1 | 5/2012 | Ramachandran et al. |
| 2012/0140743 | A1 | 6/2012 | Pelletier et al. |
| 2012/0142367 | A1* | 6/2012 | Przybylski ................. 455/456.1 |
| 2012/0149377 | A1* | 6/2012 | Su et al. .................... 455/438 |
| 2012/0163249 | A1 | 6/2012 | Chin et al. |
| 2012/0165019 | A1* | 6/2012 | Shintani et al. ............ 455/436 |
| 2012/0195209 | A1 | 8/2012 | Jain et al. |
| 2013/0017805 | A1 | 1/2013 | Andre-Jonsson et al. |
| 2013/0044613 | A1 | 2/2013 | Edara et al. |
| 2013/0084870 | A1 | 4/2013 | Nylander et al. |
| 2013/0114415 | A1 | 5/2013 | Das et al. |
| 2013/0114433 | A1 | 5/2013 | Park et al. |
| 2013/0114436 | A1 | 5/2013 | Dural et al. |
| 2013/0114473 | A1 | 5/2013 | Awoniyi et al. |
| 2013/0114566 | A1 | 5/2013 | Awoniyi et al. |
| 2013/0114571 | A1 | 5/2013 | Das et al. |
| 2013/0115967 | A1 | 5/2013 | Soliman et al. |
| 2013/0115991 | A1 | 5/2013 | Awoniyi et al. |
| 2013/0115994 | A1 | 5/2013 | Awoniyi et al. |
| 2013/0121265 | A1 | 5/2013 | Awoniyi et al. |
| 2013/0122921 | A1 | 5/2013 | Juppi et al. |
| 2013/0148520 | A1 | 6/2013 | Das et al. |
| 2013/0148527 | A1 | 6/2013 | Awiniyi et al. |
| 2013/0148576 | A1 | 6/2013 | Huang et al. |
| 2013/0148579 | A1 | 6/2013 | Das et al. |
| 2013/0148627 | A1 | 6/2013 | Das et al. |
| 2013/0148629 | A1 | 6/2013 | Das et al. |
| 2013/0150045 | A1 | 6/2013 | Das et al. |
| 2013/0176952 | A1 | 7/2013 | Shin et al. |
| 2013/0182655 | A1 | 7/2013 | Das et al. |
| 2014/0010170 | A1 | 1/2014 | Das et al. |

FOREIGN PATENT DOCUMENTS

| | | |
|---|---|---|
| EP | 2385653 A2 | 11/2011 |
| GB | 2421880 A | 7/2006 |
| WO | 2007024748 A2 | 3/2007 |

OTHER PUBLICATIONS

"3rd Generation Partnership Project; Technical Specification Group Services and System Aspects; Circuit Switched (CS) fallback, in Evolved Packet System (EPS); Stage 2 (Release 10)", 3GPP Standard; 3GPP TS 23.272, 3rd Generation Partnership Project (3GPP), Mobile Competence Centre ; 650, Route Des Lucioles ; F-06921 Sophiaantipolis Cedex ; France, vol. SA WG2, No. V10.5.0, Aug. 24, 2011, pp. 1-79, XP050553745, [retrieved on Aug. 24, 2011].
"3rd Generation Partnership Project; Technical Specification Group Services and System Aspects; Single Radio Voice Call Continuity (SRVCC); Stage 2 (Release 11)", 3GPP Standard; 3GPP TS 23.216, 3rd Generation Partnership Project (3GPP), Mobile Competence Centre ; 650, Route Des Lucioles ; F-06921 Sophiaantipolis Cedex ; France, vol. SA WG2; No. V11.2.0, Aug. 24, 2011, pp. 1-53, XP050553738, [retrieved on Aug. 24, 2011].
Abeta S., "Toward LTE commercial launch and future plan for Lte enhancements (LTE-Advanced)", Communication Systems (ICCS), 2010 IEEE International Conference on, IEEE, Piscataway, NJ, USA, Nov. 17, 2010, pp. 146-150, XP031848276, ISBN: 978-1-4244-7004-4.
Ericsson: "LTE Spurious emission concept for flexible bandwidth", 3GPP Draft; R4-051130, 3rd Generation Partnership Project (3GPP), Mobile Competence Centre, 650, Route Des Lucioles; F-06921 Sophia-Antipolis Cedex; France, vol. Ran WG4, No. Seoul, Korea; Nov. 3, 2005, XP050174721.
Holma, H., et al., "WCDMA for UMTS—HSPA Evolution and LTE (4th Edition)" in: "WCDMA for UMTS—HSPA Evolution and LTE (4th Edition)", Jan. 1, 2007, John Wiley & Sons Ltd., UK, XP055052236, ISBN: 978-0-47-031933-8 ,pp. 74-75.
International Search Report and Written Opinion—PCT/US2012/063895—ISA/EPO—May 13, 2013.
International Search Report and Written Opinion—PCT/US2012/068533—ISA/EPO—Feb. 12, 2013.
Qunhui C., "Evolution and deployment of VoLTE", Huawei Communicate, Sep. 1, 2011, XP055052291, p. 52-p. 55.
Samsung: "FDD/TDD dual mode UE capability handling", 3GPP Draft; 36331 CRXXXX_(Rel-10)_R2-116035 FDD TDD Dual Mode UE, 3rd Generation Partnership Project (3GPP), Mobile Competence Centre ; 650, Route Des Lucioles ; F-06921 Sophia-Antipolis Cedex ; France, vol. RAN WG2, No. San Francisco, USA; Nov. 14, 2011-Nov. 17, 2011, Nov. 7, 2011, XP050564131, [retrieved on Nov. 7, 2011].
"Understanding CS Fallback in LTE", Sep. 27, 2009, XP055052327.
Zte: "Discussion on activation and deactivation", 3GPP Draft; R2-103719, 3rd Generation Partnership Project (3GPP), Mobile Competence Centre ; 650, Route Des Lucioles ; F-06921 Sophia Antipolis Cedex ; France, vol. RAN WG2, No. Stockholm, Sweden; Jun. 28, 2010, Jun. 22, 2010, XP050451195, [retrieved on Jun. 22, 2010].
Co-pending U.S. Appl. No. 13/707,111, filed Dec. 6, 2012.
3GPP TS 23.009 V11.0.0 (Sep. 2011), 3rd Generation Partnership Project; Technical Specification Group Core Network and Terminals; Handover procedures (Release 11).

(56) References Cited

OTHER PUBLICATIONS

3GPP TS 25.213 "3rd Generation Partnership Project; Technical Specification Group Radio Access Network; Spreading and modulation," version 9.2.0, release 9, Sep. 2010.

3GPP TS 25.331 v11.0.0 (Dec. 2011), 3rd Generation Partnership Project; Technical Specification Group Radio Access Network; Radio Resource Control (RRC); Protocol specification (Release 11).

3GPP TS 25.413 V10.5.0 (Mar. 2012), 3rd Generation Partnership Project; Technical Specification Group Radio Access Network; UTRAN Iu interface, Radio Access Network Application Part (RANAP) signalling (Release 10).

3GPP TS 34.108 V9.6.0 (Sep. 2011), 3rd Generation Partnership Project; Technical Specification Group Radio Access Network; Common test environments for User Equipment (UE); Conformance testing (Release 9).

Black, et al., "Interference Cancellation Techniques for CDMA2000 1x Reverse Link", IEEE Globecom 2009, Global Telecommunications Conference, 2009, 5 pages.

Gessner, et al., "Voice and SMS in LTE White Paper," Rohde & Schwarz GmbH & Co. Kg, [Online] 2011, pp. 1-45, http://www2sohde-schwarz.com/file_15903/1MA197_1e.pdf (accessed Aug. 20, 2012).

Co-pending U.S. Appl. No. 14/091,933, filed Nov. 27, 2013.

3rd Generation Partnership Project; Technical Specification Group Radio Access Network; Evolved Universal Terrestrial Radio Access (E-UTRA); Relay architectures for E-UTRA (LTE-Advanced) (Release 9), 3GPP Standard; 3GPP TR 36.806, 3rd Generation Partnership Project (3GPP), Mobile Competence Centre; 650, Route Des Lucioles; F-06921 Sophia-Antipolis Cedex; France, No. V9.0.0, Apr. 21, 2010, pp. 1-34, XP050402561, [retrieved on Apr. 21, 2010].

Arjona A., et al., "Live network Performance Challenge Flash-OFDM Vs HSDPA," 22nd International Conference on Advanced Information Networking and Applications, 2008, pp. 918-925.

IEEE Std 802.11tm-2007: "IEEE Standard for Information technology—Telecommunications and Information exchange between systems—Local and metropolitan area networks—Specific requirements Part 11: Wireless Lan Medium Access Control (MAC) and Physical Layer (PHY) Specifications," 2007, pp. 1-98.

Klerer M., "Introduction to IEEE 802.20," Technical and procedural Orientation, IEEE 802.20-PD-04, Mar. 10, 2003, pp. 1-44.

Marks R.B., "The IEEE 802.16 Wireless MAN Standard for Broadband Wireless Metropolitan Area Networks," Apr. 16, 2003, pp. 1-57.

\* cited by examiner

| UE RRC State | Triggering Event | Network Mobility Type |
|---|---|---|
| Idle | MT medium/low data rate PS call | Single RAB Load-based HO/inter-frequency HO to Flexible UTRAN |
| Idle | MO medium/low data rate PS call | Single RAB load/inter-frequency HO to Flexible UTRAN |
| Connected Mode (Existing PS call) | MT medium/low data rate PS call | Multi-RAB Load/Service based HO to Flexible UTRAN |
| Connected Mode (Existing PS call) | MO medium/low data rate PS call | Multi-RAB Load/Service based HO to Flexible UTRAN |
| Connected Mode (Existing PS call) | MT PS call | Leave calls on UMTS |
| Connected Mode (Existing CS call) | MO PS call | Leave calls on UMTS |

PROVIDING FOR MOBILITY FOR FLEXIBLE BANDWIDTH CARRIER SYSTEMS

CROSS-RELATED APPLICATIONS

The present Application for Patent claims priority to Provisional Application No. 61/568,742 entitled "SIGNAL CAPACITY BOOSTING, COORDINATED FORWARD LINK BLANKING AND POWER BOOSTING, AND REVERSE LINK THROUGHPUT INCREASING FOR FLEXIBLE BANDWIDTH SYSTEMS" filed Dec. 9, 2011, and assigned to the assignee hereof and hereby expressly incorporated by reference herein for all purposes. The present Application for Patent also claims priority to Provisional Application No. 61/621,904 entitled "PROVIDING FOR MOBILITY BETWEEN FLEXIBLE BANDWIDTH SYSTEMS AND NORMAL BANDWIDTH SYSTEMS" filed Apr. 9, 2012, and assigned to the assignee hereof and hereby expressly incorporated by reference herein for all purposes.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Service providers are typically allocated blocks of frequency spectrum for exclusive use in certain geographic regions. These blocks of frequencies are generally assigned by regulators regardless of the multiple access technology being used. In most cases, these blocks are not integer multiple of channel bandwidths, hence there may be unutilized parts of the spectrum. As the use of wireless devices has increased, the demand for and value of this spectrum has generally surged, as well. Nonetheless, in some cases, wireless communications systems may not utilize portions of the allocated spectrum because the portions are not big enough to fit a standard or normal waveform. The developers of the LTE standard, for example, recognized the problem and decided to support many different system bandwidths (e.g., 1.4, 3, 5, 10, 15 and 20 MHz). This may provide one partial solution to the problem. Flexible bandwidth systems may provide another solution, though some flexible bandwidth systems may not support circuit-switched services.

SUMMARY

Methods, systems, and devices for facilitating mobility between flexible bandwidth systems and normal bandwidth systems and/or other flexible bandwidth systems are provided. These tools and techniques that provide mobility between different bandwidth systems may facilitate supporting circuit-switched (CS) services, such as circuit-switched voice services. Some embodiments provide for determining flexible bandwidth capable devices, such as user equipment (UE). Some embodiments involve core network (CN) redirection, where a core network may direct the handling of circuit-switched services, such as a CS voice service, when a flexible bandwidth system does not support the CS services. Some examples provide for radio access network (RAN) directed and/or determined handling of CS services, such as CS voice services, when a flexible bandwidth system does not support the CS services. Some embodiments provide for transitioning or spring forward to a flexible bandwidth system. Some embodiments provide for transitioning or fallback from flexible bandwidth systems to non-flexible bandwidth systems that have no support for some or all CS services (e.g., CS voice), other flexible bandwidth systems, and/or systems that natively support CS voice services.

Flexible bandwidth carriers for wireless communications systems may utilize portions of spectrum that may not be big enough to fit a normal waveform utilizing flexible bandwidth waveforms. A flexible bandwidth system that utilizes a flexible bandwidth carrier may be generated with respect to a normal bandwidth system through dilating, or scaling down, the time or the chip rate of the flexible bandwidth system with respect to the normal bandwidth system. Some embodiments may increase the bandwidth of a waveform through expanding, or scaling up, the time or the chip rate of the flexible bandwidth system.

Some embodiments include a method for providing mobility within wireless communications systems. The method may include: communicating with a user equipment using a flexible bandwidth radio access network from multiple radio access networks; and/or determining, by the flexible bandwidth radio access network, to redirect a circuit-switched service for the user equipment to a radio access network that supports the circuit-switched service from multiple radio access networks.

Some embodiments include redirecting, at the flexible bandwidth radio access network, the circuit-switched service for the user equipment to the radio access network that supports the circuit-switched service from the multiple radio access networks. Some embodiments include transmitting one or more messages to a core network such that the core network redirects the circuit switched service for the user equipment to the radio access network that supports the circuit-switched service from the multiple radio access networks. Some embodiments include modifying one or more messages to a core network such that the core network redirects the circuit switched service for the user equipment to the radio access network that supports the circuit-switched service from the multiple radio access networks. Some embodiments include handling a packet-switched service on the flexible bandwidth radio access network. Some embodiments include handling another circuit-switched service on the flexible bandwidth radio access network. Handling the other circuit-switched service may include handling a circuit-switched service other than a circuit-switched voice service.

In some cases, the circuit-switched service may include a circuit-switched voice service. In some cases, a core network may be unaware that the circuit-switched service is unsupported on the flexible bandwidth radio access network. In some cases, the core network may be aware that the circuit-switched service is unsupported on the flexible bandwidth radio access network. In some cases, a core network may be unaware of a flexible bandwidth capability of the flexible bandwidth radio access network. In some cases, a core network may be aware of a flexible bandwidth capability of the flexible bandwidth radio access network.

Some embodiments include a wireless communications system configured for mobility. The system may include: means for communicating with a user equipment using a flexible bandwidth radio access network from multiple radio access networks; and/or means for determining, by the flexible bandwidth radio access network, to redirect a circuit-switched service for the user equipment to a radio access network that supports the circuit-switched service from the multiple radio access networks.

Some embodiments include means for redirecting, at the flexible bandwidth radio access network, the circuit-switched service for the user equipment to the radio access network that supports the circuit-switched service from the multiple radio access networks. Some embodiments include means for transmitting one or more messages to a core network such that the core network redirects the circuit switched service for the user equipment to the radio access network that supports the circuit-switched service from the multiple radio access networks Some embodiments include means for handling a packet-switched service on the flexible bandwidth radio access network. Some embodiments include means for handling another circuit-switched service on the flexible bandwidth radio access network.

In some cases, a core network may be unaware that the circuit-switched service is unsupported on the flexible bandwidth radio access network. In some cases, a core network may be unaware of a flexible bandwidth capability of the flexible bandwidth radio access network. In some cases, a core network may be aware of a flexible bandwidth capability of the flexible bandwidth radio access network.

Some embodiments include a computer program product for mobility in a wireless communications system that may include a non-transitory computer-readable medium that may include: code for communicating with a user equipment using a flexible bandwidth radio access network from multiple radio access networks; and/or code for determining, by the flexible bandwidth radio access network, to redirect a circuit-switched service for the user equipment to a radio access network that supports the circuit-switched service from the multiple radio access networks.

Some embodiments include code for redirecting, at the flexible bandwidth radio access network, the circuit-switched service for the user equipment to the radio access network that supports the circuit-switched service from the multiple radio access networks. Some embodiments include code for transmitting one or more messages to a core network such that the core network redirects the circuit switched service for the user equipment to the radio access network that supports the circuit-switched service from the multiple radio access networks. Some embodiments include code for handling a packet-switched service on the flexible bandwidth radio access network. Some embodiments include code for handling another circuit-switched service on the flexible bandwidth radio access network.

In some cases, a core network may be unaware that the circuit-switched service is unsupported on the flexible bandwidth radio access network. In some cases, a core network may be unaware of a flexible bandwidth capability of the flexible bandwidth radio access network. In some cases, a core network may be aware of a flexible bandwidth capability of the flexible bandwidth radio access network.

Some embodiments include a wireless communications device configured for mobility in a wireless communications system. The device may include at least one processor that may be configured to: communicate with a user equipment using a flexible bandwidth radio access network from multiple radio access networks; and/or determine, by the flexible bandwidth radio access network, to redirect a circuit-switched service for the user equipment to a radio access network that supports the circuit-switched service from the multiple radio access networks.

In some embodiments, the at least one processor may be further configured to redirect, at the flexible bandwidth radio access network, the circuit-switched service for the user equipment to the radio access network that supports the circuit-switched service from the multiple radio access networks. In some embodiments, the at least one processor may be further configured to transmit one or more messages to a core network such that the core network redirects the circuit switched service for the user equipment to the radio access network that supports the circuit-switched service from the multiple radio access networks. In some embodiments, the at least one processor may be further configured to handle a packet-switched service on the flexible bandwidth radio access network. In some embodiments, the at least one processor is further configured to handle another circuit-switched service on the flexible bandwidth radio access network.

In some cases, a core network may be unaware that the circuit-switched service is unsupported on the flexible bandwidth radio access network. In some cases, a core network may be unaware of a flexible bandwidth capability of the flexible bandwidth radio access network. In some cases, a core network may be aware of a flexible bandwidth capability of the flexible bandwidth radio access network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 22 shows a handover scenario table in accordance with various embodiments;

DETAILED DESCRIPTION

Figure 1:
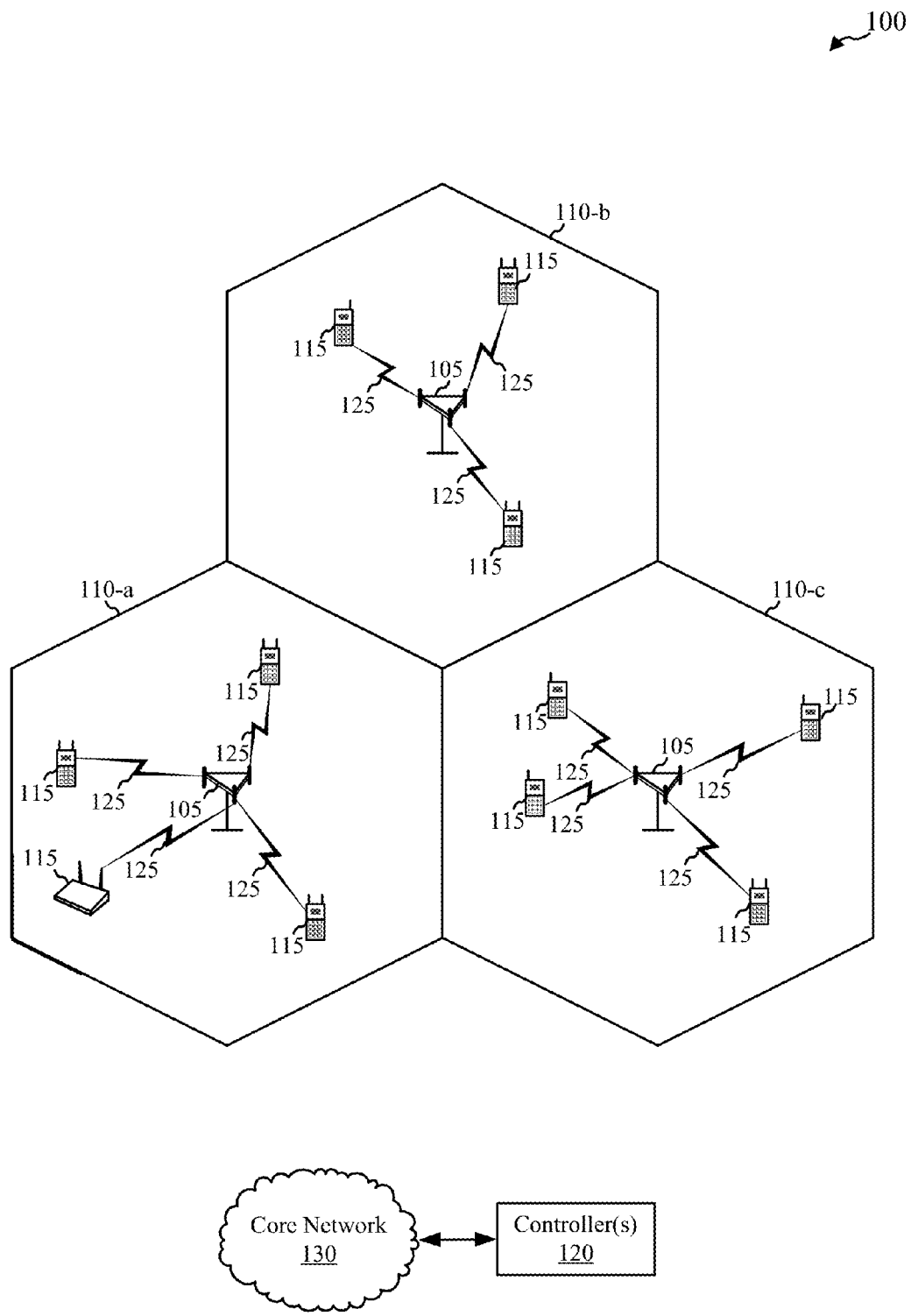
FIG. 1 shows a block diagram of a wireless communications system in accordance with various embodiments.

Methods, systems, and devices for facilitating mobility between flexible bandwidth systems and normal bandwidth systems and/or other flexible bandwidth systems are provided. These tools and techniques that provide mobility between different bandwidth systems may facilitate supporting circuit-switched (CS) services, such as circuit-switched voice services. Some embodiments provide for determining flexible bandwidth capable devices, such as user equipment (UE). Some embodiments involve core network (CN) redirection, where a core network may direct the handling of circuit-switched services, such as a CS voice service, when a flexible bandwidth system does not support the CS services. Some examples provide for radio access network (RAN) directed and/or determined handling of CS services, such as CS voice services, when a flexible bandwidth system does not support the CS services. Some embodiments provide for transitioning or spring forward to a flexible bandwidth system. Some embodiments provide for transitioning or fallback from flexible bandwidth systems to non-flexible bandwidth systems that have no support for some or all CS services (e.g., CS voice), other flexible bandwidth systems, and/or systems that natively support CS voice services.

In addition to circuit-switched services, which may be typically carried in UMTS over Release 99 channels for example, CS services can be carried over high speed data channels (commonly known as CS over HS). For the former, all communication path traversed by the voice signal may be circuit-switched, while for the latter, the radio access network aspect (communication path between the RNC and UE) may use data centric high speed data channels (HSDPA, HSUPA channels). In CS over HS, the rest of the communication path may use the same resources as used in the standard circuit-switched. Flexible bandwidth HSDPA and HSUPA networks can be used to support CS over HS. Some flexible bandwidth systems may be able to support certain CS services (e.g., voice) by one means (e.g., Voice over HS) and not by another mean Release 99 CS voice. These two voice services may be seen as one CS services or as two distinct CS services.

Some embodiments provide for determining flexible bandwidth capable devices, such as flexible bandwidth capable UEs. In some embodiments, a flexible bandwidth capable UE transmits messages indicating whether the UE supports flexible bandwidth. These messages may be in response to receiving different messages from a radio access network, for example. Some embodiments allow for differentiating legacy UEs from flexible bandwidth capable UEs through the different messages these different UEs may or may not transmit in response to receiving different types of messages. For example, legacy UEs may transmit failure messages when they receive messages related to flexible bandwidth, while flexible bandwidth capable UEs may respond differently, such as through not sending a failure message. Flexible bandwidth capable UEs may also support normal bandwidth systems, such as normal bandwidth UMTS. These tools and techniques may allow a radio access network and/or core network to determine which UEs have flexible bandwidth capabilities.

In some embodiments, a core network may direct the handling of circuit-switched services, such as a circuit-switched voice service, when a flexible bandwidth system does not support the CS services. In some examples, a user equipment may be registered with both CS and packet switched (PS) services on a flexible bandwidth radio access network. The core network may identify a lack of support for one or more circuit-switched services on a flexible bandwidth system, and redirect the circuit-switched service for the user equipment to a radio access network that supports the circuit-switched service.

Some embodiments provide for radio access network directed and/or determined handling of circuit-switched services, such as CS voice services, when a flexible bandwidth system does not support the CS services. Embodiments may include: communicating with a user equipment using a flexible bandwidth radio access network from multiple radio access networks; and determining, by the flexible bandwidth radio access network, to redirect a circuit-switched service for the user equipment to a radio access network that supports the circuit-switched service from the multiple radio access networks.

Some embodiments provide for transitioning or spring forward to a flexible bandwidth system. Some embodiments may include transitioning from a first radio access network to a second radio access network, where the first radio access network includes a normal bandwidth radio access network and the second radio access network includes a flexible bandwidth radio access network. Some embodiments include a method for facilitating mobility to a flexible bandwidth system that may include: communicating over first radio access network, where the first radio access network utilizes a first bandwidth carrier; identifying a second radio access network, where the second radio access network utilizes a first flexible bandwidth carrier; and transitioning from utilizing the first bandwidth carrier of the first radio access network to utilizing the first flexible bandwidth carrier of the second radio access network. The first bandwidth carrier may be a normal bandwidth carrier or a second flexible bandwidth carrier different from the first flexible bandwidth carrier.

Some embodiments provide for transitioning or fallback from flexible bandwidth systems to non-flexible bandwidth systems that have no support for some or all CS services (e.g., CS voice), other flexible bandwidth systems, and/or systems that natively support CS voice services including: transitioning from a first radio access network to second radio access network, where the first radio access network includes a flexible bandwidth radio access network and the second radio access network includes a normal bandwidth radio access network or another flexible bandwidth system. In one example, a method for facilitating mobility for wireless communications systems may include: communicating over first radio access network, where the first radio access network utilizes a first flexible bandwidth carrier; identifying a second radio access network, where the second radio access network utilizes a second bandwidth carrier; and transitioning from utilizing the flexible bandwidth carrier of the first radio access network to utilizing the second bandwidth carrier of the second radio access network. This transition may happen between different radio access technologies (RATs) (e.g., from Flexible bandwidth Universal Terrestrial Radio Access Network (F-UTRAN) to GSM Radio Access Network (GE-RAN)) or between the same RATs (e.g., from flexible bandwidth UTRAN to UTRAN). The second bandwidth carrier may include a normal bandwidth carrier or another flexible bandwidth carrier different from the first bandwidth carrier.

Techniques described herein may be used for various wireless communications systems such as CDMA, TDMA, FDMA, OFDMA, SC-FDMA, Peer-to-Peer, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA or OFDM system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100 in accordance with various embodiments. The system 100 includes base stations 105, user equipment 115, a base station controller 120, and a core network 130 (the controller 120 may be integrated into the core network 130 in some embodiments; in some embodiments, controller 120 may be integrated into base stations 105). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, Time Division Multiple Access (TDMA) signal, Frequency Division Multiple Access (FDMA) signal, Orthogonal FDMA (OFDMA) signal, Single-Carrier FDMA (SC-FDMA) signal, etc. Each modulated signal may be sent on a different carrier and may carry control information (e.g., pilot signals), overhead information, data, etc. The system 100 may be a multi-carrier LTE network capable of efficiently allocating network resources.

The user equipment 115 may be any type of mobile station, user equipment, access terminal, subscriber unit, or user equipment. The user equipment 115 may include cellular phones and wireless communications devices, but may also include personal digital assistants (PDAs), smartphones, other handheld devices, netbooks, notebook computers, etc. Thus, the term user equipment should be interpreted broadly hereinafter, including the claims, to include any type of wireless or mobile communications device.

Throughout this application, some user equipment may be referred to as flexible bandwidth capable user equipment, flexible bandwidth compatible user equipment, and/or flexible bandwidth user equipment. This may generally mean that the user equipment is flexible capable or compatible. In general, these devices may also be capable of normal functionality with respect to one or more normal radio access technologies (RATs). The use of the term flexible as meaning flexible capable or flexible compatible may generally be applicable to other aspects of system 100, such as for controller 120 and/or base stations 105, or a radio access network.

The base stations 105 may wirelessly communicate with the user equipment 115 via a base station antenna. The base stations 105 may be configured to communicate with the user equipment 115 under the control of the controller 120 via multiple carriers. Each of the base station 105 sites can provide communication coverage for a respective geographic area. In some embodiments, base stations 105 may be referred to as a NodeB, eNodeB, Home NodeB, and/or Home eNodeB. The coverage area for each base station 105 here is identified as 110-*a*, 110-*b*, or 110-*c*. The coverage area for a base station may be divided into sectors (not shown, but making up only a portion of the coverage area). The system 100 may include base stations 105 of different types (e.g., macro, micro, femto, and/or pico base stations).

The different aspects of system 100, such as the user equipment 115, the base stations 105, the core network 130, and/or the controller 120 may be configured to utilize flexible bandwidth and waveforms in accordance with various embodiments. System 100, for example, shows transmissions 125 between user equipment 115 and base stations 105. The transmissions 125 may include uplink and/or reverse link transmission, from a user equipment 115 to a base station 105, and/or downlink and/or forward link transmissions, from a base station 105 to a user equipment 115. The transmissions 125 may include flexible and/or normal waveforms. Normal waveforms may also be referred to as legacy and/or normal waveforms.

The different aspects of system 100, such as the user equipment 115, the base stations 105, the core network 130, and/or the controller 120 may be configured to utilize flexible bandwidth and waveforms in accordance with various embodiments. For example, different aspects of system 100 may utilize portions of spectrum that may not be big enough to fit a normal waveform. Devices such as the user equipment 115, the base stations 105, the core network 130, and/or the controller 120 may be configured to adapt the chip rates, spreading factor, and/or scaling factors to generate and/or utilize flexible bandwidth and/or waveforms. Some aspects of system 100 may form a flexible subsystem (such as certain user equipment 115 and/or base stations 105) that may be generated with respect to a normal subsystem (that may be implemented using other user equipment 115 and/or base stations 105) through dilating, or scaling down, the time of the flexible subsystem with respect to the time of the normal subsystem.

In some embodiments, different aspects of system 100, such as the user equipment 115, the base stations 105, the core network 130, and/or the controller 120 may be configured for mobility between flexible bandwidth systems and other bandwidth systems, such as normal bandwidth systems and/or other flexible bandwidth systems. Different aspects of system 100, such as the user equipment 115, the base stations 105, the core network 130, and/or the controller 120, may be configured to provide mobility between different bandwidth systems may facilitate supporting circuit-switched services, such as circuit-switched voice services. Different aspects of system 100, such as the user equipment 115, the base stations 105, the core network 130, and/or the controller 120, may be configured to provide for determining flexible bandwidth capable devices, such as user equipment 115. Some embodiments involve core network redirection, where core network 130 may direct the handling of circuit-switched services, such as a CS voice service, when a flexible bandwidth system does not support the CS services. Different aspects of system 100, such as the user equipment 115, the base stations 105, the core network 130, and/or the controller 120, may be configured to provide for radio access network, which may include base stations 105 and/or controller 120, directed and/or determined handling of CS services, such as CS voice services, when a flexible bandwidth system does not support the CS services. Different aspects of system 100, such as the user equipment 115, the base stations 105, the core network 130, and/or the controller 120, may be configured to provide for transitioning or spring forward to a flexible bandwidth system. Different aspects of system 100, such as the user equipment 115, the base stations 105, the core network 130, and/or the controller 120, may be configured to provide for transitioning or fallback from flexible bandwidth systems to non-flexible bandwidth systems that have no support for some or all CS services (e.g., CS voice), other flexible bandwidth systems, and/or systems that natively support CS voice services.

Figure 2A:
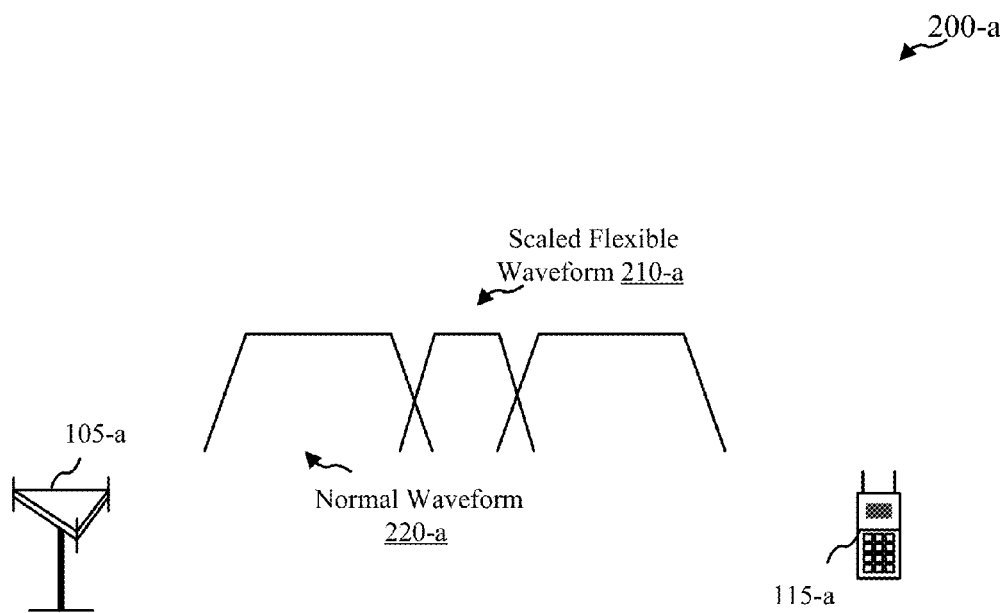
FIG. 2A shows an example of a wireless communications system where a flexible bandwidth waveform fits into a portion of spectrum not broad enough to fit a normal waveform in accordance with various embodiments.
Figure 2B:
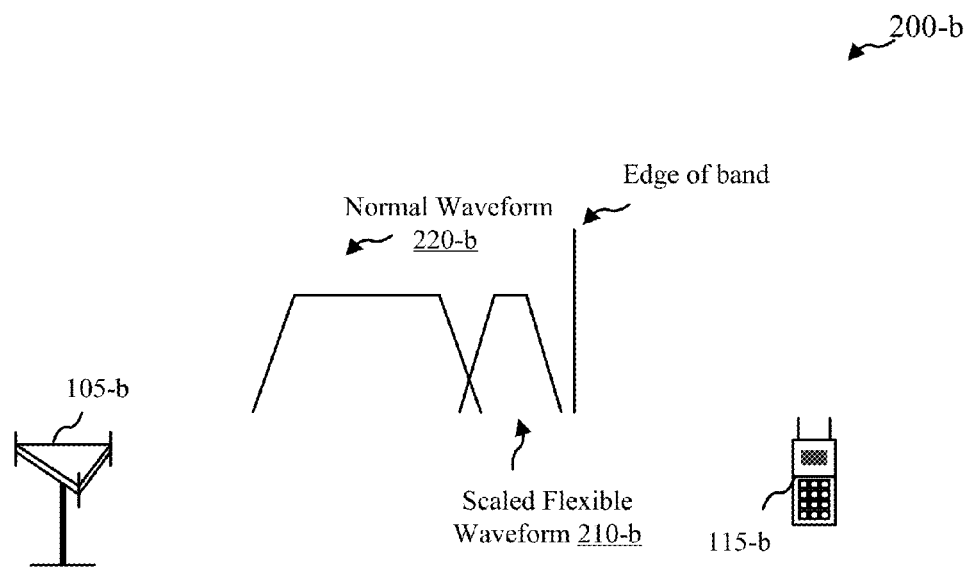
FIG. 2B shows an example of a wireless communications system where a flexible bandwidth waveform fits into a portion of spectrum near an edge of a band in accordance with various embodiments.

FIG. 2A shows an example of a wireless communications system 200-a with a base station 105-a and a user equipment 115-a in accordance with various embodiments, where a flexible bandwidth waveform 210-a fits into a portion of spectrum not broad enough to fit a normal waveform 220-a. System 200-a may be an example of system 100 of FIG. 1. In some embodiments, the flexible bandwidth waveform 210-a may overlap with the normal waveform 220-a that either the base 105-a and/or the user equipment 115-a may transmit. In some cases, the normal waveform 220-a may completely overlap the flexible bandwidth waveform 210-a. Some embodiments may also utilize multiple flexible bandwidth waveforms 210. In some embodiments, another base station and/or user equipment (not shown) may transmit the normal waveform 220-a and/or the flexible bandwidth waveform 210-a. FIG. 2B shows an example of a wireless communications system 200-b with a base station 105-b and user equipment 115-b, where a flexible bandwidth waveform 210-b fits into a portion of spectrum near an edge of a band, which may be a guard band, where normal waveform 220-b may not fit. System 200-b may be an example of system 100 of FIG. 1. User equipment 115-a/115-b and/or base stations 105-a/105-b may be configured to dynamically adjust the bandwidth of the flexible bandwidth waveforms 210-a/210-b in accordance with various embodiments.

Figure 2C:
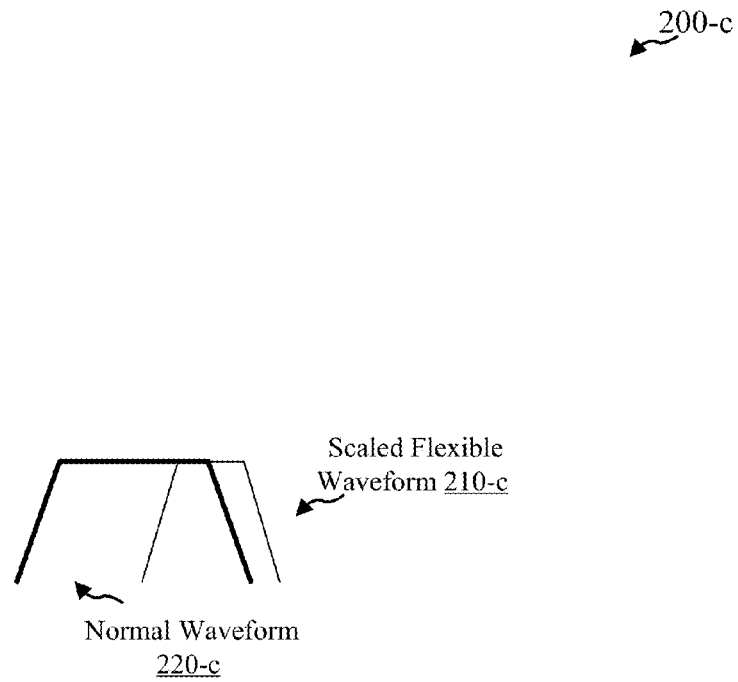
FIG. 2C shows an example of a wireless communications system where a flexible bandwidth waveform partially overlaps a normal waveform in accordance with various embodiments.
Figure 2D:
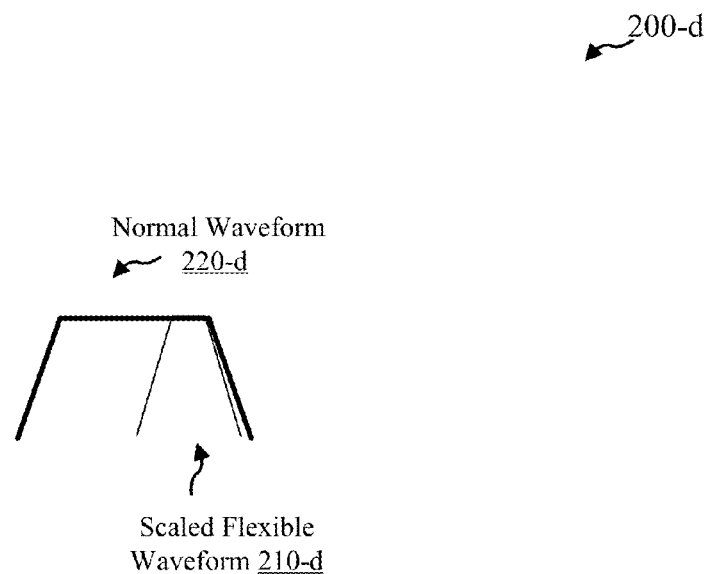
FIG. 2D shows an example of a wireless communications system where a flexible bandwidth waveform is completely overlapped by a normal waveform in accordance with various embodiments.
Figure 2E:
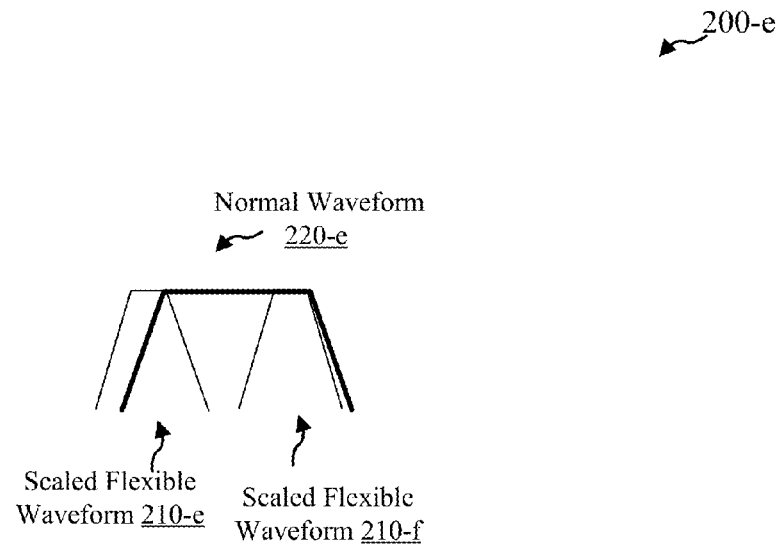
FIG. 2E shows an example of a wireless communications system where one flexible bandwidth waveform is completely overlapped by a normal waveform and another flexible bandwidth waveform partially overlaps a normal waveform in accordance with various embodiments.
Figure 2F:
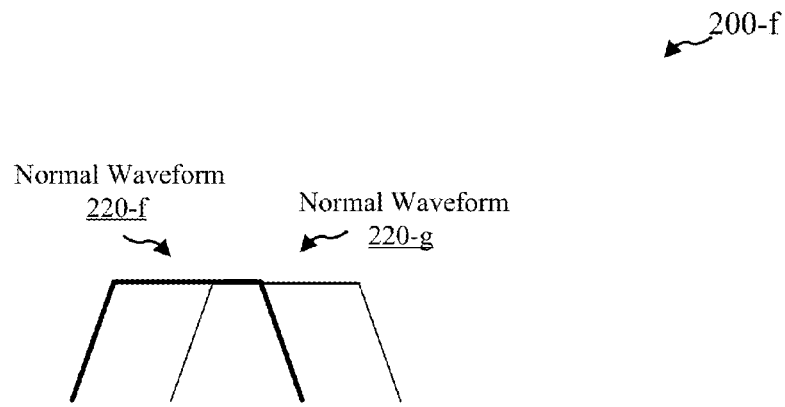
FIG. 2F shows an example of a wireless communications system where one normal waveform partially overlaps another normal waveform in accordance with various embodiments.

FIG. 2C shows an example of a wireless communications system 200-c where a flexible bandwidth waveform 210-c partially overlaps a normal waveform 220-c in accordance with various embodiments. System 200-c may be an example of system 100 of FIG. 1. FIG. 2D shows an example of a wireless communications systems 200-d where a flexible bandwidth waveform 210-d is completely overlapped by a normal waveform 220-d in accordance with various embodiments. System 200-d may be an example of system 100 of FIG. 1. FIG. 2E shows an example of a wireless communications system 200-e where one flexible bandwidth waveform 210-f is completely overlapped by a normal waveform 220-e and another flexible bandwidth waveform 210-e partially overlaps the normal waveform 220-e in accordance with various embodiments. System 200-e may be an example of system 100 of FIG. 1. FIG. 2F shows an example of a wireless communications system 200-f where one normal waveform 220-f partially overlaps another normal waveform 220-g in accordance with various embodiments. System 200-f may be an example of system 100 of FIG. 1. Systems 200-c, 200-d, 200-e, and/or 200-f may be configured such that the bandwidth of the flexible bandwidth waveforms 210-c, 210-d, and/or 210-e may be dynamically adjusted in accordance with various embodiments.

In general, a first waveform or carrier bandwidth and a second waveform or carrier bandwidth may partially overlap when they overlap by at least 1%, 2%, and/or 5%. In some embodiments, partial overlap may occur when the overlap is at least 10%. In some embodiments, the partial overlap may be less than 99%, 98%, and/or 95%. In some embodiments, the overlap may be less than 90%. In some cases, a flexible bandwidth waveform or carrier bandwidth may be contained completely within another waveform or carrier bandwidth such as seen in system 200-d of FIG. 2. This overlap still reflects partial overlap, as the two waveforms or carrier bandwidths do not completely coincide. In general, partial overlap can mean that the two or more waveforms or carrier bandwidths do not completely coincide (i.e., the carrier bandwidths are not the same).

Some embodiments may utilize different definitions of overlap based on power spectrum density (PSD). For example, one definition of overlap based on PSD is shown in the following overlap equation for a first carrier:

$$\text{overlap} = 100\% * \frac{\int_0^\infty PSD_1(f) * PSD_2(f)}{\int_0^\infty PSD_1(f) * PSD_1(f)}.$$

In this equation, $PSD_1(f)$ is the PSD for a first waveform or carrier bandwidth and $PSD_2(f)$ is the PSD for a second waveform or carrier bandwidth. When the two waveforms or carrier bandwidths coincide, then the overlap equation may equal 100%. When the first waveform or carrier bandwidth and the second waveform or carrier bandwidth at least partially overlap, then the overlap equation may not equal 100%. For example, the Overlap Equation may result in a partial overlap of greater than or equal to 1%, 2%, 5%, and/or 10% in some embodiments. The overlap equation may result in a partial overlap of less than or equal to 99%, 98%, 95%, and/or 90% in some embodiments. One may note that in the case in which the first waveform or carrier bandwidth is a normal waveform or carrier bandwidth and the second waveform or a carrier waveform is a flexible bandwidth waveform or carrier bandwidth that is contained within the normal bandwidth or carrier bandwidth, then the overlap equation may represent the ratio of the flexible bandwidth compared to the normal bandwidth, written as a percentage. Furthermore, the overlap equation may depend on which carrier bandwidth's perspective the overlap equation is formulated with respect to. Some embodiments may utilize other definitions of overlap. In some cases, another overlap may be defined utilizing a square root operation such as the following:

$$\text{overlap} = 100\% * \sqrt{\frac{\int_0^\infty PSD_1(f) * PSD_2(f)}{\int_0^\infty PSD_1(f) * PSD_1(f)}}.$$

Other embodiments may utilize other overlap equations that may account for multiple overlapping carriers.

Figure 3A:
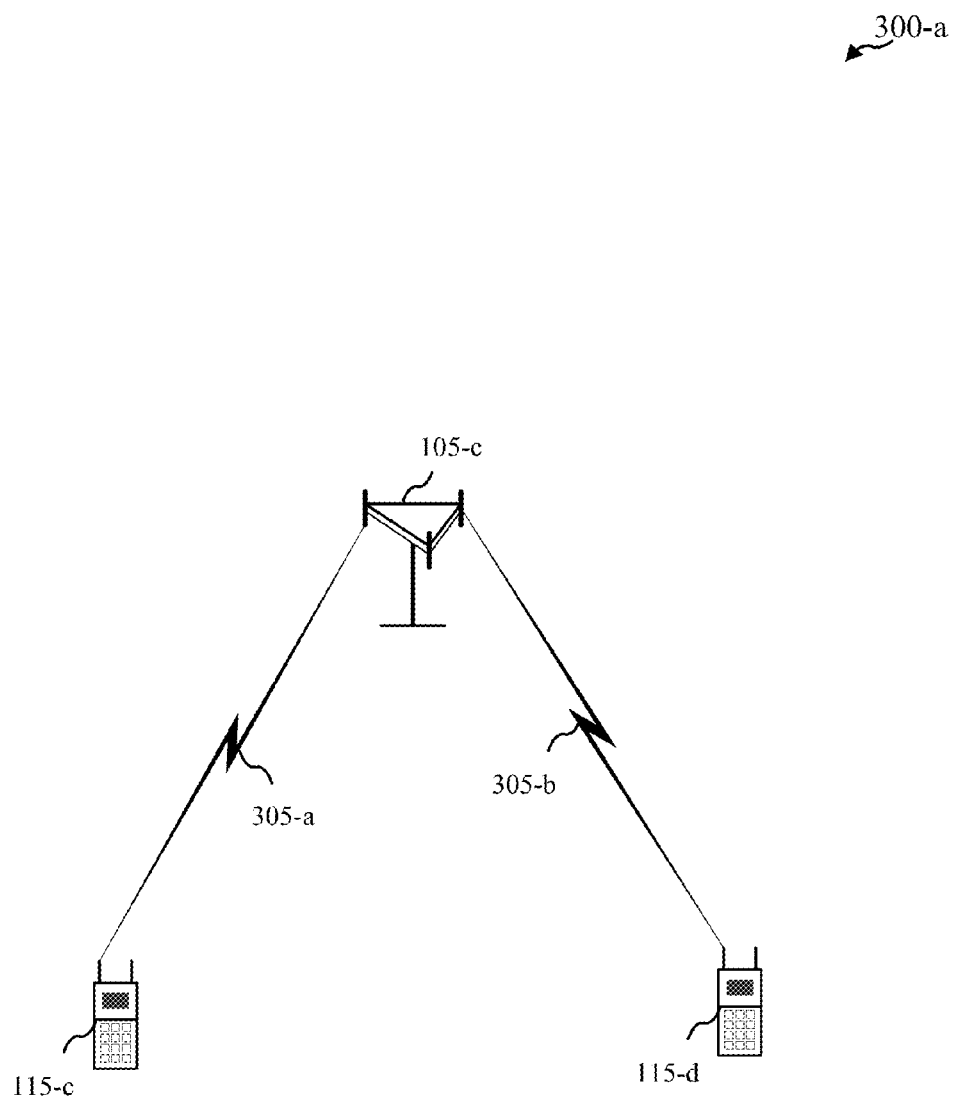
FIG. 3A shows a block diagram of a wireless communications system in accordance with various embodiments.

FIG. 3A shows a wireless communications system 300-a with a base station 105-c and user equipment 115-c and 115 d, in accordance with various embodiments. Different aspects of system 300-a, such as the user equipment 115-c and/or 115-d and/or the base stations 105-c, may be configured for mobility between flexible bandwidth systems and other bandwidth systems, such as normal bandwidth systems and/or other flexible bandwidth systems. Different aspects of system 300-a, such as the user equipment 115-c and/or 115-d and/or the base stations 105-c, may be configured to provide mobility between different bandwidth systems may facilitate supporting circuit-switched services, such as circuit-switched voice services. Different aspects of system 300-a, such as the user equipment 115-c and/or 115-d and/or the base stations 105-c, may be configured to provide for determining flexible bandwidth capable devices, such as user equipment 115-c and/or 115-d. Some embodiments involve core network redirection, where a core network may direct the handling of circuit-switched services, such as a CS voice service, when a flexible bandwidth system does not support the CS services. Different aspects of system 300-a, such as the user equipment 115-c and/or 115-d and/or the base stations 105-c, may be configured to provide for radio access network, which may include base stations 105-c, directed and/or determined handling of CS services, such as CS voice services, when a flexible bandwidth system does not support the CS services. Different aspects of system 300-a, such as the user equipment 115-c and/or 115-d and/or the base stations 105-c, may be configured to provide for transitioning or spring forward to a flexible bandwidth system. Different aspects of system 300-a, such as the user equipment 115-c and/or 115-d and/or the base stations 105-c, may be configured to provide for transitioning or fallback from flexible bandwidth systems to non-flexible bandwidth systems that have no support for some or all CS services (e.g., CS voice), other flexible bandwidth systems, and/or systems that natively support CS voice services.

Transmissions 305-a and/or 305-b between the user equipment 115-c/115-d and the base station 105-a may utilize flexible bandwidth waveforms that may be generated to occupy less (or more) bandwidth than a normal waveform. For example, at a band edge, there may not be enough available spectrum to place a normal waveform. For a flexible bandwidth waveform, as time gets dilated, the frequency occupied by a waveform goes down, thus making it possible to fit a flexible bandwidth waveform into spectrum that may not be broad enough to fit a normal waveform. In some embodiments, the flexible bandwidth waveform may be scaled utilizing a scaling factor N with respect to a normal waveform. Scaling factor N may take on numerous different values including, but not limited to, integer values such as 1, 2, 3, 4, 8, etc. N, however, does not have to be an integer.

Some embodiments may utilize additional terminology. A new unit D may be utilized. The unit D is dilated. The unit is unitless and has the value of N. One can talk about time in the flexible system in terms of "dilated time". For example, a slot of say 10 ms in normal time may be represented as 10 Dms in flexible time (note: even in normal time, this will hold true since N=1 in normal time: D has a value of 1, so 10 Dms=10 ms). In time scaling, one can replace most "seconds" with "dilated-seconds". Note frequency in Hertz is 1/s.

As discussed above, a flexible bandwidth waveform may be a waveform that occupies less bandwidth than a normal waveform. Thus, in a flexible bandwidth system, the same number of symbols and bits may be transmitted over a longer duration compared to normal bandwidth system. This may result in time stretching, whereby slot duration, frame duration, etc., may increase by a scaling factor N. Scaling factor N may represent the ratio of the normal bandwidth to flexible bandwidth (BW). Thus, data rate in a flexible bandwidth system may equal (Normal Rater 1/N), and delay may equal (Normal Delay×N). In general, a flexible systems channel BW=channel BW of normal systems/N. Delay×BW may remain unchanged. Furthermore, in some embodiments, a flexible bandwidth waveform may be a waveform that occupies more bandwidth than a normal waveform.

Throughout this specification, the term normal system, subsystem, and/or waveform may be utilized to refer to systems, subsystems, and/or waveforms that involve embodiments that may utilize a scaling factor that may be equal to one (e.g., N=1) or a normal or standard chip rate. These normal systems, subsystems, and/or waveforms may also be referred to as standard and/or legacy systems, subsystems, and/or waveforms. Furthermore, flexible systems, subsystems, and/or waveforms may be utilized to refer to systems, subsystems, and/or waveforms that involve embodiments that may utilize a scaling factor that may be not equal to one (e.g., N=2, 4, 8, ½, ¼, etc.). For N>1, or if a chip rate is decreased, the bandwidth of a waveform may decrease. Some embodiments may utilize scaling factors or chip rates that increase the bandwidth. For example, if N<1, or if the chip rate is increased, then a waveform may be expanded to cover bandwidth larger than a normal waveform. Flexible systems, subsystems, and/or waveforms may also be referred to as fractional systems, subsystems, and/or waveforms in some cases. Fractional systems, subsystems, and/or waveforms may or may not change bandwidth, for example. A fractional system, subsystem, or waveform may be flexible because it may offer more possibilities than a normal or standard system, subsystem, or waveform (e.g., N=1 system). Furthermore, the use of the term flexible may also be utilized to mean flexible bandwidth capable.

Figure 3B:
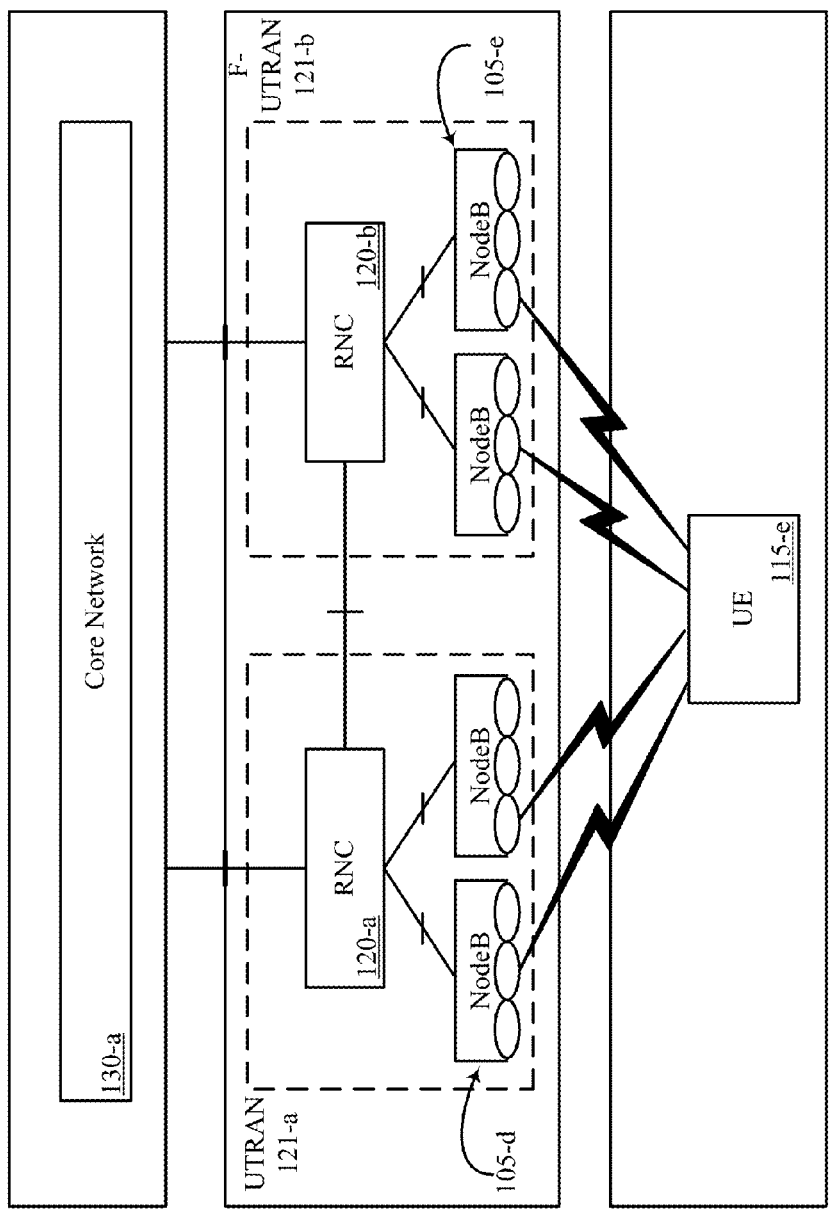
FIG. 3B shows a block diagram of a wireless communications system in accordance with various embodiments.

Referring next to FIG. 3B, a block diagram illustrates an example of a wireless communications system **300-*b*. The system 300-*b* may be an example of the system 100 described with reference to FIG. 1. NodeBs 105 and radio network controllers (RNCs) 120 are parts of wireless communications system 300-*b*. In the illustrated example, the system includes a UMTS Terrestrial Radio Access Network (UTRAN) 121-*a* and a flexible UMTS (F-UMTS) 121-*b* (or, in general, UTRAN 121). A UTRAN 121 may be a collective term for the NodeBs 105 (or base stations) and the control equipment for the NodeBs 105 (or RNC 120) it contains which make up the UMTS radio access network. This may be a 3 G communications network which can carry both real-time circuit switched and IP-based packet-switched traffic types. The UTRAN 121 may provide an air interface access method for the user equipment (UE) 115-*e* Connectivity is provided between the UE 115-*e* and the core network 130-*a* by the UTRAN 121-*a* and/or F-UTRAN 121-*b*. The UTRAN 121 may transport data packets to multiple UEs 115-*e***

The UTRANs 121 may be connected internally or externally to other functional entities by a number of interfaces. UTRANs 121 may be in communication with a core network **130-*a* via external interface supported by RNCs 120. In addition, the RNCs 120 manage a set of base stations called NodeBs 105. RNCs 120 may be in communication with each other, as well. UTRANs 121 may be largely autonomous from the core network 130-*a* because the RNCs 120 may be interconnected. The NodeBs 105 may be in wireless communication with the UE 115-*e*. The system may be further connected to additional networks (not shown), such as a corporate intranet, the Internet, or a conventional public switched telephone network, and may transport data packets between each UE 115-*e*** and such outside networks.

Each RNC 120 may fill multiple roles. First, they may control the admission of new UEs **115-*e* or services attempting to use the NodeB 105. Second, from the NodeB 105, or base station, point of view, the RNC 120 may be a controlling RNC 120. Controlling admission ensures that UEs 115-*e* may be allocated radio resources (bandwidth and signal/noise ratio) up to what the network has available. An RNC 120 may terminate the UE's 115-*e*** link layer communications.

For an air interface, UMTS often uses a wideband spread-spectrum mobile air interface known as Wideband Code Division Multiple Access (or W-CDMA). W-CDMA uses a direct sequence code division multiple access signaling method (or CDMA) to separate users. W-CDMA is a third generation standard for mobile communications. W-CDMA evolved from GSM (Global System for Mobile Communications)/GPRS a second generation standard, which is oriented to voice communications with limited data capability. The first commercial deployments of W-CDMA are based on a version of the standards called W-CDMA Release 99. The air interface may also be configured to utilize flexible bandwidth.

The different aspects of system **300-*b*, such as the user equipment 115-*e*, the base stations 105-*e*, the core network 130-*a*, RNC 120-*b*, and/or F-UTRAN 121-*b* may be configured to utilize flexible bandwidth and waveforms in accordance with various embodiments. For example, different aspects of system 300-*b* may utilize portions of spectrum that may not be big enough to fit a normal waveform. Devices such as the user equipment 115, the base stations 105, the core network 130, and/or the controller 12, such as the user equipment 115-*e*, the base stations 105-*e*, the core network 130-*a*, RNC 120-*b*, and/or F-UTRAN 121-*b* may be configured to adapt the chip rates, spreading factor, and/or scaling factors to generate and/or utilize flexible bandwidth bandwidth and/or waveforms. Some aspects of system 300-*b* may form a flexible bandwidth subsystem (such as certain user equipment 115 and/or base stations 105) that may be generated with respect to a normal subsystem (that may be implemented using other user equipment 115 and/or base stations 105**) through dilating, or scaling down, the time of the flexible bandwidth subsystem with respect to the time of the normal subsystem.

In some embodiments, different aspects of system **300-*b*, such as the user equipment 115-*e*, the base stations 105-*e*, the core network 130-*a*, RNC 120-*b*, and/or F-UTRAN 121-*b*, may be configured for mobility between flexible bandwidth systems and other bandwidth systems, such as normal bandwidth systems and/or other flexible bandwidth systems. Different aspects of system 300-*b*, such as the user equipment 115-*e*, the base stations 105-*e*, the core network 130-*a*, RNC 120-*b*, and/or F-UTRAN 121-*b*, may be configured to provide mobility between different bandwidth systems may facilitate supporting circuit-switched services, such as circuit-switched voice services. Different aspects of system 300-*b*, such as the user equipment 115-*e*, the base stations 105-*e*, the core network 130-*a*, RNC 120-*b*, and/or F-UTRAN 121-*b*, may be configured to provide for determining flexible bandwidth capable devices, such as user equipment 115-*e*. Some embodiments involve core network redirection, where core network 130-*a* may direct the handling of circuit-switched services, such as a CS voice service, when a flexible bandwidth system does not support the CS services. Different aspects of system 300-*b*, such as the user equipment 115-*e*, the base stations 105-*e*, the core network 130-*a*, RNC 120-*b*, and/or F-UTRAN 121-*b*, may be configured to provide for radio access network, which may include UTRAN 121-*a* and/or F-UTRAN 1210-*b*, directed and/or determined handling of CS services, such as CS voice services, when a flexible bandwidth system does not support the CS services. Different aspects of system 300-*b*, such as the user equipment 115-*e*, the base stations 105-*e*, the core network 130-*a*, RNC 120-*b*, and/or F-UTRAN 121-*b*, may be configured to provide for transitioning or spring forward to a flexible bandwidth system. Different aspects of system 300-*b*, such as the user equipment 115-*e*, the base stations 105-*e*, the core network 130-*a*, RNC 120-*b*, and/or F-UTRAN 121-*b***, may be configured to provide for transitioning or fallback from flexible bandwidth systems to non-flexible bandwidth systems that have no support for some or all CS services (e.g., CS voice), other flexible bandwidth systems, and/or systems that natively support CS voice services.

Methods, systems, and devices for mobility between flexible bandwidth systems and normal bandwidth systems are provided. Some embodiments provide for flexible-capable user equipment to be registered with a flexible bandwidth system and/or normal bandwidth system based on the services the user equipment may utilize. For example, a user equipment may be registered with a normal bandwidth system that may support circuit-switched voice services that the flexible bandwidth system may not support, while other service, such as packet-switched services, and possibly some circuit-switched services, may be provided through the flexible bandwidth system. Some embodiments may involve situations where a core network may or may not be aware of the flexible-capabilities of the user equipment or other aspects of the wireless communications systems, such as a flexible-capable radio access network (RAN). Some embodiments may provide for a core network and/or RAN to redirect circuit-switched voice services or other services to different networks based on capability and/or usage. Furthermore, some embodiments may be configured to provide for transitioning, or fallback, from a flexible bandwidth system to a normal bandwidth system. Some embodiments may provide for transitioning, or spring forward, from a normal bandwidth system to a flexible bandwidth system.

For some flexible bandwidth systems, supporting voice may present different issues. For example, a data rate for voice may get reduced and/or additional delay may get introduced. Some embodiments may address such issues without utilizing native voice support in a flexible bandwidth system, such as a flexible bandwidth UTRAN. Some embodiments may include transitioning and/or fallback to other RATs (e.g., GERAN, UTRAN, CDMA 1x) for circuit-switched voice. To address such issues, mobility between flexible bandwidth systems, such as flexible bandwidth UTRAN, and non-flexible bandwidth systems or systems that natively support CS voice (e.g., GERAN/UTRAN (for voice fallback)) and other way round (for PS connection transfer either for better coverage or higher rate) may be supported.

In the following, fractional bandwidth RAN, flexible bandwidth RAN, fractional bandwidth UTRAN, and/or flexible bandwidth UTRAN may mean the same. In general, this terminology refers to flexible bandwidth Radio Access Network that may include an RNC and Node B modified to support flexible bandwidth functionality, such as flexible bandwidth UMTS functionalities. Some embodiments may provide mobility in accordance with various embodiments through several core network based embodiments. These embodiments maybe related to the behavior of the core network.

In some embodiments, Location Area (LA) and/or Routing Area (RA) for flexible bandwidth UMTS, UMTS, and GSM, for example, may be overlapping but not necessarily the same as the cell sizes are different. The flexible bandwidth UMTS and UMTS and/or GSM cells may overlap partially or completely. In some embodiments, SGSN and MSC serving UMTS, GSM and flexible bandwidth UMTS networks are the same. This may be the case, for example, when UMTS, GSM, and flexible bandwidth UMTS are deployed at the same site. In some embodiments, flexible bandwidth UTRAN supports CS SMS and other CS services except CS voice call. For CS voice, it may support some CS voice related signaling (e.g., Paging Type 2 message for MT CS voice call when UE is in PS call.

Some embodiment may handle situations where there is no CS support on the flexible bandwidth RAN, such as a flexible bandwidth UTRAN. In some embodiments, the CN is aware that flexible bandwidth UTRAN does not offer CS services. Mobiles may do combined IMSI/GPRS Attach, for example. Redirection by CN and/or flexible bandwidth UTRAN may be used.

Some embodiment may handle situations where there is CS without voice support on a flexible bandwidth RAN, such as a flexible bandwidth UTRAN. For example, a flexible bandwidth UTRAN may support CS signaling (e.g., Paging Type 2 message for MT CS voice call when UE is in PS call) and might or might not support SMS and CS data services but does not support CS voice call. The CN may or may not be aware of this lack of voice support. UEs may do combined IMSI/GPRS Attach. For embodiments with CN aware, redirection by CN or flexible bandwidth UTRAN may be used. For embodiments with CN unaware, redirection by flexible bandwidth UTRAN may be utilized. In some embodiments, the CN may ensure that the UE is registered with the appropriate MSC and SGSN. MSC and SGSN might support different RATs.

The following describes some embodiments where there may be no CS support on a flexible bandwidth RAN, such as a flexible bandwidth UTRAN. Merely by way of example, a UE may be camping on the flexible bandwidth UTRAN. The UE may participate in a CS+PS registration process, such as a combined GPRS and IMSI (CS+PS) Attach on the flexible bandwidth UTRAN. In some embodiments, the GPRS Attach is received by the SGSN and the UE is registered on the PS domain at the SGSN. In some embodiments, the CN is aware of lack of CS support on flexible bandwidth UTRAN, and as a result, the IMSI attach may be forwarded to MSC/VLR of the GSM/UMTS network with overlapping routing and location areas as the flexible bandwidth UTRAN routing areas. RAN changes and CN changes may be involved in some embodiments. In these embodiments, CN redirection or RAN redirection may both work.

The following description includes numerous call flows, including those shown in FIGS. 4, 5, 19, 20, 22-24, and 30-37. These call flows and other portions may include different mobile originated (MO) (i.e., user equipment originated) and/or mobile terminated (MT) (i.e., user equipment terminated) communications in some cases. These call flows and other portions may show or refer to user equipment (UE), flexible bandwidth radio access network (flexible bandwidth RAN), WCDMA Universal Terrestrial Radio Access Network (UTRAN), GSM/EDGE Radio Access Network (GERAN), UMTS UTRAN, Flexible bandwidth UMTS, combined Radio Network Controller (RNC), flexible bandwidth UTRAN, Mobile Switching Center (MSC), Visitor Location Register (VLR), Serving General Packet Radio Service Support Node (SGSN), and/or Home Location Register (HLR). In general, a UE may in be implemented as generally described with respect to user equipment 115 throughout this Application. Flexible bandwidth RAN, WCDMA UTRAN, GERAN, UMTS UTRAN, Flexible bandwidth UMTS, and/or combined Radio Network Controller may be implemented as part of the radio access networks 121 as generally described throughout this Application. Mobile Switching Center (MSC), Visitor Location Register (VLR), Serving General Packet Radio Service Support Node (SGSN), and/or Home Location Register (HLR) may be implemented as part of the core networks 130 as generally described throughout this Application.

Figure 4:
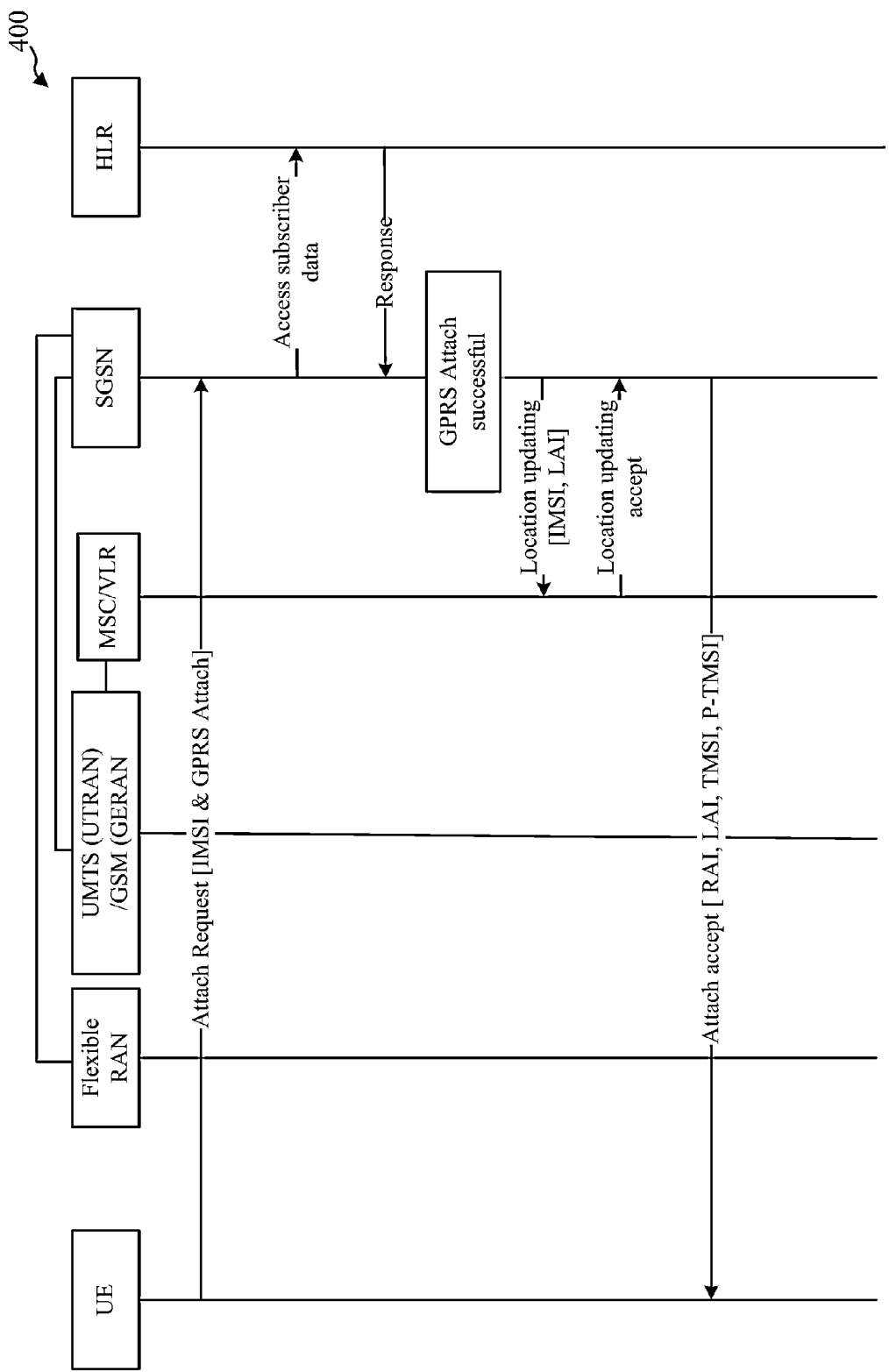
FIG. 4 shows a call flow in accordance with various embodiments.

For example, turning to FIG. 4, a call flow 400 is shown involving registration for the UE when there may not be CS support on the flexible bandwidth UTRAN in accordance with various embodiments. In call flow 400, GPRS Attach may be performed with SGSN. HLR may provide information to the SGSN to assist it in finding the appropriate MSC. IMSI Attach may be forwarded to MSC/VLR supporting UMTS/GSM network with overlapping LAs/RAs as the flexible bandwidth UMTS RAs. In this example, LAI and RAI in the "Attach accept" message may belong to different networks. Although not shown in the FIG. 4, authentication and security commands may typically be exchanged between the UE and CN network before the "Attach Accept" is sent to the UE.

Some embodiments include a flexible bandwidth system where CS signaling may be supported by a flexible bandwidth RAN, but no voice support on the flexible bandwidth RAN, such as a flexible bandwidth UTRAN. Merely by way of example, a UE may be camping on the flexible bandwidth UTRAN. The UE may perform a combined IMSI and GPRS Attach on the flexible bandwidth UTRAN. In some embodiments, the CN is aware that some CS signaling and maybe some services (e.g., SMS, CS Data etc.) are supported on flexible bandwidth UTRAN, but not voice. The CN may register the UE for CS' and PS calls (where CS' means all CS services except CS voice) on flexible bandwidth UTRAN and CS voice on another RAN that may support voice, such as UMTS or GSM. MT/MO CS (except voice) and PS calls may be handled on flexible bandwidth UTRAN. When MT CS notification is received at the MSC connected to UMTS or GSM, a page may be forwarded to the UE through the MSC supporting non-voice CS or the SGSN (for flexible bandwidth UTRAN) and UE may be redirected to another CS voice support system, such as GSM or UMTS. CN redirection and/or RAN redirection may both works. RAN changes and/or CN changes may be implemented in some cases.

Merely by way of example, a UE may be camping on the flexible bandwidth UTRAN. The UE may perform a combined IMSI and GPRS Attach on the flexible bandwidth UTRAN. In some embodiments, the CN is not aware that flexible bandwidth UTRAN does not support voice services, so it may register the UE for CS+PS calls on flexible bandwidth UTRAN. MT/MO CS (except voice) and PS calls may be handled on flexible bandwidth UTRAN. When MT CS notification is received at the MSC, a page may be sent to the UE and UE may redirected to another voice-support network, such as GSM or UMTS. In some embodiments, RAN redirection is utilized. RAN changes may occur in some embodiments.

Figure 5:
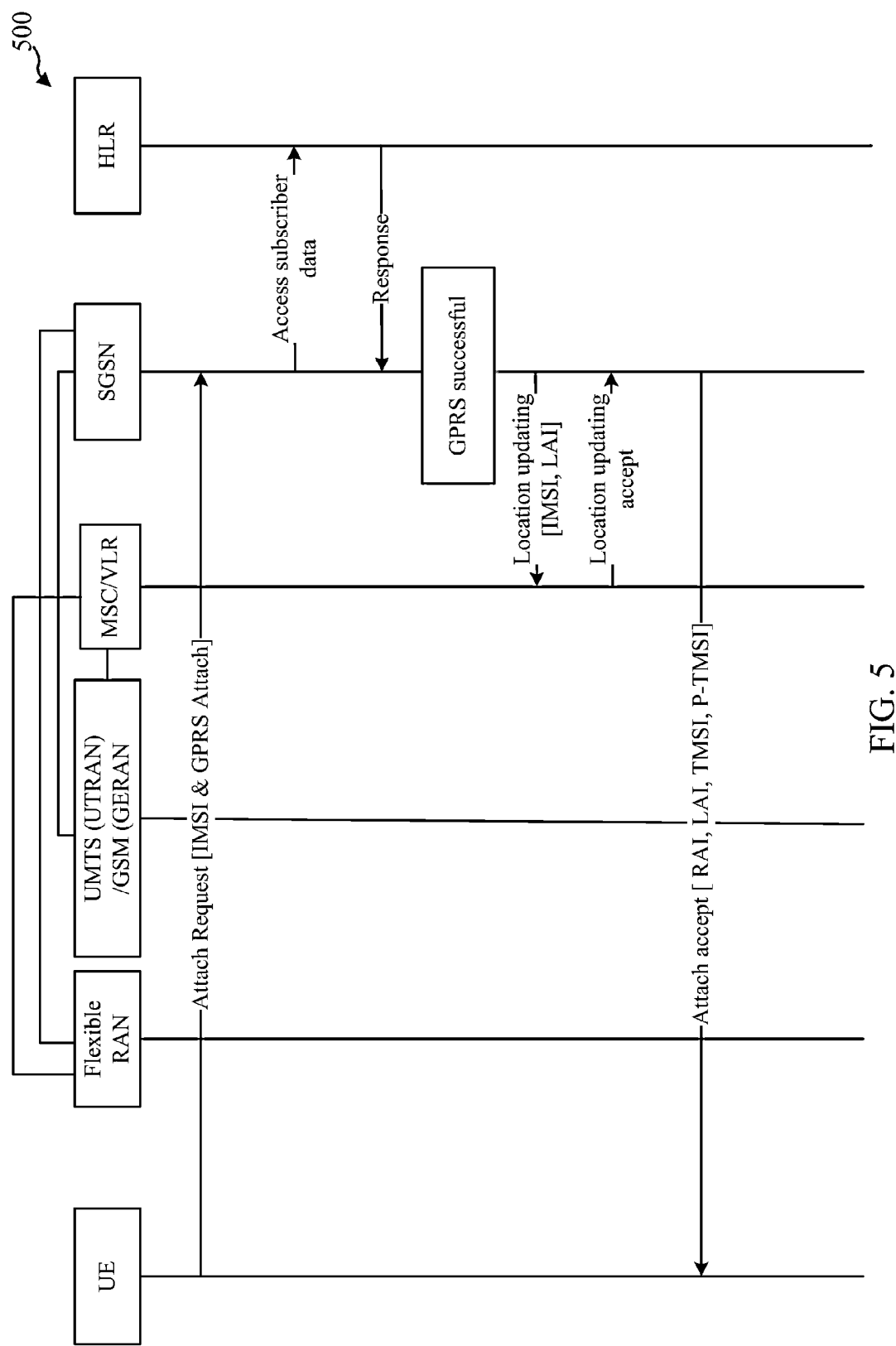
FIG. 5 shows a call flow in accordance with various embodiments.

FIG. 5 shows an example of a call flow 500 for a registration process in accordance with various embodiments where they may be PS and some CS support on the flexible bandwidth RAN. The HLR may provide information to the SGSN to assist it in finding the appropriate MSC. IMSI Attach may be forwarded to MSC/VLR supporting flexible bandwidth UTRAN. LAI and RAI in the "Attach Accept" message may belong to the flexible bandwidth UTRAN. Although, it is not shown in the FIG. 5, authentication and security commands may be typically exchanged between the UE and CN network before the "Attach Accept" is sent to the UE.

Methods, systems, and devices for identifying flexible bandwidth capable devices are provided. These methods, systems, and/or devices may include device 600 of FIG. 6, RAN 121 of FIG. 7, UE 115 of FIG. 8, method 900-a of FIG. 9A, method 900-b of FIG. 9B, and/or method 900-c of FIG. 9C, for example. Some embodiments provide for determining flexible bandwidth capable devices, such as user equipment (UE). In some embodiments, a flexible bandwidth capable UE transmits messages indicating whether the UE supports flexible bandwidth radio access network. These messages may be in response to receiving different messages from a radio access network, for example. Some embodiments allow for differentiating legacy UEs from flexible bandwidth capable UEs through the different messages these different UEs may or may not transmit in response to receiving different types of messages. For example, legacy UEs may transmit failure messages when they receive messages related to flexible bandwidth radio access networks, while flexible bandwidth capable UEs may respond differently, such as through not sending a failure message. Flexible bandwidth capable UEs may also support normal bandwidth systems, such as normal bandwidth UMTS. These tools and techniques may allow a radio access network and/or core network to determine which UEs have flexible bandwidth capabilities.

Some embodiments include identifying flexible bandwidth UEs through a standardized solution. The UTRAN may send an "UE Capability Enquiry" message to connected mode flexible bandwidth UMTS and normal UMTS UEs while they are in connected mode on a normal bandwidth UMTS carrier. The UE capability enquiry can be used to request the UE to transmit its capability information related to any radio access network that is supported by the UE. The UEs may respond back with the "UE capability information" message which states whether the UE supports flexible bandwidth UMTS cells and in which frequency bands. The UTRAN may use the message to determine which UEs to request inter-frequency measurements from where the target carrier is flexible bandwidth UMTS carrier.

A flexible-compatible (or capable) UTRAN (which may support both normal and flexible bandwidth carriers) may infer the UE's flexible bandwidth capability based on configuring measurement reports as the UE capability may not indicate support of flexible bandwidth UMTS system in current UMTS releases. Some embodiments provide for a flexible-bandwidth compatible UTRAN (e.g., supports both normal and flexible bandwidth carriers) that may know whether a UE is flexible bandwidth compatible or not in other ways. In some cases, if a UE is asked to make a measurement that is not supported by the UE, it may ignore the entire Measurement Control Message and may send a Measurement Control Failure message to the UTRAN with "failure cause" set to "unsupported measurement". The UE may continue with any ongoing processes and procedures as if the Measurement Control Message has not been received. Some embodiments may address this through the following procedure. In a step A, a flexible bandwidth compatible UTRAN (supports normal+ flexible bandwidth UMTS frequencies) may send a Measurement Control Message corresponding to measurement in a chosen invalid UARFCN—a frequency which a legacy UE (that may not support flexible bandwidth UTMS) would consider as invalid because it is in band edge. In a step B, a legacy UE may send Measure Control Failure Message as the measurement is not supported. On the other hand, a flexible bandwidth compatible UE may interpret the invalid UARFCN differently and may not send Measurement Control Failure Message. The flexible bandwidth-compatible UE may not send any Measurement Control Failure message and might or might not send any Measurement Report Message. Thus, cost to legacy UE may be the Measurement Control Message transmission from network with invalid UARFCN that triggers the Measurement Control Failure Message from legacy UE. In a step C, flexible bandwidth-compatible UTRAN may know which UEs are flexible bandwidth compatible from step B (i.e., UEs that have not sent Measurement Control Failure Message). It may ask flexible bandwidth-compatible UEs to go and make measurements on flexible bandwidth UMTS frequencies and schedule Compressed Mode gaps. A variant may be possible in which the invalid UARFCN may encode the flexible bandwidth UMTS frequency, and possibly the bandwidth, eliminating step C for flexible bandwidth compatible UEs. Irrespective of the variants, the flexible bandwidth capable UE may send Measurement Report Message based on whether flexible bandwidth UMTS carrier was detected.

Some embodiments may use some reserved bits in existing IEs (Information Elements) for a flexible bandwidth UMTS compatible UE to indicate its flexible capability to a network that is flexible bandwidth UMTS capable. The reserved bits maybe ignored by a legacy network that is not flexible bandwidth capable. A flexible bandwidth UMTScompatible UE may signal its capability using non-critical extension Information Elements (IE). In both cases, if a legacy RAN receives the IE, it may discard it while a flexible-compatible UMTS RAN may act upon this capability information. There may be also UTRAN Classmark Info sent by the UE. These could also be used by flexible-compatible UMTS UE to indicate its flexible bandwidth capability and for flexible bandwidth UTRAN to know the UE's flexible bandwidth capabilities when there may be fields/Information Elements to indicate such capability.

In some embodiments, there is measurement capability to indicate capability for FDD measurements, 3.84 Mcps TDD measurements, 7.68 Mcps TDD measurements, 1.28 Mcps TDD measurements, etc. In some embodiments, there is also measurement capability extension. Flexible bandwidth UMTS capability of UE can be indicated as another capability in the measurement capability or measurement capability extension. With flexible bandwidth UMTS being considered as same RAT as UMTS, and considering it as a UMTS "feature or special category", an additional IE may be added to the "UE radio access capability" or "UE radio access capability extension," for example. In the extension, features such as dual cell capability, frequency band specific capability may be specified. As an alternative, flexible bandwidth UMTS capability of UE can be specified in "UE multi-mode/multi-RAT capability," for example. This may cover both cases where flexible bandwidth UMTS is considered as mode of the same RAT (UMTS) or considered as a different RAT than UMTS.

Some embodiments provide for identifying UEs with flexible bandwidth capabilities in other ways. For example, the network scheduled compressed mode gaps for flexible UMTS and normal UMTS connected mode UEs may be utilized to search for neighboring cells on flexible bandwidth UMTS carriers and determining the flexible bandwidth UMTS capability of UEs. Periodic reporting may be used to monitor if the UE can identify neighboring ells on flexible bandwidth UMTS carriers within a given period of time. If neighboring cells on flexible bandwidth UMTS carriers may not be identified, the RAN may disable the inter-frequency measurements and the RAN may infer those UEs as normal or legacy UEs that are not flexible bandwidth capable. For flexible bandwidth UMTS capable UEs that may identify neighboring cells on flexible bandwidth UMTS carriers, the reporting can be switched to event-based reporting and the RAN may infer these UEs as flexible bandwidth capable UEs. Inter-frequency handover may be triggered once a suitable event is reported to the UTRAN by the flexible bandwidth capable UE. The RAN may also choose to trigger an inter-frequency blind handover before the UE reports a suitable event.

Figure 6:
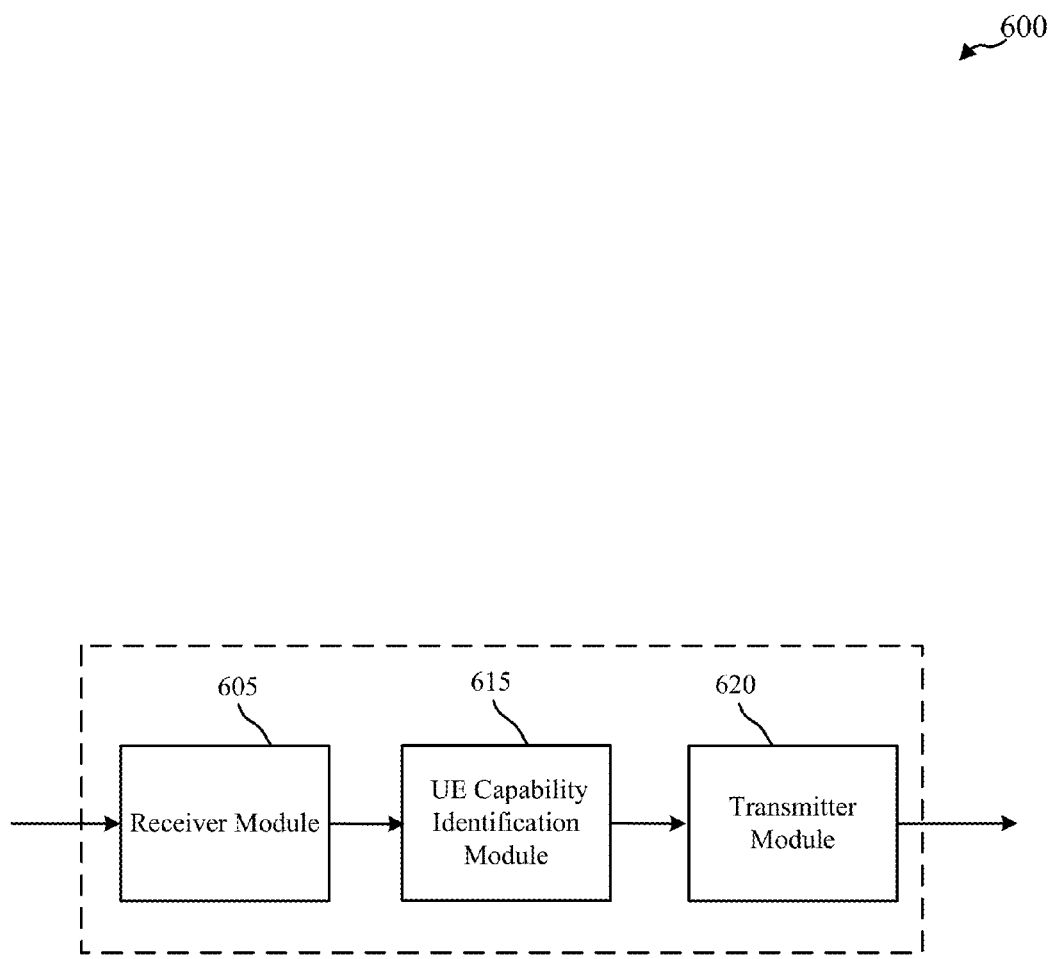
FIG. 6 shows a block diagram of a device configured for user equipment capability identification in accordance with various embodiments.

Turning next to FIG. 6, a block diagram illustrates a device 600 configured for user equipment identification in accordance with various embodiments. The device 600 may be an example of aspects of the radio access networks 121 of FIG. 3B and/or FIG. 7; and/or user equipment 115 of FIG. 1, FIG. 2, FIG. 3, FIG. 7, and/or FIG. 8. The device 600 may also be a processor. The device 600 may include a receiver module 605, a UE capability identification module 615, and/or a transmitter module 620. Each of these components may be in communication with each other.

These components of the device 600 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may receive information such as packet, data, and/or signaling information regarding what device 600 has received or transmitted. The received information may be utilized by the UE capability identification module 615 for a variety of purposes.

In some embodiments, UE capability identification module 615 is configured for determining flexible bandwidth capable user equipment. UE capability identification module 615 may be configured for: transmitting one or more messages to one or more user equipments (UEs), where the one or more messages are configured to facilitate determining which of the one or more UEs is capable of utilizing a flexible bandwidth carrier; receiving one or more responses from one or more of the one or more UEs in response to the one or more transmitted messages; and/or utilizing the one or more received responses to determine which of the one or more UEs is capable of utilizing the flexible bandwidth carrier. In some cases, receiver module 605 and/or transmitter module 620 may be configured to perform one or more of these aspects.

In some cases, transmitting the one or more messages to one or more UEs utilizing device 600 may occur over another bandwidth carrier, which may include a normbla bandwidth carrier. The other bandwidth carrier may be on another radio access technology. Transmitting the one or more messages to one or more UEs may occur over a first carrier that may be supported by all the UEs. Some embodiments include transmitting the one or more messages over a first carrier to facilitate determining which UEs are capable of supporting a second carrier, where the second carrier is a flexible bandwidth carrier. Transmitting the one or more messages to one or more UEs may include transmitting a message to the one or more UEs corresponding to a measurement for an unused frequency with respect to a normal bandwidth system. The unused frequency may include an invalid frequency and or a conditional frequency.

Receiving the one or more responses from one or more of the UEs utilizing device 600 may include receiving one or more failures messages from one or more of the one or more UEs reflecting that the UEs is not capable of utilizing with respect to at least one flexible bandwidth carrier. Receiving the one or more responses from one or more of the UEs may include receiving one or more responses indicating the one or more of the one or more UEs can identify flexible bandwidth carriers. Receiving the one or more response from one or more of the UEs may include receiving one or more Information Elements (IEs) indicating the flexible bandwidth capabilities of one or more of the one or more UEs. Some embodiments include determining that a timing out period has occurred for at least one of the UEs.

Some embodiments of device 600 may provide for identifying UE capabilities. For example, in some embodiments, the network issues compressed mode gaps for flexible bandwidth UMTS and normal UMTS connected mode UEs to search for neighboring cells on flexible bandwidth UMTS carriers. Periodic reporting may be used to monitor if the UE can identify neighboring cells on Flexible bandwidth UMTS carriers after a given period of time. If neighboring cells on flexible bandwidth UMTS carriers may not be identified, the RAN may disable the inter-frequency measurements. For flexible bandwidth UMTS UEs that may identify neighboring cells on flexible bandwidth UMTS carriers, the reporting can be switched to event-based reporting. Inter-frequency handover may be triggered once an event is reported to the flexible bandwidth compatible UTRAN. The RAN may choose to trigger an inter-frequency handover before the UE reports an event.

In some embodiments, identifying UE capabilities may include a standardized solution. The UTRAN may issue an "UE capability Enquiry" message to connected mode flexible bandwidth UMTS and normal UMTS UEs. The UEs may respond back with the "UE capability information" message which states whether the UE supports flexible bandwidth UMTS carriers and in which frequency bands. The UTRAN may use the message to determine from which UEs to request inter-frequency measurements for flexible bandwidth UMTS carriers. In some embodiments, a flexible bandwidth-compatible (or capable) UTRAN (supports both normal and flexible bandwidth carriers) may infer the UE's flexible bandwidth capability based on configuring measurement reports as the UE capability may not indicate support of flexible bandwidth UMTS. Some embodiments may use some reserved bits in existing IEs (Information Elements) that may not be processed by any network for a flexible bandwidth UMTS compatible UE to indicate its flexible bandwidth capability to network. In some embodiments, a flexible bandwidth UMTS-compatible UE may signal its capability using non-critical extension Information Elements (IE). In some embodiments, a flexible-compatible UE or network may use the additional range in the IE that is not currently used. In some cases, if a legacy RAN receives the IE, it may discard it while a flexible bandwidth-compatible UTRAN may act upon this capability information. There may be also UTRAN Classmark Info sent by the UE. These could also be used by flexible bandwidth UMTS-compatible UE to indicate its flexible bandwidth capability and for flexible bandwidth UTRAN to know the UE's flexible bandwidth capabilities when there may be fields/Information Elements to indicate such capability.

In some embodiments, there is measurement capability to indicate capability for FDD measurements, 3.84 Mcps TDD measurements, 7.68 Mcps TDD measurements, 1.28 Mcps TDD measurements, etc. In some embodiments, there is also measurement capability extension. Flexible bandwidth-UMTS capability of UE can be indicated as another capability in the measurement capability or measurement capability extension. With flexible bandwidth UMTS as same RAT as UMTS and considering it a UMTS "feature or special category", an additional IE may be added to the "UE radio access capability" or "UE radio access capability extension," for example. In the extension, features such as dual cell capability, frequency band specific capability may be specified. As an alternative, flexible bandwidth UMTS capability of UE can be specified in "UE multi-mode/multi-RAT capability," for example. This may cover both cases where flexible bandwidth UMTS is considered as mode of the same RAT (UMTS) or considered as a different RAT than UMTS.

Some embodiments may provide for a flexible-bandwidth compatible UTRAN (supports both normal and flexible bandwidth carriers) that may know whether a UE is flexible bandwidth compatible or not in other ways. In some cases, if a UE may be asked to make a measurement that is not supported by the UE, it may ignore the entire Measurement Command message and may send a Measurement Control Failure message to the UTRAN with "failure cause" set to "unsupported measurement". The UE may continue with any ongoing processes and procedures as if the Measurement Control Message has not been received. Some embodiments may address this through the following procedure. In a step A, a flexible compatible UTRAN (supports normal and flexible bandwidth UMTS frequencies) may send a Measurement Control Message corresponding to measurement in a chosen invalid UARFCN—a frequency which a normal UE would consider as invalid because it is in band edge. In a step B, a legacy UE may send Measure Control Failure Message as the measurement is not supported. On the other hand, a flexible bandwidth-compatible UE may interpret the invalid UARFCN differently and may not send Measurement Control Failure Message. The flexible bandwidth-compatible UE may not send any Measurement Control Failure message and might or might not send any Measurement Report Message. Thus, cost to legacy UE may be the Measurement Control Message transmission from network with invalid UARFCN that triggers the Measurement Control Failure Message from the legacy UEs. In a step C, flexible bandwidth-compatible UTRAN may know which UEs are flexible bandwidth compatible from through step B. It may ask flexible bandwidth-compatible UEs to go and make measurements on flexible bandwidth UMTS frequencies and turn on Compressed Mode gaps. A variant may be possible in which the invalid UARFCN may encode the flexible bandwidth UMTS frequency, and possibly the bandwidth, eliminating step C for flexible bandwidth compatible UEs. Irrespective of the variants, the flexible bandwidth capable UE may send Measurement Report Message based on whether flexible bandwidth UMTS carrier was detected.

Figure 7:
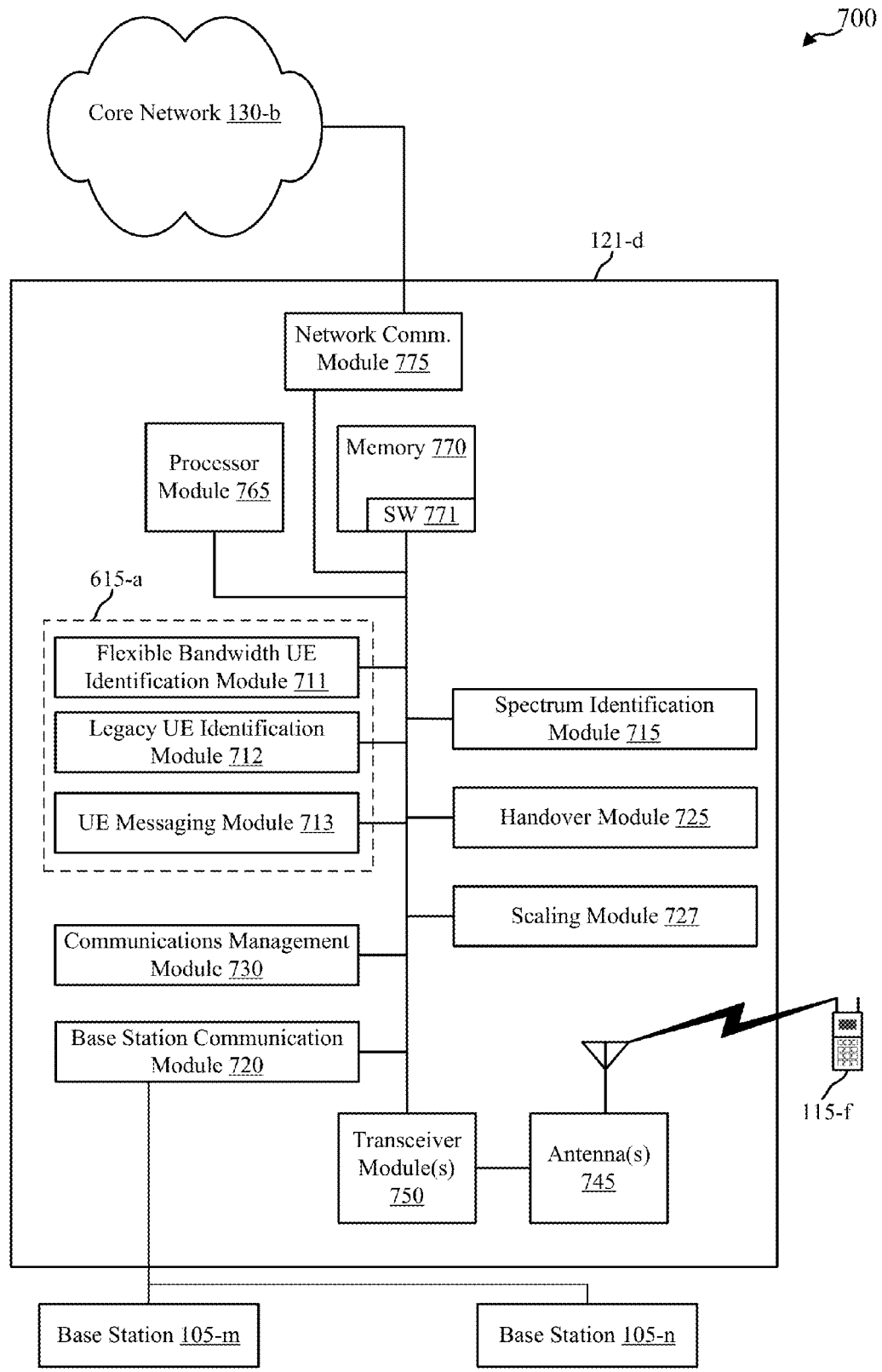
FIG. 7 shows a communications system configured for user equipment identification in accordance with various embodiments.

FIG. 7 shows a block diagram of a communications system 700 that may be configured for determining flexible bandwidth capable user equipment in accordance with various embodiments. This system 700 may be an example of aspects of the system 100 depicted in FIG. 1, systems 200 of FIG. 2, systems 300 of FIG. 3, and/or system 4200 of FIG. 42; and/or device 600 of FIG. 6. The radio access network 121-c may include aspects of a base station 105 and/or a controller 120 to represent a combined system and/or separate components that may comprise part of a radio access network. The radio access network 121-c may include antennas 745, a transceiver module 750, memory 770, and a processor module 765, which each may be in communication, directly or indirectly, with each other (e.g., over one or more buses). The transceiver module 750 may be configured to communicate bi-directionally, via the antennas 745, with the user equipment 115-f, which may be a multi-mode user equipment. The transceiver module 750 (and/or other components of the radio access network 121-c) may also be configured to communicate bi-directionally with one or more networks. In some cases, the radio access network 121-c may communicate with the core network 130-b through network communications module 775. Radio access network 121-c may include an eNodeB base station, a Home eNodeB base station, a NodeB base station, and/or a Home NodeB base station.

Radio access network 121-c may also communicate with other base stations 105, such as base station 105-m and base station 105-n. Each of the base stations 105 may communicate with user equipment 115-f using different wireless communications technologies, such as different Radio Access Technologies. In some cases, radio access network 121-c may communicate with base stations such as 105-m and/or 105-n utilizing base station communication module 720. In some embodiments, base station communication module 720 may provide an X2 interface within an LTE wireless communication technology to provide communication between some of the base stations 105. In some embodiments, radio access network 121-c may communicate with other base stations through core network 130-b.

The memory 770 may include random access memory (RAM) and read-only memory (ROM). The memory 770 may also store computer-readable, computer-executable software code 771 containing instructions that are configured to, when executed, cause the processor module 765 to perform various functions described herein (e.g., call processing, database management, message routing, etc.). Alternatively, the software 771 may not be directly executable by the processor module 765 but be configured to cause the computer, e.g., when compiled and executed, to perform functions described herein.

The processor module 765 may include an intelligent hardware device, e.g., a central processing unit (CPU) such as those made by Intel® Corporation or AMD®, a microcontroller, an application-specific integrated circuit (ASIC), etc. The processor module 765 may include a speech encoder (not shown) configured to receive audio via a microphone, convert the audio into packets (e.g., 20 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking.

The transceiver module 750 may include a modem configured to modulate the packets and provide the modulated packets to the antennas 745 for transmission, and to demodulate packets received from the antennas 745. While some examples of the radio access network 121-*c* may include a single antenna 745, the radio access network 121-*c* preferably includes multiple antennas 745 for multiple links which may support carrier aggregation. For example, one or more links may be used to support macro communications with user equipment 115-*f*.

According to the architecture of FIG. 7, the radio access network 121-*c* may further include a communications management module 730. The communications management module 730 may manage communications with other base stations 105. By way of example, the communications management module 730 may be a component of the radio access network 121-*c* in communication with some or all of the other components of the radio access network 121-*c* via a bus. Alternatively, functionality of the communications management module 730 may be implemented as a component of the transceiver module 750, as a computer program product, and/or as one or more controller elements of the processor module 765.

The components for radio access network 121-*c* may be configured to implement aspects discussed above with respect to device 600 of FIG. 6 and may not be repeated here for the sake of brevity. The UE identification module 615-*a* may be an example of the UE identification module 615 of FIG. 6. UE identification module 615-*a* may include a flexible bandwidth UE identification module 711, a legacy UE identification module 712, and/or a UE messaging module 713.

The radio access network 121-*c* may also include a spectrum identification module 715. The spectrum identification module 715 may be utilized to identify spectrum available for flexible bandwidth waveforms. In some embodiments, a handover module 725 may be utilized to perform handover procedures of the user equipment 115-*f* from one base station 105 to another. For example, the handover module 725 may perform a handover procedure of the user equipment 115-*f* from radio access network 121-*c* to another where normal waveforms are utilized between the user equipment 115-*f* and one of the base stations and flexible bandwidth waveforms are utilized between the user equipment and another base station. A scaling module 727 may be utilized to scale and/or alter chip rates to generate flexible bandwidth waveforms.

In some embodiments, the transceiver module 750 in conjunction with antennas 745, along with other possible components of radio access network 121-*c*, may transmit information regarding flexible bandwidth waveforms and/or scaling factors from the radio access network 121-*c* to the user equipment 115-*f*, to other base stations 105-*m*/105-*n*, or core network 130-*b*. In some embodiments, the transceiver module 750 in conjunction with antennas 745, along with other possible components of radio access network 121-*c*, may transmit information to the user equipment 115-*f*, to other base stations 105-*m*/105-*n*, or core network 130-*b*, such as flexible bandwidth waveforms and/or scaling factors, such that these devices or systems may utilize flexible bandwidth waveforms.

Figure 8:
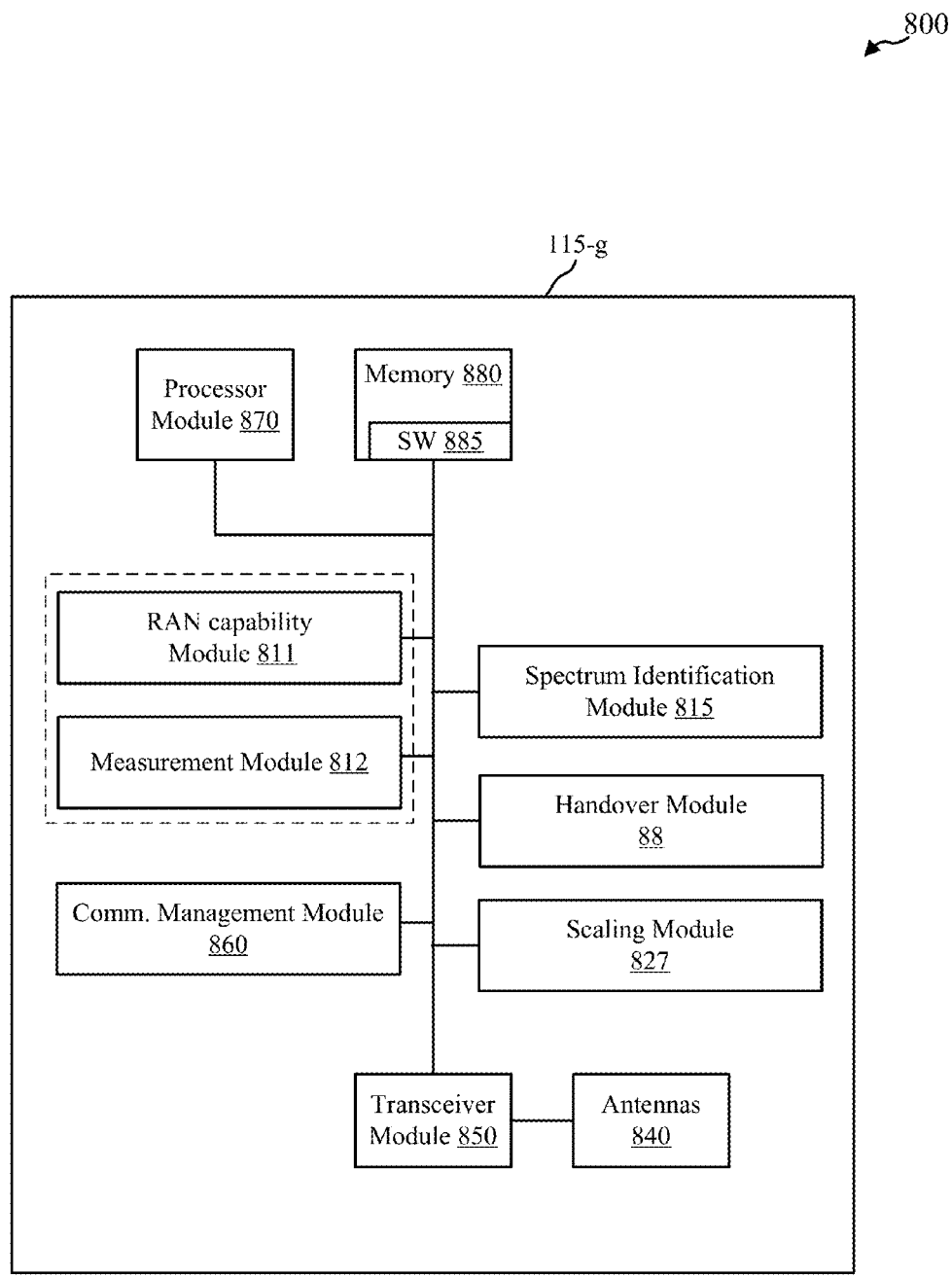
FIG. 8 shows a block diagram of a user equipment configured for mobility in accordance with various embodiments.

FIG. 8 is a block diagram 800 of a user equipment 115-*g* configured for mobility in accordance with various embodiments. The user equipment 115-*g* may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-*g* may have an internal power supply (not shown), such as a small battery, to facilitate mobile operation. In some embodiments, the user equipment 115-*g* may be the user equipment 115 of FIG. 1, FIG. 2, FIG. 3, FIG. 7, and/or FIG. 42, and/or the device 600 of FIG. 6. The user equipment 115-*g* may be a multi-mode user equipment. The user equipment 115-*g* may be referred to as a wireless communications device in some cases.

The user equipment 115-*g* may include antennas 840, a transceiver module 850, memory 880, and a processor module 870, which each may be in communication, directly or indirectly, with each other (e.g., via one or more buses). The transceiver module 850 is configured to communicate bi-directionally, via the antennas 840 and/or one or more wired or wireless links, with one or more networks, as described above. For example, the transceiver module 850 may be configured to communicate bi-directionally with base stations 105 of FIG. 1, FIG. 2, FIG. 3A, FIG. 42; and/or the radio access networks 121 of FIG. 3B and/or FIG. 7. The transceiver module 850 may include a modem configured to modulate the packets and provide the modulated packets to the antennas 840 for transmission, and to demodulate packets received from the antennas 840. While the user equipment 115-*g* may include a single antenna, the user equipment 115-*g* will typically include multiple antennas 840 for multiple links.

The memory 880 may include random access memory (RAM) and read-only memory (ROM). The memory 880 may store computer-readable, computer-executable software code 885 containing instructions that are configured to, when executed, cause the processor module 870 to perform various functions described herein (e.g., call processing, database management, message routing, etc.). Alternatively, the software 885 may not be directly executable by the processor module 870 but be configured to cause the computer (e.g., when compiled and executed) to perform functions described herein.

The processor module 870 may include an intelligent hardware device, e.g., a central processing unit (CPU) such as those made by Intel® Corporation or AMD®, a microcontroller, an application-specific integrated circuit (ASIC), etc. The processor module 870 may include a speech encoder (not shown) configured to receive audio via a microphone, convert the audio into packets (e.g., 30 ms in length) representative of the received audio, provide the audio packets to the transceiver module 850, and provide indications of whether a user is speaking. Alternatively, an encoder may only provide packets to the transceiver module 850, with the provision or withholding/suppression of the packet itself providing the indication of whether a user is speaking.

According to the architecture of FIG. 8, the user equipment 115-g may further include a communications management module 860. The communications management module 860 may manage communications with other user equipment 115. By way of example, the communications management module 860 may be a component of the user equipment 115-g in communication with some or all of the other components of the user equipment 115-g via a bus. Alternatively, functionality of the communications management module 860 may be implemented as a component of the transceiver module 850, as a computer program product, and/or as one or more controller elements of the processor module 870.

The components for user equipment 115-g may be configured to facilitate the UE identification provided by device 600 of FIG. 6. For example, user equipment 115-g may have a RAN capability module 811 to provide information regarding the UE to convey specific RAN capability information to the RAN. User equipment 812 may include measurement module 812 that may also provide measurements that may allow a RAN to determine whether the user equipment 115-g has flexible bandwidth capabilities or may be a legacy UE.

The user equipment 115-g may also include a spectrum identification module 815. The spectrum identification module 815 may be utilized to identify spectrum available for flexible bandwidth waveforms. In some embodiments, a handover module 825 may be utilized to perform handover procedures of the user equipment 115-g from one base station to another. For example, the handover module 825 may perform a handover procedure of the user equipment 115-g from one base station to another where normal waveforms are utilized between the user equipment 115-g and one of the base stations and flexible bandwidth waveforms are utilized between the user equipment and another base station. A scaling module 827 may be utilized to scale and/or alter chip rates to generate flexible bandwidth waveforms.

In some embodiments, the transceiver module 850, in conjunction with antennas 840, along with other possible components of user equipment 115-g, may transmit information regarding flexible bandwidth waveforms and/or scaling factors from the user equipment 115-g to base stations or a core network. In some embodiments, the transceiver module 850, in conjunction with antennas 840, along with other possible components of user equipment 115-g, may transmit information, such flexible bandwidth waveforms and/or scaling factors, to base stations or a core network such that these devices or systems may utilize flexible bandwidth waveforms.

Figure 9A:
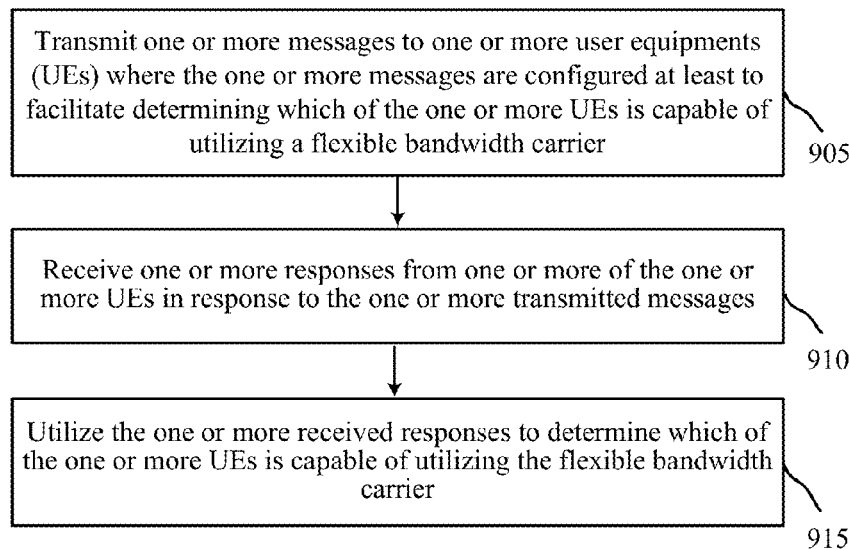
FIG. 9A shows a flow diagram of a method for determining flexible bandwidth capable user equipment in accordance with various embodiments.

Turning to FIG. 9A, a flow diagram of a method 900-a for determining flexible bandwidth capable user equipment is provided in accordance with various embodiments. Method 900-a may be implemented utilizing various wireless communications devices and/or systems including, but not limited to: the core networks 130 of FIG. 1 and/or FIG. 3B; the base stations 105 of FIG. 1, FIG. 2, FIG. 3A, FIG. 7, and/or FIG. 42; the user equipment 115 of FIG. 1, FIG. 2, FIG. 3, FIG. 7, FIG. 8, and/or FIG. 42; the controllers 120 of FIG. 1 and/or FIG. 3B; the radio access networks 121 of FIG. 3B and/or FIG. 7; and/or device 600 of FIG. 6.

At block 905, one or more messages may be transmitted to one or more user equipments (UEs). The one or more messages may be configured to facilitate determining which of the one or more UEs is capable of utilizing a flexible bandwidth carrier. At block 910, one or more responses may be received from one or more of the one or more UEs in response to the one or more transmitted messages. At block 915, the one or more received responses may be utilized to determine which of the one or more UEs is capable of utilizing the flexible bandwidth carrier.

Transmitting the one or more messages to one or more UEs may occur over a another bandwidth carrier, which may include a normal bandwidth carrier. The other bandwidth carrier may be on another radio access technology. Transmitting the one or more messages to one or more UEs may occur over a first carrier that may be supported by other UEs. Some embodiments include transmitting the one or more messages over a first carrier to facilitate determining which UEs are capable of supporting a second carrier, where the second carrier is a flexible bandwidth carrier. Transmitting the one or more messages to one or more UEs may include transmitting a message to the one or more UEs corresponding to a measurement for an unused frequency with respect to a normal bandwidth system. The unused frequency may include an invalid frequency and/or a conditional frequency.

Receiving the one or more responses from one or more of the one or more UEs may include receiving one or more failures messages from one or more of the one or more UEs reflecting that the UEs is not capable of utilizing at least one flexible bandwidth carrier. Receiving the one or more responses from one or more of the one or more UEs may include receiving one or more responses indicating the one or more of the one or more UEs can identify flexible bandwidth carriers. Receiving the one or more response from one or more of the one or more UEs may include receiving one or more Information Elements (IEs) indicating the flexible bandwidth capabilities of one or more of the one or more UEs. Some embodiments include determining that a timing out period has occurred for at least one of the UEs.

Figure 9B:
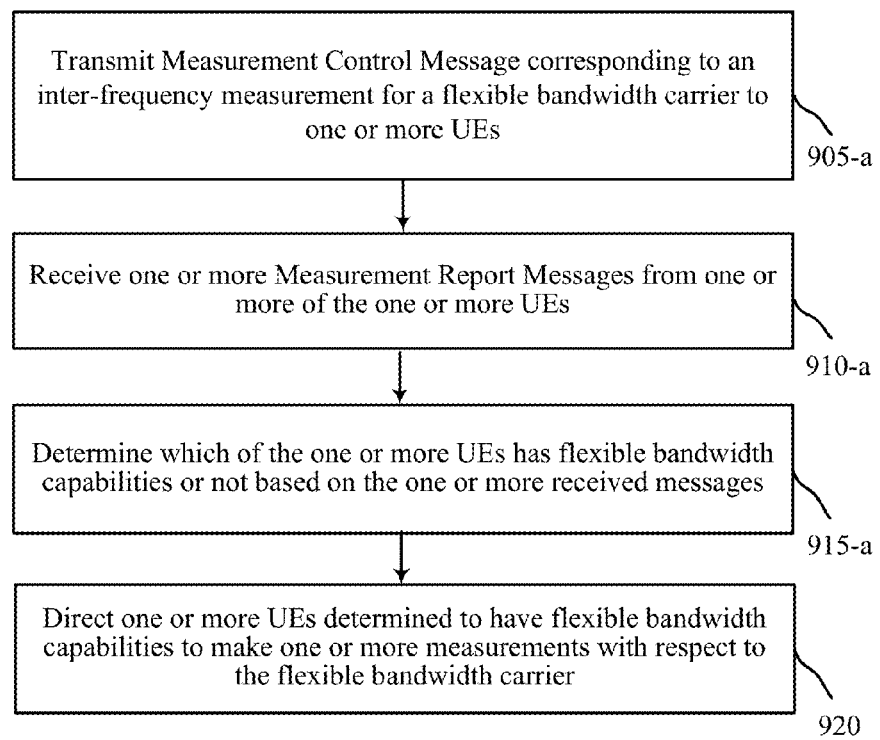
FIG. 9B shows a flow diagram of a method for determining flexible bandwidth capable user equipment in accordance with various embodiments.

Turning to FIG. 9B, a flow diagram of a method 900-b for determining flexible bandwidth capable user equipment is provided in accordance with various embodiments. Method 900-b may be implemented utilizing various wireless communications devices and/or systems including, but not limited to: the core networks 130 of FIG. 1 and/or FIG. 3B; the base stations 105 of FIG. 1, FIG. 2, FIG. 3A, FIG. 7, and/or FIG. 42; the user equipment 115 of FIG. 1, FIG. 2, FIG. 3, FIG. 7, FIG. 8, and/or FIG. 42; the controllers 120 of FIG. 1 and/or FIG. 3B; the radio access networks 121 of FIG. 3B and/or FIG. 7; and/or device 600 of FIG. 6. Method 900-b may include one or more aspects of method 900-a of FIG. 9A.

At block 905-a, a Measurement Control Message corresponding to an inter-frequency measurement for a flexible bandwidth carrier may be transmitted to one or more UEs. At block 910-a, one or more Measurement Report Messages may be received from one or more of the one or more UEs. At block 915-a, it may be determined which of the one or more UEs has flexible bandwidth capabilities or not based on the one or more received messages. At block 920, one or more UEs determined to have flexible bandwidth capabilities may be directed to make one or more measurements with respect to the flexible bandwidth carrier.

Figure 9C:
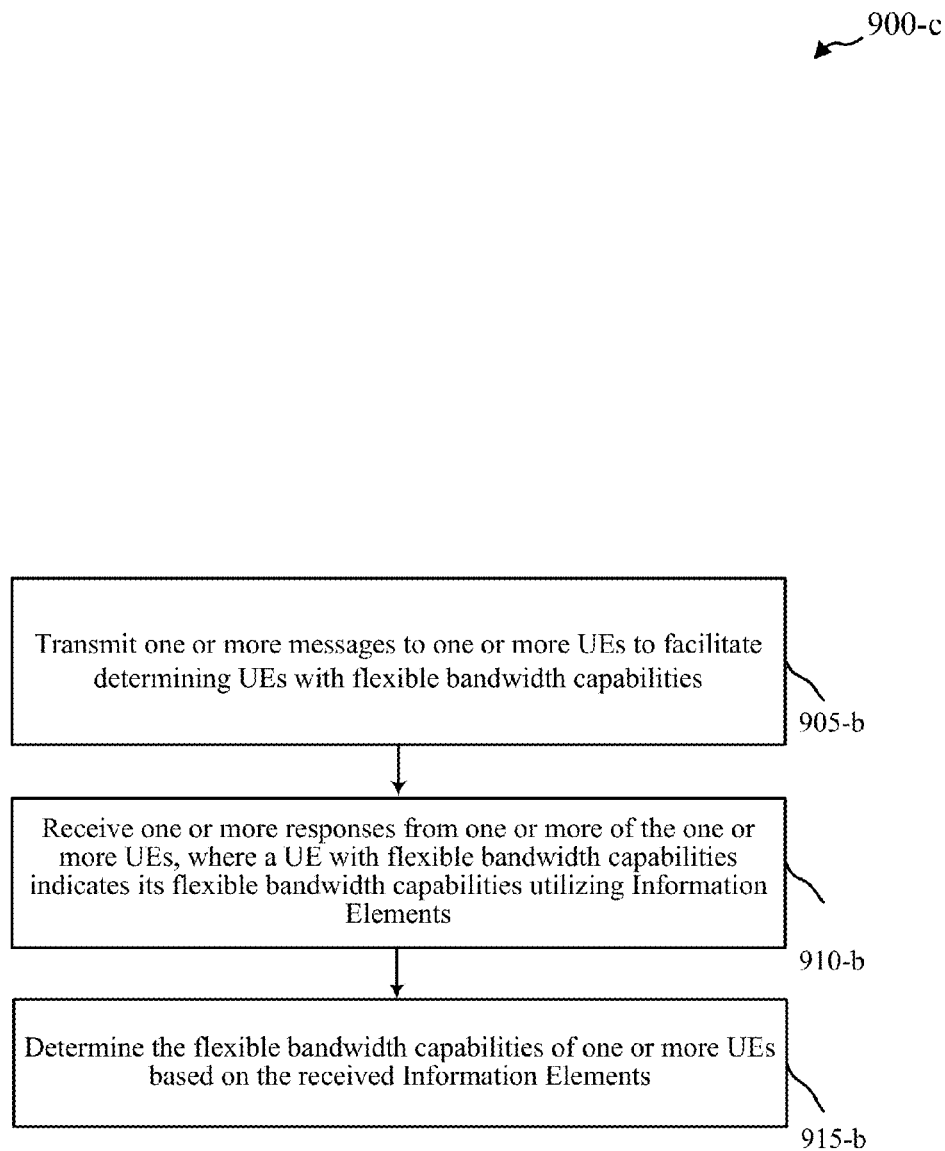
FIG. 9C shows a flow diagram of a method for determining flexible bandwidth capable user equipment in accordance with various embodiments.

Turning to FIG. 9C, a flow diagram of a method 900-c for determining flexible bandwidth capable user equipment is provided in accordance with various embodiments. Method 900-c may be implemented utilizing various wireless communications devices and/or systems including, but not limited to: the core networks 130 of FIG. 1 and/or FIG. 3B; the base stations 105 of FIG. 1, FIG. 2, FIG. 3A, FIG. 7, and/or FIG. 42; the user equipment 115 of FIG. 1, FIG. 2, FIG. 3, FIG. 7, FIG. 8, and/or FIG. 42; the controllers 120 of FIG. 1 and/or FIG. 3B; the radio access networks 121 of FIG. 3B and/or FIG. 7; and/or device 600 of FIG. 6. Method 900-c may include one or more aspects of method 900-*a* of FIG. 9A and/or method 900-*b* of FIG. 9B.

At block 905-*b*, one or more messages may be transmitted to one or more UEs to facilitate determine UEs with flexible bandwidth capabilities. At block 910-*b*, one or more responses may be received from one or more of the one or more UEs. A UE with flexible bandwidth capabilities may indicate its flexible bandwidth capabilities utilize Information Elements. At block 915-*b*, the flexible bandwidth capabilities of one or more UEs may be determined based on the received Information Elements.

Methods, systems, and devices for providing mobility between flexible bandwidth systems and normal bandwidth systems and/or other flexible bandwidth systems are provided. These methods, systems, and/or devices may include device 1000 of FIG. 10, core network 130-*c* of FIG. 11, method 1200-*a* of FIG. 12A, method 1200-*b* of FIG. 12B, and/or method 1600 of FIG. 16. In some examples, a user equipment may be registered with both CS and packet switched (PS) services on flexible bandwidth radio access network. In some examples, a core network (CN) may direct the handling of circuit-switched (CS) services, such as a circuit-switched voice service, when a flexible bandwidth system does not support the any or some of CS services (e.g., voice, SMS, etc.). A CN may choose some services and not others, in some cases. Though the example of the circuit switch services may include voices, other CS service may be redirected. The core network may identify a lack of support (for example, from the UE registration) for a circuit-switched service on a flexible bandwidth carrier on which the flexible bandwidth capable UE currently is and redirect the user equipment to a radio access network that supports the circuit-switched service.

In some embodiments, the UE may register for a packet switched service with the CN through the flexible bandwidth radio access network. Also, through the flexible bandwidth radio access network, the UE may also register for non-voice circuit-switched service with the CN. To start the registration procedure, the UE may send a combined CS and PS attach request to the CN through the flexible bandwidth radio access network. The request may be received by the CN entity (e.g., SGSN) that provides PS domain services support for the flexible bandwidth RAN. The PS CN may register the UE for PS services and then may forward the CS attach to the CS CN entity, the CN entity providing CS domain services support for a radio access network that supports CS services. In some embodiments, the core network may register the user equipment for a packet switched service over flexible bandwidth radio access network. In some other embodiment, the core network may register the user equipment for non-voice circuit-switched service over flexible bandwidth radio access network.

In some embodiments, the CS CN entity and PS CN entity may support multiple RAN. In some embodiments, Location Area (LA) and/or Routing Area (RA) for flexible bandwidth UMTS, UMTS, and GSM, for example, may be overlapping but not necessarily the same as the cell sizes may be different. The flexible bandwidth UMTS and UMTS and/or GSM cells may overlap partially or completely. The SGSN and MSC serving UMTS, GSM and flexible UMTS networks may be the same. This may be the case, for example, when UMTS, GSM, and flexible bandwidth UMTS may be deployed at the same site. In some embodiments, flexible UTRAN support CS SMS and other CS services except CS voice call. For CS voice, it may support some CS voice related signaling (e.g., Paging Type 2 message for MT CS voice call when user equipment is in PS call. UMTS may include both WCDMA and/or HSPA, for example.

Some embodiments may handle situations where there is no CS support on the flexible RAN, such as a flexible UTRAN. Some embodiment may handle situations where support for some CS services may exist on the flexible RAN, such as a flexible UTRAN. An example may be where CS voice on WCDMA is not supported, but CS SMSM or CS over HS is supported. The CN may be aware that the flexible UTRAN does not support all CS services. UEs may perform a combined IMSI and GPRS Attach to register for both PS and CS services with the CN through the flexible bandwidth RAN. In the case that a CS service that is not supported by the flexible RAN is received and/or initiated while the UE is on the flexible bandwidth RAN, the CN may redirect the call to another RAN that supports those services.

In some embodiments, the flexible RAN (e.g., flexible UTRAN) may support CS services without voice. For example, a flexible UTRAN may support CS signaling (e.g., Paging Type 2 message for MT CS voice call when user equipment is in PS call) and might or might not support SMS and CS data services but does not support CS voice call. The CN may be aware of this lack of voice support. When the CN is aware, redirection by CN or flexible UTRAN to UTRAN or any radio access network that supports CS voice may be used when there is a CS voice call for the flexible bandwidth capable UE on the flexible UTRAN. During the registration, the UE may register for CS and PS services with the MSC and SGSN that may support the flexible bandwidth RAN, other RANs that support CS voice, and/or other RATs.

The following describes some embodiments where there may be limited CS support (including no CS support) on a flexible RAN, such as a flexible UTRAN. Other scenarios include scenarios where CS support may exist for some CS services but not for all CS services. Furthermore, some scenarios include scenarios where a certain CS service may be supported and for one reason or another, however, there may be advantages for those services for the user equipment to be provided in another radio access network.

Some embodiments include a flexible bandwidth system where CS signaling may be supported by a flexible RAN, but there may be no voice support on the flexible RAN, such as a flexible UTRAN. In these cases, CN redirection may be utilized when the CN is aware that the flexible bandwidth RAN does not support voice services. For example, a user equipment camping on the flexible UTRAN may perform a combined IMSI and GPRS Attach with the MSC and SGSN using the flexible UTRAN. The CN may be aware that some CS signaling and maybe some services (e.g., SMS, CS Data etc.) are supported on flexible UTRAN, but not CS voice. The CN may register the user equipment for CS' and PS, where CS' means all CS services except the services not supported (e.g., voice) services on the flexible UTRAN and CS voice on another RAN that may support voice, such as UMTS or GERAN. MT and/or MO CS (except voice) and PS calls may be handled on flexible UTRAN. When MT CS notification is received at the MSC serving UMTS or GSM, a page may be forwarded to the user equipment through the MSC supporting non-voice CS services or the SGSN (for flexible UTRAN) and user equipment may be redirected to another RAN that supports CS voice support, such as GERAN or UTRAN. CN changes may need to be implemented in some cases.

Figure 10:
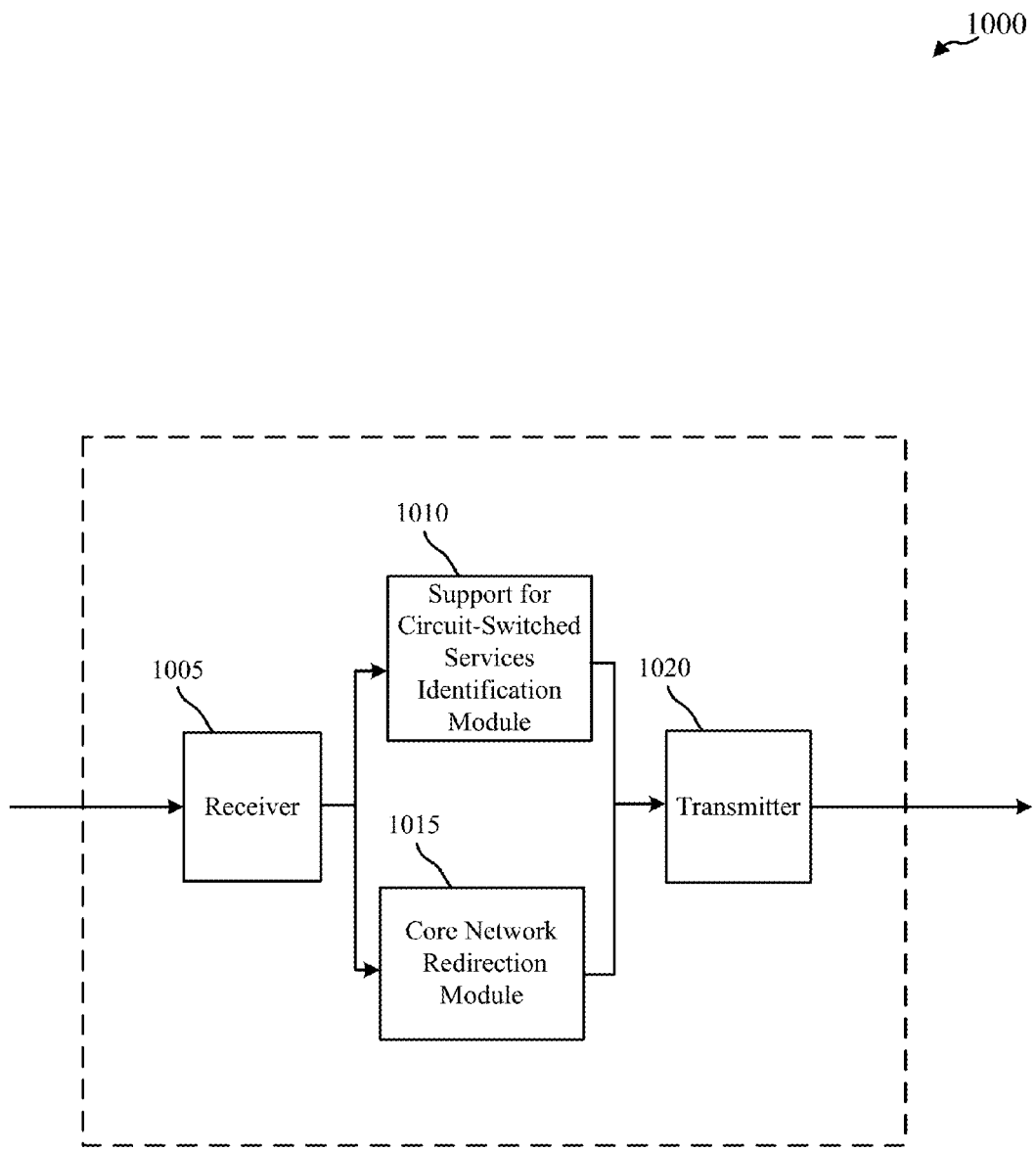
FIG. 10 shows a block diagram of a device that includes mobility functionality in accordance with various embodiments.

Turning next to FIG. 10, a block diagram illustrates a device 1000 that includes mobility functionality in accordance with various embodiments. The device 1000 may be an example of aspects of: the core networks 130 of FIG. 1, FIG.

Figure 11:
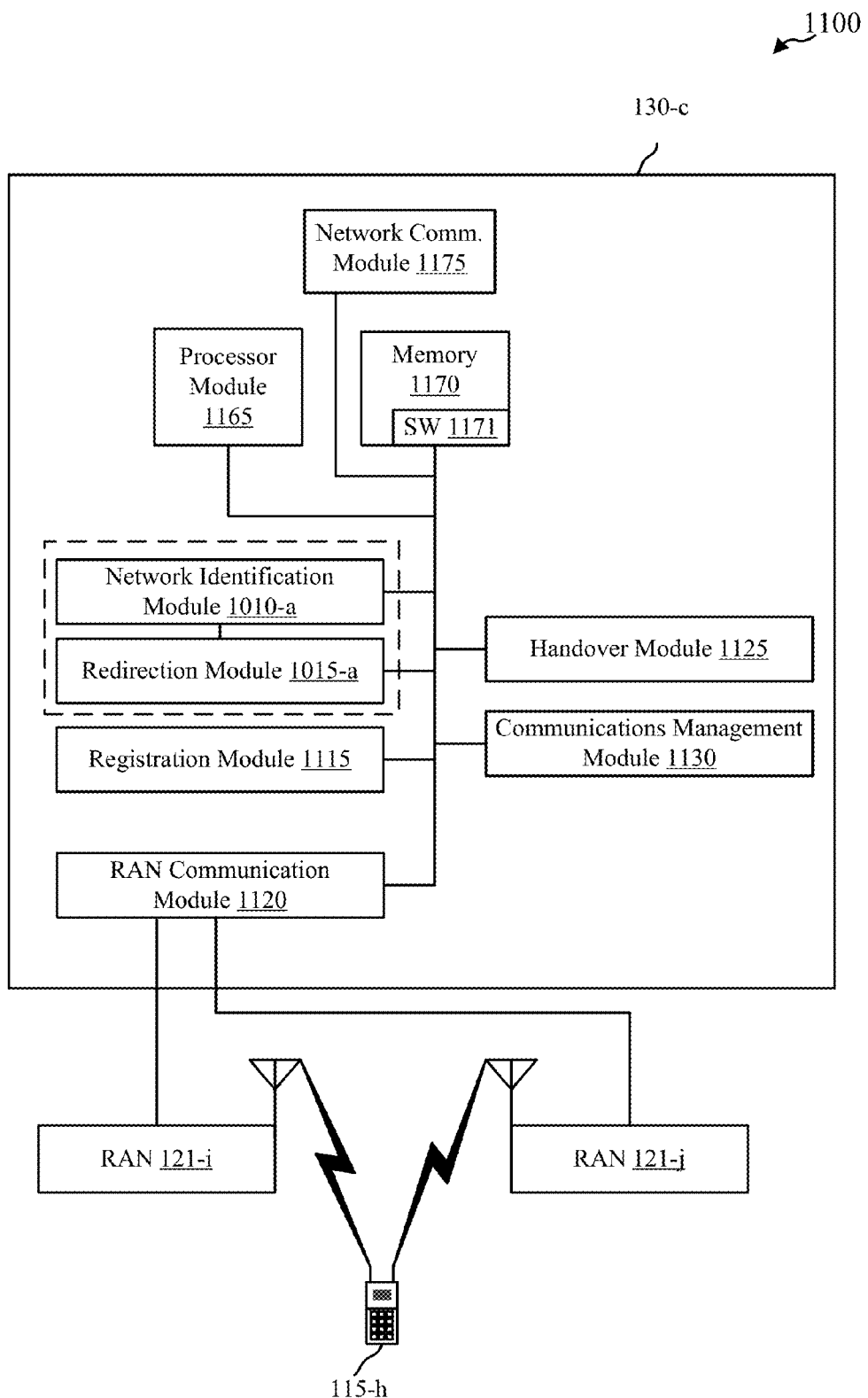
FIG. 11 shows a block diagram of a communications system configured for providing mobility for wireless communications systems in accordance with various embodiments.

3B, and/or FIG. 11. The device 1000 may also be a processor. The device 1000 may include a receiver module 1005, a support for circuit-switched services identification module 1010, a core network redirection module 1015, and/or a transmitter module 1020. Each of these components may be in communication with each other.

These components of the device 1000 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1005 may receive information such as packet, data, and/or signaling information regarding what device 1000 has received or transmitted. The received information may be utilized by the support for circuit-switched services identification module 1010 and/or core network redirection module 1015 for a variety of purposes.

In some embodiments, a lack of support for one or more circuit-switched services on a flexible bandwidth radio access network of multiple radio access networks may be identified by the support for circuit-switched services identification module 1010. The circuit-switched (CS) service for a user equipment may be redirected at the core network redirection module 1015 from the flexible bandwidth radio access network to a radio access network that supports the one or more circuit-switched services. The core redirection module 1015 may modify and/or transmit one or more messages to intitiate a core network redirection. In some cases, the circuit-switched service may be a circuit-switched voice service. The one or more CS services includes at least a CS voice service, a Release 99 CS voice service, or a CS voice service over one or more data channels, for example.

The support for circuit-switched services identification module 1010 and/or core network redirection module 1015 may be configured to register the user equipment with respect to at least one packet switched service. Some embodiments of device 1000 may include a registration module to perform this function. Some embodiments include registering, by device 1000 such as through the support for circuit-switched services identification module 1010 and/or core network redirection module 1015, the user equipment over the flexible bandwidth radio access network with respect to at least one circuit-switched service. The circuit-switched service may include a non-voice circuit-switched service, SMS data, and/or CS data. Some embodiments include receiving, at device 1000 through the support for circuit-switched services identification module 1010 and/or core network redirection module 1015, a registration request from the user equipment on the flexible bandwidth radio access network.

In some cases, the user equipment may be camped on the flexible bandwidth radio access network. The user equipment may be currently at least being served by or camped on a flexible bandwidth carrier that lacks support for a CS service, such as a CS voice service.

In some situations, the device 1000 is aware of the capabilities of the flexible bandwidth radio access network. The flexible bandwidth radio access network may be aware that it lacks support for the circuit-switched service but may not initiate redirection. In some embodiments, the device 1000 may determine that the CS service is unsupported on the flexible bandwidth radio access network and may tune to another radio access network that supports the CS service. In other situations, the device 1000 may be unaware that the CS service is unsupported on the flexible bandwidth radio access network.

FIG. 11 shows a block diagram of a communications system 1100 that may be configured for utilizing mobility for wireless communications systems in accordance with various embodiments. This system 1100 may include aspects of the system 100 depicted in FIG. 1, systems 200 of FIG. 2, systems 300 of FIG. 3, and/or system 4200 of FIG. 42; and/or device 1000 of FIG. 10. The core network 130-c may include memory 1170, and a processor module 1165, which each may be in communication, directly or indirectly, with each other (e.g., over one or more buses). In some cases, the core network 130-c may communicate with other aspects of the network communications module 1175.

Core network 130-c may also communicate with radio access networks 121-i/121-j. Radio access networks 121 may be co-located in some cases, or separated located. In some cases, radio access networks 121 may include flexible capable radio access networks and/or normal/legacy radio access networks. Radio access networks 121 may be in wireless communication with user equipment 115-h, which may be flexible capable. In some cases, core network 130-c may communicate with radio access networks 121 utilizing radio access network communication module 1120.

The memory 1170 may include random access memory (RAM) and read-only memory (ROM). The memory 1170 may also store computer-readable, computer-executable software code 1171 containing instructions that are configured to, when executed, cause the processor module 1165 to perform various functions described herein (e.g., call processing, database management, message routing, etc.). Alternatively, the software 1171 may not be directly executable by the processor module 1165 but be configured to cause the computer, e.g., when compiled and executed, to perform functions described herein.

The processor module 1165 may include an intelligent hardware device, e.g., a central processing unit (CPU) such as those made by Intel® Corporation or AMD®, a microcontroller, an application-specific integrated circuit (ASIC), etc. The processor module 1165 may include a speech encoder (not shown) configured to receive audio via a microphone, convert the audio into packets (e.g., 20 ms in length) representative of the received audio, provide the audio packets, and provide indications of whether a user is speaking.

According to the architecture of FIG. 11, the core network 130-c may further include a communications management module 1130. The communications management module 1130 may manage communications other aspects of communication, such as communication with user equipment 115-h. By way of example, the communications management module 1130 may be a component of the core network 130-c in communication with some or all of the other components of the core network 130-c via a bus. Alternatively, functionality of the communications management module 1130 may be implemented as a component of the radio access network communications module 1120, as a computer program product, and/or as one or more controller elements of the processor module 1165.

The components for core network 130-c may be configured to implement aspects discussed above with respect to device 1000 in FIG. 10 and may not be repeated here for the sake of brevity. The network identification module 1010-a may be an example of the support for circuit-switched services identification module 1010 of FIG. 10. The redirection module 1015-*a* may be an example of the core network redirection module 1015 of FIG. 10.

The core network 130-*c* may also include a handover module 1125 that may be utilized to perform handover procedures of the user equipment 115-*h* from one radio access network 121 to another. For example, the handover module 1125 may perform a handover procedure of the user equipment 115-*h* from core network 130-*c* to another where normal waveforms are utilized between the user equipment 115-*h* and one of the radio access networks 121 and flexible bandwidth waveforms are utilized between the user equipment and another radio access network. The core network 130-*c* may also include a registration module 1115 for registering different user equipment 115 with different services (e.g., CS, PS) through different RANs 121.

Figure 12A:
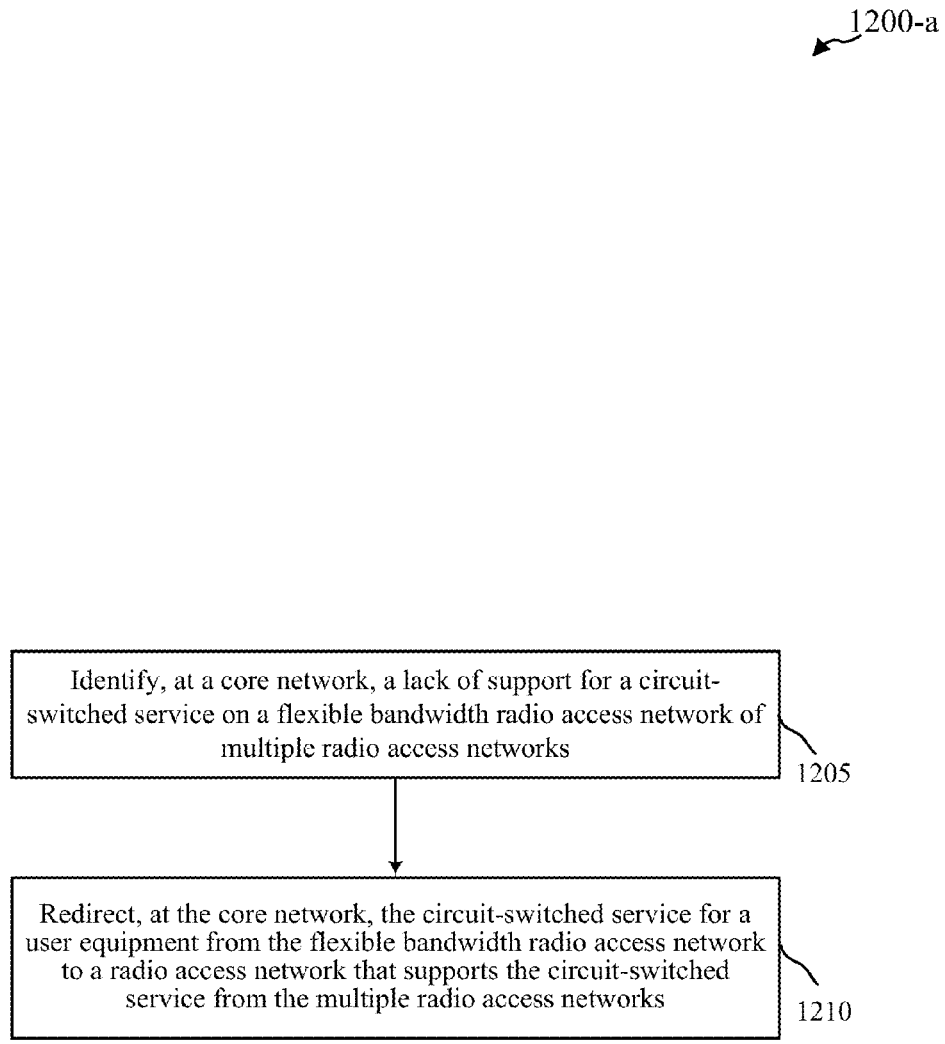
FIG. 12A shows a flow diagram of a method for providing mobility within wireless communications systems in accordance with various embodiments.

Turning to FIG. 12A, a flow diagram of a method 1200-*a* for providing mobility within wireless communications systems is provided in accordance with various embodiments. Method 1200-*a* may be implemented utilizing various wireless communications devices and/or systems including, but not limited to: system 100 of FIG. 1, systems 200 of FIG. 2, systems 300 of FIG. 3, system 1100 of FIG. 11, system 4200 of FIG. 42; the core networks 130 of FIG. 1, FIG. 3B, and/or FIG. 11 and/or device 1000 of FIG. 10.

At block 1205, a lack of support for one or more circuit-switched (CS) services on a flexible bandwidth radio access network may be identified at a core network. At block 1210, the one or more CS services for a user equipment may be redirected, at the core network, from the flexible bandwidth radio access network to a radio access network that supports the one or more circuit-switched service from the multiple radio access networks. The one or more circuit-switched services may include a circuit-switched voice service, a Release 99 CS voice service, or a CS voice service over one or more data channels, for example.

Some embodiment include registering, at the core network, the user equipment over the flexible bandwidth radio access network with respect to at least one packet switched service. Some embodiments include registering, at the core network, the user equipment over the flexible bandwidth radio access network with respect to at least one circuit-switched service, such as a non-voice CS service, SMS data, and/or CS data. Some embodiments include receiving, at the core network, an attach request from the user equipment over the flexible bandwidth radio access network.

In some cases, the user equipment may be camped on the flexible bandwidth radio access network. In some cases, the user equipment may be currently at least being served by or camped on a flexible bandwidth carrier that lacks support for a circuit-switched service, such as a CS voice service.

In some situations, the core network is aware of the capabilities of the flexible bandwidth radio access network. The flexible bandwidth radio access network may be aware that it lacks support for the circuit-switched service but may not initiate redirection. In other cases, the core network may determine that the CS service, such as CS voice service, is unsupported on the flexible bandwidth radio access network. In some cases, the core network may be unaware that the circuit-switched service, such as CS voice service, is unsupported on the flexible bandwidth radio access network.

Figure 12B:
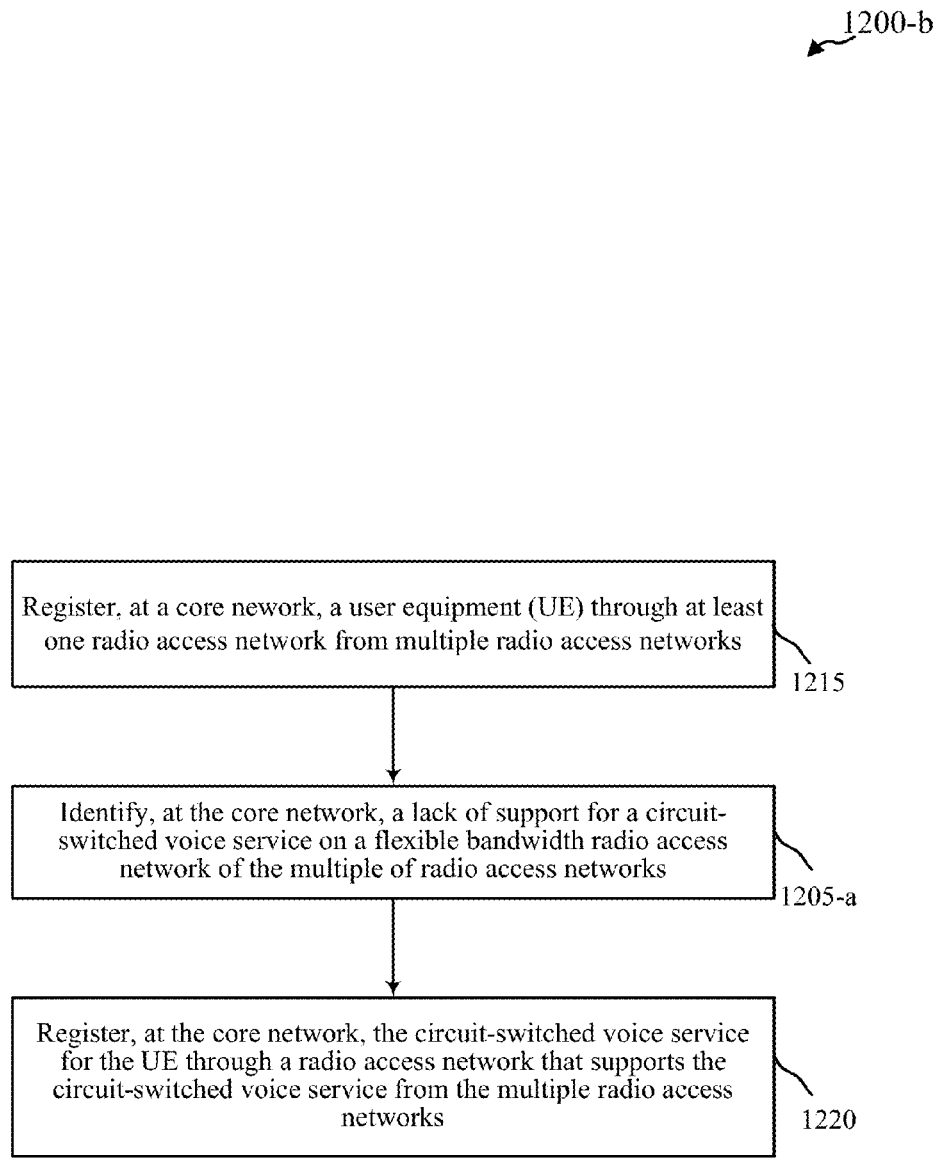
FIG. 12B shows a flow diagram of a method for providing mobility within wireless communications systems in accordance with various embodiments.

Turning to FIG. 12B, a flow diagram of a method 1200-*b* for providing mobility within wireless communications systems is provided in accordance with various embodiments. Method 1200-*b* may be implemented utilizing various wireless communications devices and/or systems including, but not limited to: system 100 of FIG. 1, systems 200 of FIG. 2, systems 300 of FIG. 3, system 1100 of FIG. 11, system 4200 of FIG. 42; the core networks 130 of FIG. 1, FIG. 3B, and/or FIG. 11 and/or device 1000 of FIG. 10. Method 1200-*b* may be an example of one or more aspects of method 1200-*a* of FIG. 12A.

A core network may register a user equipment (UE) through at least one radio access network from multiple radio access networks at block 1215. Identifying, at the core network, a lack of support for a certain circuit-switched service, such as a voice service, on a flexible bandwidth radio access network of the multiple of radio access networks may occur at block 1205-*a*. Registering, at the core network, the circuit-switched voice service for the UE through a radio access network that supports the circuit-switched voice service from the multiple radio access networks may occur at block 1220.

Figure 12C:
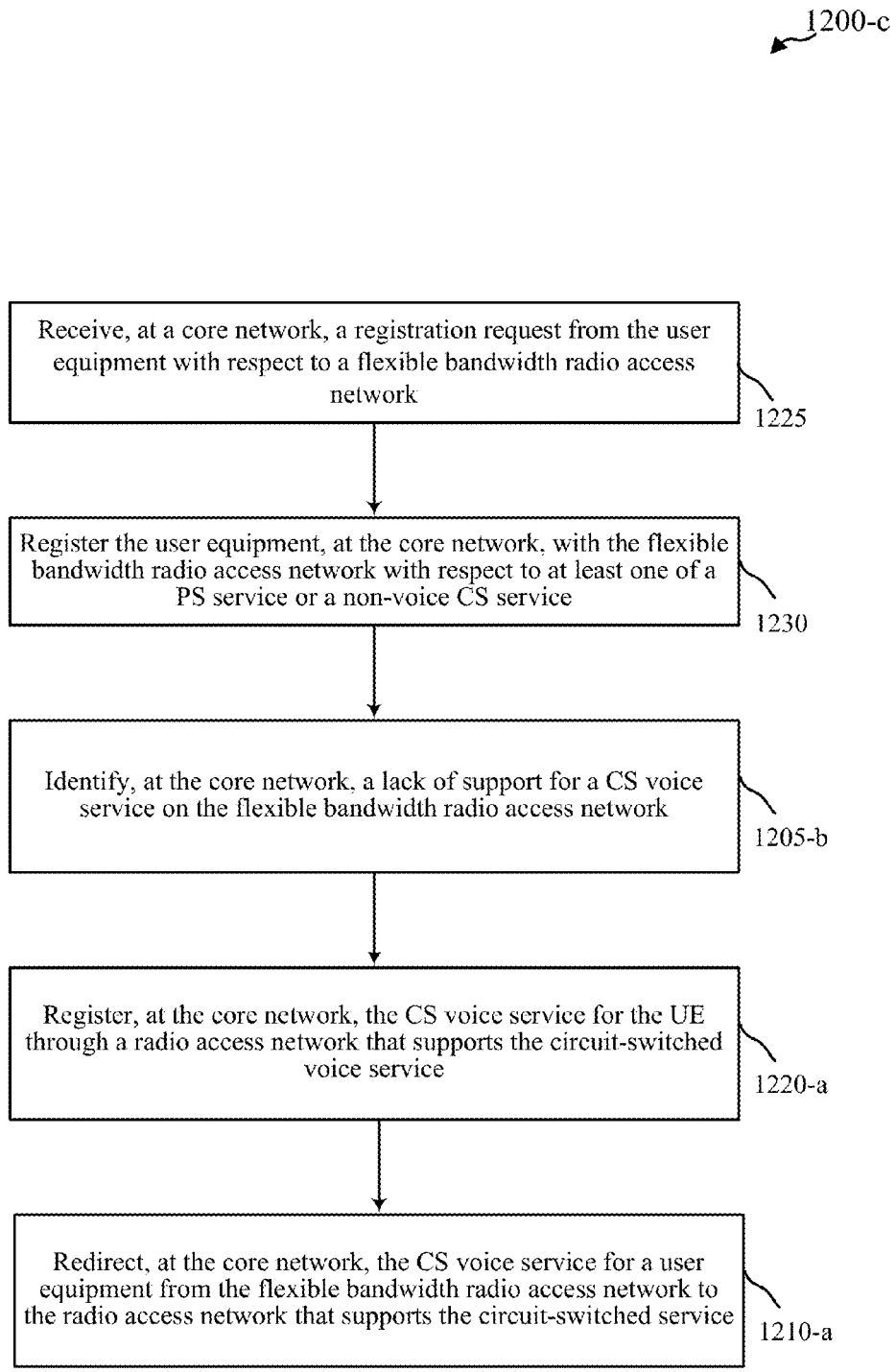
FIG. 12C shows a flow diagram of a method for providing mobility within wireless communications systems in accordance with various embodiments.

Turning to FIG. 12C, a flow diagram of a method 1200-*c* for providing mobility within wireless communications systems is provided in accordance with various embodiments. Method 1200-*b* may be implemented utilizing various wireless communications devices and/or systems including, but not limited to: system 100 of FIG. 1, systems 200 of FIG. 2, systems 300 of FIG. 3, system 1100 of FIG. 11, system 4200 of FIG. 42; the core networks 130 of FIG. 1, FIG. 3B, and/or FIG. 11 and/or device 1000 of FIG. 10. Method 1200-*c* may be an example of one or more aspects of method 1200-*a* of FIG. 12A and/or method 1200-*b* of FIG. 12B.

At block 1225, a registration request for the UE may be received at a core network through a flexible bandwidth radio access network. The registration request may be with respect to both a CS and PS domain, for example. In some cases, the registration request may be with respect to a CS voice service, a PS service, and/or a non-voice CS service. At block 1230, the core network may register the user equipment with the flexible bandwidth radio access network with respect to at least one of the PS service or the non-voice CS service. At block 1205-*b*, the core network may identify a lack of support for a CS voice service on the flexible bandwidth radio access network of the multiple of radio access networks. At block 1220-*a*, the core network may register the CS voice service for the UE through a radio access network that supports the circuit-switched voice service from the multiple radio access networks. At block 1210-*a*, the core network may redirect the CS voice service for a user equipment from the flexible bandwidth radio access network to the radio access network that supports the circuit-switched service from the multiple radio access networks.

Methods, systems, and devices for providing mobility between flexible bandwidth systems and normal bandwidth systems and/or other flexible bandwidth systems are provided. These methods, systems, and devices may be implemented utilizing device 1300 of FIG. 13, system 1400 of FIG. 14, method 1500-*a* of FIG. 15A, method 1500-*b* of FIG. 15B, and/or method 1600 of FIG. 16, for example. Some examples provide for radio access network (RAN) determining support for circuit-switched (CS) services, such as CS voice services, and in the case of lack of support for such services over a flexible bandwidth system, redirecting the user equipment for such services to a radio access network that supports such services. Embodiments may include: communicating with a user equipment over a flexible bandwidth radio access network from multiple radio access networks; and determining, by the flexible bandwidth radio access network, to redirect a circuit-switched service for the user equipment to a radio access network that supports the circuit-switched service from the multiple radio access networks.

The flexible bandwidth radio access network may redirect the circuit-switched service for the user equipment to the radio access network that supports the circuit-switched service from the multiple radio access networks. In many cases, the flexible bandwidth radio access network and the radio access network that supports the additional services (e.g., circuit switched services) may be part of the same equipment. For example, a single nodeB may include multiple cells. As an example, one cell may support the flexible bandwidth radio access network and another may support the radio access network that supports the additional services. In some cases, the flexible radio access network may transmit one or more messages to a core network such that the core network redirects the circuit switched service for the user equipment to the radio access network that supports the circuit-switched service from the multiple radio access networks. Other services (e.g., PS services and non-voice CS services) may be handled by the flexible bandwidth radio access network. Some examples include handling a packet-switched service on the flexible bandwidth radio access network. A non-voice circuit-switched service may be handled on the flexible bandwidth radio access network in some cases. In other cases, the flexible bandwidth radio access network may support voice services in some cases.

The core network (CN) may not be aware that the flexible bandwidth RAN may not support some CS services, like CS voice services. The core network may be unaware of a flexible bandwidth capability of the radio access network (i.e., does not distinguish a flexible bandwidth radio access network from a normal bandwidth radio access network in terms of types of services supported). In other cases, the core network may be aware that the flexible bandwidth RAN may not support some CS services, like CS voice services. However, the CN may not handle redirection of CS voice services but rather may let the flexible bandwidth radio access network handle the redirection. In other cases, the core network may be aware that the flexible bandwidth RAN may not support some CS services. However, the CN (or another knowledgeable entity) may handle some but not all of the redirections of the CS services allowing the RAN to handle and/or initiate the redirection.

In some examples, Location Area (LA) and/or Routing Area (RA) for flexible bandwidth UMTS, UMTS, and GSM may be overlapping but not necessarily the same as the cell sizes are different. The flexible bandwidth UMTS and UMTS and/or GSM cells may overlap partially or completely. The SGSN and MSC serving UMTS, GSM and flexible bandwidth UMTS networks may be the same. This may be the case, for example, when UMTS, GSM, and flexible bandwidth UMTS are deployed at the same site. In some examples, flexible bandwidth UTRAN supports CS SMS and other CS services except CS voice call. For CS voice, it may support some CS voice related signaling (e.g., Paging Type 2 message for MT CS voice call when user equipment is in PS call).

Some examples include a situation where a user equipment may be camping on a flexible bandwidth UTRAN. The user equipment may perform a combined IMSI and GPRS Attach with the CN through the flexible bandwidth UTRAN. In some examples, the CN is not aware that flexible bandwidth UTRAN does not support voice services, so it may register the user equipment for CS and PS services over the flexible bandwidth UTRAN. For example, MT/MO CS (except voice) and PS calls may be handled on flexible bandwidth UTRAN. For example, when setting up a mobile terminated (MT) CS voice call, RAN redirection may be utilized to direct the CS voice call in a radio access network that supports CS voice call. The procedure may be implemented as such as: when a MT CS notification is received at the MSC, a page may be sent to the user equipment and user equipment may be redirected to a radio access network that supports CS voice, such as GSM or UMTS by the flexible bandwidth UTRAN. Similarly, when setting up a MO CS voice call, the flexible bandwidth UTRAN may redirect the call to a radio access network that supports CS voice, such as GSM or UMTS.

Some examples may handle situations where there is no CS support on the flexible bandwidth RAN, such as a flexible bandwidth UTRAN and the CN is aware that flexible bandwidth UTRAN does not offer CS services but the CN does not handle redirection and acts the same way as if flexible bandwidth UTRAN supports all CS services. Mobiles may do combined IMSI and GPRS Attach, for example. For MO/MT CS voice call, redirection by a flexible bandwidth UTRAN to a radio access network that supports CS voice, such as GSM or UMTS, may be used.

Some examples may handle situations where there may be support for CS services except voice on a flexible bandwidth RAN, such as a flexible bandwidth UTRAN. For example, a flexible bandwidth UTRAN may support CS signaling (e.g., Paging Type 2 message for MT CS voice call when user equipment is in PS call) and might or might not support SMS and CS data services but does not support CS voice call. The CN may not be aware of this lack of voice support. Redirection by flexible bandwidth UTRAN may be utilized. In some cases, the CN may ensure that the user equipment is registered with the appropriate MSC and SGSN using a combined IMSI and GPRS Attach. The MSC and the SGSN might support different RATs.

The following describes some embodiments where there may be no CS support on a flexible bandwidth RAN, such as a flexible bandwidth UTRAN. Merely by way of example, a user equipment may be camping on the flexible bandwidth UTRAN and perform combined GPRS and IMSI Attach (on the CS and PS domain) with the CN through the flexible bandwidth UTRAN. In some cases, the GPRS Attach is received by the SGSN and the user equipment is registered on the PS domain at the SGSN. The IMSI attach request maybe received by the SGSN and forwarded to the appropriate MSC. Though the CN may be aware of the lack of support for some CS services over flexible bandwidth RAN, the redirection may be handled by the RAN.

Some embodiments include a flexible bandwidth system where CS signaling may be supported by a flexible bandwidth RAN, but there may be no voice support on the flexible bandwidth RAN, such as a flexible bandwidth UTRAN. For example, a user equipment may be camping on the flexible bandwidth UTRAN. RAN redirection may be utilized to move the UE to RAN that supports CS voice. The user equipment may perform a combined IMSI and GPRS Attach with the CN through the flexible UTRAN. The UE registration may be for a combined CS' (where CS' means all CS services except certain CS services such as CS voice) and PS registration. As a result, the CN may be made aware that some CS signaling and maybe some services (e.g., SMS, CS Data etc.) are supported on flexible UTRAN, but not voice. Therefore, CS voice services for that UE may be supported by another RAN such as UMTS or GSM and MT/MO CS (except voice) and PS calls may be handled on flexible UTRAN.

Figure 13:
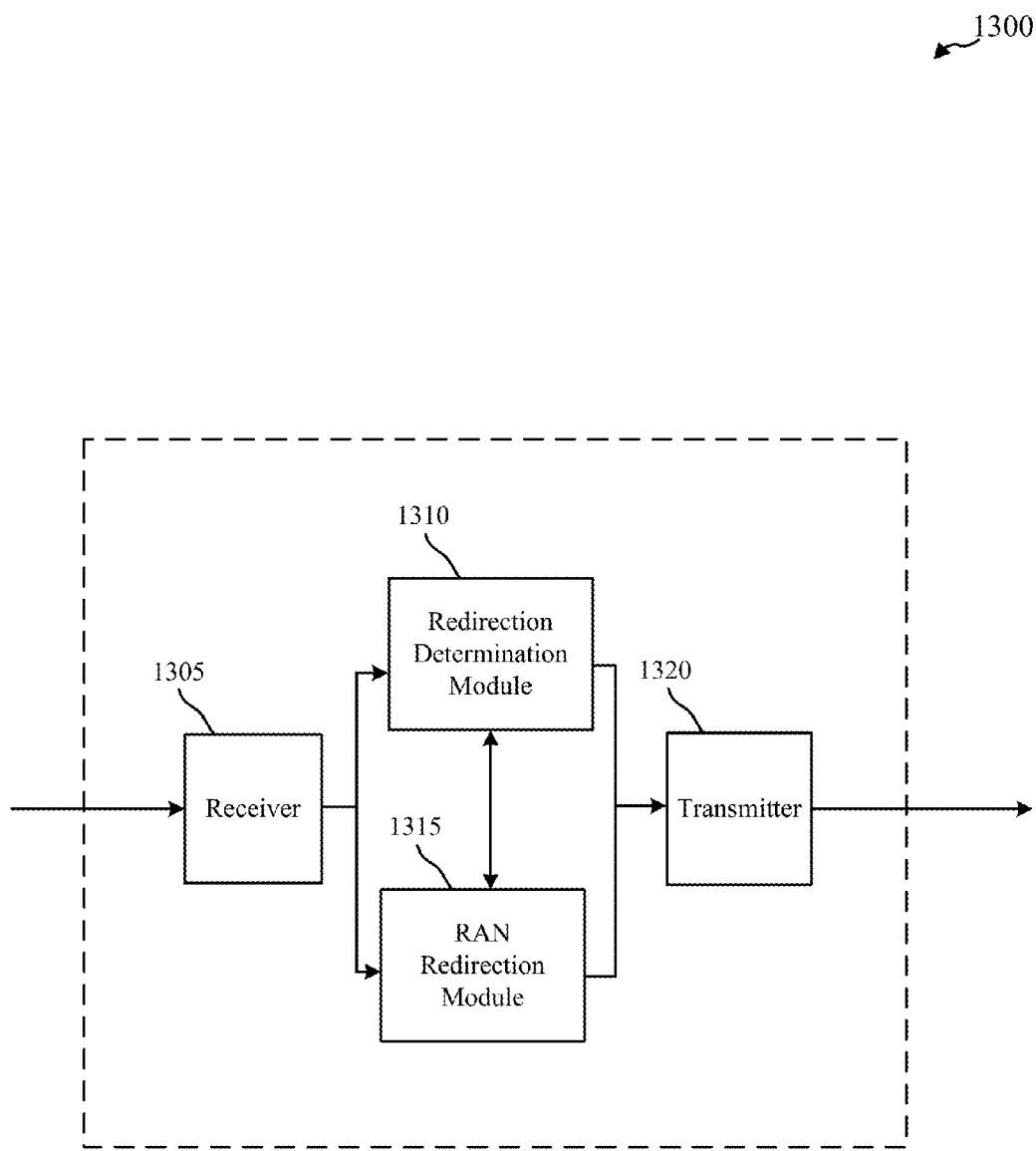
FIG. 13 shows a block diagram of a device that includes mobility functionality in accordance with various embodiments.

Turning next to FIG. 13, a block diagram illustrates a device 1300 that includes mobility functionality in accordance with various embodiments. The device 1300 may be an example of aspects of the core networks 130 of FIG. 1, FIG. 3B, and/or FIG. 14. The device 2100 may also be a processor. The device 1300 may include a receiver module 1305, a redirection determination module 1310, a RAN redirection module 1315, and/or a transmitter module 1320. Each of these components may be in communication with each other. Furthermore, the redirection determination module 1310 may also communicate with the other network entities (e.g., MSC, SGSN, CN). Both the redirection determination module 1310 and/or the RAN redirection module 1315 may determine its actions based on messages and signalling directed to other entities within the RAN and outside the redirection determination module 1310 and/or the RAN redirection module 1315. Furthermore, the redirection determination module 1310 and/or the RAN redirection module 1315 may modify messages and signaling directed to other modules. Modifying may include remove a message or fields in a message. These messages may be directed or directed to entities outside the redirection determination module 1310 and/or the RAN redirection module 1315 (e.g., UE, RAN, CN). Furthermore, the redirection determination module 1310 and/or the RAN redirection module 1315 can generate new messages and signaling or remove messages and signaling directed to other modules These components of the device 1300 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1305 may receive information such as packet, data, and/or signaling information regarding what device 1300 has received or transmitted. The received information may be utilized by the redirection determination module 1310 and/or the RAN redirection module 1315 for a variety of purposes.

In some embodiments, device 1300 through transmitter module 1320 and/or receiver module 1305 may be configured for communicating with a user equipment using a flexible bandwidth radio access network from multiple radio access networks. The redirection determination module 1310 and/or the RAN redirection module 1315 may be configured for determining to redirect a circuit-switched service for the user equipment to a radio access network that supports the circuit-switched service from the multiple radio access networks.

The redirection determination module 1310 and/or the RAN redirection module 1315 may be configured such that redirecting the circuit-switched service may occur at the flexible bandwidth radio access network. Redirecting the circuit-switched service may occur at a core network. Some embodiments include transmitting one or more message from device 1300 through the redirection determination module 1310, the RAN redirection module 1315, and/or the transmitter module 1320 to the core network to prompt the redirection. The redirection determination module 1310 and/or the RAN redirection module 1315 may be configured for redirecting, at the flexible bandwidth radio access network, the circuit-switched service for the user equipment to the radio access network that supports the circuit-switched service from the plurality of radio access networks. The redirection determination module 1310 and/or the RAN redirection module 1315 may be configured for transmitting one or more messages to a core network such that the core network redirects the circuit switched service for the user equipment to the radio access network that supports the circuit-switched service from the plurality of radio access networks. The redirection determination module 1310 and/or the RAN redirection module 1315 may modify one or more messages to a core network such that the core network redirects the circuit switched service for the user equipment to the radio access network that supports the circuit-switched service from the multiple radio access networks.

Some embodiments of device 1300 being configured to handle a packet-switched service on the flexible bandwidth radio access network. Some embodiments include handling another circuit-switched service on the flexible bandwidth radio access network. The other circuit-switched service may include a non-voice circuit-switched service or a circuit-switched voice service.

In some situations, the core network is unaware that the circuit-switched voice service is unsupported on the flexible bandwidth radio access network. In some cases, the core network may be unaware of a flexible bandwidth capability of the flexible bandwidth radio access network. In some cases, the core network may be aware of a flexible bandwidth capability of the flexible bandwidth radio access network. In some cases, the core network is unaware of a flexible bandwidth capability of the flexible bandwidth radio access network.

Figure 14:
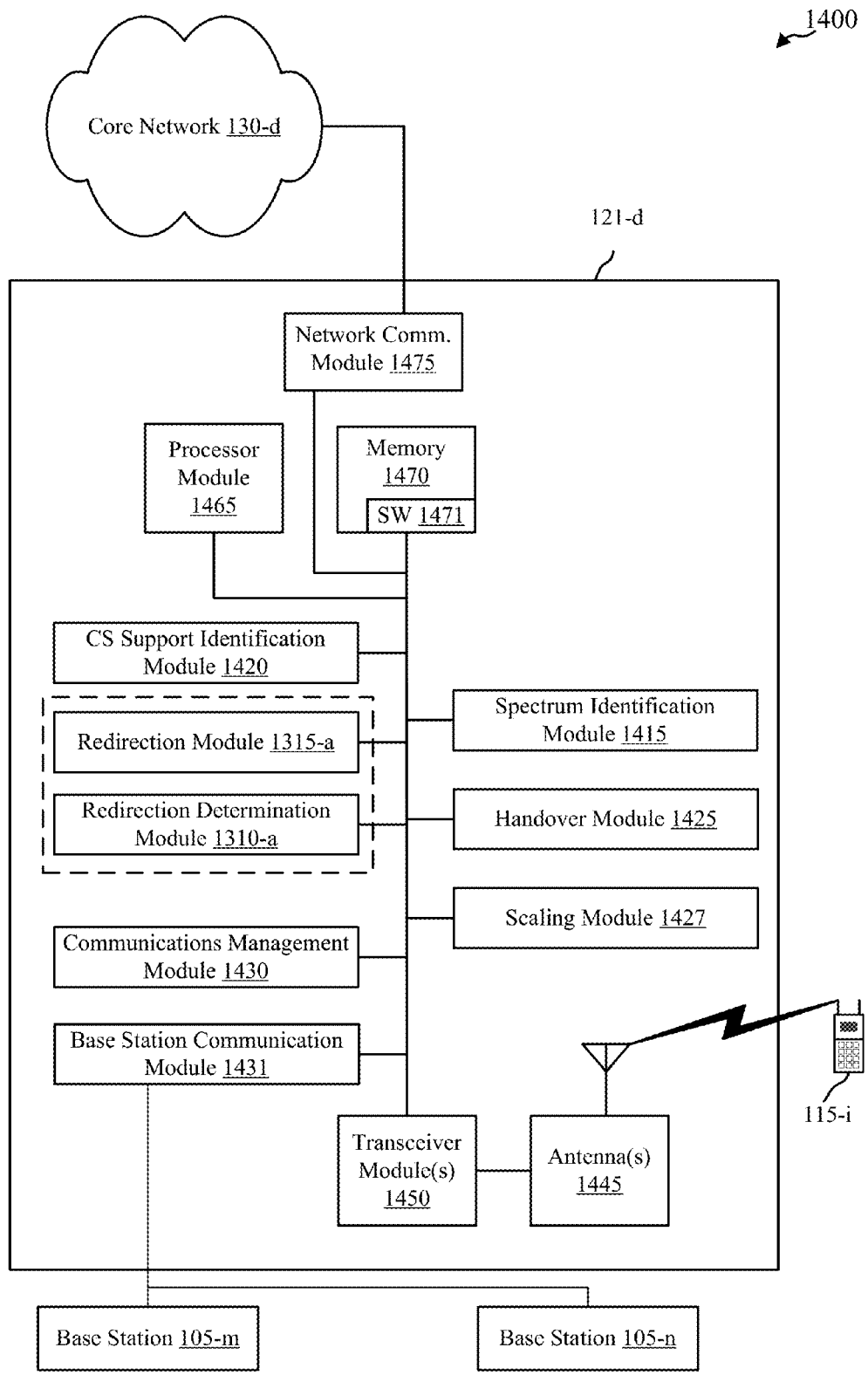
FIG. 14 shows a block diagram of a communications system configured for providing mobility for wireless communications systems in accordance with various embodiments.

FIG. 14 shows a block diagram of a communications system 1400 that may be configured for mobility for wireless communications systems in accordance with various embodiments. This system 1400 may include aspects of the system 100 depicted in FIG. 1, systems 200 of FIG. 2, systems 300 of FIG. 3, and/or system 4200 of FIG. 42; and/or device 1300 of FIG. 13. The radio access network 121-*d* may include aspects of a base station 105 and/or a controller 120 to represent a combined system and/or separate components that may comprise part of a radio access network. The radio access network 121-*d* may include antennas 1445, a transceiver module 1450, memory 1470, and a processor module 1465, which each may be in communication, directly or indirectly, with each other (e.g., over one or more buses). The transceiver module 1450 may be configured to communicate bi-directionally, via the antennas 1445, with the user equipment 115-*i*, which may be a multi-mode user equipment. The transceiver module 1450 (and/or other components of the radio access network 121-*d*) may also be configured to communicate bi-directionally with one or more networks. In some cases, the radio access network 121-*d* may communicate with the network 130-*d* through network communications module 1475. Radio access network 121-*d* may be an example of an eNodeB base station, a Home eNodeB base station, a NodeB base station, a Radio Network Controller (RNC), and/or a Home NodeB base station.

Radio access network 121-*d* may also communicate with other base stations 105, such as base station 105-*m* and base station 105-*n*. Each of the base stations 105 may communicate with user equipment 115-*i* using different wireless communications technologies, such as different Radio Access Technologies. In some cases, radio access network 121-*d* may communicate with other base stations such as 105-*m* and/or 105-*n* utilizing base station communication module 1431. In some embodiments, base station communication module 1431 may provide an X2 interface within an LTE wireless communication technology to provide communication between some of the base stations 105. In some embodiments, radio access network 121-*d* may communicate with other base stations through controller 120-*a* and/or network 130-*d*.

The memory 1470 may include random access memory (RAM) and read-only memory (ROM). The memory 1470 may also store computer-readable, computer-executable software code 1471 containing instructions that are configured to, when executed, cause the processor module 1465 to perform various functions described herein (e.g., call processing, database management, message routing, etc.). Alternatively, the software 1471 may not be directly executable by the processor module 1465 but be configured to cause the computer, e.g., when compiled and executed, to perform functions described herein.

The processor module 1465 may include an intelligent hardware device, e.g., a central processing unit (CPU) such as those made by Intel® Corporation or AMD®, a microcontroller, an application-specific integrated circuit (ASIC), etc. The processor module 1465 may include a speech encoder (not shown) configured to receive audio via a microphone, convert the audio into packets (e.g., 20 ms in length) representative of the received audio, provide the audio packets, and/or provide indications of whether a user is speaking.

The transceiver module 1450 may include a modem configured to modulate the packets and provide the modulated packets to the antennas 1445 for transmission, and to demodulate packets received from the antennas 1445. While some examples of the radio access network 121-d may include a single antenna 1445, the radio access network 121-d preferably includes multiple antennas 1445 for multiple links which may support carrier aggregation. For example, one or more links may be used to support macro communications with user equipment 115-i.

According to the architecture of FIG. 14, the radio access network 121-d may further include a communications management module 1430. The communications management module 1430 may manage communications with other base stations 105 or RNC 120. By way of example, the communications management module 1430 may be a component of the radio access network 121-d in communication with some or all of the other components of the radio access network 121-d via a bus. Alternatively, functionality of the communications management module 1430 may be implemented as a component of the transceiver module 1450, as a computer program product, and/or as one or more controller elements of the processor module 1465.

The components for radio access network 121-d may be configured to implement aspects discussed above with respect to device 1300 of FIG. 13 and may not be repeated here for the sake of brevity. The redirection module 1315-a may be an example of the RAN redirection module 1315-a. The redirection determination module 1310-a may be an example of the redirection determination module 1310-a.

The radio access network 121-d may also include a spectrum identification module 1415. The spectrum identification module 1415 may be utilized to identify spectrum available for flexible bandwidth waveforms. Some embodiments may include a circuit-switched support identification module 1420 to determine if other aspects of system 1400 include support for circuit-switched services, such as CS voice services. In some embodiments, a handover module 1425 may be utilized to perform handover procedures of the user equipment 115-i from one base station 105 to another. For example, the handover module 1425 may perform a handover procedure of the user equipment 115-i from radio access network 121-d to another where normal waveforms are utilized between the user equipment 115-i and one of the base stations and flexible bandwidth waveforms are utilized between the user equipment and another base station. A scaling module 1427 may be utilized to scale and/or alter chip rates to generate flexible bandwidth waveforms.

In some embodiments, the transceiver module 1450 in conjunction with antennas 1445, along with other possible components of radio access network 121-d, may transmit and/or receive information regarding flexible bandwidth waveforms and/or scaling factors from the radio access network 121-d to the user equipment 115-i, to other base stations 105-m/105-n, or core network 130-d. In some embodiments, the transceiver module 1450 in conjunction with antennas 1445, along with other possible components of radio access network 121-d, may transmit and/or receive information to or from the user equipment 115-i, to or from other base stations 105-m/105-n, or core network 130-d, such as flexible bandwidth waveforms and/or scaling factors, such that these devices or systems may utilize flexible bandwidth waveforms.

Figure 15A:
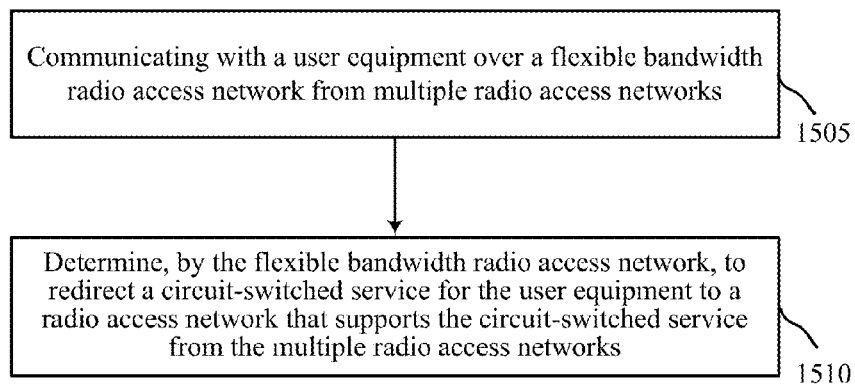
FIG. 15A shows a flow diagram of a method for providing mobility within wireless communications systems in accordance with various embodiments.

Turning to FIG. 15A, a flow diagram of a method 1500-a for providing mobility within wireless communications systems is provided in accordance with various embodiments. Method 1500-a may be implemented utilizing various wireless communications devices and/or systems including, but not limited to: system 100 of FIG. 1, systems 200 of FIG. 2, systems 300 of FIG. 3, system 1400 of FIG. 14, system 4200 of FIG. 42; the radio access networks 121 of FIG. 14; and/or device 1300 of FIG. 13.

Communicating with a user equipment over a flexible bandwidth radio access network may occur at block 1505, where the flexible bandwidth radio access network is from a group of radio access networks. Determining, by the flexible bandwidth radio access network, to redirect a circuit-switched service for the user equipment to a radio access network that supports the circuit-switched service from the multiple radio access networks may occur at block 1510.

For method 1500-a, redirecting the circuit-switched service may occur at the flexible bandwidth radio access network. Redirecting the circuit-switched service may occur at a core network. Some embodiments include transmitting one or more message from the flexible bandwidth radio access network to the core network to initiate and/or facilitate the redirection. Method 1500-a may include redirecting, at the flexible bandwidth radio access network, the circuit-switched service for the user equipment to the radio access network that supports the circuit-switched service from the multiple radio access networks. Method 1500-a may include transmitting one or more messages to a core network such that the core network redirects the circuit switched service for the user equipment to the radio access network that supports the circuit-switched service from the multiple radio access networks. Some embodiments include modifying one or more messages to a core network such that the core network redirects the circuit switched service for the user equipment to the radio access network that supports the circuit-switched service from the plurality of radio access networks.

Some embodiments include handling a packet-switched service on the flexible bandwidth radio access network. Some embodiments include handling another circuit-switched service on the flexible bandwidth radio access network. The other circuit-switched service may include a non-voice circuit switched service or a circuit-switched voice service.

In some situations, the core network may be unaware of a flexible bandwidth capability of the flexible bandwidth radio access network. For example, the core network may be unaware that the circuit-switched voice service is unsupported on the flexible bandwidth radio access network. In other situations, the core network may be aware of a flexible bandwidth capability of the flexible bandwidth radio access network. In some situations, the core network is aware that the circuit-switched service is unsupported on the flexible bandwidth radio access network.

Figure 15B:
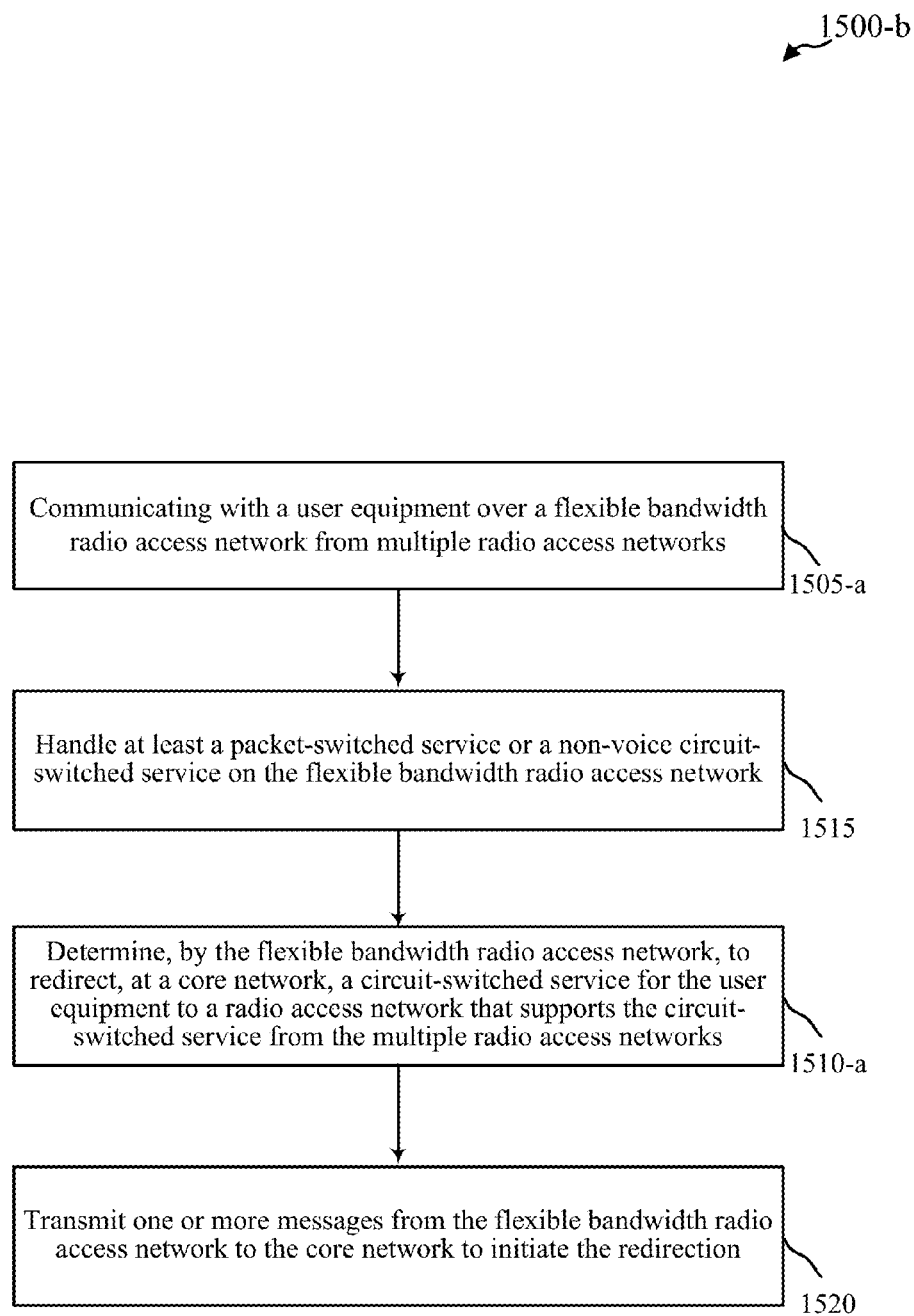
FIG. 15B shows a flow diagram of a method for providing mobility within wireless communications systems in accordance with various embodiments.

Turning to FIG. 15B, a flow diagram of a method 1500-*b* for providing mobility within wireless communications systems is provided in accordance with various embodiments. Method 1500-*b* may be implemented utilizing various wireless communications devices and/or systems including, but not limited to: system 100 of FIG. 1, systems 200 of FIG. 2, systems 300 of FIG. 3, system 1400 of FIG. 14, system 4200 of FIG. 42; the radio access networks 121 of FIG. 14; and/or device 1300 of FIG. 13. Method 1500-*b* be may be an example of one or more aspects of method 1500-*a* of FIG. 15A.

At block 1505-*a*, communicating with a user equipment over a flexible bandwidth radio access network, where the flexible bandwidth radio access network is from a group of multiple radio access networks may occur. At block 1515, at least a packet-switched service or a non-voice circuit-switched service may be handled on the flexible bandwidth radio access network. At block 1510-*a*, the flexible bandwidth radio access network may determine to redirect at a core network a circuit-switched service for the user equipment to a radio access network that supports the circuit-switched service from the multiple radio access networks. At block 1520, one or more messages may be transmitted from the flexible bandwidth radio access network to the core network to initiate the redirection.

Figure 15C:
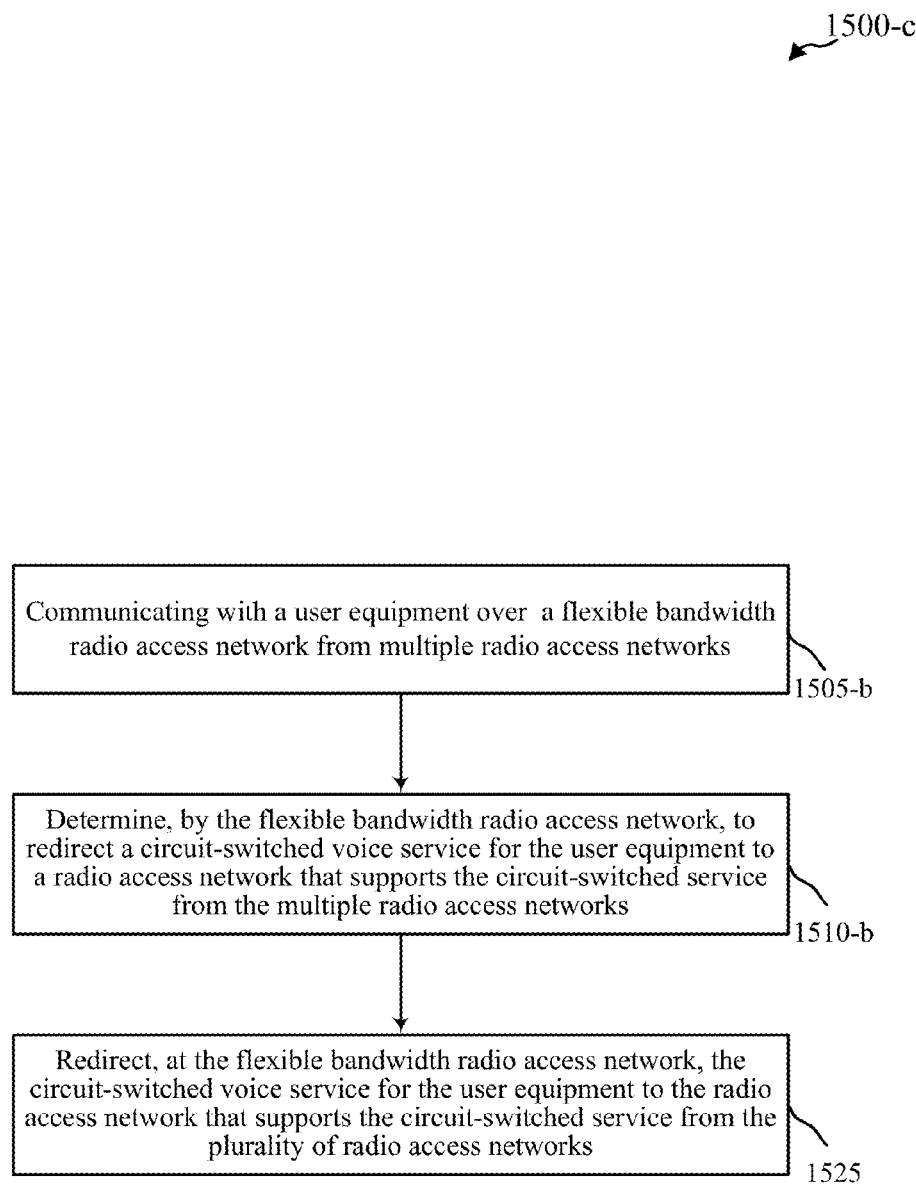
FIG. 15C shows a flow diagram of a method for providing mobility within wireless communications systems in accordance with various embodiments.

Turning to FIG. 15C, a flow diagram of a method 1500-*c* for providing mobility within wireless communications systems is provided in accordance with various embodiments. Method 1500-*c* may be implemented utilizing various wireless communications devices and/or systems including, but not limited to: system 100 of FIG. 1, systems 200 of FIG. 2, systems 300 of FIG. 3, system 1400 of FIG. 14, system 4200 of FIG. 42; the radio access networks 121 of FIG. 14; and/or device 1300 of FIG. 13. Method 1500-*c* be may be an example of one or more aspects of method 1500-*a* of FIG. 15A and/or method 1500-*b* of FIG. 15B At block 1505-*b*, communicating with a user equipment over a flexible bandwidth radio access network may occur. The flexible bandwidth radio access network may be from a group of multiple radio access networks. At block 1510-*b*, the flexible bandwidth radio access network may determine to redirect a circuit-switched voice service for the user equipment to a radio access network that supports the circuit-switched voice service from the multiple radio access networks. At block 1525, the flexible bandwidth radio access network may redirect the circuit-switched voice service for the user equipment to the radio access network that supports the circuit-switched service from the plurality of radio access networks.

Figure 16:
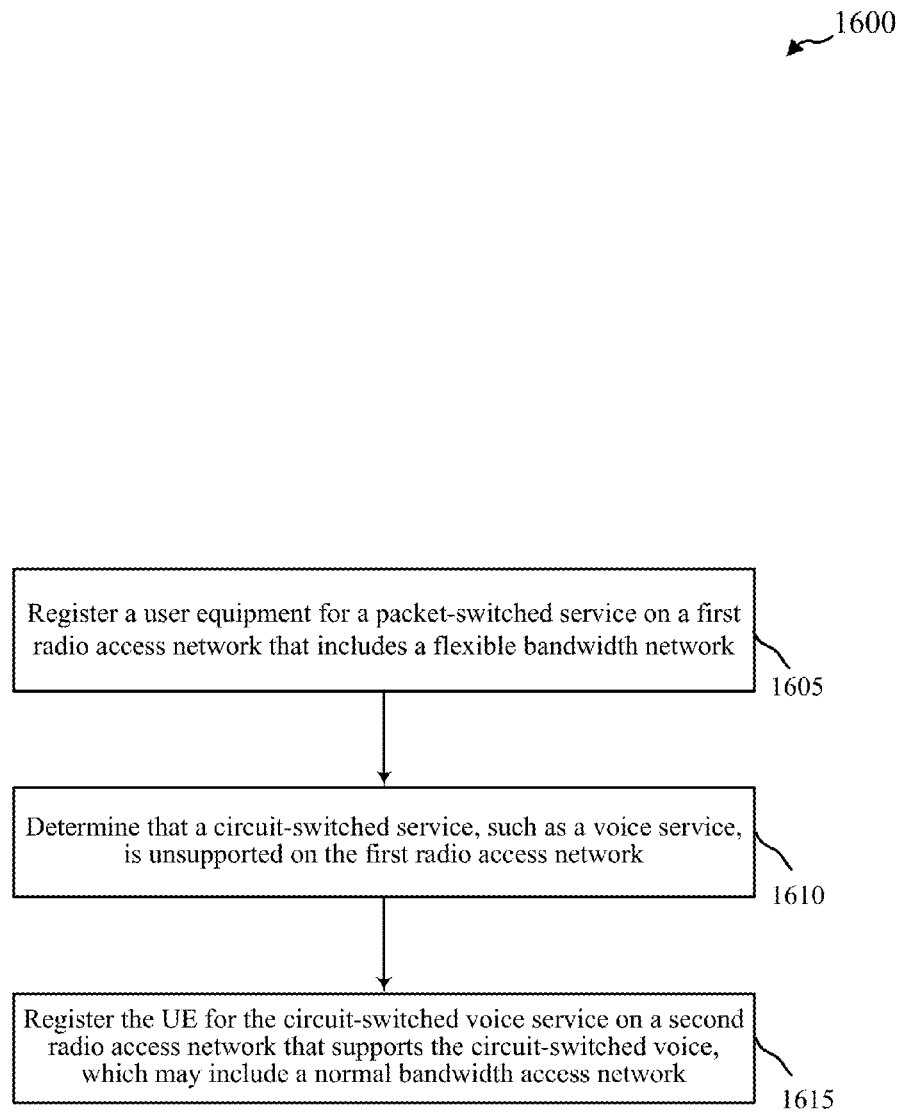
FIG. 16 shows a flow diagram of a method for providing mobility within wireless communications systems in accordance with various embodiments.

Turning to FIG. 16, a flow diagram of a method 1600 for providing mobility within wireless communications systems is provided in accordance with various embodiments. Method 1600 may be implemented utilizing various wireless communications devices and/or systems including, but not limited to: system 100 of FIG. 1, systems 200 of FIG. 2, systems 300 of FIG. 3, system 1100 of FIG. 11, system 1400 of FIG. 14, system 4200 of FIG. 42; the core network 130 of FIG. 11; the radio access networks 121 of FIG. 14; and/or device 1300 of FIG. 13. Method 1600 be may be an example of one or more aspects of method 1500-*a* of FIG. 15A, method 1500-*b* of FIG. 15B, method 1200-*a* of FIG. 12A, and/or method 1200-*b* of FIG. 12B.

At block 1605, a user equipment may be registered for a packet-switched service on a first radio access network that includes a flexible bandwidth network. At block 1610, it may be determine that a circuit-switched service, such as a voice service, is unsupported on the first radio access network. At block 1615, the UE may be registered for the circuit-switched service on a second radio access network that supports the circuit-switched service, which may include a normal bandwidth access network.

Methods, systems, and devices facilitating mobility between flexible bandwidth systems and normal bandwidth systems and/or other flexible bandwidth systems are provided. The methods, systems, and/or devices may be implemented utilizing one or more aspects of system 2500 of FIG. 25, the system 2600 of FIG. 26, user equipment 2700 of FIG. 27, method 2800-*a* of FIG. 28A, and/or method 2800-*b* of FIG. 28B, for example. Some embodiments provide for transitioning or spring forward to a flexible bandwidth system. Spring forward may include the transition from a normal bandwidth carrier (e.g., GSM, UMTS) to a flexible bandwidth carrier. Some embodiment may include transitioning from a first radio access network to a second radio access network, where the first radio access network includes a normal bandwidth radio access network and the second radio access network includes a flexible bandwidth radio access network. Some embodiments include a method for facilitating mobility to a flexible bandwidth system that may include: communicating over first radio access network, where the first radio access network utilizes a first bandwidth carrier; identifying a second radio access network, where the second radio access network utilizes a first flexible bandwidth carrier; and transitioning from utilizing the first bandwidth carrier of the first radio access network to utilizing the first flexible bandwidth carrier of the second radio access network. The first bandwidth carrier may be a normal bandwidth carrier or a second flexible bandwidth carrier different from the first flexible bandwidth carrier.

A core network may direct one or more aspects of the transitioning. At least one of the radio access networks directs one or more aspects of the transitioning in some embodiments. The transitioning may relate to packet-switched services for a user equipment. The transitioning may utilize a variety of different procedures including, but not limited to, a load-based handover procedure, a service-based handover procedure, and/or a inter-frequency handover procedure. When the handover involves one service, it may be called a single Radio Access Bearer (RAB) handover and when multiple services (e.g., CS and PS call) may be involved, the handover may be referred to as a multi-RAB handover. These handover procedures may also involve the user equipment taking measurements from the new cell or the handover could be performed blindly.

Some embodiments include a load-based handover for transitioning to a flexible bandwidth system. Some embodiments include a load-based handover for transitioning to a flexible bandwidth system. Load-based handover are used typically triggered in networks when a particular network can not support adding a new call on its network so it handovers the associated UE to another network. For handover, between normal bandwidth and flexible bandwidth system, load-based handover procedure can be used triggered when services could be better supported on the flexible bandwidth network. The reason for triggering the load-based handover in the scenario is not necessarily due to the load on the normal bandwidth network. For example, a load-based handover may be utilized to transition or spring forward from GSM to a flexible system. For example, while entering the GSM network, a UE may perform a combined GPRS and IMSI Attach on the GSM network after which the UE camps on the cell.

The UE may initiate a MO PS call or may receive a MT PS call (with data rate that can be supported on the flexible bandwidth network but not on GERAN, for example). The user equipment may send a service request and may set-up a PDP context for the call. GSM network may accept the calls and may assign appropriate bearer resources to support the PS call and may establish a PS connection with the user equipment. GERAN may decide that the QoS can be served by flexible bandwidth UMTS cell so RAN may initiate relocation to a flexible bandwidth UTRAN target cell. The flexible bandwidth UMTS target cell may be determined from a database at the RAN containing a list of geographically overlapping or neighboring UMTS and flexible bandwidth UMTS cells, for example. GERAN may request that the user equipment perform inter-RAT measurements on the target flexible bandwidth UMTS cell before issuing a Cell Change Order command to user equipment. In some embodiments, this may be done if user equipment may not be known to support flexible bandwidth UTRAN. If user equipment detects flexible bandwidth UMTS target cell and may report suitable signal strength to GERAN, GERAN may send a "Cell Change order to UTRAN" command to the user equipment. In case measurements are not configured for the user equipment, GERAN may blindly send a Cell Change Order command to the user equipment to tune to the target flexible bandwidth UMTS cell. This may be done if user equipment is known to support flexible bandwidth UTRAN, for example. In some embodiments, measurements are configured so that the user equipment may identify the target flexible bandwidth UMTS cell before being handed over, which may avoid call drops especially for non-flexible and/or normal user equipment, which may not be able to detect flexible bandwidth UMTS cell. This embodiment includes situations where there may be no ongoing CS voice call. Also, it may be possible that if requested data rate can be supported by GERAN, the PS call is not handed over to flexible bandwidth UTRAN.

A service-based handover for transitioning to a flexible bandwidth system may be utilized in some cases. For example, a service-based handover (SBHO) may be utilized to transition or spring forward from GSM to a flexible bandwidth UMTS. For example, a redirect of a flexible bandwidth capable UE from GSM to flexible bandwidth UTRAN may occur when a PS call is attempted by the UE. Service-based HO procedure may be utilized and the UE maybe notified of the handover with the Cell Change Order message. The Cell Change Order (CCO) message sent from the GERAN to the UE regarding the flexible bandwidth UTRAN cell may be sent after the UE takes measurement on the flexible bandwidth UTRAN cell or blindly by the GERAN. The GERAN might or might not know if UE is flexible bandwidth capable before ordering the measurements or sending the CCO. In some cases, the GERAN may be able to obtain additional information to determine if the UE has flexible capabilities. For supporting PS services on the flexible bandwidth networks, the SGSN, if aware of the UE capability, may selectively perform SBHO for flexible bandwidth capable UEs based on UEIDs such as IMEI. Note that in some embodiments, SBHO may include the SGSN notifying the BSC to perform a HO to flexible bandwidth UTRAN.

Some embodiments may utilize handover procedures based on no measurements and/or based on user equipment measurements. For load-based, service-based, and/or inter-frequency handovers, for example, before the network communicates the handover to the UE, it could ask the UE to take measurements or not of the target cell. For example, some embodiments include mobile-assisted (UE measurement-based) handover where, for example, compressed mode gaps (measurement gaps) may be scheduled for inter-frequency measurements to find suitable target cell. This may be utilized when a user equipment may not be known to support flexible bandwidth. Some embodiments utilize database and/or network assisted handover, for example, which may include no measurements performed on other frequencies; rather cell mapping information may be stored in data base is used to identify the target cell. This approach may be done when user equipment may already be known to support flexible bandwidth. For example, cell mapping information may be available at RAN from the knowledge of collocated flexible and GSM/UMTS cells. User equipment capability information may be built up over time by RAN—from previous user equipment measurements reported to RAN, for example. Subsequently, when a user equipment may be known to be flexible bandwidth compatible, blind HO may be done.

An inter-frequency handover (IFHO) from a normal bandwidth system to a flexible bandwidth system may be utilized in some cases. Some embodiments may be non-measurement based. For example, a user equipment may camp on the UMTS network and may receive a MT PS call (with bit rate that can be supported on the flexible bandwidth network) or may decide to establish an MO PS call. The user equipment may send a service request and may set-up a PDP context for the call. UMTS network may accept the calls and may assign appropriate RAB resources to support the PS call and may establish a PS connection with the user equipment. Using a RAN preference algorithm, the RAN may decide that the QoS can be served by flexible bandwidth UMTS cell so RAN may initiate an relocation to a flexible bandwidth UMTS target cell. The flexible bandwidth UMTS target cell may be determined from a database at the RAN containing a list of geographically overlapping or neighboring UMTS and flexible bandwidth UMTS cells. In some embodiments, the RAN can request that the user equipment perform inter-frequency measurements on the target cell before issuing a handover to user equipment. If user equipment finds the target cell and reports favorable signal strength to the UMTS RAN, then, the UMTS RAN may send a "physical channel reconfiguration" message to the user equipment. In case measurements are not issued, the UMTS may blindly send a "physical channel reconfiguration" message to the user equipment to tune to the target. In some embodiments, the user equipment identifies the target cell before being handed over to avoid call drops especially for non-flexible or normal UMTS user equipment.

Some embodiments may include an inter-frequency handover that may be similar to the load-based handover with some differences. For example, one difference may be that the inter-frequency HO may be triggered based on the measured signal strength of the user equipment. Once the measured signal strength may be past a threshold, the user equipment may signal the event to the UMTS RAN (UTRAN) and the relocation required command may be issued by the RAN to the SGSN. The HO procedure may then proceed similar to the load-based handover. The difference between the IFHO and the load-based handover may be that only the user equipment (flexible bandwidth UMTS user equipment, for example) that may identify the flexible bandwidth UMTS's cell may be triggered to be handed over to the target cell. Some embodiments may include multi-RAB scenarios. For example, in case of an existing PS call on the UMTS RAN, if another MT or MO PS call may be received by the network, another RAB might be set-up for such call. Similar to the single RAB scenario, if flexible bandwidth UMTS cell supports the multiple RAB services, a load-based handover or an inter-frequency handover may be for transitioning the UE from a normal bandwidth cell to a flexible bandwidth cell.

Some embodiments involve a preferred radio access technology (RAT) that the user equipment may camp on. For example, for voice centric user equipment, GSM may be a preferred RAT. For low and/or medium data rate centric user equipment, flexible bandwidth UMTS may be a preferred RAT or a preferred mode of a RAT. For high data rate centric user equipment, UMTS/HSPA may be a preferred RAT or a preferred mode of a RAT.

Figure 17:
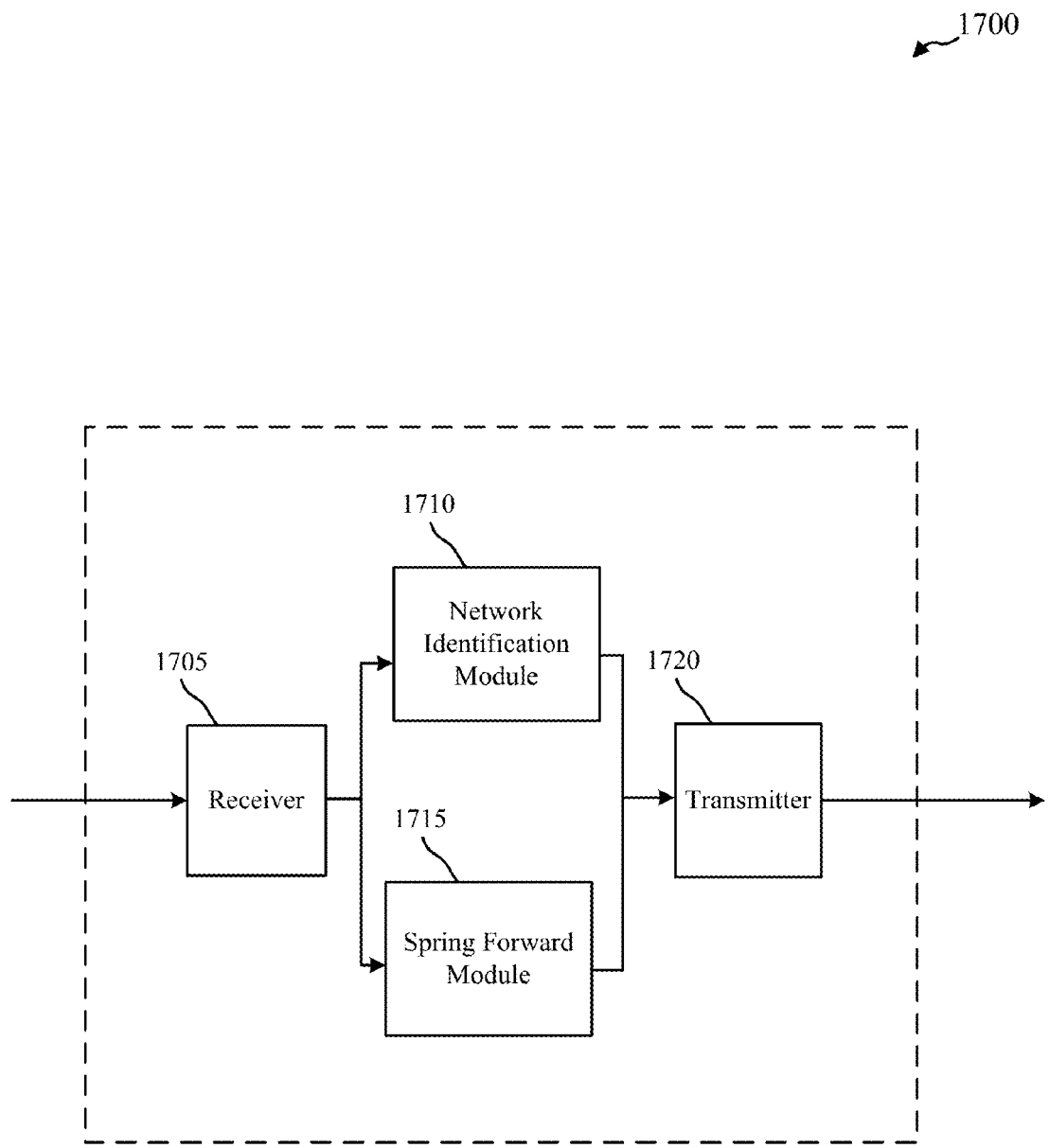
FIG. 17 shows a block diagram of a device that includes mobility functionality in accordance with various embodiments.

Turning next to FIG. 17, a block diagram illustrates a device 1700 that includes mobility functionality in accordance with various embodiments. The device 1700 may be an example of aspects of: the core networks 130 of FIG. 1, FIG. 3B, FIG. 25, and/or FIG. 26; the radio access networks 121 of FIG. 3B, FIG. 25, and/or FIG. 26; and/or the user equipment 115 of FIG. 1, FIG. 2, FIG. 3, FIG. 25, FIG. 26, and/or FIG. 27. The device 2100 may also be a processor. The device 1700 may include a receiver module 1705, a network identification module 1710, a spring forward module 1715, and/or a transmitter module 1720. Each of these components may be in communication with each other. Device 1700 may be configured to implement different aspects of the call flows and/or systems as shown in FIGS. 4-20 and/or associated description.

These components of the device 1700 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 1705 may receive information such as packet, data, and/or signaling information regarding what device 1700 has received or transmitted. The received information may be utilized by the network identification module 1710 and/or spring forward module 1715 for a variety of purposes.

In some embodiments, spring forward module 1715 is configured for transitioning from a first radio access network to a second radio access network, wherein the first radio access network includes a normal bandwidth radio access network and the second radio access network includes a flexible bandwidth radio access network may occur. In some embodiments, a core network directs one or more aspects of the transitioning through spring forward module 1715. At least one of the radio access networks directs one or more aspects of the transitioning through spring forward module 1715 in some embodiments. The transitioning may relate to packet-switched services for a UE. The spring forward module 1715 may utilize a variety of different procedures including, but not limited to, a load-based handover procedure, a service-based handover procedure, an inter-frequency handover procedure, and/or a multi-RAB load-based procedure, a multi-RAB service-based procedure and/or multi-RAB inter-frequency handover procedure. These handovers may involve the user equipment taking measurements from the new cell or the handover could be performed blindly.

The receiver module 1705 and/or the transmitter module 1720 may be configured to communicate over first radio access network, wherein the first radio access network utilizes a first bandwidth carrier. The network identification module 1710 may be configured for identifying a second radio access network, wherein the second radio access network utilizes a first flexible bandwidth carrier. The spring forward module 1715 may be configured for transitioning from utilizing the first bandwidth carrier of the first radio access network to utilizing the first flexible bandwidth carrier of the second radio access network. After transitioning to the first flexible bandwidth carrier, the receiver module 1705 and/or the transmitter module 1720 may be configured to communicate over second radio access network, wherein the second radio access network utilizes a first flexible bandwidth carrier.

Transitioning from utilizing the first bandwidth carrier of the first radio access network to utilizing the first flexible bandwidth carrier of the second radio access network may be directed at least in part by a core network. Transitioning from utilizing the first bandwidth carrier of the first radio access network to utilizing the first flexible bandwidth carrier of the second radio access network may be directed at least in part by at least one of the radio access networks. In some embodiments, the network identification module 1710 may be configured for performing one or more of these transitioning steps. The first bandwidth carrier may include a normal bandwidth carrier or a second flexible bandwidth carrier different from the first flexible bandwidth carrier.

Transitioning from utilizing the first bandwidth carrier of the first radio access network to utilizing the first flexible bandwidth carrier of the second radio access network may relate to packet-switched services for a user equipment. Transitioning from utilizing the first bandwidth carrier of the first radio access network to utilizing the first flexible bandwidth carrier of the second radio access network may include utilizing a load-based handover. Transitioning from utilizing the first bandwidth carrier of the first radio access network to utilizing the first flexible bandwidth carrier of the second radio access network may include utilizing a service-based handover. Transitioning from utilizing the first bandwidth carrier of the first radio access network to utilizing the first flexible bandwidth carrier of the second radio access network may include utilizing a blind handover. Transitioning from utilizing the first bandwidth carrier of the first radio access network to utilizing the first flexible bandwidth carrier of the second radio access network may include utilizing user equipment measurements. For example, a single RAB load-based handover procedure, a single RAB service-based handover procedure, a single RAB inter-frequency handover procedure, a multi-RAB load-based, a multi-RAB service-based, and/or multi-RAB inter-frequency handover procedure may involve the user equipment taking measurements from the new cell or the handover could be performed blindly. Transitioning from utilizing the first bandwidth carrier of the first radio access network to utilizing the first flexible bandwidth carrier of the second radio access network may include utilizing an inter-frequency handover. Transitioning from utilizing the first bandwidth carrier of the first radio access network to utilizing the first flexible bandwidth carrier of the second radio access network may include utilizing a multi-RAB inter-frequency, service-based, and/or load-based handover.

In some embodiments, the network identification module 1710 may be configured for performing one or more of these transitioning steps. In some embodiments, the network identification module 1710 may be configured for determining a preferred radio access technology for a user equipment to camp on based on whether the user equipment is voice centric or data centric.

Some embodiments of device 1700 may provide mobility from a normal and/or non-flexible bandwidth systems to flexible bandwidth systems. The normal and/or non-flexible bandwidth systems may be configured to handle circuit-switched voice services. The mobility between flexible bandwidth systems and non-flexible or normal bandwidth systems and/or circuit-switched voice-supporting systems may be referred to as transitioning between these systems and/or spring forward. For example, some embodiments may include transition from a normal and/or non-flexible RAN to a flexible RAN. In some embodiments, a flexible RAN or flexible bandwidth capable UE may also be capable of normal RAN or normal UE functionality. Thus, a flexible RAN or flexible bandwidth capable UE may be a flexible-capable and normal-capable RAN or UE, respectively.

The transitioning or spring forward procedures may utilize a variety of techniques in accordance with various embodiments. Different embodiments may utilize different techniques for these transitioning and/or spring forward procedures including, but not limited to, single RABload-based handover, single RAB service-based handover, single RAB inter-frequency handover, multi-RAB inter-frequency, multi-RAB service-based, and/or multi-RAB load-based handover. Some embodiments include specific registration procedures. Some embodiments include idle mode camping strategies. Merely by way of example, some embodiments include transitioning and/or spring forward from GSM to flexible bandwidth UMTS. In other example, transitioning and/or spring forward may be from UMTS to flexible bandwidth UMTS. Other embodiments may utilize other RATs.

Merely by way of example, some embodiments include registration while camping on a specific RAT, such as GSM or UMTS. A UE may perform combined GPRS/IMSI Attach, for example. IMSI Attach may be received by the MSC and the UE may be registered on the CS domain at the MSC supporting the GSM or UMTS RAT, for example. GPRS Attach may be forwarded to SGSN of the GSM or UMTS network with overlapping routing areas with the flexible bandwidth UMTS routing areas.

In some embodiments, a UE may idle on a normal RAT or a flexible bandwidth RAT. For example, a voice centric UEs could use GSM as a preferred RAT. Low/medium data rate centric UEs could use a flexible bandwidth UMTS as a preferred RAT. A high data rate centric UE could use UMTS or HSPA as preferred RAT. These are merely examples, and other normal and/or flexible bandwidth RATs may be utilized.

Some embodiments include idle on normal RAT, such as GSM or UMTS. For CS call, for example, GSM or UMTS could be used. With ongoing CS call, if there is PS call, GPRS could be used (for DTM UEs) or UMTS could be used. For PS call, PS connection can be transferred to a flexible bandwidth UTRAN (different mechanisms covered in UE mobility to flexible bandwidth UTRAN). After PS call is transferred, if there is CS call, fallback to GSM or UMTS could occur.

Some embodiments include idle on a flexible bandwidth RAN, such as a flexible bandwidth UTRAN. When the UE receives a CS call, the UE may fallback to GSM or UMTS network for example. With ongoing CS call on the flexible bandwidth UTRAN, if a PS call is received, GPRS could be used (for DTM UEs), for example. For PS call received while the UE is on the flexible bandwidth UTRAN, the UE may take the call on the flexible bandwidth UTRAN. After a PS call, if CS call is received while the UE is on the flexible bandwidth UTRAN, the UE may fallback to GSM, for example. Other RATs could be utilized in some embodiments.

Some embodiments include transitioning from GSM to flexible bandwidth UMTS. For example, flexible bandwidth UMTS and GSM cells may be served by the same core network but different RAN networks. Combined GPRS and IMSI Attach may be performed by the UE on the GSM network. The UE may be camping or operating in connected mode on a GSM cell. For CS calls, UE may stay in GERAN. With ongoing CS call, if there is a MO/MT PS call (DTM UE, for example) UE may stay in GERAN. For PS calls (no ongoing CS call, for example), if requested rate can be served by GPRS/EDGE, UE may stay in GERAN. PS calls (no ongoing CS call, for example), if requested rate cannot be served by GRPS/EDGE, the UE may be handed over to flexible bandwidth UTRAN. If afterwards, there is MO/MT CS call, UE may fallback to GSM. In some cases, a UE may be on GSM, GPRS, and/or EDGE for data and a higher rate of data may be requested.

Figure 18A:
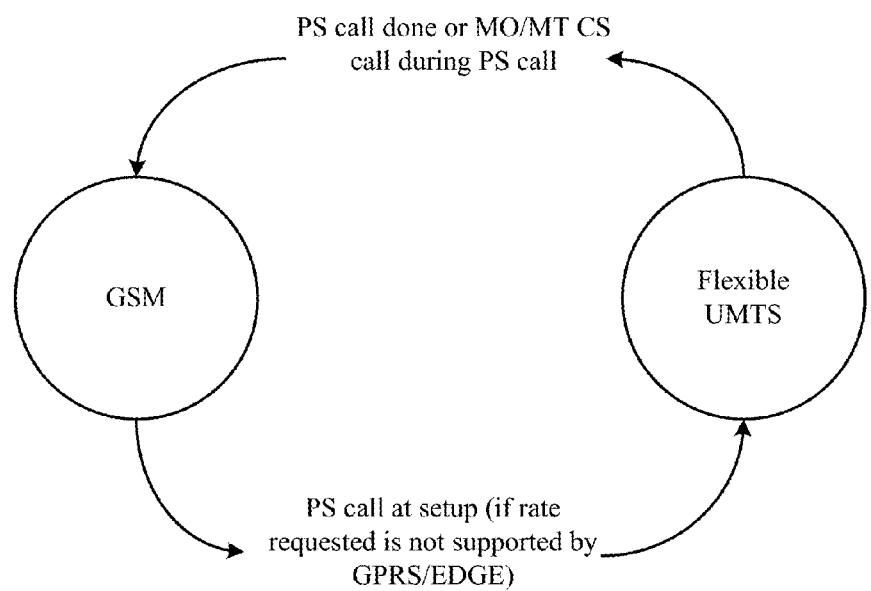
FIG. 18A shows a communications system in accordance with various embodiments.
Figure 18B:
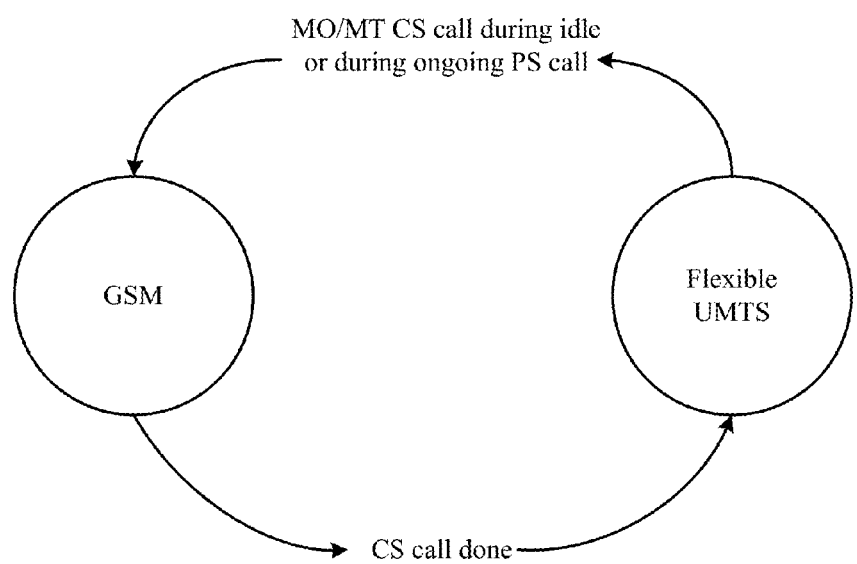
FIG. 18B shows a communications system in accordance with various embodiments.
Figure 18C:
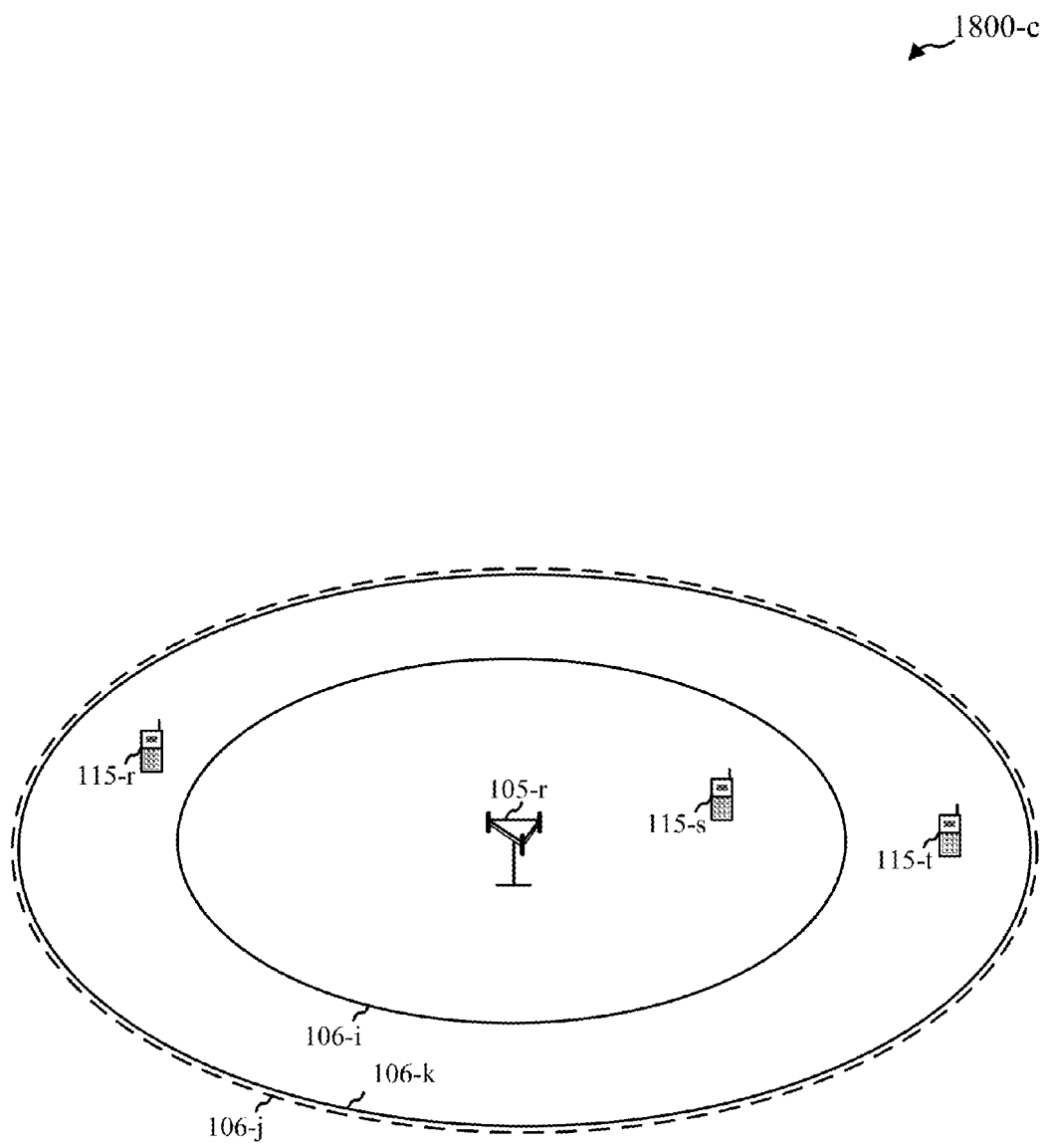
FIG. 18C shows a communications system in accordance with various embodiments.

Turning to FIG. 18A, a communications system 1800-a in accordance with various embodiments is shown for a voice central UE is shown as described above. FIG. 18B shows a communications system 1800-b in accordance with various embodiments for a data centric UE as described above. Some embodiments may include determining a preferred radio access technology for a user equipment to camp on based on whether the user equipment is voice centric or data centric. FIG. 18C shows an example of a communications system 1800-c that may utilize voice centric UEs (e.g., 115-r) and data centric UEs (e.g., 115-s, 115-t). System 1800-c may include one or more co-locate base stations 105-r that may support multiple RATs, for example, GSM 900 (with range 106-k), flexible bandwidth UMTS 900 (with range 106-j), and/or UMTS 2100 (with range 106-i).

Figure 19A:
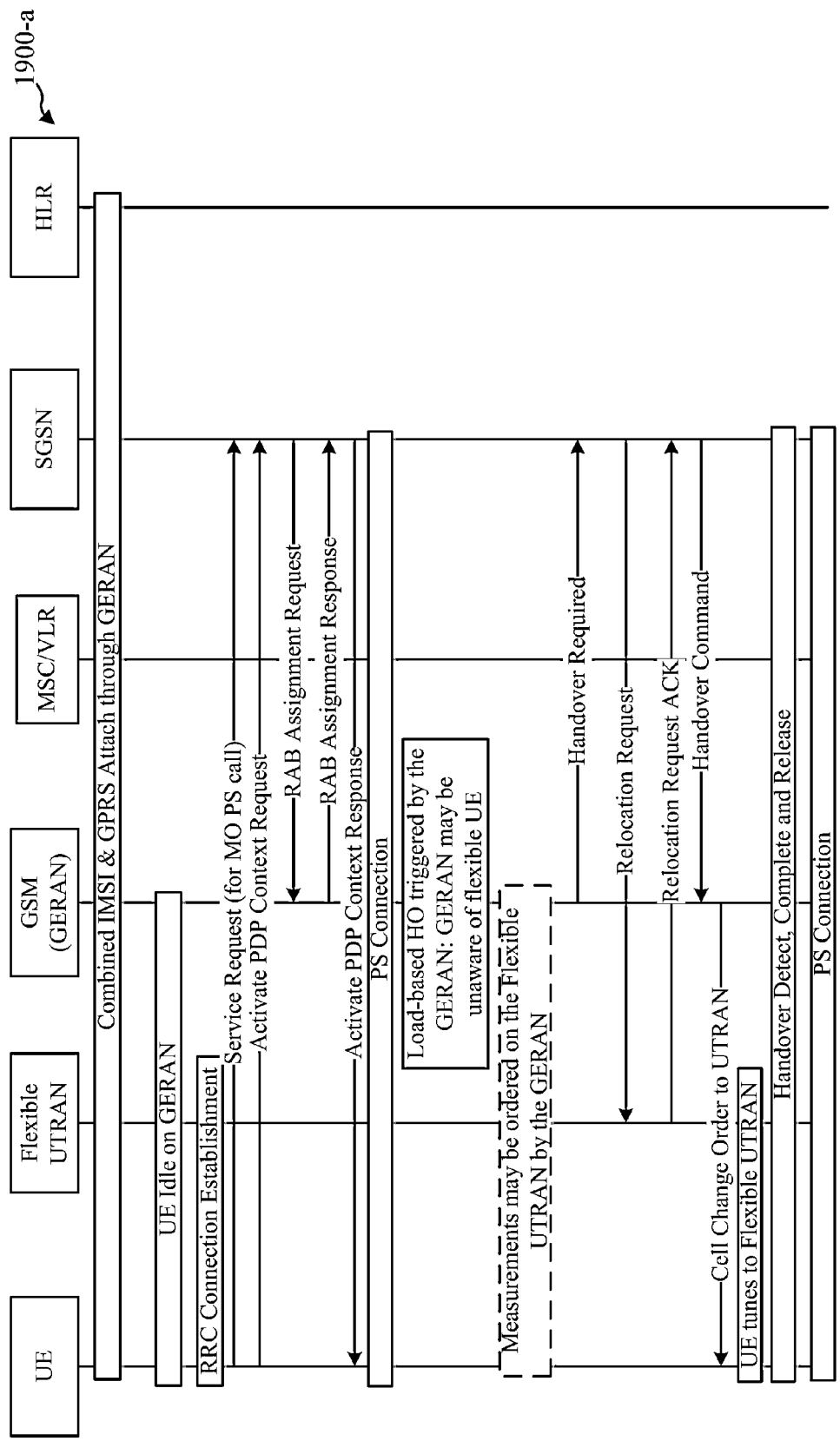
FIG. 19A shows a call flow in accordance with various embodiments.
Figure 19B:
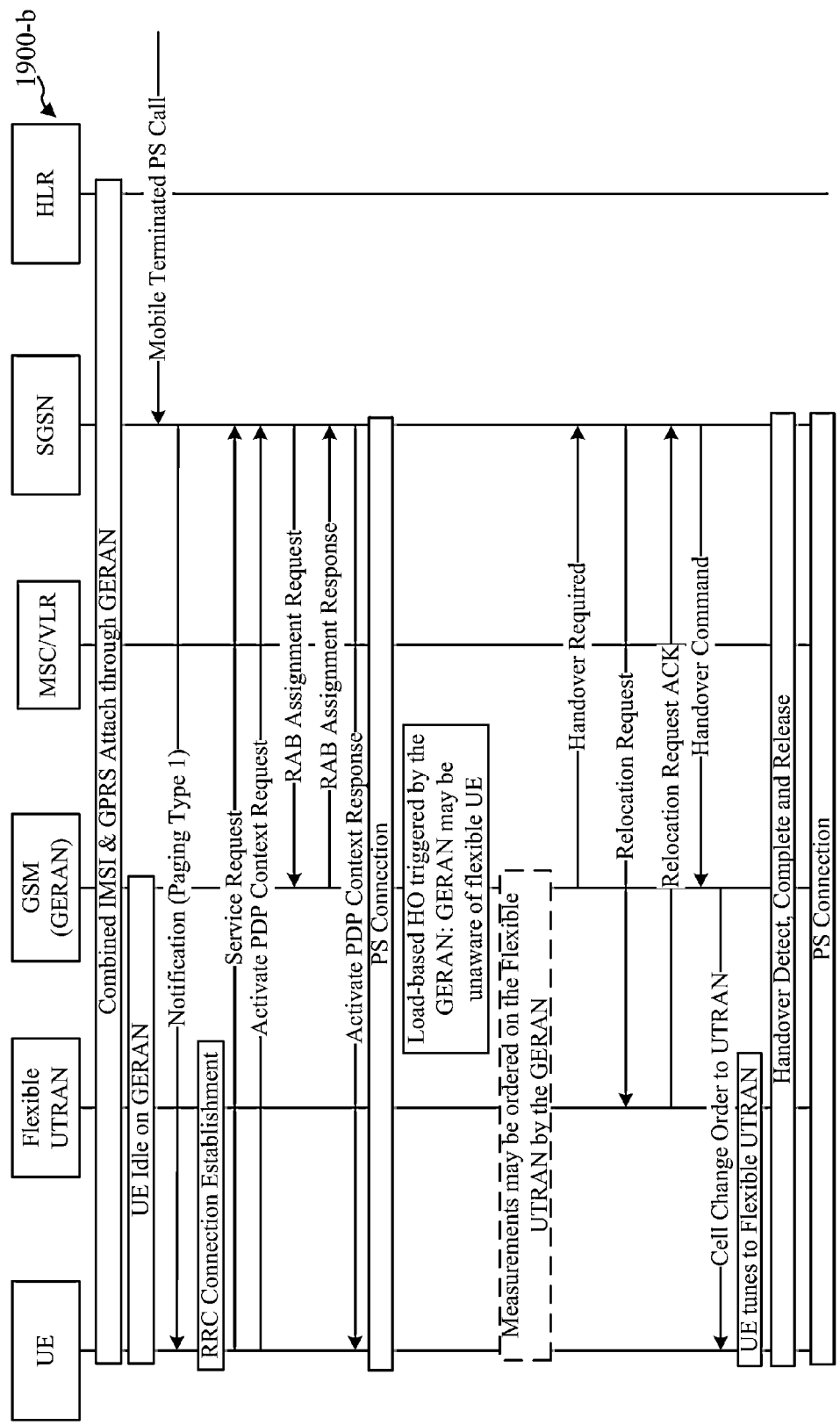
FIG. 19B shows a call flow in accordance with various embodiments.

Some embodiments include a load-based handover from a normal bandwidth system to a flexible bandwidth system. FIG. 19A shows a call flow 1900-a for a GERAN to flexible bandwidth UTRAN load-based HO with MO PS in accordance with various embodiments. FIG. 19B shows a call flow 1900-b for a GERAN to flexible bandwidth UTRAN load-based HO with MT PS in accordance with various embodiments. For example, a load-based handover may be utilized to transition or spring forward from GSM to a flexible bandwidth UMTS. A UE may camps on the GSM network and may initiate a MO or may receive a MT PS call (with bit rate that can be supported on the flexible bandwidth network but not on GERAN, for example). The UE may send a service request and may set-up a PDP context for the call. GSM network may accept the calls and may assign appropriate RAB resources to support the PS call and may establish a PS connection with the UE. GERAN may decide that the QoS can be served by flexible bandwidth UMTS cell so RAN may initiate a relocation to a flexible bandwidth UTRAN target cell by triggering a load-based handover, for example. The flexible bandwidth UMTS target cell may be determined from a database at the RAN containing a list of geographically overlapping or neighboring UMTS and flexible bandwidth UMTS cells, for example. GERAN may request that the UE perform inter-RAT measurements on the target flexible bandwidth UMTS cell before issuing a Cell Change Order command to UE. In some embodiments, this may be done if UE may not be known to support flexible bandwidth UTRAN. If UE detects flexible bandwidth UMTS target cell and may report suitable signal strength to GERAN, GERAN may send a Cell Change order to UTRAN command to the UE. In case measurements are not issued, GERAN may blindly send a Cell Change Order command to the UE to tune to the target. This may be done if UE is known to support flexible bandwidth UTRAN, for example. In some embodiments, the UE identifies the target cell before being handed over, which may avoid call drops especially for non-flexible bandwidth and/or normal UEs.

Figure 20A:
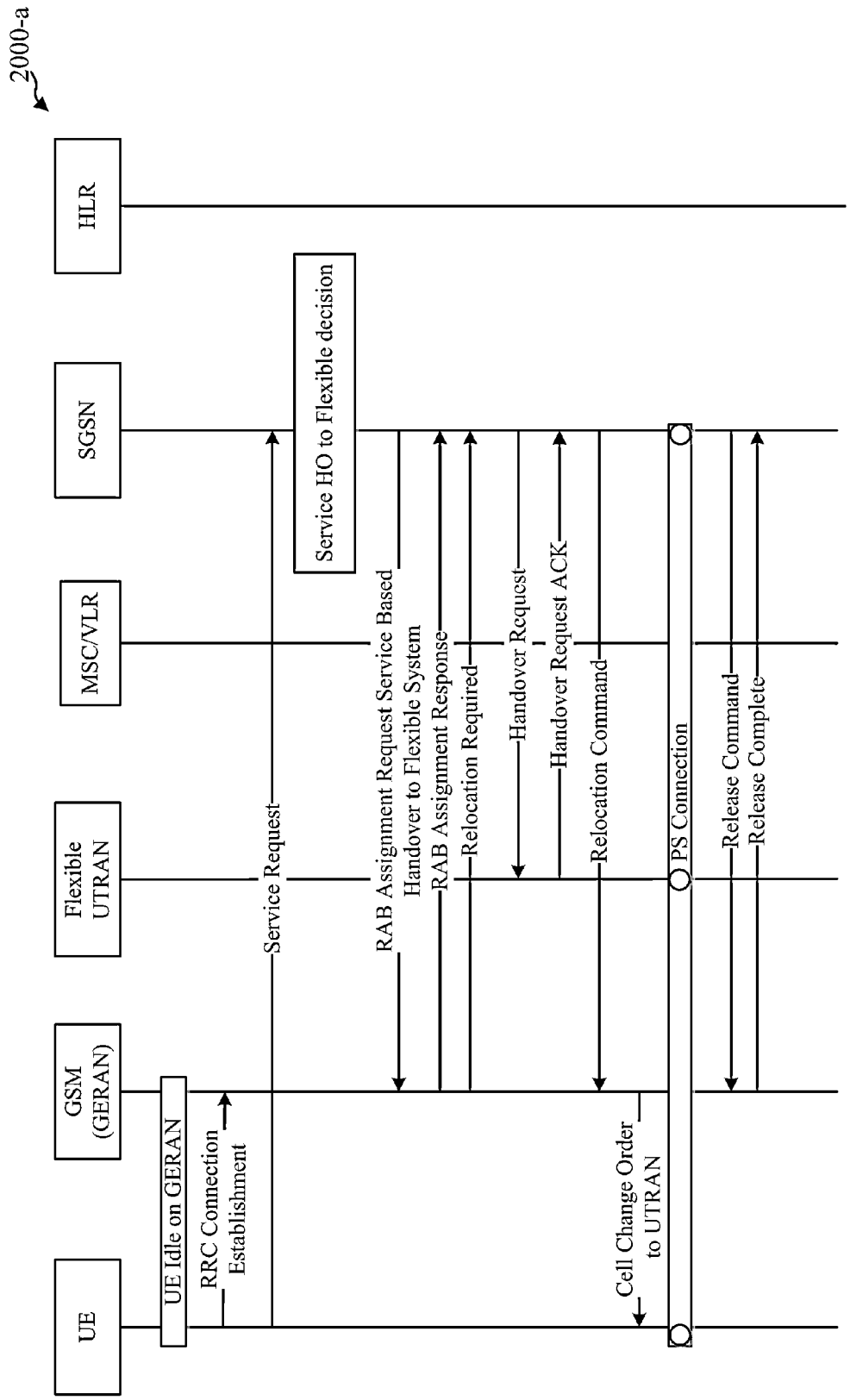
FIG. 20A shows a call flow in accordance with various embodiments.
Figure 20B:
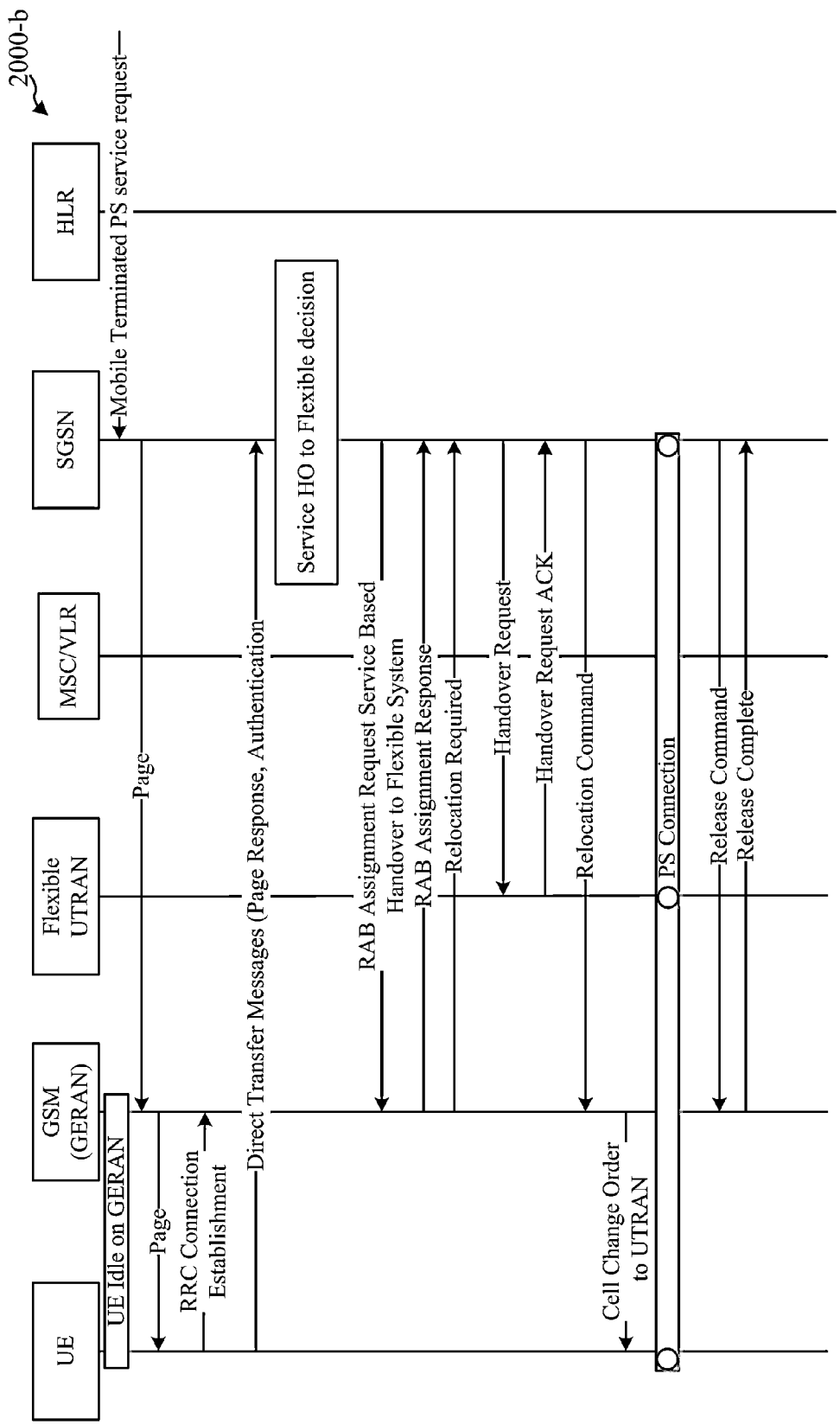
FIG. 20B shows a call flow in accordance with various embodiments.

Some embodiments include a service-based handover from a normal bandwidth system to a flexible bandwidth system. FIG. 20A shows a call flow 2000-*a* for GERAN to flexible bandwidth UTRAN with service-based handover for MO PS in accordance with various embodiments. FIG. 20B shows a call flow 2000-*a* for GERAN to flexible bandwidth UTRAN with service-based handover for MT PS in accordance with various embodiments. For example, a service-based handover may be utilized to transition or spring forward from GSM to a flexible bandwidth UMTS. For example, a redirect of a flexible bandwidth capable UE from GSM to flexible bandwidth UTRAN may occur when a PS call is attempted by the UE. Service-based HO procedure may be utilized and the UE may be notified of the handover with the Cell Change Order message. The Cell Change Order (CCO) message may be sent from the GERAN to the UE regarding the flexible bandwidth UTRAN cell maybe sent after the UE takes measurement on the flexible bandwidth UTRAN cell or blindly by the GERAN. The GERAN might or might not know if UE is flexible before ordering the measurements or sending the CCO. SGSN, if aware of the UE capability, may selectively perform SBHO for flexible bandwidth capable UEs based on UEIDs such as IMEI. Note that in some embodiments, service-based HO may include the SGSN notifying the BSC to perform a HO to flexible bandwidth UTRAN.

Some embodiments may utilize blind searches and/or UE measurements. For example, cell mapping information may be available at RAN from the knowledge of collocated flexible bandwidth and GSM/UMTS cells. UE capability information may be built up over time by RAN—from previous UE measurements reported to RAN, for example. Subsequently, when a UE may be known to be flexible bandwidth compatible, blind HO may be done (for example, the CCO is sent to the UE without the network requesting UE measurements on the flexible bandwidth UTRAN). Some embodiments include mobile-assisted (UE measurements-based) handover whereby, for example, compressed mode gaps (measurement gaps) may be scheduled for inter-frequency measurements to find a suitable target cell. This may be utilized when a UE may not be known to support flexible bandwidth. Some embodiments utilize database and/or network assisted handover, for example, which may include no measurements performed on other frequencies; rather cell mapping information may be stored in data base is used to identify the target cell. This approach may be done when UE may already be known to support flexible bandwidth.

Figure 21:
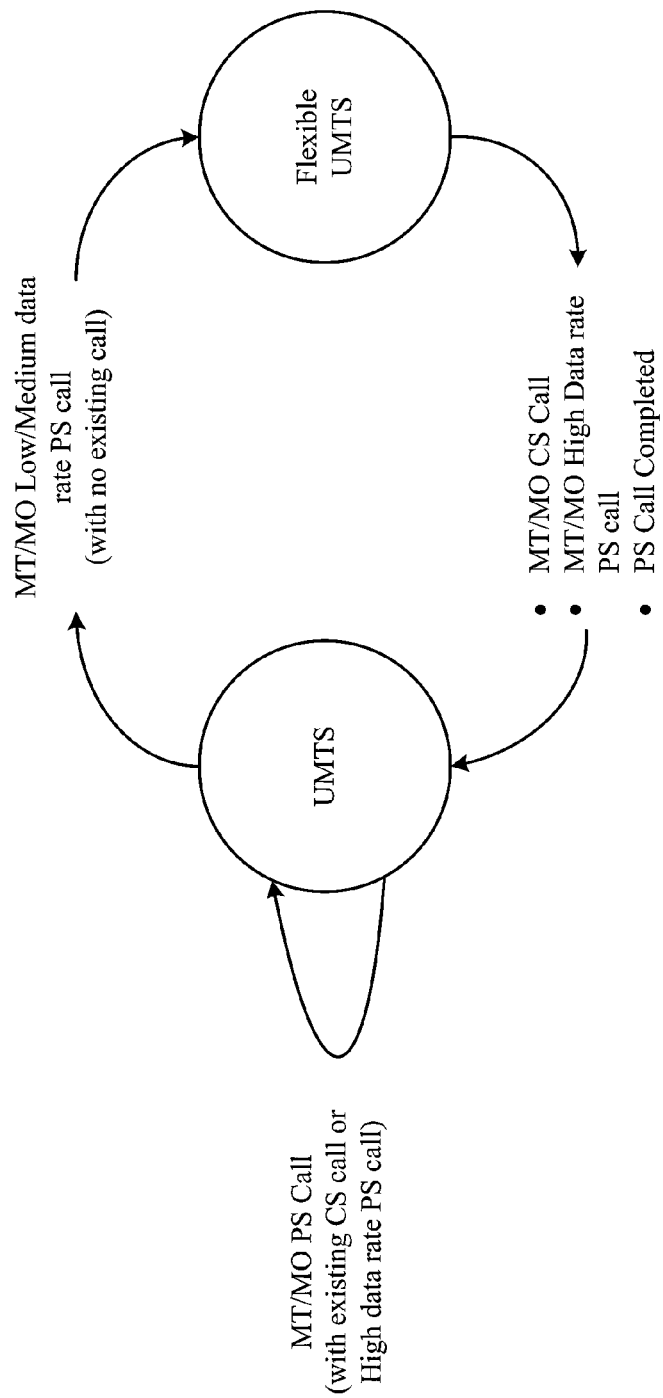
FIG. 21 shows a communications system in accordance with various embodiments.

Some embodiments may include transitioning or spring forward from UMTS to flexible bandwidth UMTS. For example, in some scenarios flexible bandwidth UMTS and UMTS cells may be served by the same core network but different RAN networks. Combined GPRS and IMSI Attach may be performed by the UE on the UMTS network/UTRAN when the UE registers on the UMTS cell after which the UE may camp or operate in connected mode on the cell. FIG. 21 shows a communications system 2100 with UMTS to flexible bandwidth UMTS transition in accordance with various embodiments. The UE may be assumed to be configured to select UMTS cells for idle mode camping if available. FIG. 22 includes a table 2200 showing different UMTS to flexible bandwidth UMTS handover scenarios in accordance with various embodiments. For example, HO may be triggered by the establishment of an MT, MO or an existing PS call with QoS demands that can be supported by the flexible bandwidth UMTS network. If the UE is in an existing CS call, calls may not be handed over to the flexible bandwidth UMTS RAN in some cases. In some embodiment, the flexible bandwidth UMTS network may also support CS so the UE can also be handed over to flexible bandwidth RAN in those cases.

Figure 23A:
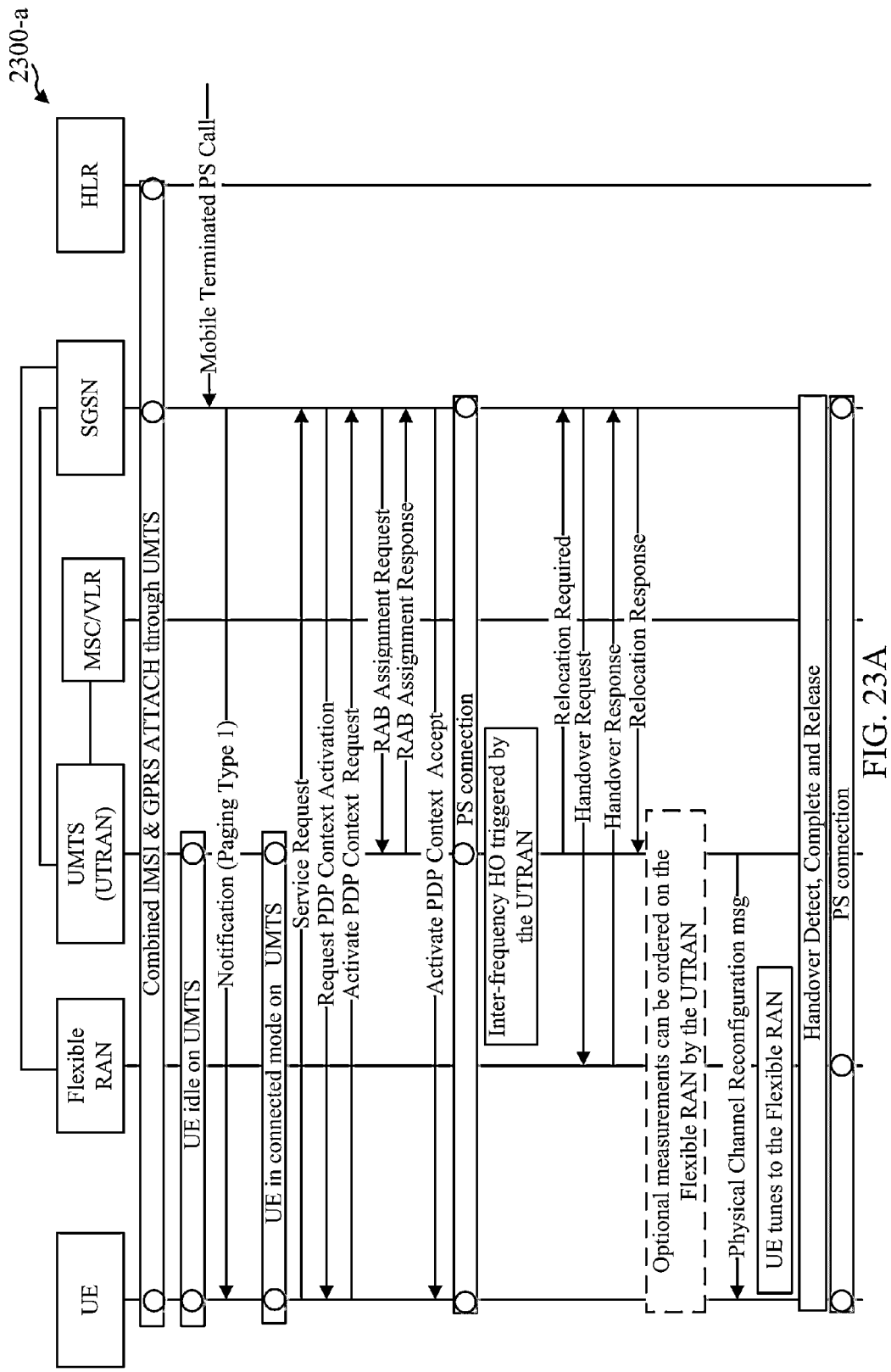
FIG. 23A shows a call flow in accordance with various embodiments.
Figure 23B:
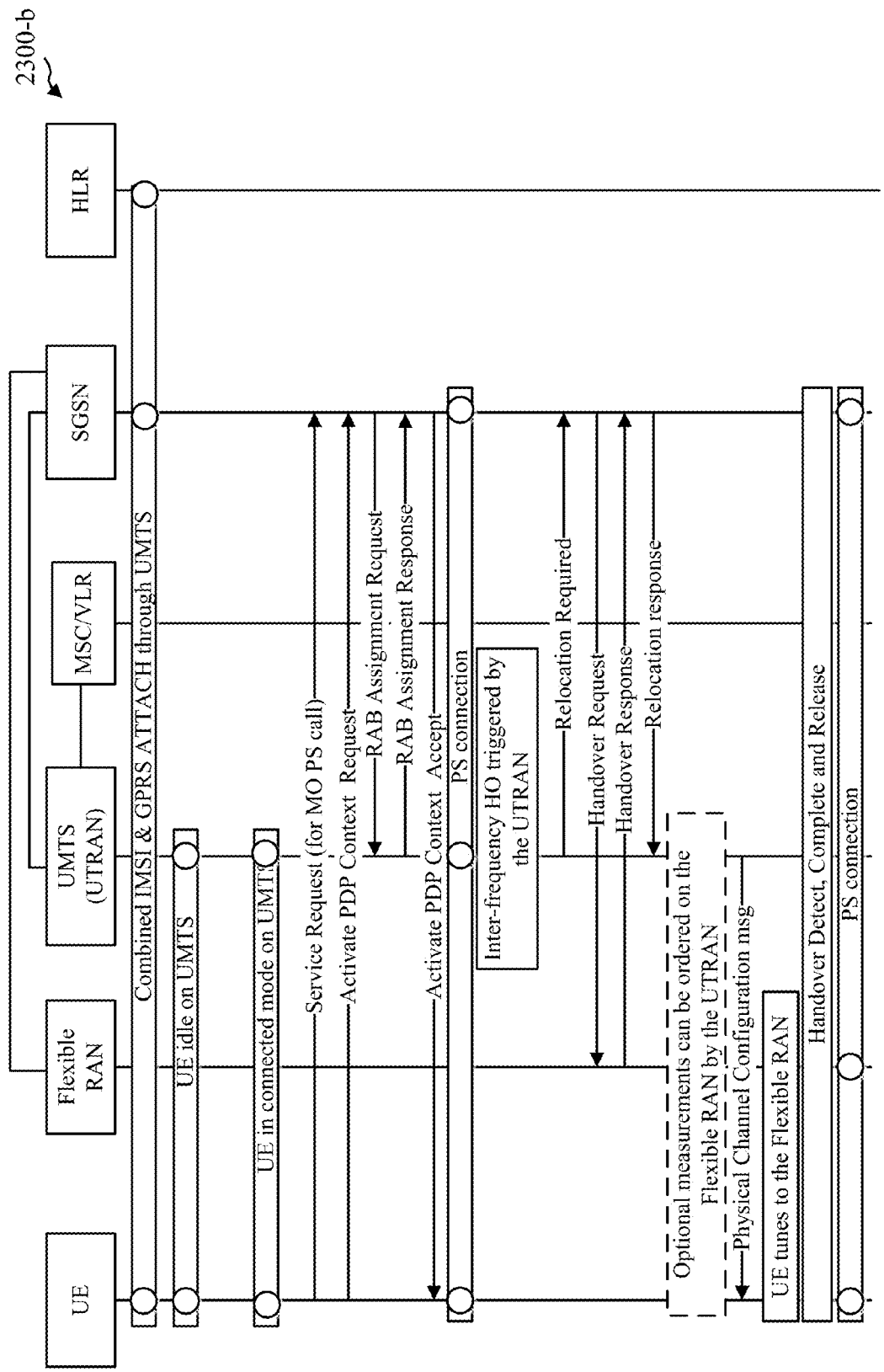
FIG. 23B shows a call flow in accordance with various embodiments.

Some embodiments include an inter-frequency handover (IFHO) from a normal bandwidth system to a flexible bandwidth system. FIG. 23A shows a call flow 2300-*a* for MT PS Call with single RAB IFHO in accordance with various embodiments. In some embodiments, if existing PDP context exists while the UE is in idle, then PDP context activation may not be used as shown in call flow 2300-*a*. FIG. 23B shows a call flow 2300-*b* for MO PS Call with single RAB IFHO in accordance with various embodiments. In some embodiments, if existing PDP context exists while the UE is in idle, then PDP context activation may not be used as shown in call flow 2300-*b*. For example, a UE may camp on the UMTS network and may receive a MT PS call (with bit rate that can be supported on the flexible bandwidth network) or may decide to establish an MO PS call. In some embodiments, if existing PDP context exists while the UE is in idle, then PDP activation request may not be used sent by the UE. The UE may send a service request and may set-up a PDP context for the call. UMTS network may accept the calls and may assign appropriate RAB resources to support the PS call and may establish a PS connection with the UE. Using a RAN preference algorithm, the RAN may decide that the QoS can be served by flexible bandwidth UMTS cell so the RAN may initiate a relocation to a flexible bandwidth UMTS target cell. The flexible bandwidth UMTS target cell may be determined from a database at the RAN containing a list of geographically overlapping or neighboring UMTS and flexible bandwidth UMTS cells. In some embodiments, the RAN can request that the UE perform inter-frequency measurements on the target cell before issuing a handover to UE. If UE finds the target cell and reports favorable signal strength to the UMTS RAN, then, the UMTS RAN may send a "physical channel reconfiguration" message to the UE. In case measurements are not issued (e.g., blind HO), the UMTS may blindly send a "physical channel reconfiguration" message to the UE to tune to the target cell. In some embodiments, the UE identifies the target cell before being handed over to avoid call drops especially for non-flexible bandwidth or normal UMTS UEs.

Some embodiments may include an inter-frequency single RAB handover that may be similar to the load-based handover with some differences. For example, the inter-frequency HO may be triggered based on the measured signal strength of the UE. Once the measured signal strength may be past a threshold, the UE may signal the event to the UMTS RAN (UTRAN) and the relocation required command may be issued by the RAN to the SGSN. The HO procedure may proceed similar to the load-based handover. The difference between the IFHO and the load-based handover may be that only the UEs (flexible bandwidth UMTS UEs, for example) that can identify the flexible bandwidth UMTS's cell may be triggered to be handed over to the target cell.

Figure 24A:
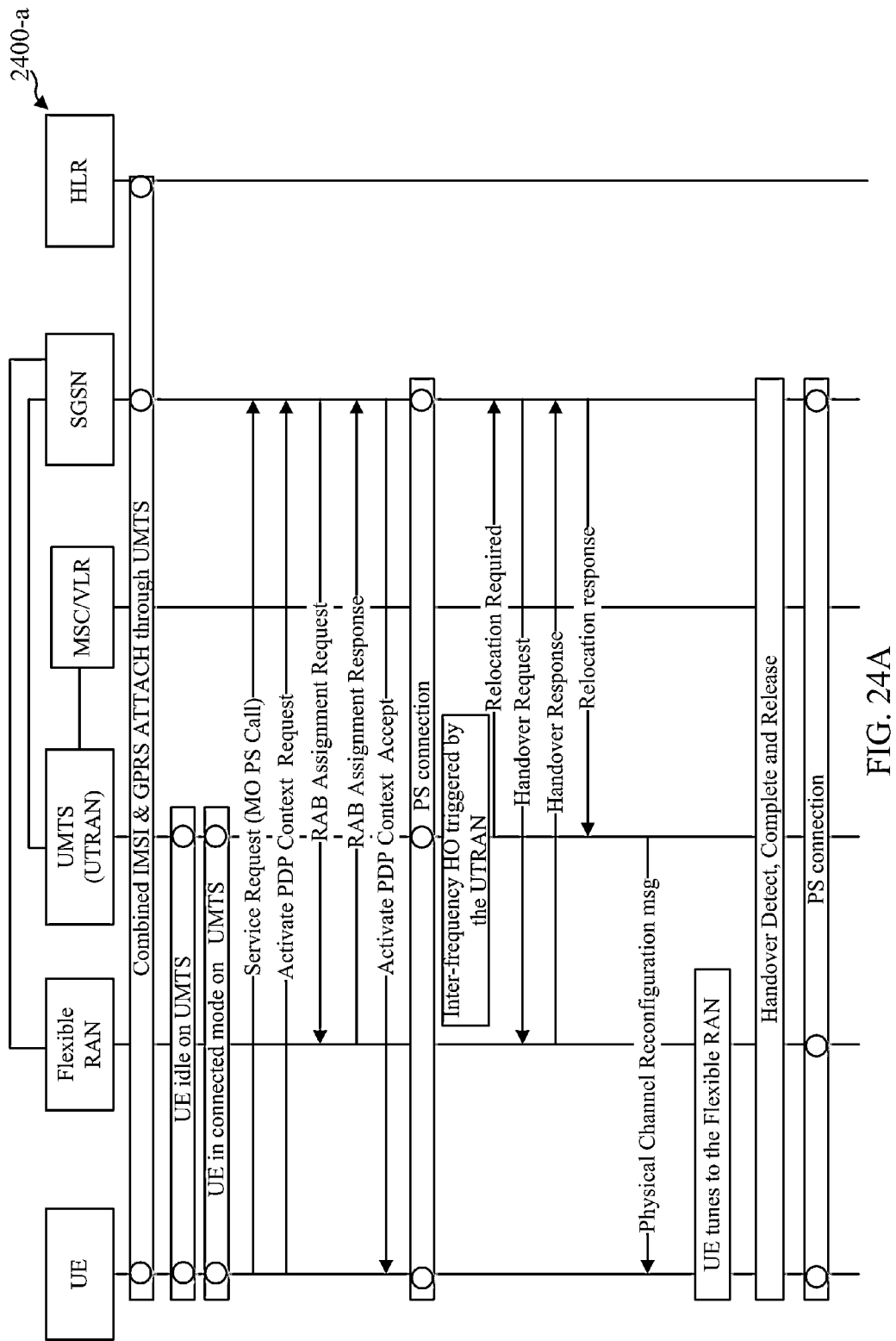
FIG. 24A shows a call flow in accordance with various embodiments.
Figure 24B:
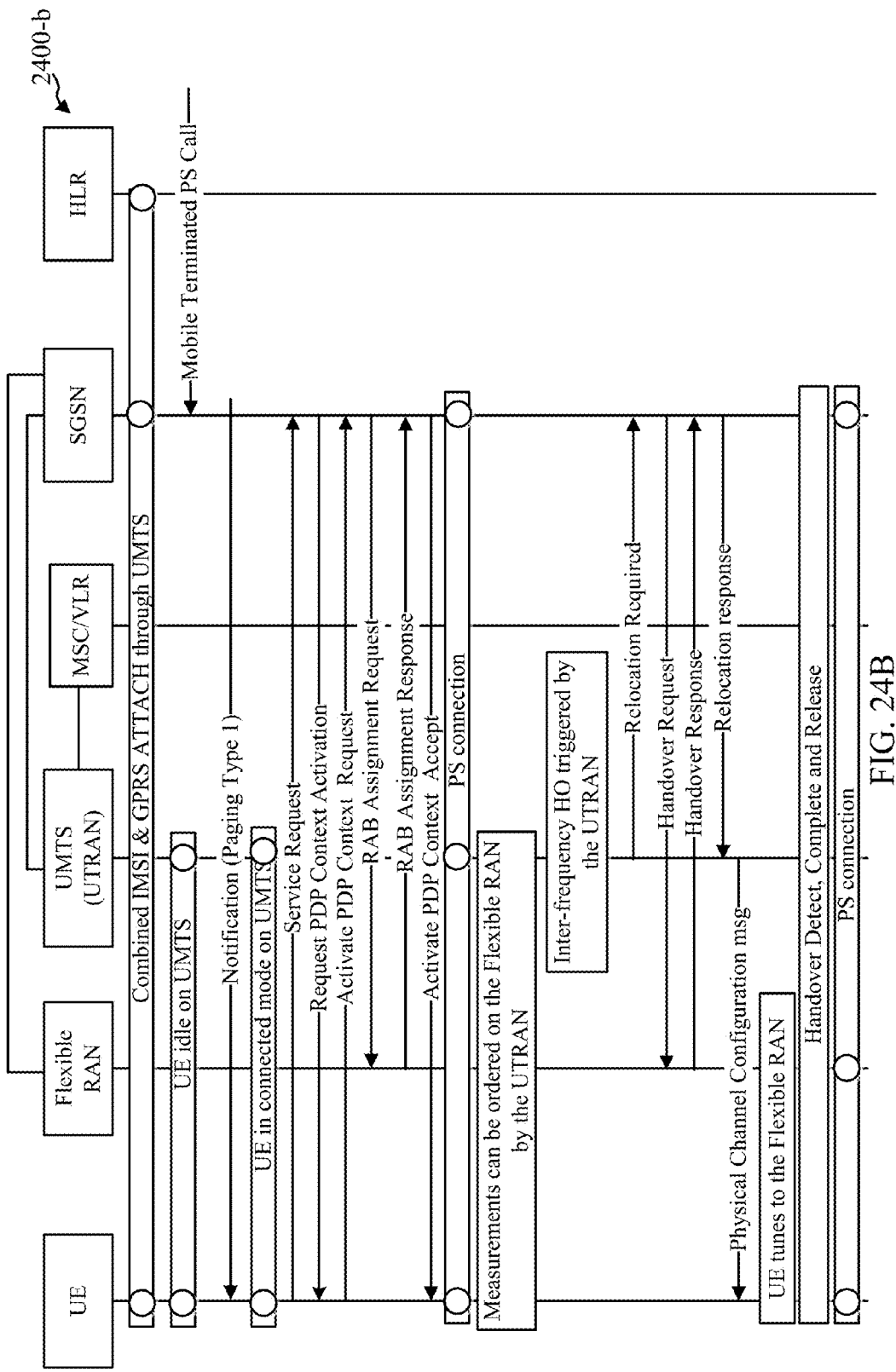
FIG. 24B shows a call flow in accordance with various embodiments.
Figure 24C:
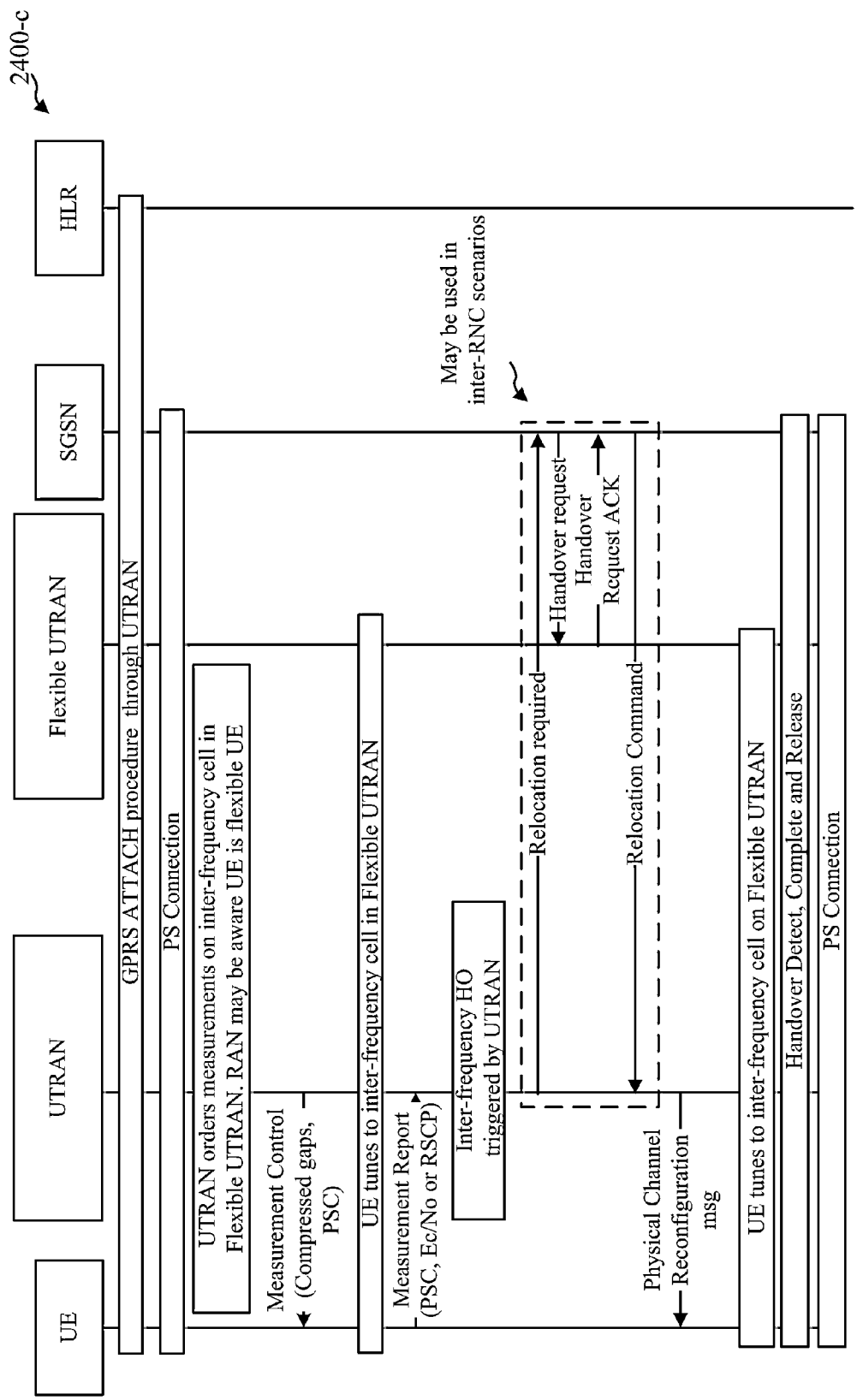
FIG. 24C shows a call flow in accordance with various embodiments.
Figure 24D:
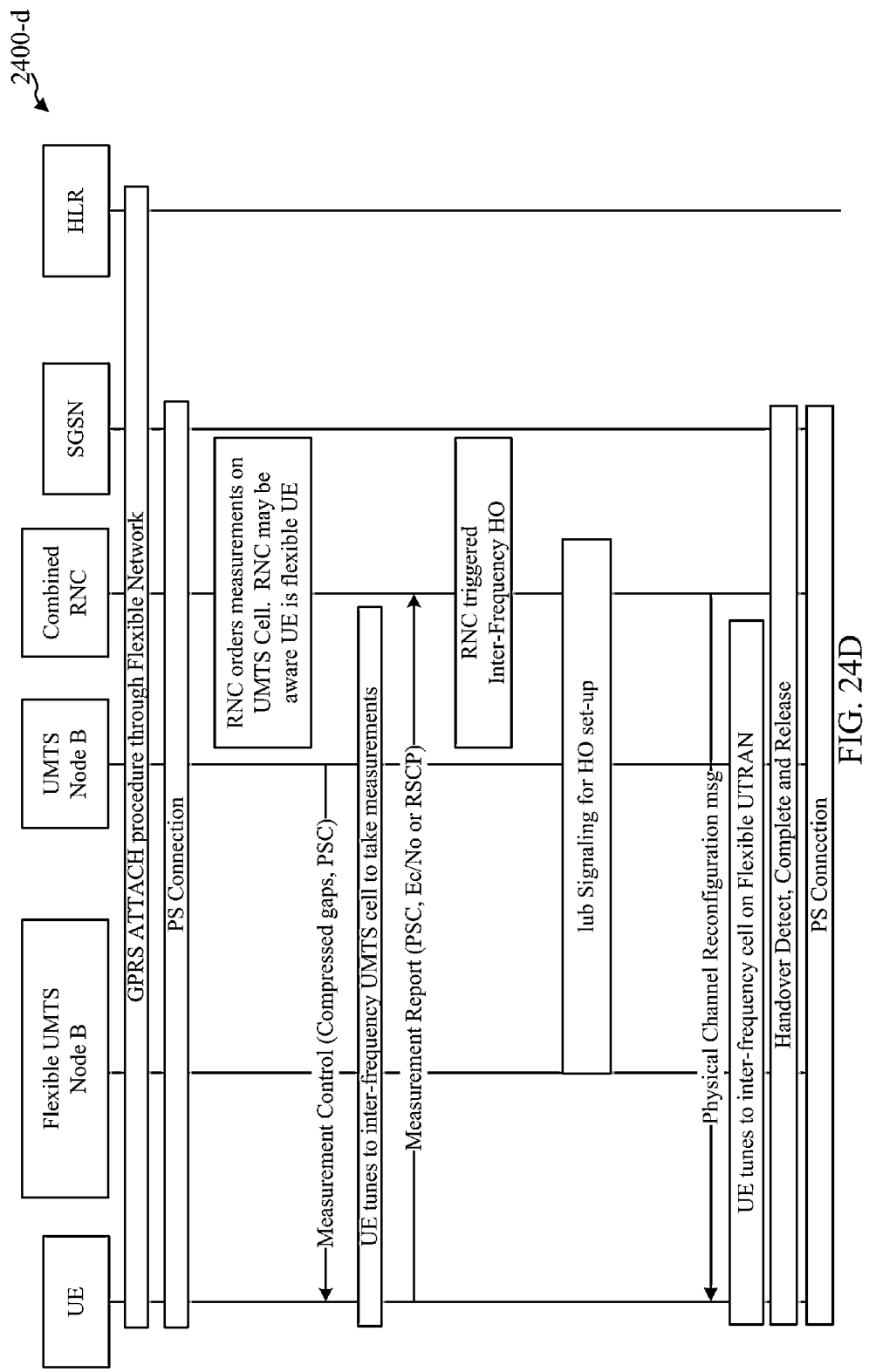
FIG. 24D shows a call flow in accordance with various embodiments.

FIG. 24A shows a call flow 2400-*a* for MO PS Call scenario involving a single RAB IFHO in accordance with various embodiments. In this figure, the UE may not be ordered to take cell measurements of the target flexible bandwidth cell before the handover command is sent in the Physical Channel Reconfiguration message. FIG. 24B shows a call flow 2400-*b* for MT PSCall scenario involving a single RAB IFHO in accordance with various embodiments. In this figure, the UE may not be ordered to take cell measurements of the target flexible bandwidth cell before the handover command is sent in the Physical Channel Reconfiguration message. FIG. 24C shows a call flow 2400-*c* for single RAB IFHO triggered by UE measurements in inter-RNC scenarios in accordance with various embodiments. In this figure, similar to FIGS. 24A-24B, the UMTS network/UTRAN and flexible bandwidth UTRAN operate on separate RAN. This may illustrate an example of an inter-RNC HO. FIG. 24D shows a call flow 2400-d for single RAB IFHO triggered by UE measurements in intra-RNC scenarios in accordance with various embodiments. In this figure, the flexible bandwidth RAN and the WCDMA/UMTS RAN may share the same Radio network controller (RNC) but not the same base station. Therefore, after the UE measurements may be used to trigger the IFHO, Iub signalling is exchanged between the UMTS Node B and flexible bandwidth UMTS Node B via the RNC to facilitate resource reservation for the UE on the flexible bandwidth UMTS Node B. Handover in intra-RNC scenarios are typically faster than those in inter-RNC scenarios.

Some embodiments may include multi-RAB scenarios. For example, in case of an existing PS call on the UMTS RAN, if another MT or MO PS call may be received by the network, another RAB might be set-up for such call. As for the single RAB scenario, if flexible bandwidth UMTS cells may support the combined multiple RAB service, a load-based handover or an inter-frequency handover may be issued.

Figure 25:
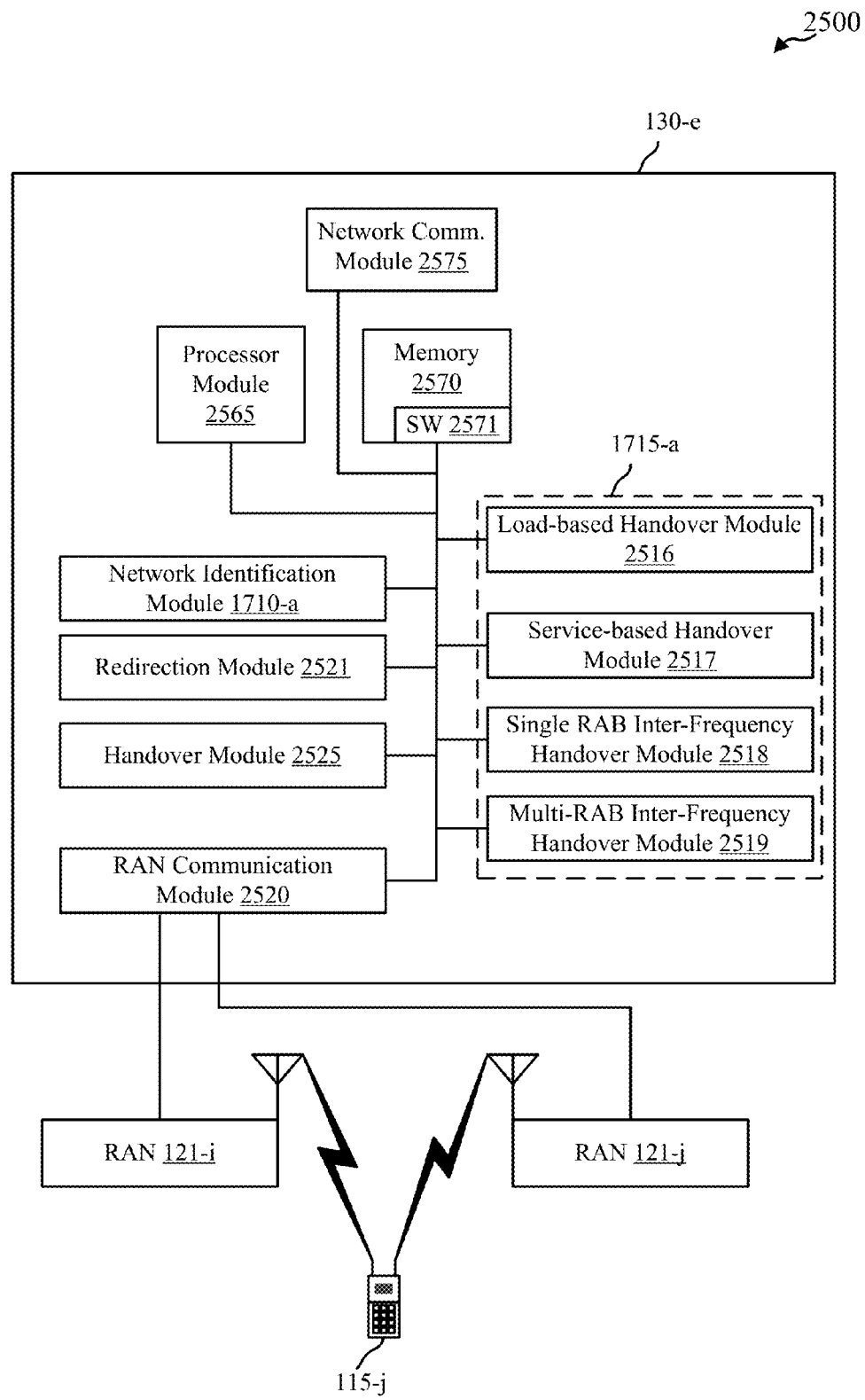
FIG. 25 shows a block diagram of a communications system configured for providing mobility for wireless communications systems in accordance with various embodiments.

FIG. 25 shows a block diagram of a communications system 2500 that may be configured for utilizing mobility for wireless communications systems in accordance with various embodiments. This system 2500 may be an example of aspects of the system 100 depicted in FIG. 1, systems 200 of FIG. 2, systems 300 of FIG. 3, and/or system 4200 of FIG. 42. The core network 130-e may include memory 2570, and a processor module 2565, which each may be in communication, directly or indirectly, with each other (e.g., over one or more buses). In some cases, the core network 130-e may communicate with other aspects of the network communications module 2575. System 2500 may be configured to implement different aspects of the call flows and/or systems as shown in FIGS. 19-24 and/or associated descriptions.

Core network 130-e may also communicate with radio access networks 121-i/121-j 105. Radio access networks 121 may be co-located in some cases, or separated located. In some cases, radio access networks 121 may include flexible bandwidth capable radio access networks and/or normal radio access networks. Radio access networks 121 may be in wireless communication with user equipment 115-j, which may be flexible bandwidth capable. In some cases, core network 130-e may communicate with radio access networks 121 utilizing radio access network communication module 2520.

The memory 2570 may include random access memory (RAM) and read-only memory (ROM). The memory 2570 may also store computer-readable, computer-executable software code 2571 containing instructions that are configured to, when executed, cause the processor module 2565 to perform various functions described herein (e.g., call processing, database management, message routing, etc.). Alternatively, the software 2571 may not be directly executable by the processor module 2565 but be configured to cause the computer, e.g., when compiled and executed, to perform functions described herein.

The processor module 2565 may include an intelligent hardware device, e.g., a central processing unit (CPU) such as those made by Intel® Corporation or AMD®, a microcontroller, an application-specific integrated circuit (ASIC), etc. The processor module 2565 may include a speech encoder (not shown) configured to receive audio via a microphone, convert the audio into packets (e.g., 20 ms in length) representative of the received audio.

According to the architecture of FIG. 25, the core network 130-e may further include a radio access communications module 2520. The radio access communications module 2520 may manage communications other aspects of communication, such as communication with user equipment 115-j. By way of example, the radio access communications module 2520 may be a component of the core network 130-e in communication with some or all of the other components of the core network 130-e via a bus. Alternatively, functionality of the radio access communications module 2520 may be implemented as a computer program product, and/or as one or more controller elements of the processor module 2565 or network communications module 2375.

The components for core network 130-e may be configured to implement aspects discussed above with respect to device 1700 of FIG. 17 and may not be repeated here for the sake of brevity. The network identification module 1710-a may be an example of the network identification module 1710 of FIG. 17. The spring forward module 1715-a may be an example of the spring forward module 1715 of FIG. 17. The spring forward module 1715-a may include a load-based handover module 2516, a service-based handover module 2517, a single RAB inter-frequency handover module 2518, and/or multi-RAB inter-frequency handover module 2519. In some cases, the load-based handover module 2516 may be configured to perform single RAB load-based handover and/or multi-RAB load-based handover. In some cases, the service-based handover module 2517 may be configured to perform single RAB service-based handover and/or multi-RAB load-based handover.

The core network 130-e may also include a handover module 2525 in general that may be utilized to perform handover procedures of the user equipment 115-j from one radio access network 121 to another. For example, the handover module 2525 may perform a handover procedure of the user equipment 115-j from RAN 121-i to RAN 121-j. The core network 130-e may include a redirection module 2521 that may facilitate redirection from one bandwidth system to another.

Figure 26:
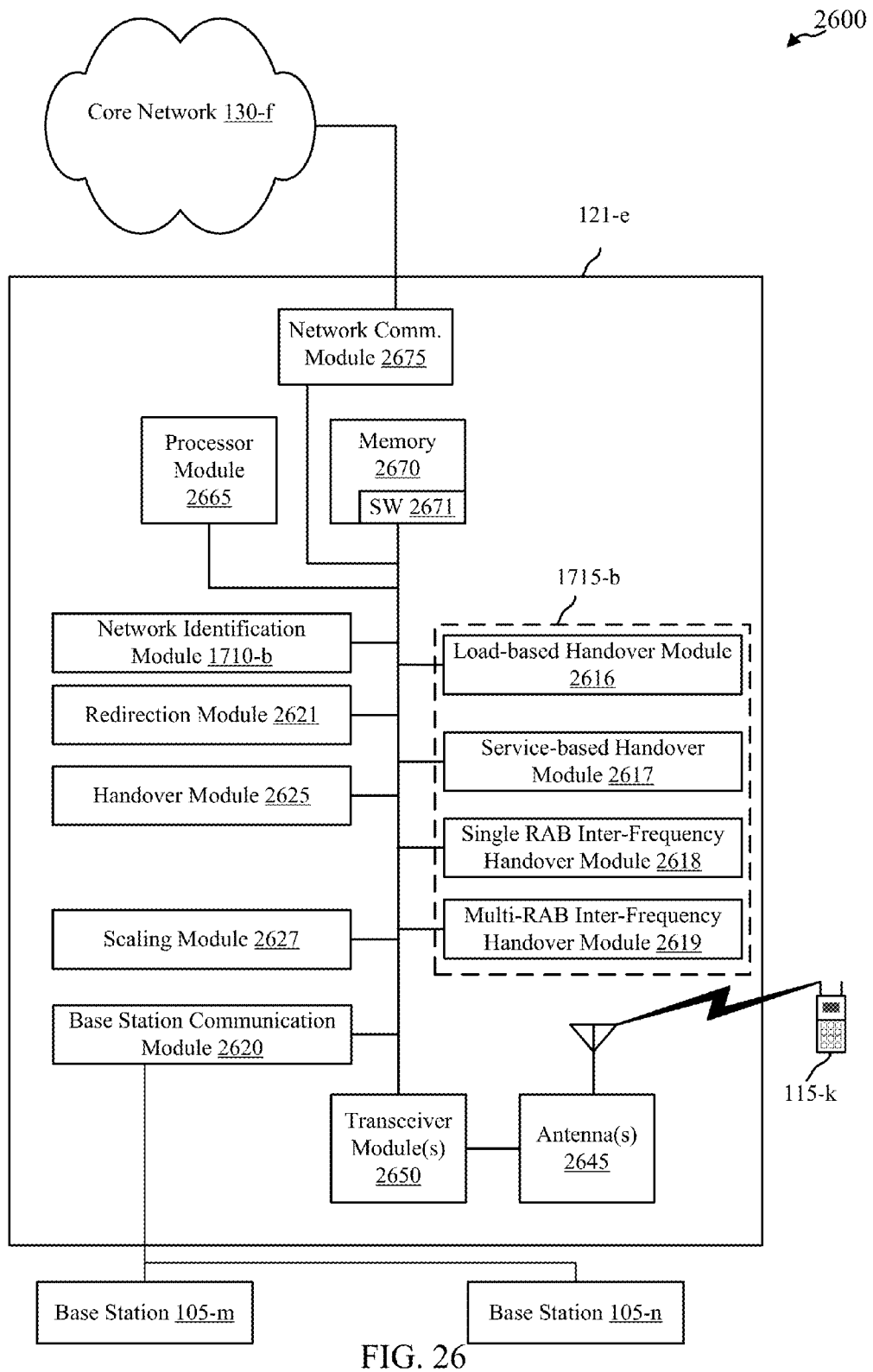
FIG. 26 shows a block diagram of a communications system configured for providing mobility for wireless communications systems in accordance with various embodiments.

FIG. 26 shows a block diagram of a communications system 2600 that may be configured for utilizing mobility for wireless communications systems in accordance with various embodiments. This system 2600 may be an example of aspects of the system 100 depicted in FIG. 1, systems 200 of FIG. 2, systems 300 of FIG. 3, and/or system 4200 of FIG. 42; and/or device 1700 of FIG. 17. The radio access network 121-e may include aspects of a base station 105 and/or a controller 120 to represent a combined system and/or separate components that may comprise part of a radio access network. The base station 105-e may include antennas 2645, a transceiver module 2650, memory 2670, and a processor module 2665, which each may be in communication, directly or indirectly, with each other (e.g., over one or more buses). The transceiver module 2650 may be configured to communicate bi-directionally, via the antennas 2645, with the user equipment 115-k, which may be a multi-mode user equipment. The transceiver module 2650 (and/or other components of the radio access network 121-e) may also be configured to communicate bi-directionally with one or more networks. In some cases, the radio access network 121-e may communicate with the core network 130-f through network communications module 2675. Radio access network 121-e may include an eNodeB base station, a Home eNodeB base station, a NodeB base station, and/or a Home NodeB base station. System 2600 may be configured to implement different aspects of the call flows and/or systems as shown in FIGS. 19-24 and/or associated descriptions.

Radio access network 121-*e* may also communicate with other base stations 105, such as base station 105-*m* and base station 105-*n*. Each of the base stations 105 may communicate with user equipment 115-*k* using different wireless communications technologies, such as different Radio Access Technologies. In some cases, radio access network 121-*e* may communicate with other base stations such as 105-*m* and/or 105-*n* utilizing base station communication module 2620. In some embodiments, base station communication module 2620 may provide an X2 interface within an LTE wireless communication technology to provide communication between some of the base stations 105. In some embodiments, radio access network 121-*e* may communicate with other base stations through network 130-*f*.

The memory 2670 may include random access memory (RAM) and read-only memory (ROM). The memory 2670 may also store computer-readable, computer-executable software code 2671 containing instructions that are configured to, when executed, cause the processor module 2665 to perform various functions described herein (e.g., call processing, database management, message routing, etc.). Alternatively, the software 2671 may not be directly executable by the processor module 2665 but be configured to cause the computer, e.g., when compiled and executed, to perform functions described herein.

The processor module 2665 may include an intelligent hardware device, e.g., a central processing unit (CPU) such as those made by Intel® Corporation or AMD®, a microcontroller, an application-specific integrated circuit (ASIC), etc. The processor module 2665 may include a speech encoder (not shown) configured to receive audio via a microphone, convert the audio into packets (e.g., 20 ms in length) representative of the received audio, provide the audio packets to the transceiver module 2650, and provide indications of whether a user is speaking. Alternatively, an encoder may only provide packets to the transceiver module 2650, with the provision or withholding/suppression of the packet itself providing the indication of whether a user is speaking.

The transceiver module 2650 may include a modem configured to modulate the packets and provide the modulated packets to the antennas 2645 for transmission, and to demodulate packets received from the antennas 2645. While some examples of the radio access network 121-*e* may include a single antenna 2645, the radio access network 121-*e* preferably includes multiple antennas 2645 for multiple links which may support carrier aggregation. For example, one or more links may be used to support macro communications with user equipment 115-*k*.

According to the architecture of FIG. 26, the radio access network 121-*e* may further include a base station communications module 2620. The base station communications module 2620 may manage communications with other base stations 105. By way of example, the base station communications module 2620 may be a component of the radio access network 121-*e* in communication with some or all of the other components of the radio access network 121-*e* via a bus. Alternatively, functionality of the base station communications module 2620 may be implemented as a component of the transceiver module 2650, as a computer program product, and/or as one or more controller elements of the processor module 2665.

The components for radio access network 121-*e* may be configured to implement aspects discussed above with respect to device 1700 of FIG. 17 and may not be repeated here for the sake of brevity. The network identification module 1710-*b* may be an example of the network identification module 1710 of FIG. 17. The spring forward module 1715-*b* may be an example of the spring forward module 1715 of FIG. 17. The spring forward module 1715-*b* may include a load-based handover module 2616, a service-based handover module 2617, a single RAB inter-frequency handover module 2618, and/or multi-RAB inter-frequency handover module 2619. In some cases, the load-based handover module 2616 may be configured to perform single RAB load-based handover and/or multi-RAB load-based handover. In some cases, the service-based handover module 2617 may be configured to perform single RAB service-based handover and/or multi-RAB load-based handover.

The radio access network 121-*e* may also include a handover module 2625 in general that may be utilized to perform handover procedures of the user equipment 115-*e* from radio access network 121-*e* to another like base station 105-*m*. The radio access network 121-*e* may include a redirection module 2621 that may facilitate redirection from one bandwidth system to another. A scaling module 2627 may be utilized to scale and/or alter chip rates to generate flexible bandwidth waveforms.

In some embodiments, the transceiver module 2650 in conjunction with antennas 2645, along with other possible components of radio access network 121-*e*, may transmit information regarding flexible bandwidth waveforms and/or scaling factors from the radio access network 121-*e* to the user equipment 115-*k*, to other base stations 105-*m*/105-*n*, or core network 130-*f*. In some embodiments, the transceiver module 2650 in conjunction with antennas 2645, along with other possible components of radio access network 121-*e*, may transmit information to the user equipment 115-*f*, to other base stations 105-*m*/105-*n*, or core network 130-*f*, such as flexible bandwidth waveforms and/or scaling factors, such that these devices or systems may utilize flexible bandwidth waveforms.

Figure 27:
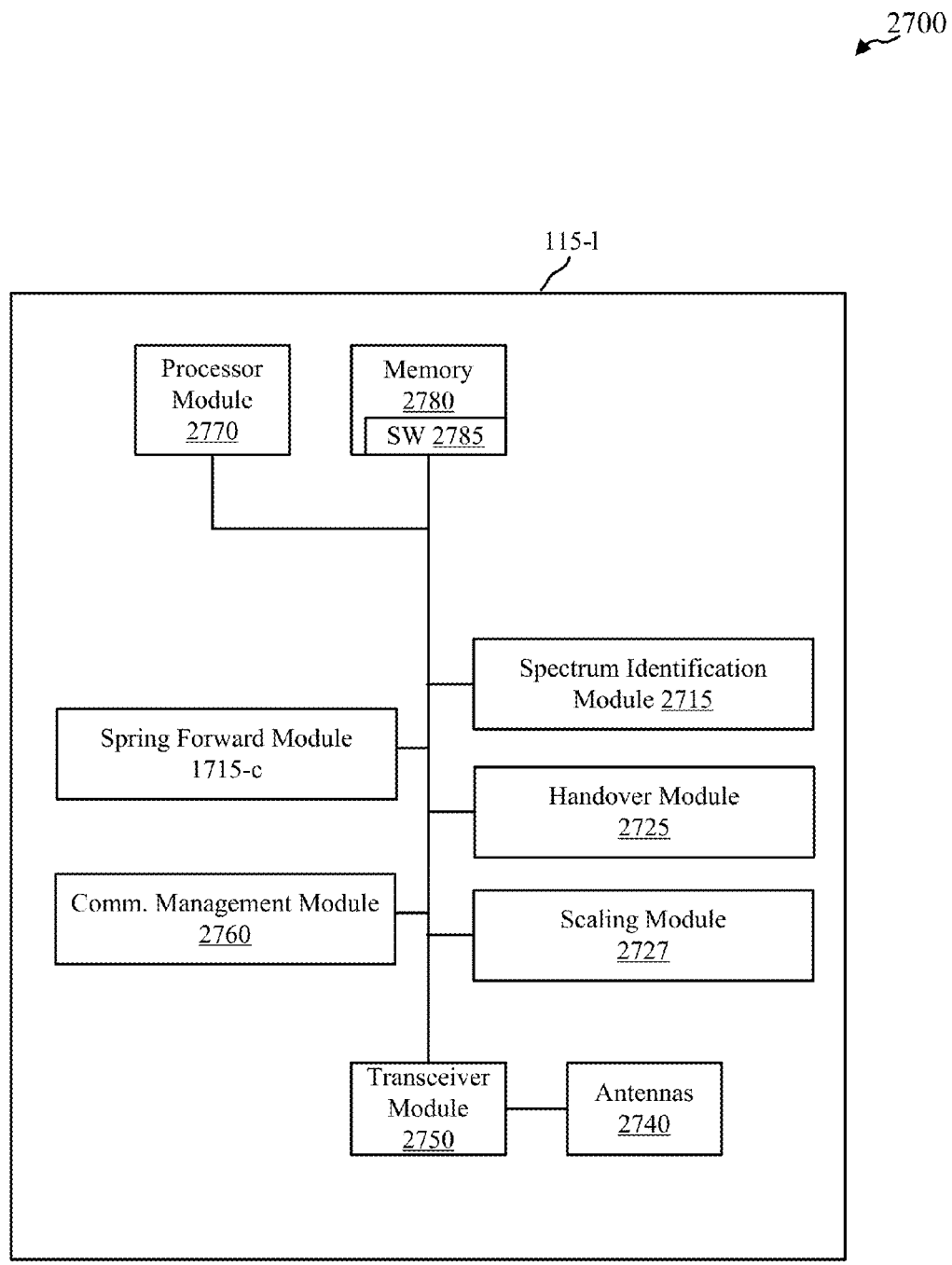
FIG. 27 shows a block diagram of a user equipment configured for mobility in accordance with various embodiments.

FIG. 27 is a block diagram 2700 of a user equipment 115-1 configured for mobility in accordance with various embodiments. The user equipment 115-1 may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-1 may have an internal power supply (not shown), such as a small battery, to facilitate mobile operation. In some embodiments, the user equipment 115-1 may be the user equipment 115 of FIG. 1, FIG. 2, FIG. 3, FIG. 23, FIG. 25, FIG. 26, and/or FIG. 42, and/or the device 1700 of FIG. 17. The user equipment 115-1 may be a multi-mode user equipment. The user equipment 115-1 may be referred to as a wireless communications device in some cases. User equipment 115-1 may be configured to implement different aspects of the call flows and/or systems as shown in FIGS. 19-24 and/or associated descriptions.

The user equipment 115-1 may include antennas 2740, a transceiver module 2750, memory 2780, and a processor module 2770, which each may be in communication, directly or indirectly, with each other (e.g., via one or more buses). The transceiver module 2750 is configured to communicate bi-directionally, via the antennas 2740 and/or one or more wired or wireless links, with one or more networks, as described above. For example, the transceiver module 2750 may be configured to communicate bi-directionally with base stations 105 of FIG. 1, FIG. 2, FIG. 3, and/or FIG. 26; and/or the radio access networks 121 of FIG. 3B, FIG. 25, and/or FIG. 26. The transceiver module 2750 may include a modem configured to modulate the packets and provide the modulated packets to the antennas 2740 for transmission, and to demodulate packets received from the antennas 2740. While the user equipment 115-1 may include a single antenna, the user equipment 115-1 will typically include multiple antennas 2740 for multiple links.

The memory 2780 may include random access memory (RAM) and read-only memory (ROM). The memory 2780 may store computer-readable, computer-executable software code 2785 containing instructions that are configured to, when executed, cause the processor module 2770 to perform various functions described herein (e.g., call processing, database management, message routing, etc.). Alternatively, the software 2785 may not be directly executable by the processor module 2770 but be configured to cause the computer (e.g., when compiled and executed) to perform functions described herein.

The processor module 2770 may include an intelligent hardware device, e.g., a central processing unit (CPU) such as those made by Intel® Corporation or AMD®, a microcontroller, an application-specific integrated circuit (ASIC), etc. The processor module 2770 may include a speech encoder (not shown) configured to receive audio via a microphone, convert the audio into packets (e.g., 20 ms in length) representative of the received audio, provide the audio packets to the transceiver module 2750, and provide indications of whether a user is speaking. Alternatively, an encoder may only provide packets to the transceiver module 2750, with the provision or withholding/suppression of the packet itself providing the indication of whether a user is speaking. The processor module 2770 may also include a speech decoder that may perform a reverse functionality as the speech encoder.

According to the architecture of FIG. 27, the user equipment 115-1 may further include a communications management module 2760. The communications management module 2760 may manage communications with other user equipment 115. By way of example, the communications management module 2760 may be a component of the user equipment 115-1 in communication with some or all of the other components of the user equipment 115-1 via a bus. Alternatively, functionality of the communications management module 2760 may be implemented as a component of the transceiver module 2750, as a computer program product, and/or as one or more controller elements of the processor module 2770.

The components for user equipment 115-1 may be configured to implement aspects discussed above with respect to device 1700 of FIG. 17 and may not be repeated here for the sake of brevity. The spring forward module 1715-c may be an example of the spring forward module 1715 of FIG. 17.

The user equipment 115-1 may also include a spectrum identification module 2715. The spectrum identification module 2715 may be utilized to identify spectrum available for flexible bandwidth waveforms. In some embodiments, a handover module 2725 may be utilized to perform handover procedures of the user equipment 115-1 from one base station to another. For example, the handover module 2725 may perform a handover procedure of the user equipment 115-1 from one base station to another where normal waveforms are utilized between the user equipment 115-1 and one of the base stations and flexible bandwidth waveforms are utilized between the user equipment and another base station. A scaling module 2727 may be utilized to scale and/or alter chip rates to generate/decode flexible bandwidth waveforms.

In some embodiments, the transceiver module 2750, in conjunction with antennas 2740, along with other possible components of user equipment 115-1, may transmit information regarding flexible bandwidth waveforms and/or scaling factors from the user equipment 115-1 to base stations or a core network. In some embodiments, the transceiver module 2750, in conjunction with antennas 2740, along with other possible components of user equipment 115-1, may transmit/receive information, such flexible bandwidth waveforms and/or scaling factors, to/from base stations or a core network such that these devices or systems may utilize flexible bandwidth waveforms.

Figure 28A:
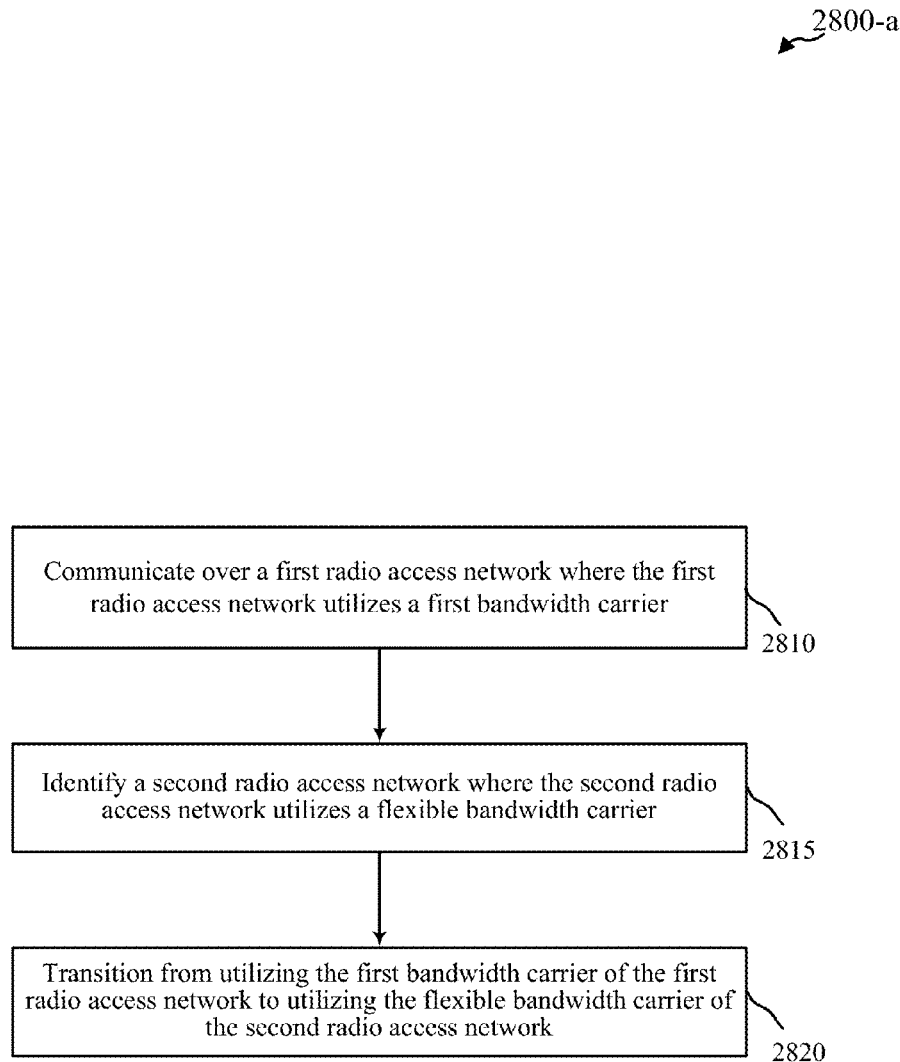
FIG. 28A shows a flow diagram of a method for providing mobility within wireless communications systems in accordance with various embodiments.

Turning to FIG. 28A, a flow diagram of a method 2800-a for providing mobility within wireless communications systems in accordance with various embodiments. Method 2800-a may be implemented utilizing various wireless communications devices and/or systems including, but not limited to: the core networks 130 of FIG. 1, FIG. 3B, FIG. 25, and/or FIG. 26; the radio access networks 121 of FIG. 3B, FIG. 25, and/or FIG. 26; the user equipment 115 of FIG. 1, FIG. 2, FIG. 3, FIG. 25, FIG. 26, FIG. 27, and/or FIG. 42; and/or device 1700 of FIG. 17. Method 2800-b may implement different aspects of the call flows and/or systems as shown in FIGS. 19-24 and/or associated descriptions.

Block 2810 may include communicating over first radio access network, wherein the first radio access network utilizes a first bandwidth carrier. Block 2815 may include identifying a second radio access network, wherein the second radio access network utilizes a first flexible bandwidth carrier. Block 2820 may include transitioning from utilizing the first bandwidth carrier of the first radio access network to utilizing the first flexible bandwidth carrier of the second radio access network.

Transitioning from utilizing the first bandwidth carrier of the first radio access network to utilizing the first flexible bandwidth carrier of the second radio access network may be directed at least in part by a core network. Transitioning from utilizing the first bandwidth carrier of the first radio access network to utilizing the first flexible bandwidth carrier of the second radio access network may be directed at least in part by at least one of the radio access networks. The first bandwidth carrier may include a normal bandwidth carrier or a second flexible bandwidth carrier different from the first flexible bandwidth carrier. The first radio access network and the second radio access network may be shared or may be different.

Transitioning from utilizing the first bandwidth carrier of the first radio access network to utilizing the first flexible bandwidth carrier of the second radio access network may relate to packet-switched services for a user equipment. Transitioning from utilizing the first bandwidth carrier of the first radio access network to utilizing the first flexible bandwidth carrier of the second radio access network may include utilizing a load-based handover. Transitioning from utilizing the first bandwidth carrier of the first radio access network to utilizing the first flexible bandwidth carrier of the second radio access network may include utilizing a service-based handover. Transitioning from utilizing the first bandwidth carrier of the first radio access network to utilizing the first flexible bandwidth carrier of the second radio access network may include utilizing a blind search. Transitioning from utilizing the first bandwidth carrier of the first radio access network to utilizing the first flexible bandwidth carrier of the second radio access network may include utilizing a user equipment measurement. Transitioning from utilizing the first bandwidth carrier of the first radio access network to utilizing the first flexible bandwidth carrier of the second radio access network may include utilizing a single RAB inter-frequency handover. Transitioning from utilizing the first bandwidth carrier of the first radio access network to utilizing the first flexible bandwidth carrier of the second radio access network may include utilizing a multi-RAB inter-frequency handover. Some embodiments may include utilizing at least a multi-RAB load-based handover or a multi-RAB service based handover as part of at least transitioning from utilizing the first bandwidth carrier of the first radio access network to utilizing the first flexible bandwidth carrier of the second radio access network or identifying the second radio access network. These techniques may also include utilizing at least a blind search or a user equipment measurement as part of at least transitioning from utilizing the first bandwidth carrier of the first radio access network to utilizing the first flexible bandwidth carrier of the second radio access network or identifying the second radio access network.

In some embodiments, the identification step may perform aspects of the transitioning steps. Some embodiments may include determining a preferred radio access technology for a user equipment to camp on based on whether the user equipment is voice centric or data centric.

Figure 28B:
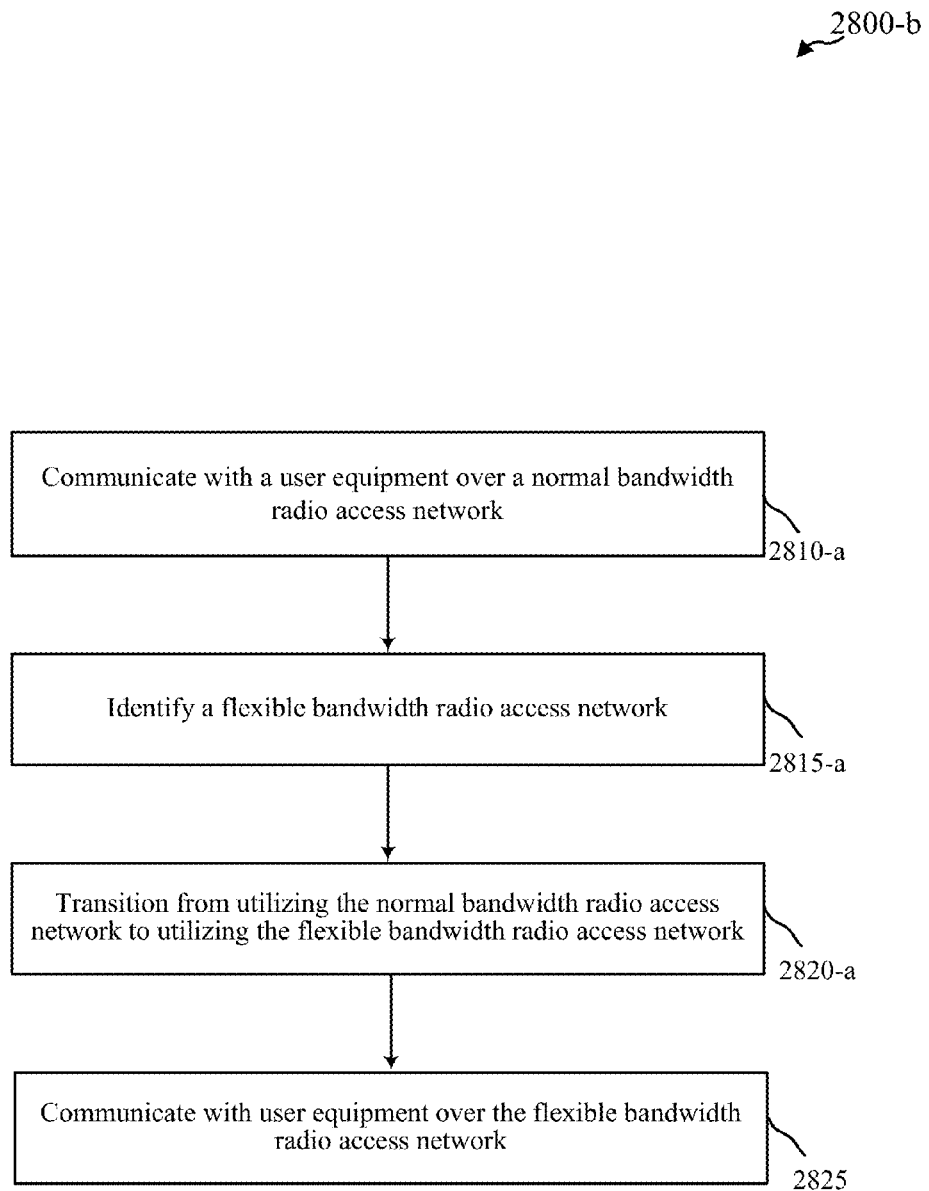
FIG. 28B shows a flow diagram of a method for providing mobility within wireless communications systems in accordance with various embodiments.

Turning to FIG. 28B, a flow diagram of a method 2800-*b* for providing mobility within wireless communications systems in accordance with various embodiments. Method 2800-*b* may be implemented utilizing various wireless communications devices and/or systems including, but not limited to: the core networks 130 of FIG. 1, FIG. 3B, FIG. 25, and/or FIG. 26; the radio access networks 121 of FIG. 3B, FIG. 25, and/or FIG. 26; the user equipment 115 of FIG. 1, FIG. 2, FIG. 3, FIG. 25, FIG. 26, FIG. 27, and/or FIG. 42; and/or device 1700 of FIG. 17. Method 2800-*b* may implement different aspects of the call flows and/or systems as shown in FIGS. 19-24 and/or associated descriptions. In some embodiments, method 2800-*b* may include aspects of method 2800-*a* of FIG. 28A.

Block 2810-*a* may include communicating with a user equipment over a normal bandwidth radio access network. Block 2815-*a* may include identifying a flexible bandwidth radio access network. Block 2820-*a* may include transitioning from utilizing the normal bandwidth radio access network to utilizing the flexible bandwidth radio access network. At block 2525, communication may be established with the user equipment over the flexible bandwidth radio access network.

Figure 28C:
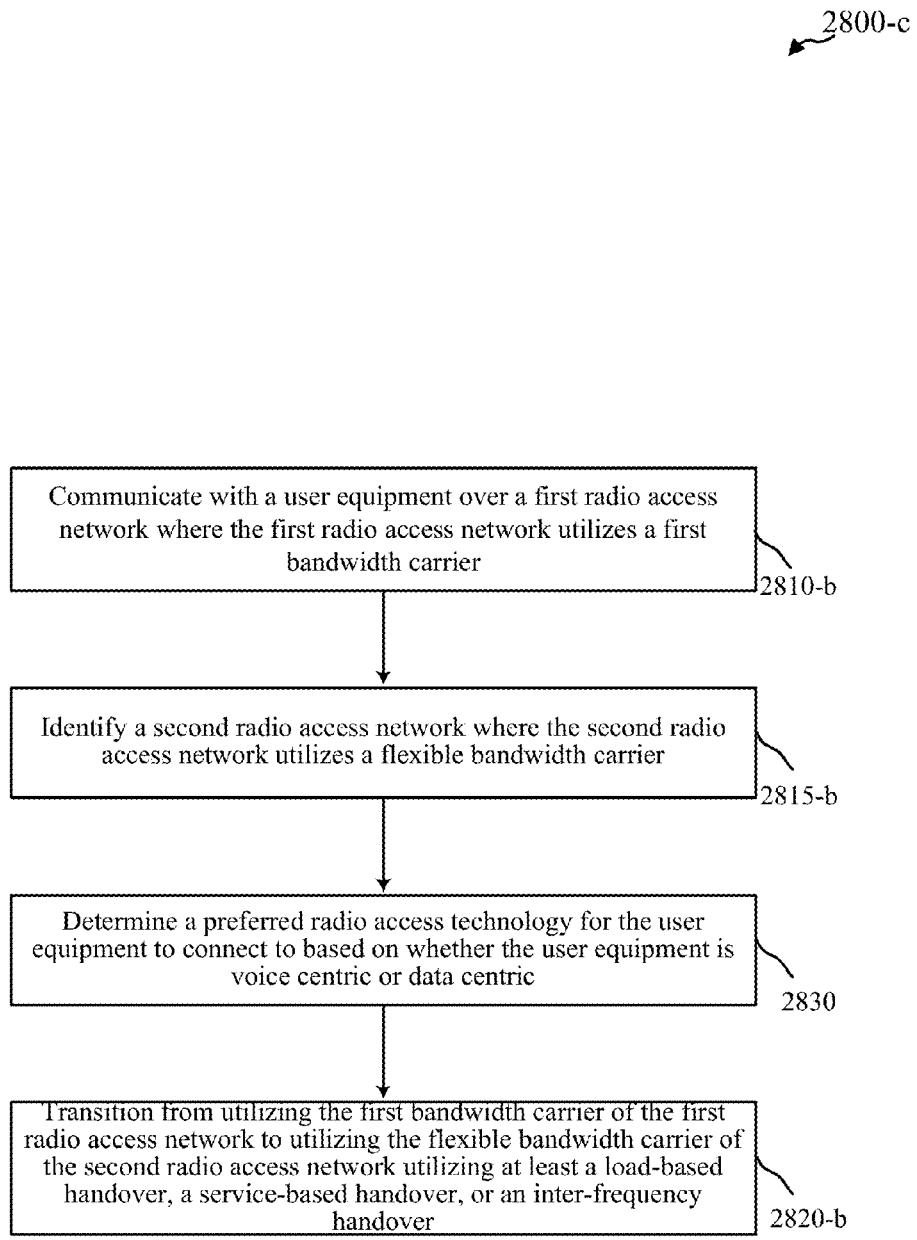
FIG. 28C shows a flow diagram of a method for providing mobility within wireless communications systems in accordance with various embodiments.

Turning to FIG. 28C, a flow diagram of a method 2800-*c* for providing mobility within wireless communications systems in accordance with various embodiments. Method 2800-*c* may be implemented utilizing various wireless communications devices and/or systems including, but not limited to: the core networks 130 of FIG. 1, FIG. 3B, FIG. 25, and/or FIG. 26; the radio access networks 121 of FIG. 3B, FIG. 25, and/or FIG. 26; the user equipment 115 of FIG. 1, FIG. 2, FIG. 3, FIG. 25, FIG. 26, FIG. 27, and/or FIG. 42; and/or device 1700 of FIG. 17. Method 2800-*b* may implement different aspects of the call flows and/or systems as shown in FIGS. 19-24 and/or associated descriptions. In some embodiments, method 2800-*c* may include aspects of method 2800-*a* of FIG. 28A, and/or method 2800-*b* of FIG. 28B.

Block 2810-*b* may include communicating with a user equipment over first radio access network. The first radio access network may utilize a first bandwidth carrier. Block 2815-*b* may include identifying a second radio access network. The second radio access network may utilize a first flexible bandwidth carrier. At block 2830, a preferred radio access technology may be determined for the user equipment to connect to based on whether the user equipment is voice centric or data centric. Block 2820-*b* may include transitioning from utilizing the first bandwidth carrier of the first radio access network to utilizing the first flexible bandwidth carrier of the second radio access network utilizing at least a load-based handover, an inter-frequency handover, or a service-based handover.

Methods, systems, and devices for facilitating mobility between flexible bandwidth systems and normal bandwidth systems and/or other flexible bandwidth systems are provided. These methods, systems, and devices may utilize device 2900 of FIG. 29, system 3800 of FIG. 38, system 3900 of FIG. 39, user equipment 115 of FIG. 4000, method 4100-*a* of FIG. 41A, and/or method 4100-*b* of FIG. 41B, for example. Some examples provide for transitioning or fallback from flexible bandwidth systems to non-flexible bandwidth systems that has no support for some or all CS services (e.g., CS voice), transitioning to other flexible bandwidth systems, and/or systems that natively support requested circuit-switched (CS) services (e.g., CS voice services) including: transitioning from a first radio access network to second radio access network, where the first radio access network includes a flexible bandwidth radio access network and the second radio access network includes a normal bandwidth radio access network or another flexible bandwidth system. In one example, a method for facilitating mobility for wireless communications systems may include: communicating over first radio access network, where the first radio access network utilizes a first flexible bandwidth carrier; identifying a second radio access network, where the second radio access network utilizes a second bandwidth carrier; and transitioning from utilizing the flexible bandwidth carrier of the first radio access network to utilizing the second bandwidth carrier of the second radio access network. This transition may happen between different radio access technologies (RATs) (e.g., from flexible bandwidth UTRAN to GERAN) or between the same RATs (e.g., from flexible bandwidth UTRAN to UTRAN). The UE, network, network elements, or standard may treat the flexible bandwidth carrier as either the same RAT or different RAT or some combination thereof. The second bandwidth carrier may include a normal bandwidth carrier or another flexible bandwidth carrier different from the first bandwidth carrier.

A core network may direct one or more aspects of the transitioning. At least one of the radio access networks directs one or more aspects of the transitioning in some examples. The transitioning may relate to circuit-switched voices services for a user equipment. The transitioning may utilize a variety of different procedures including, but not limited to, a circuit-switched fallback (CSFB)-like procedure, a redirection procedure (CN redirection as well as RAN redirection), a cell change order procedure, a service-based handover, and/or a tune away procedure by the user equipment.

CSFB may often used to support voice services in a RAT or carrier that does not currently support voice. The user may then "fallback" to a RAT or carrier that does support voice. Though CSFB may be mainly used in the context of voice services, the tools and techniques may be generalized to any CS services or even any specific set of CS services. Such set may change. For example, the same technique can be used during a CS video service. Some embodiments may refer to CSFB or CSFB-like procedures.

Transitioning from a flexible bandwidth system to a non-flexible bandwidth system, to another flexible bandwidth system that natively support CS voice services, or to a circuit-switched voice supporting system may utilize CSFB-like techniques and procedures. CSFB may not be defined for UMTS/GSM as UMTS/GSM supports CS voice. Accordingly one example of redirection from flexible bandwidth UMTS to UMTS/GSM may be modeled along the lines of CSFB. CSFB may in general be supported from LTE to UMTS. Consider, for example, a flexible bandwidth UMTS network that may support PS calls or services, while CS calls may be supported on another network, such as GSM or UMTS. A user equipment may perform a joint GPRS and IMSI attach during registration prior to initiating a call. While in an ongoing PS call, to answer an incoming CS call, the PS call may be terminated. In some cases, the PS calls may be handed over to the other radio access network or suspended for the duration of the CS call when mobile is redirected to the other radio access network. To support a CS MO call, while the UE is in a PS call on a flexible bandwidth network, the user equipment may send a MO CS service request with an indicator (e.g., "CSFB indicator") to core network (e.g., SGSN). The "CSFB indicator" may notify the SGSN that the CM service request is not a regular CS request but one that requires fallback. A flexible bandwidth RAN, such as a flexible bandwidth UTRAN, may receive a request from the core network (e.g., SGSN) about a possible migration of the UE from the current RAT to another RAT, such as GERAN or UTRAN, for example, to answer the CS call using a RAN redirection request/response procedure. The flexible bandwidth UTRAN may receive information such as the RAT location-area ID (LAI) or PLMN ID from the core network in the RAN redirection request message. The information maybe utilized by the flexible bandwidth RAN to order measurements on the GERAN or UTRAN in order to find the best cell on the new RAT. With the target cell identified, an RRC release procedure with a redirection to the GERAN or UTRAN may be initiated to order the UE to migrate to the target cell. In case some System Information about the target cell is available, the flexible bandwidth RNC may include this information in the redirection message. The PDP context and RABs that were previously used to maintain the PS connection between the flexible bandwidth RAN and the UE may be released at the SGSN. The user equipment may then switch to the new RAT using the system information and send a CS service request on the new cell with a flag (e.g., "CSMO" flag) to indicate CSFB to the MSC. A CS connection may be set-up on the new RAT, such as GERAN or UTRAN. A similar procedure may be followed for MT CS call. Current CM service request message used in UMTS/GSM may not allow the inclusion of "CSFB" indicator or "CSMO" flag, so new messages may be created or existing CM request message maybe extended to support this procedure. In addition, the RAN redirection request message may not exist in UMTS; therefore, a new RAN redirection message carrying information such as the RAT, frequency information, etc. may be created or existing messages such as the RAB assignment messages maybe extended to include this information. The RRC release with redirection message in the current standards may not carry SI; therefore, new messages may be created or existing messages may need to be extended.

Some embodiments provide for transitioning from a flexible bandwidth system to a non-flexible bandwidth system, to another flexible bandwidth system, and/or to a circuit-switched voice supporting system using CSFB-like procedure as discussed above. However, instead of creating new messages or extending existing messages, existing messages in UMTS may be used and the flexible bandwidth UTRAN or flexible bandwidth Core Network entities associated with these messages may determine the relevant information without receiving the information in a message. For example, since the UMTS CS service request message may not include the "CSFB" indicator, the SGSN may determine from the reception of the CM service request message, knowledge of UE capabilities, UE registration info, network capabilities and/or services offered by the network to the UE, if the CM service request should be treated as a CSFB request or not. Likewise, when the UE sends the CM service request on the new cell without the "CSMO" flag, the MSC may make the decision if to treat the message as a CSFB request or not. Instead of defining a RAN redirection message or extending the RAB messages, the RAB request/response message can be used. An optional "LAI" could be sent in the message. The LAI could be used by the RNC to create database of the RAT and frequency associated with that LAI. With the database, once the RAN receives the "LAI" it could predict the corresponding frequency info and RAT information. However, the RAT and frequency information that could have been carried in those messages may be determined by the flexible bandwidth UTRAN (e.g., the RNC). To minimize the need for including SI in the RRC release with a re-direction message, UE measurements may be ordered by the flexible bandwidth UTRAN prior to sending the RRC release with a re-direction message to ensure that the UE is being redirected to cell that is already identified. For this purpose, the flexible bandwidth UTRAN may use the RRC Connection Release with Release cause "preemptive release" and redirection info (e.g., Frequency Info and Inter-RAT Info) to terminate the ongoing PS call and order the UE to handover to the target cell. For the inter-RAT info, currently only GSM RAT information may be included in the RRC Connection Release; a modification may be used to include information for UMTS cells in this message.

Some embodiments provide for transitioning from a flexible bandwidth system to a non-flexible bandwidth system, to another flexible bandwidth system, and/or to a circuit-switched voice supporting system utilizing cell change order commands. In UMTS, for example, inter-RAT mobility from UMTS to GSM in PS domain may be handled using "Cell Change Order from UTRAN" to transfer a PS connection to another RAT (e.g., GPRS) when the UE is in RRC states such as the Cell_DCH or Cell_FACH state. In CS domain, "Handover from UTRAN" may be used. Similarly, inter-RAT mobility from GSM to UMTS in PS domain may be handled using "Cell Change Order to UTRAN" to transfer a PS connection from GSM to UMTS. In CS domain, "Handover to UTRAN" may be used. These tools and techniques may be used to initiate fallback to UMTS/GSM, possibly as a result of inter-RAT measurements reported by user equipment indicating the presence of a suitable UMTS/GPRS cell. For example, when the UE has an ongoing PS connection through the flexible bandwidth UTRAN, the flexible bandwidth RAN may indicate the RABs to be transferred and the information the user equipment may utilize to identify and camp on the GPRS cell to the UE. GSM Info in "Cell Change Order from UTRAN" may include: BSIC, Band Indicator, BCCH ARFCN, and/or NC Mode. The user equipment may attempt to establish a connection with target GPRS cell and may connect the upper layer entities corresponding to the indicated RABs to the radio resources offered by the target RAT. If the procedure succeeds, the PS Core Network may inform the flexible bandwidth UTRAN so that the flexible bandwidth UTRAN can release the dedicated resources assigned to the user equipment (e.g., UTRAN) radio resources and user equipment context information). If the procedure fails, the user equipment may send a "Cell Change Order From UTRAN" Failure message and may maintain the connection with flexible bandwidth UTRAN. This example may assume that there is ongoing PS call in flexible bandwidth UTRAN and then there is MO/MT CS call which may be redirected to GERAN and PS call may also be handed over to GERAN. Similar fallback procedures can be used when the UE has existing PS connection through the flexible bandwidth UTRAN and receives/transmits a MO/MT voice call. Flexible bandwidth UTRAN may send "Cell Change Order from UTRAN" for voice fallback to GERAN and behaves as UTRAN. Flexible bandwidth UTRAN may send "Cell Change Order to UTRAN" for voice fallback to UTRAN and behaves as if it different from UTRAN.

In some embodiments, transitioning from a flexible bandwidth system to a non-flexible bandwidth system, to another flexible bandwidth system, and/or to a circuit-switched voice supporting system may utilize a service-based handover. For this procedure, the voice fallback decision may be made by the core network entities such as the MSC and respective RAN is notified by using the RAB assignment message with a service-based handover information element (IE). For example, a Core Network (CN) may be aware that flexible bandwidth RAN, such as a flexible UTRAN, may not support CS voice (network preference). The MSC/CN may be configured to conduct Service Based Handover (SBHO) to GSM, to normal bandwidth UTRAN or other network for voice services. For a MT voice call, the MSC may send Page to the flexible RNC. The flexible bandwidth UMTS RNC may page the user equipment and the UMTS RRC connection may be established as needed. After Direct Transfer messages have been exchanged between user equipment and MSC, the MSC may send a RAB Assignment Request (for example, indicating handover to GSM may be performed using a Service-based Handover IE). The flexible bandwidth UTRAN may send RAB Assignment Response message to MSC accepting the handover. The flexible bandwidth UTRAN may immediately after send Relocation Required message through the MSC to the to the GERAN to reserve resources for the UE. When the flexible RAN receives acknowledge that the GERAN is ready for the handover, the flexible bandwidth RNC (in the flexible RAN) may notifies the UE by sending a "Handover from UTRAN" command.

Some embodiments provide for transitioning from a flexible bandwidth system to a non-flexible bandwidth system, to another flexible bandwidth system, and/or to a circuit-switched voice supporting system utilizing RAN Redirection. For this procedure, the decision to fallback to another network in order to answer an MT/MO voice call may be made by the RAN and communicated to the CN and the UE. This procedure could be used in scenarios where the CN is not aware of whether or not the RAN supports voice services. For example, a user equipment may be camping on a flexible bandwidth RAN, such as a flexible bandwidth UTRAN. The flexible bandwidth UTRAN may handle transition or voice fallback without core network (CN) being aware that flexible bandwidth UTRAN may not support voice. CN may support CS and PS Attach over flexible bandwidth UTRAN by registering the user equipment on flexible bandwidth UTRAN LA and RA for both CS and PS calls. When there is a MO/MT CS voice call, the flexible bandwidth UTRAN may redirect user equipment to other RANs for reasons such as coverage (as if user equipment reached end of coverage area for flexible UTRAN, for example) and/or capacity (as if flexible bandwidth UTRAN's admission control indicates a loaded system, for example). When the CN is notified, the CS call may be transferred to a GERAN or UTRAN through the MCS, for example. Implementation may be easier if the same MSC serves the flexible bandwidth UTRAN and GERAN/UTRAN. There may be several flavors for implementing the RAN redirection. In one example, the flexible bandwidth UMTS RNC may always reject RAB Assignment request from MSC (for voice, not necessarily for SMS) and may initiate the Relocation Preparation procedure (through the MSC) with a cell on the GERAN/UTRAN. The flexible bandwidth UTRAN may order some UE measurements on cells in the GERAN/UTRAN to identify the target cell for the voice fallback. The rejection in the RAB response message to the MSC may indicate a message such as "RABs Failed To Setup Or Modify List" or "Relocation required". When the "RABs Failed To Setup Or Modify List" message is included, possible causes may include "Relocation Triggered", "Relocation desirable for radio reasons", "Directed Retry", "Reduce Load in Serving Cell", "Requested Traffic Class not Available", etc. Possible causes when the "Relocation required" message is indicated could be "Time critical Relocation", "Resource optimization relocation", "Relocation desirable for radio reasons", "Directed Retry", "Reduce Load in Serving Cell" etc. Once the Relocation procedure is completed and resources are reserved on the target cell for the UE, the flexible bandwidth user equipment may tune to GERAN/UTRAN and continue the handover to set-up the CS connection. The Directed Retry mechanism and Load Based Handover (LBHO) may work for flexible bandwidth UTRAN to GERAN mobility while Inter-Frequency Load Based HO works for flexible bandwidth UTRAN to UTRAN mobility. In another example flexible bandwidth UMTS user equipment may send RRC Connection Request to flexible bandwidth UTRAN with Establishment cause and domain type information for to initiate a fallback for an MO/MT CS voice call. In this case, the flexible bandwidth UTRAN may know whether it is originating conversational call, terminating conversational call and therefore, while set-up the RRC connection, may send a RRC Connection Reject with Redirection Info for CS voice calls only. The Rejection Cause in RRC Connection Reject may be "congestion" or "unspecified". This example may be used when there may be no ongoing PS connection, for example.

Transitioning or fallback from a flexible bandwidth system to a non-flexible bandwidth system, to another flexible bandwidth system, and/or to a circuit-switched voice supporting system may utilize a tuning away procedure by the user equipment. For example, a user equipment can be idle or connected mode on the flexible bandwidth RAN, such as flexible bandwidth UTRAN that does not support voice services, and may tune away periodically to monitor pages in other RATs e.g. GSM or UMTS. In some cases, the network may send CS pages over GSM or UMTS. The tune away may be with assistance of flexible bandwidth UTRAN where flexible bandwidth UTRAN may configure compressed mode for user equipment to tune away and monitor pages in GSM or UMTS. The tune away may also be without assistance from flexible bandwidth UTRAN, similar to some implementations in 1x/DO networks. The lack of coordination from the flexible bandwidth UTRAN might lead to performance degradation of the connection the flexible bandwidth UTRAN if the UE is in connected mode. This perform penalty for a UE in connected mode on the flexible system may be expected to be more than that of the 1x/DO model because of time stretched nature of the flexible system.

Figure 29:
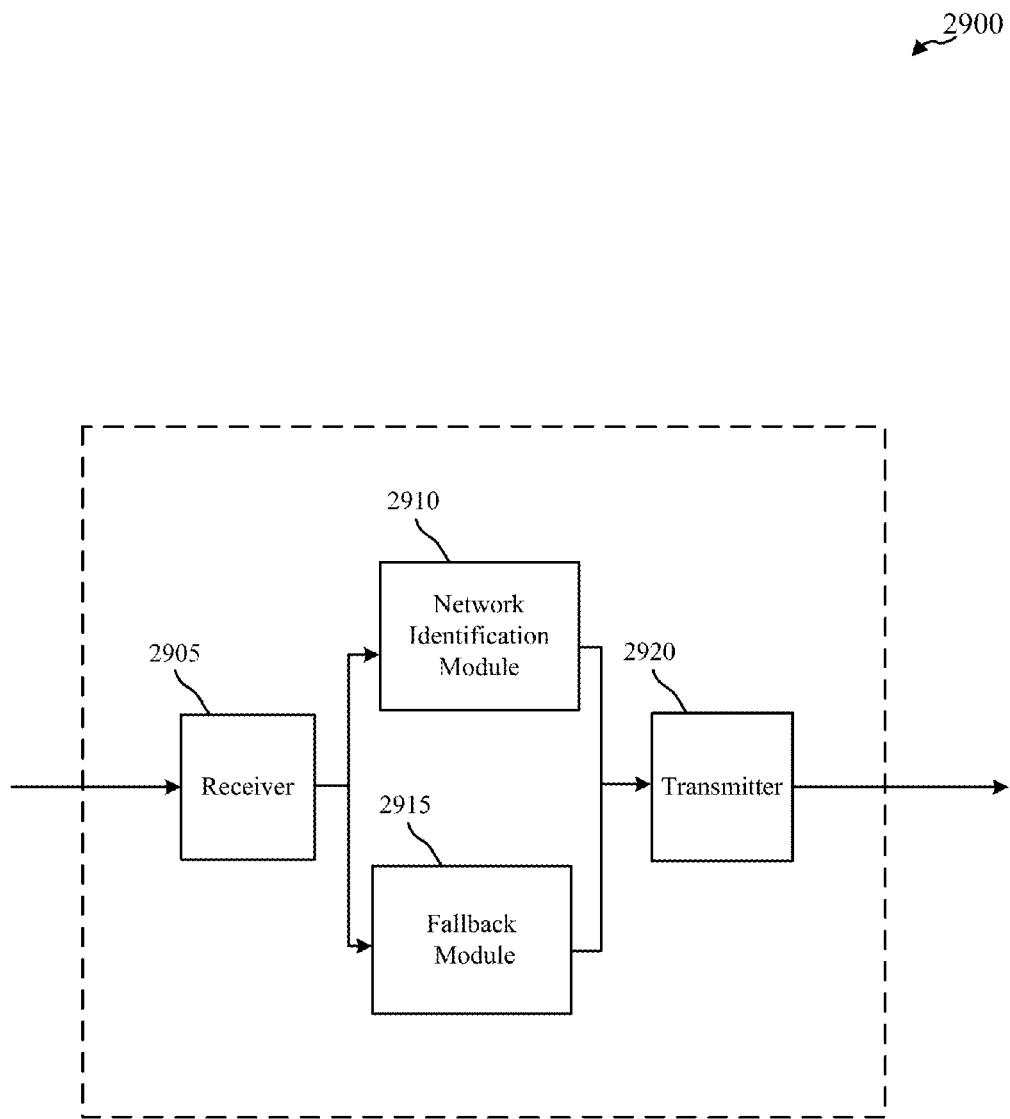
FIG. 29 shows a block diagram of a device that includes mobility functionality in accordance with various embodiments.

Turning next to FIG. 29, a block diagram illustrates a device 2900 that includes mobility functionality in accordance with various embodiments. The device 2900 may be an example of aspects of: the core networks 130 of FIG. 1, FIG. 3B, FIG. 38, and/or FIG. 39; the radio access networks 121 of FIG. 3B, FIG. 38, and/or FIG. 39; and/or the user equipment 115 of FIG. 1, FIG. 2, FIG. 3, FIG. 38, FIG. 39, FIG. 40, and/or FIG. 42. The device 2900 may also be a processor. The device 2900 may include a receiver module 2905, a network identification module 2910, a fallback module 2915, and/or a transmitter module 2920. Each of these components may be in communication with each other. Device 2900 may be configured to implement different aspects of the call flows and/or systems as shown in FIGS. 30-37 and/or associated descriptions.

These components of the device 2900 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 2905 may receive information such as packet, data, and/or signaling information regarding what device 2900 has received or transmitted. The received information may be utilized by the network identification module 2910 and/or fallback module 2915 for a variety of purposes.

In some embodiments, fallback module 2915 is configured for transitioning from a first radio access network to second radio access network, where the first radio access network includes a flexible bandwidth radio access network and the second radio access network includes a normal bandwidth radio access network may occur. In some embodiments, a core network may direct one or more aspects of the transitioning through fallback module 2915. At least one of the radio access networks directs one or more aspects of the transitioning through fallback module 2915 in some embodiments. The transitioning may relate to circuit-switched voices services for a UE. The fallback module 2915 may utilize a variety of different procedures including, but not limited to, a circuit-switched fallback-like procedure, a redirection procedure, a cell change order procedure, a service-based handover, a RAN redirection procedure, and/or a tune away procedure by the UE.

Device 2900, through receiver module 2905 and/or transmitter module 2902, may be configured for communicating over first radio access network, wherein the first radio access network utilizes a first flexible bandwidth carrier. Network identification module 2910 may be configured for identifying a second radio access network. The second radio access network may utilize a first bandwidth carrier. Fallback module 2915 may be configured for transitioning from utilizing the first flexible bandwidth carrier of the first radio access network to utilizing the first bandwidth carrier of the second radio access network.

The fallback module 2915 may be configured such that transitioning from utilizing the first flexible bandwidth carrier of the first radio access network to utilizing the first bandwidth carrier of the second radio access network may be directed at least in part by a core network. Transitioning from utilizing the first flexible bandwidth carrier of the first radio access network to utilizing the first bandwidth carrier of the second radio access network may be directed at least in part by at least one of the radio access networks. At least transitioning from utilizing the first flexible bandwidth carrier of the first radio access network to utilizing the first bandwidth carrier of the second radio access network or identifying the second radio access network may relate to a call set-up. The first bandwidth carrier may include a normal bandwidth carrier or a second flexible bandwidth carrier.

The network identification module 2910 and/or fallback module 2915 may be configured such that at least transitioning from utilizing the first flexible bandwidth carrier of the first radio access network to utilizing the first bandwidth carrier of the second radio access network or identifying the second radio access network may relate to circuit-switched voice services for a user equipment.

The network identification module 2910 and/or fallback module 2915 may be configured such that at least transitioning from utilizing the first flexible bandwidth carrier of the first radio access network to utilizing the first bandwidth carrier of the second radio access network or identifying the second radio access network may include utilizing a circuit-switched fallback-like procedure. In some cases, an indicator, which may include a flag, may be utilized to signal the use of the circuit-switched fallback-like procedure. In other cases, one of the radio access networks or a core network may determine that the circuit-switched fallback-like procedure is being utilized with receiving a specific indicator signaling the use of the circuit-switched fallback-like procedure. At least transitioning from utilizing the first flexible bandwidth carrier of the first radio access network to utilizing the first bandwidth carrier of the second radio access network or identifying the second radio access network may include utilizing a cell change order procedure. At least transitioning from utilizing the first flexible bandwidth carrier of the first radio access network to utilizing the first bandwidth carrier of the second radio access network or identifying the second radio access network may include utilizing a service-based handover. At least transitioning from utilizing the first flexible bandwidth carrier of the first radio access network to utilizing the first bandwidth carrier of the second radio access network or identifying the second radio access network may include utilizing a RAN redirection procedure. At least transitioning from utilizing the first flexible bandwidth carrier of the first radio access network to utilizing the first bandwidth carrier of the second radio access network or identifying the second radio access network may include utilizing a tune away procedure by a user equipment.

Some embodiments of device 2900 may provide mobility between flexible bandwidth systems to non-flexible bandwidth systems. The non-flexible bandwidth systems may be configured to handle circuit-switched voice services. The mobility between flexible bandwidth systems and non-flexible bandwidth systems and/or circuit-switched voice-supporting systems may be referred to as transitioning between these systems and/or voice fallback. For example, some embodiments may include transition from a flexible bandwidth RAN to a non-flexible bandwidth RAN for circuit-switched voice services. One example may include voice fallback from a flexible bandwidth RAN to a GERAN, UTRAN, or other radio access technology RAN. In some embodiments, a flexible bandwidth RAN or flexible bandwidth capable UE may also be capable of normal RAN or normal UE functionality. Thus, a flexible bandwidth RAN or flexible bandwidth capable UE may be a flexible-capable and normal-capable RAN or UE, respectively.

The transition or fallback procedures may utilize a variety of techniques in accordance with various embodiments. Different embodiments may utilize different techniques for these transitioning and/or fallback procedures including, but not limited to, circuit-switched fallback (CSFB)-like procedure with new or modified existing messages, CSFB-like procedure using existing messages and modified RAN and/or CN entities, cell change order, service-based handover, RAN redirection, and/or tune away by mobile.

Merely by way of example, the following provides several different examples utilizing specific radio access technologies. Other similar embodiments may include the use of other RATs. One embodiment includes fallback from flexible UTRAN to GERAN, UTRAN, or 1x using a Circuit Switched Fallback (CSFB) like procedure with new or modified existing messages. One embodiment includes fallback from UTRAN to GERAN or UTRAN using CSFB-like procedure with existing messages and modified CN and RAN entities. One embodiment includes fallback from flexible bandwidth UTRAN to GERAN using Cell Change Order commands. One embodiment includes fallback from flexible UTRAN to GERAN or UTRAN using Service-Based Handover. Some embodiments include fallback from flexible bandwidth UTRAN to GERAN/UTRAN using RAN Redirection. One embodiment includes fallback from flexible bandwidth UTRAN to GERAN or UTRAN by allowing the UE Tune Away to other RATs.

Figure 30A:
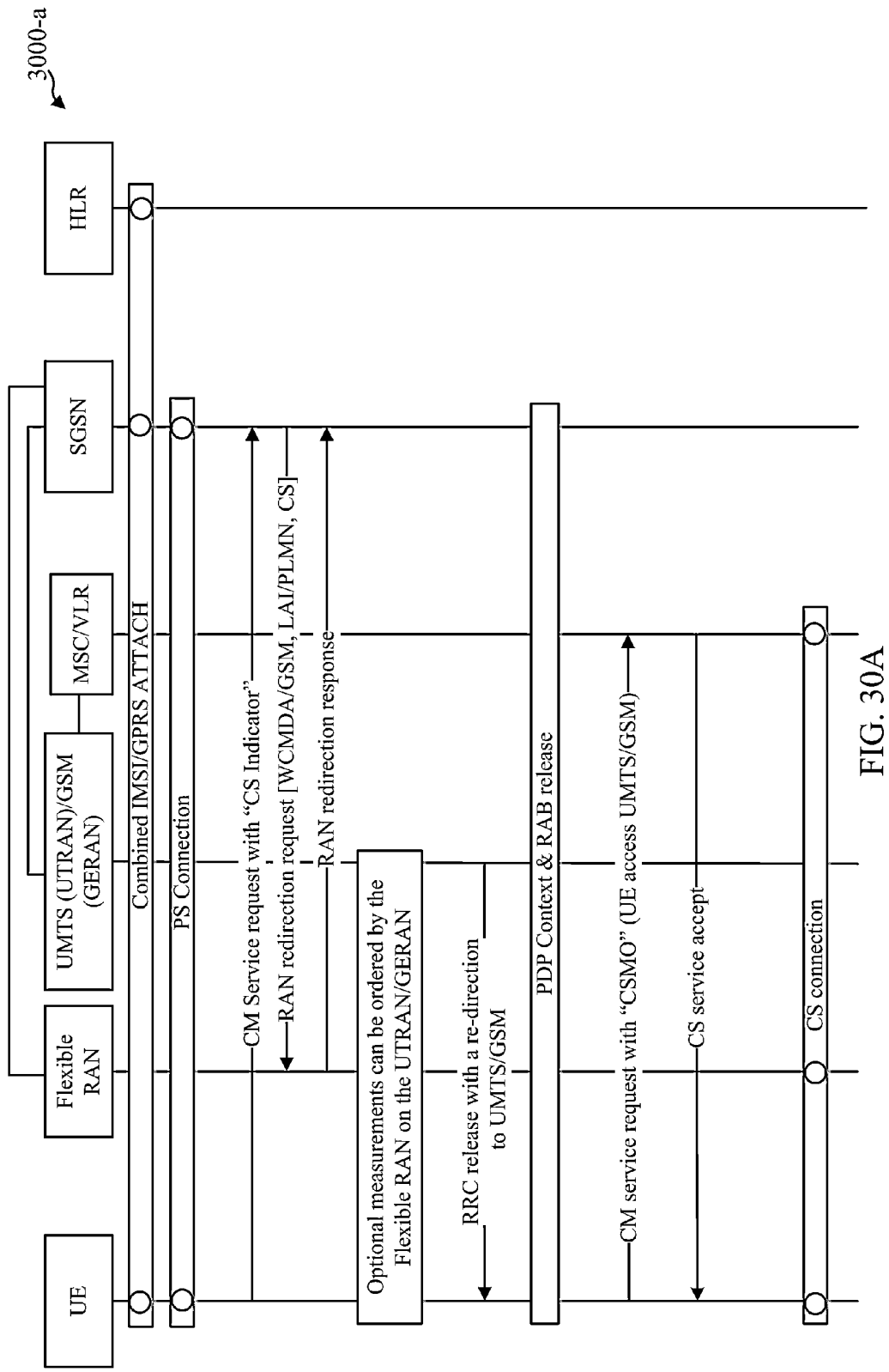
FIG. 30A shows a call flow in accordance with various embodiments.

Some embodiments provide for transitioning or fallback from a flexible bandwidth system to a non-flexible bandwidth system or to a circuit-switched voice supporting system utilizing CSFB like procedure with new or modified existing messages. FIG. 30A shows a call flow 3000-a for a MO CSFB-like procedure to a RAT such as UMTS or GSM. For example, CSFB-like procedures may be utilized to transition or fallback to UMTS or GSM. Merely by way of example, consider a flexible bandwidth UMTS network that may support PS calls or services, while CS calls may be supported on another network, such as GSM or UMTS. A UE may perform a joint GPRS and IMSI attach during registration prior to initiating a call. While on an ongoing PS call, to answer an incoming CS call, a PS call may be terminated. In some cases, the PS calls may be PS handover or suspended. For a CS MO call, a UE may send a MO CS service request "with CSFB indicator" to core network (e.g., SGSN). A flexible bandwidth RAN, such as a flexible bandwidth UTRAN, may receive a request from the core network (e.g., SGSN) about a possible migration of the UE from the current RAT to another RAT, such as GERAN or UTRAN, for example, to answer the CS call using a RAN redirection request/response procedure. The flexible bandwidth UTRAN may receive information such as the RAT, LAI, or PLMN ID from the core network in the RAN redirection message. The information may be utilized by the flexible bandwidth RAN to order measurements on the GERAN or UTRAN in order to find the best cell on the new RAT. With the target cell identified, an RRC release procedure with a redirection to the GERAN or UTRAN may be initiated to order the UE to migrate to the target cell. In case some System Information about the target cell is available, the flexible bandwidth RNC may include this information in the redirection message. The PDP context and RABs that were previously used to maintain the PS connection between the flexible bandwidth RAN and the UE may be released at the SGSN. The user equipment may then switch to the new RAT using the System information and send a CS service request on the new cell with a flag (e.g., "CSMO" flag) to indicate CSFB to the MSC. A CS connection may be set-up on the new RAT, such as GERAN or UTRAN.

Figure 30B:
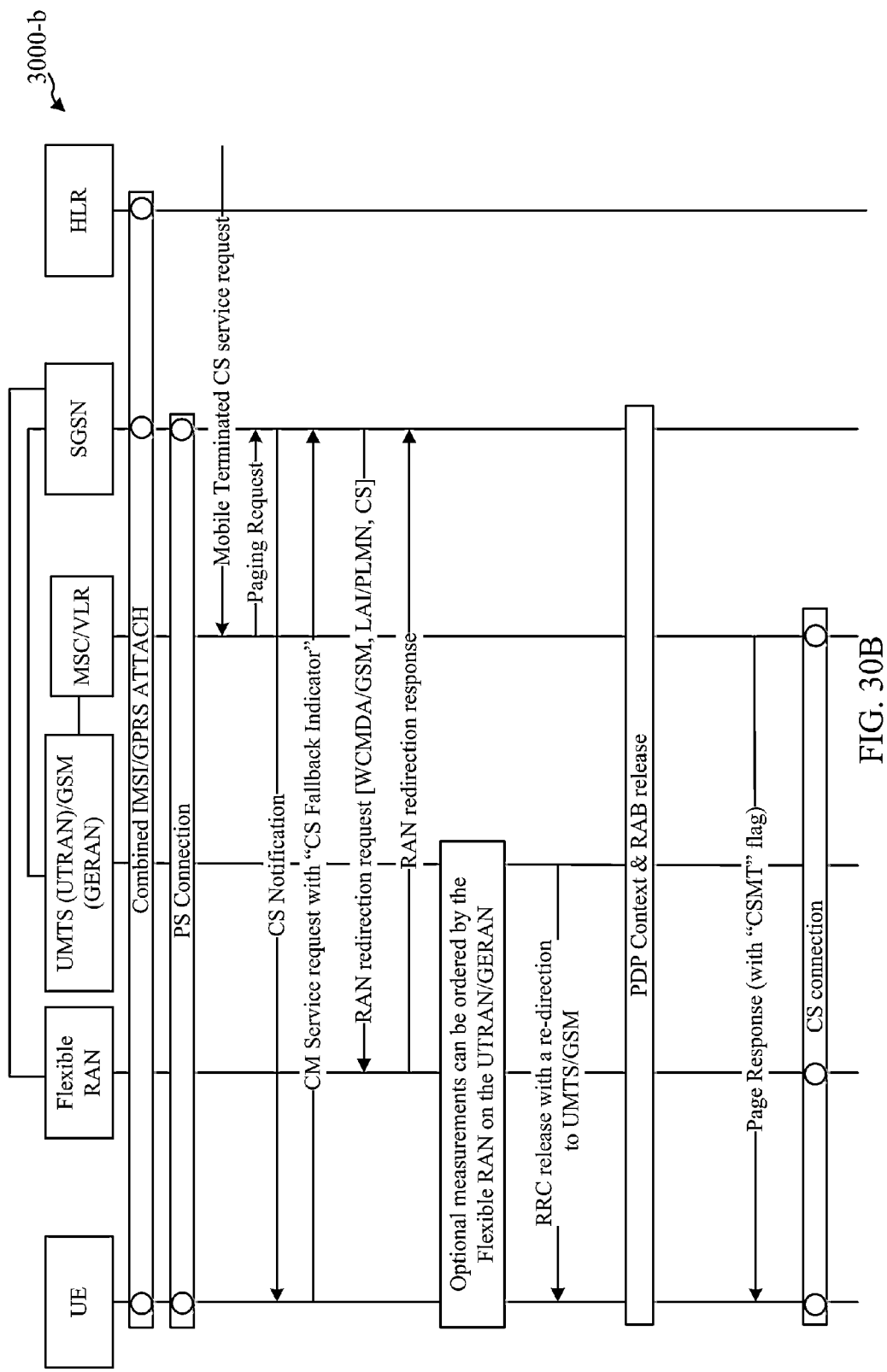
FIG. 30B shows a call flow in accordance with various embodiments.

Some embodiments are configured for CS MT calls utilizing a variety of different RATs. The following examples may utilize a flexible bandwidth UTRAN, GSM, and/or UMTS, but other RATs may be utilized. FIG. 30B shows a call flow 3000-b for an MT CSFB-like procedure to a RAT, such as UMTS or GSM. For example, an MSC may receive a CS service request for this UE. The MSC may notify the SGSN that the UE needs to be paged. The SGSN may notify the UE about the CS call request using a CS notification message (with a paging type 2 on the RAN, for example). UE may send a MT CS service request with the "CSFB indicator" to core network (SGSN in this case). A flexible bandwidth UTRAN may be notified by the SGSN about the migration to GERAN or UTRAN to answer the CS call using the RAN re-direction request/response. The flexible bandwidth UTRAN can order measurements on the GERAN or UTRAN to find the best cell on the new RAT. RRC release procedure may be initiated with a redirection to the GERAN or UTRAN and SI may be included in the message if available. The PDP context and RABs that were previously used to maintain the pS connection between the RAN and UE may be released at the SGSN. The UE may switch RAT and may send page response on the new cell with "CSMT" flag to indicate CSFB to the MSC. A CS connection may be set-up on the GERAN or UTRAN.

Method 3000-a and/or method 3000-b may include transitioning from a flexible bandwidth system to a non-flexible bandwidth system, to another flexible bandwidth system that natively support CS voice services, or to a circuit-switched voice supporting system may utilize CSFB-like techniques and procedures as discussed above. CSFB may not be defined for UMTS/GSM as UMTS/GSM supports CS voice. Accordingly one example of redirection from flexible bandwidth UMTS to UMTS/GSM may be modeled along the lines of CSFB. CSFB may in general be supported from LTE to UMTS. Consider, for example, a flexible bandwidth UMTS network that may support PS calls or services, while CS calls may be supported on another network, such as GSM or UMTS. A user equipment may perform a joint GPRS and IMSI attach during registration prior to initiating a call. While in an ongoing PS call, to answer an incoming CS call, the PS call may be terminated. In some cases, the PS calls may be handed over to the other radio access network or suspended for the duration of the CS call when mobile is redirected to the other radio access network. To support a CS MO call, while the UE is in a PS call on a flexible bandwidth network, the user equipment may send a MO CS service request with an indicator (e.g., "CSFB indicator") to core network (e.g., SGSN). The "CSFB indicator" may notify the SGSN that the CM service request is not a regular CS request but one that requires fallback. A flexible bandwidth RAN, such as a flexible bandwidth UTRAN, may receive a request from the core network (e.g., SGSN) about a possible migration of the UE from the current RAT to another RAT, such as GERAN or UTRAN, for example, to answer the CS call using a RAN redirection request/response procedure. The flexible bandwidth UTRAN may receive information such as the RAT location-area ID (LAI) or PLMN ID from the core network in the RAN redirection request message. The information maybe utilized by the flexible bandwidth RAN to order measurements on the GERAN or UTRAN in order to find the best cell on the new RAT. With the target cell identified, an RRC release procedure with a redirection to the GERAN or UTRAN may be initiated to order the UE to migrate to the target cell. In case some System Information about the target cell is available, the flexible bandwidth RNC may include this information in the redirection message. The PDP context and RABs that were previously used to maintain the PS connection between the flexible bandwidth RAN and the UE may be released at the SGSN. The user equipment may then switch to the new RAT using the infotand send a CS service request on the new cell with a flag (e.g., "CSMO" flag) to indicate CSFB to the MSC. A CS connection may be set-up on the new RAT, such as GERAN or UTRAN. A similar procedure may be followed for MT CS call.

Call flows 3000-a and/or 3000-b may include some embodiments which may utilize additional messages in UTRAN/GERAN to implement this CSFB-like procedure. Some embodiments may modify existing messages by defining new IEs. Current CM service request message used in UMTS/GSM may not allow the inclusion of "CSFB" indicator or "CSMO" flag, so new messages may be created or existing CM request message maybe extended to support this procedure. In addition, the RAN redirection request message may not exist in UMTS; therefore, a new RAN redirection message carrying information such as the RAT, frequency information, etc. may be created or existing messages such as the RAB assignment messages maybe extended to include this information. The RRC release with redirection message in the current standards may not carry SI; therefore, new messages may be created or existing messages may need to be extended. For example, an additional IE may be added to the CM service request to indicate voice fallback or transitional mode CM service request. Additional IEs may be added to the page response to indicate "CSMT flag". A new message "RAN redirection request/response" or similar message may be utilized to carry information like the LAI, PLMN, and/or RAT information from the SGSN to the flexible bandwidth UTRAN or other flexible bandwidth RAN. This message may be an existing RAB assignment request/response message with additional IEs. Additional IEs may include UMTS cells in the RRC release with re-direction message. Addition IEs carrying SI may also be included in the RRC release with redirection messages to provide SI about the target cell to the UE.

Some embodiments provide for transitioning or fallback from a flexible bandwidth system to a non-flexible bandwidth system and/or to a circuit-switched voice supporting system utilizing CSFB-like procedure with currently existing messages (CEM). For example, CSFB with CEM techniques may be utilized to transition or fallback to UMTS or GSM from a flexible bandwidth UTRAN. In this example, the flexible bandwidth UTRAN may supports PS, while CS calls may be supported on GSM and/or UMTS UE may perform a joint GPRS and IMSI attach during registration. To answer the CS call, the PS call may be terminated, handed over or suspended. For MO calls, the flexible bandwidth UMTS capable UE (when UE is in PS call, for example) may send CM Service Request for "Originating conversational voice call" for a CS voice call. In some cases, since the UMTS CS service request message may not include the "CSFB" indicator, the SGSN may determine from the reception of the CM service request message, knowledge of UE capabilities, UE registration info, network capabilities and/or services offered by the network to the UE, if the CM service request should be treated as a CSFB request or not. Likewise, when the UE sends the CM service request on the new cell without the "CSMO" flag, the MSC may make the decision if to treat the message as a CSFB request or not. Instead of defining a RAN redirection message or extending the RAB messages, the RAB request/response message can be used. An optional "LAI" could be sent in the message. The LAI could be used by the RNC to create database of the RAT and frequency associated with that LAI. With the database, once the RAN receives the "LAI" it could predict the corresponding frequency info and RAT information. However, the RAT and frequency information that could have been carried in those messages may be determined by the flexible bandwidth UTRAN (e.g., the RNC). To minimize the need for including SI in the RRC release with a re-direction message, UE measurements may be ordered by the flexible bandwidth UTRAN prior to sending the RRC release with a re-direction message to ensure that the UE is being redirected to cell that is already identified. For this purpose, the flexible bandwidth UTRAN may use the RRC Connection Release with Release cause "preemptive release" and redirection info (e.g., Frequency Info and Inter-RAT Info) to terminate the ongoing PS call and order the UE to handover to the target cell. For the inter-RAT info, currently only GSM RAT information may be included in the RRC Connection Release; a modification may be used to include information for UMTS cells in this message. This may also be applicable to method 3100-*a* through method 3100-*b* and other portions discussed below.

Figure 31A:
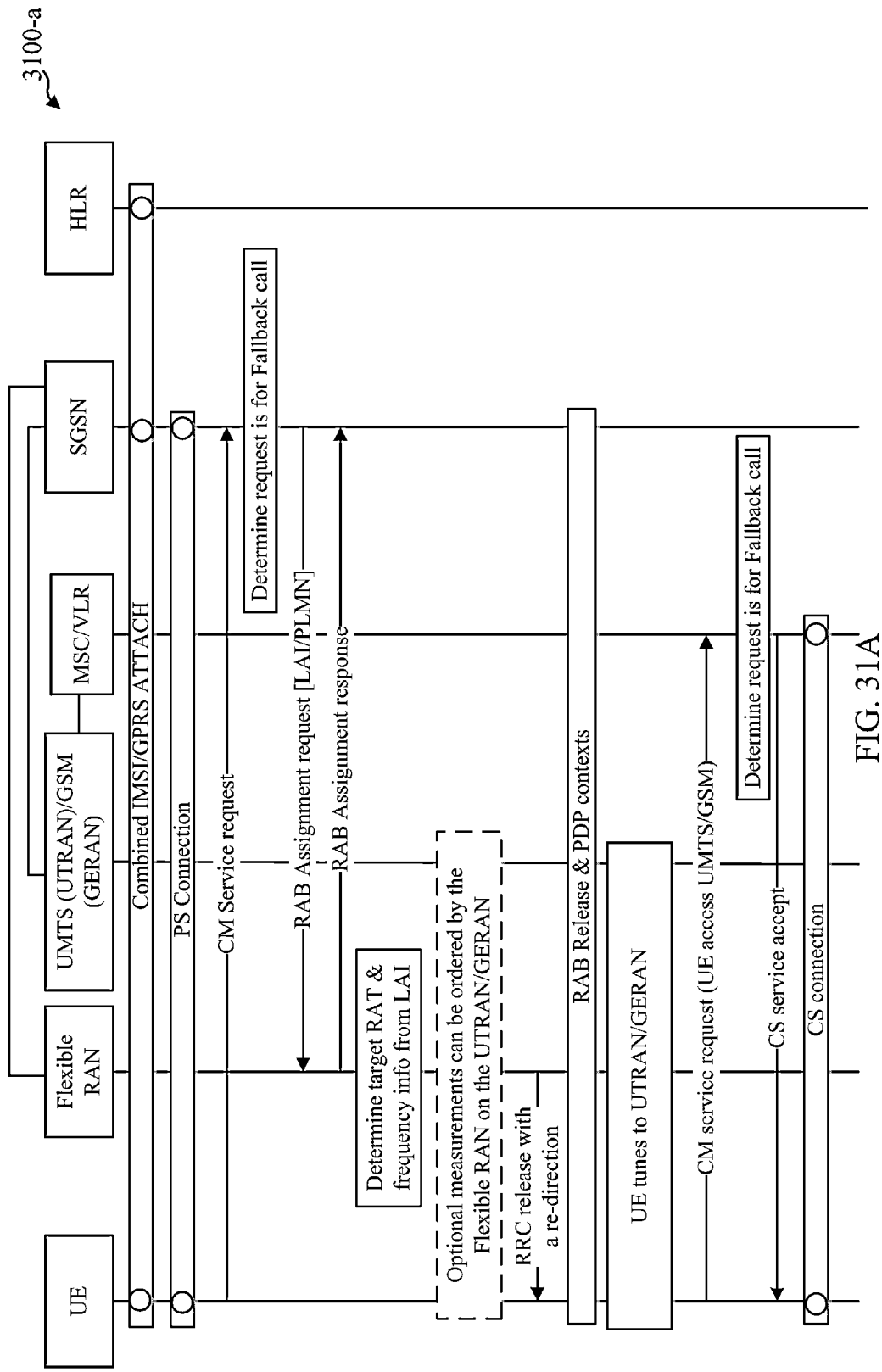
FIG. 31A shows a call flow in accordance with various embodiments.

Some embodiments provide for MO CS calls with CEM. FIG. 31A shows a call flow 3100-*a* for an MO CS call with CEM in accordance with various embodiments. For example, to terminate the ongoing PS call and instruct the UE to move to the GERAN/UTRAN to proceed with the CS call, a flexible bandwidth UTRAN may send the RRC Connection Release with Release cause "preemptive release" and/or redirection info (e.g., Frequency Info and Inter-RAT info) to the UE. The GSM RAT information may easily be included in the existing RRC connection Release message; some embodiments include a modification to the message to include information for UMTS cells. A flexible bandwidth UMTS UE may send RRC Connection Release Complete. The flexible bandwidth UMTS UE may tune to GSM or WCDMA (or other RAT) frequency as indicated in the redirection info (e.g., Frequency Info and Inter-RAT info). The flexible bandwidth UMTS UE may send a CS service request to the target UMTS or GSM cell and the corresponding MSC may need to determine that the CS call was for fallback call. The flexible bandwidth UMTS UE may proceed with CS call in GSM or UMTS (or other RAT). The PS data session may be also either suspended or transferred.

Figure 31B:
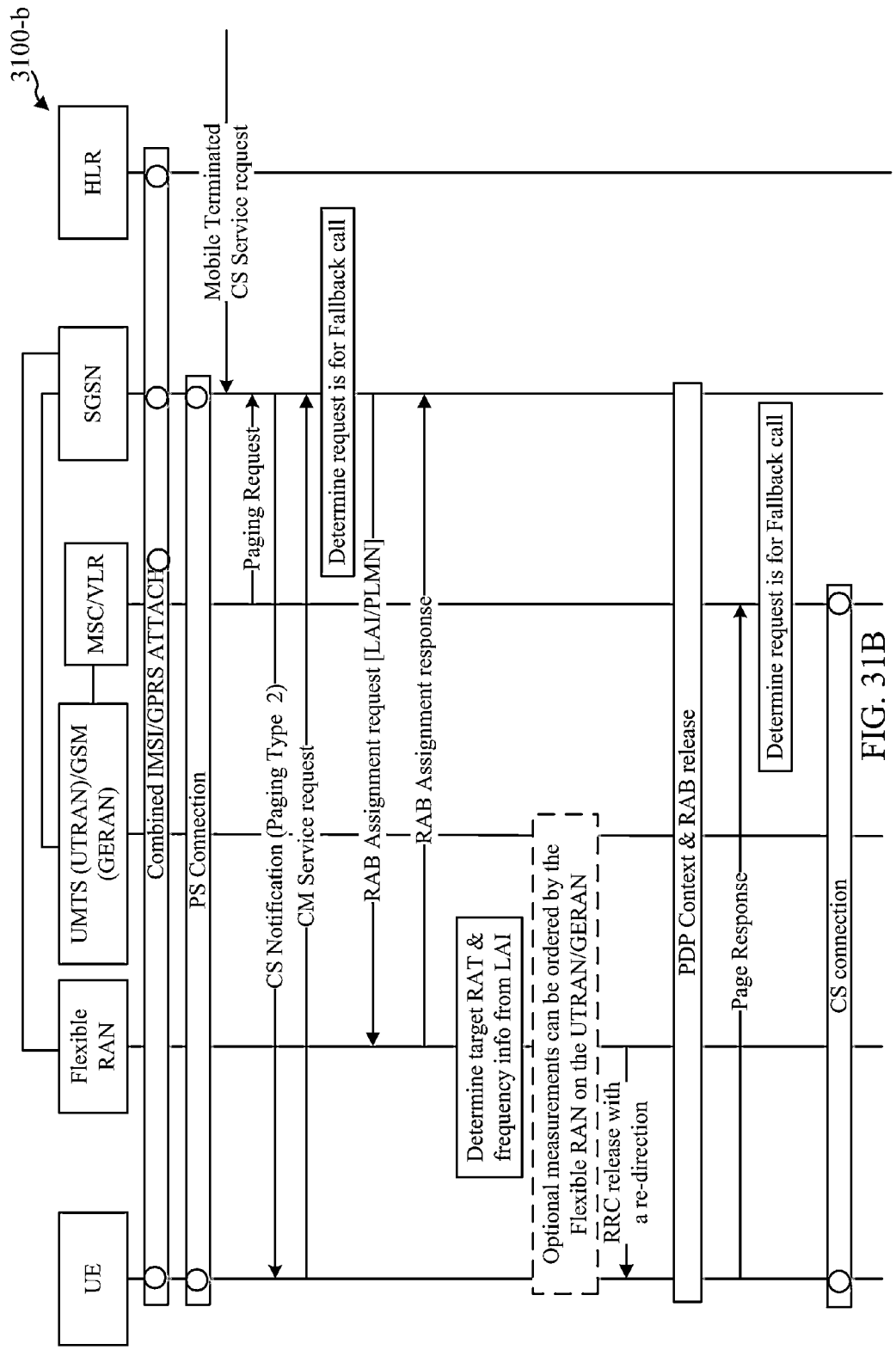
FIG. 31B shows a call flow in accordance with various embodiments.

Some embodiments provide for MT CS calls with CEM. FIG. 31B shows an example of a call flow 3100-*b* for an MT CS call with CEM in accordance with various embodiments. For example, a flexible bandwidth RAN, such as a flexible bandwidth UTRAN, may send a Paging Type 2 to a flexible bandwidth capable UE, such as UMTS UE (in PS call) with paging cause "Terminating conversational voice call" and CN domain identity "CS domain" for CS voice call. The flexible bandwidth UMTS UE (in PS call, for example) may respond back with a CM Service Request message. The MSC may determine that the call requires fallback and may send a RAB assignment request message to flexible bandwidth UTRAN with the LAI optional field included. The flexible bandwidth UTRAN may determine candidate RAT and frequency information from LAI. The flexible bandwidth UTRAN can initiate measurements on the UTRAN or GERAN cell, for example, such that the UE can identify the cell. The flexible bandwidth UTRAN may send RRC Connection Release with Release cause "preemptive release" and/or redirection info (e.g., Frequency Info and Inter-RAT info) to terminate the ongoing PS call, for example.

In some cases, the flexible bandwidth UMTS UE sends RRC Connection Release Complete to another flexible bandwidth RAN, such as a flexible bandwidth UTRAN. The UMTS UE may tune to GSM or UMTS frequency, for example, as may be indicated in and redirection info (e.g., Frequency Info and Inter-RAT info). The flexible bandwidth UMTS UE may respond to paging for MT CS voice call in GSM or UMTS, for example. The PS data session may be suspended or transferred.

Embodiments that utilize CEM may include normal CM service request without "Fallback indicator" or the "CSMO" flag being used; the SGNS and/or MSC may determine a fallback service request from regular service request using UE registration information. The RNC may determinate the target cell RAT and/or frequency from the LAI the RAB Assignment Request message. Some embodiments may include additional IE to provide for redirection to UMTS cells.

Some embodiments provide for transitioning or fallback from a flexible bandwidth system to a non-flexible bandwidth system and/or to a circuit-switched voice supporting system utilizing cell change order commands. For example, some embodiments utilize cell change order from UTRAN. In UMTS, for example, inter-RAT mobility in PS domain may be handled using "Cell Change Order from UTRAN" to transfer a PS connection (UE in Cell_DCH or Cell_FACH state, for example) to another RAT (e.g., GPRS). In CS domain, "Handover from UTRAN" may be used. These tools and techniques may be used to initiate by UTRAN, possibly as result of inter-RAT measurements reported by UE indicating the presence of a suitable GPRS cell. The UTRAN may indicate the RABs to be transferred and the information the UE may utilize to identify and camp on the GPRS cell. GSM Info in "Cell Change Order from UTRAN" may include: BSIC, Band Indicator, BCCH ARFCN, and/or NC Mode. The UE may attempt to establish a connection with target GPRS cell and may connect the upper layer entities corresponding to the indicated RABs to the radio resources offered by the target RAT. If the procedure succeeds, the PS Core Network may inform UTRAN so that UTRAN can release the dedicated resources assigned to the UE (UTRAN radio resources and UE context information). If the procedure fails, the UE may send a Cell Change Order From UTRAN Failure message and may maintain the connection with UTRAN.

For example, as discussed above, in UMTS, inter-RAT mobility from UMTS to GSM in PS domain may be handled using "Cell Change Order from UTRAN" to transfer a PS connection to another RAT (e.g., GPRS) when the UE is in RRC states such as the Cell_DCH or Cell_FACH state. In CS domain, "Handover from UTRAN" may be used. Similarly, inter-RAT mobility from GSM to UMTS in PS domain may be handled using "Cell Change Order to UTRAN" to transfer a PS connection from GSM to UMTS. In CS domain, "Handover to UTRAN" may be used. These tools and techniques may be used to initiate fallback to UMTS/GSM, possibly as a result of inter-RAT measurements reported by user equipment indicating the presence of a suitable UMTS/GPRS cell. For example, when the UE has an ongoing PS connection through the flexible bandwidth UTRAN, the flexible bandwidth RAN may indicate the RABs to be transferred and the information the user equipment may utilize to identify and camp on the GPRS cell to the UE. GSM Info in "Cell Change Order from UTRAN" may include: BSIC, Band Indicator, BCCH ARFCN, and/or NC Mode. The user equipment may attempt to establish a connection with target GPRS cell and may connect the upper layer entities corresponding to the indicated RABs to the radio resources offered by the target RAT. If the procedure succeeds, the PS Core Network may inform the flexible bandwidth UTRAN so that the flexible bandwidth UTRAN can release the dedicated resources assigned to the user equipment (e.g., UTRAN) radio resources and user equipment context information). If the procedure fails, the user equipment may send a "Cell Change Order From UTRAN" Failure message and may maintain the connection with flexible bandwidth UTRAN. This example may assume that there is ongoing PS call in flexible bandwidth UTRAN and then there is MO/MT CS call which may be redirected to GERAN and PS call may also be handed over to GERAN. Similar fallback procedures can be used when the UE has existing PS connection through the flexible bandwidth UTRAN and receives/transmits a MO/MT voice call. Flexible bandwidth UTRAN may send "Cell Change Order from UTRAN" for voice fallback to GERAN and behaves as UTRAN. Flexible bandwidth UTRAN may send "Cell Change Order to UTRAN" for voice fallback to UTRAN and behaves as if it different from UTRAN.

In some cases, instead of triggering "Cell Change Order from UTRAN" based on UE measurements indicating suitable GPRS cells, a flexible bandwidth UTRAN may send "Cell Change Order from UTRAN" if there is a MO or MT CS voice call for voice fallback from flexible bandwidth UTRAN to GERAN. For MO voice call, UE may send CM Service Request/Setup and that can trigger "Cell Change Order from UTRAN". For MT CS voice call, paging type 2 message sent from UTRAN and/or CS Service Request may trigger "Cell Change Order from UTRAN".

Some embodiments include inter-system cell change order to UTRAN. This procedure may be used by the other RATs (e.g., GSM, GPRS) to command UE to move to the UTRAN Cell using procedures specific for that RAT. Some embodiments include identity of the target UTRAN cell. In UTRAN, the UE may initiate RRC connection establishment procedure with establishment cause set to "Inter-RAT Cell Change Order", for example.

Some embodiments provide for transitioning and/or voice fallback to UMTS. In some cases, instead of triggering "Cell Change Order to UTRAN" based on UE measurements indicating suitable UMTS cells, a flexible bandwidth UTRAN may send "Cell Change Order to UTRAN" if there is a MO or MT CS voice call for voice fallback from Fractional UTRAN to UTRAN For MO voice call, UE may send CM Service Request/Setup and that may trigger "Cell Change Order from UTRAN". For MT CS voice call, paging type 2 message sent from UTRAN and/or CS Service Request may trigger "Cell Change Order from UTRAN", for example.

For some embodiments, flexible bandwidth UTRAN may send "Cell Change Order from UTRAN" for voice fallback to GERAN. In this case, it may behave as if the flexible bandwidth UTRAN may be identical to UTRAN. In some embodiments, the flexible bandwidth UTRAN sends "Cell Change Order to UTRAN" for voice fallback to UTRAN. In this case, it may behave as if Fractional UTRAN is different from UTRAN.

Figure 32A:
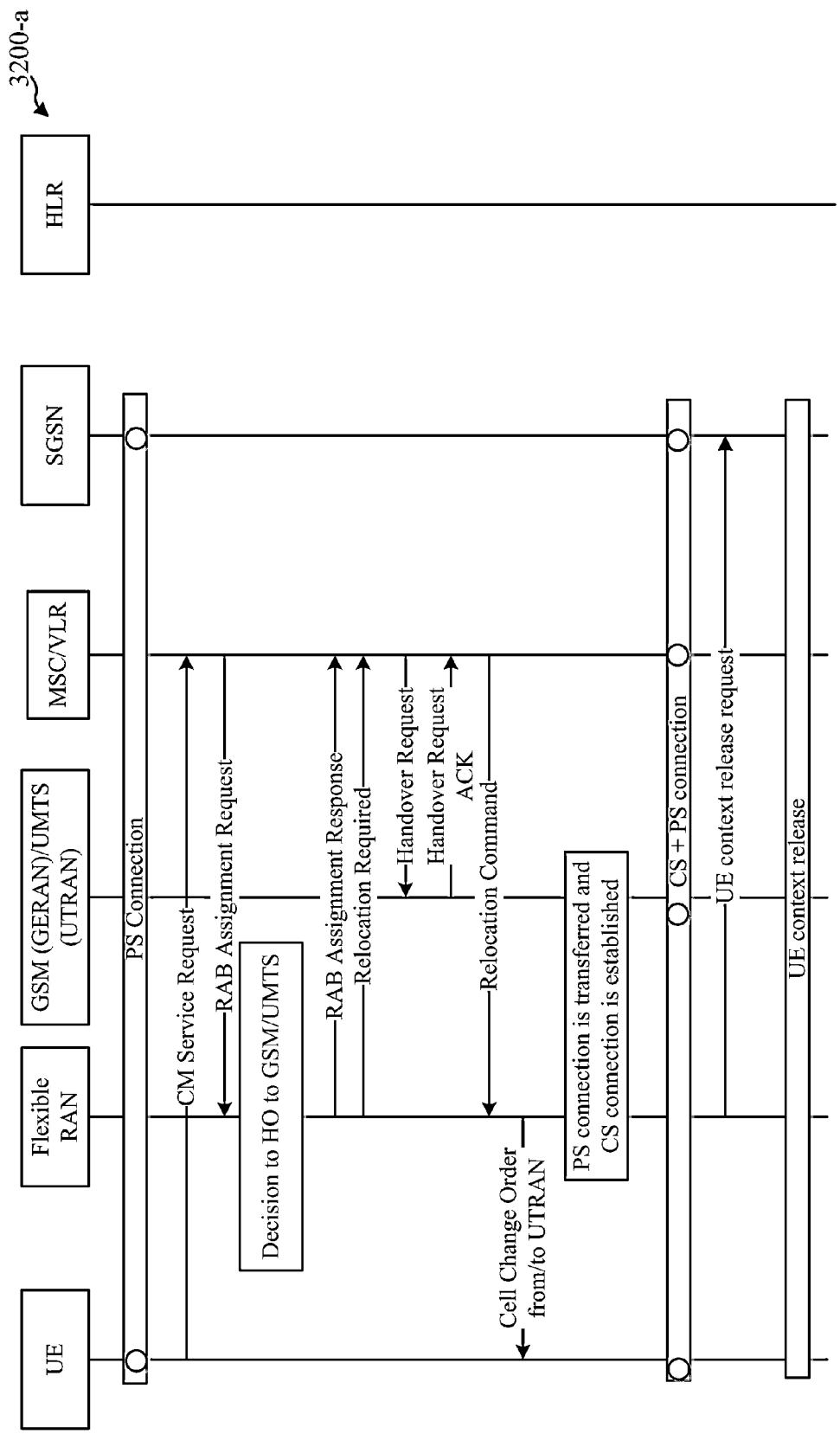
FIG. 32A shows a call flow in accordance with various embodiments.

Some embodiments utilizing cell change order involve one or more MO scenarios. FIG. 32A shows an example of a call flow 3200-a of an MO scenario in accordance with various embodiments. For example, a core network may be unaware that a flexible bandwidth UTRAN does not support CS voice services. The flexible bandwidth capable UE may send CM Service Request to MSC, for example. The MSC may send RAB Assignment Request indicating handover to GSM should be performed in Service Handover IE, for example. In other cases, the flexible bandwidth UTRAN may decide to HO to GSM based on prior UE measurements or information about voice support at the flexible bandwidth RAN. The flexible bandwidth UTRAN may send RAB Assignment Response message to MSC and may immediately after send Relocation Required message to GERAN through the MSC to start the handover preparation procedures. After the GERAN acknowledges reserving resources for the UE relocation, the flexible bandwidth RNC may send a "Cell Change Order from UTRAN" command with "GSM Info" to UE. If the target cell is in the UTRAN, the "Cell Change Order to UTRAN" message is used and "UMTS cell Info" may be added to the message. The Core Network may let the flexible UTRAN know that PS call may have been transferred. Once the PS connection is transferred and the UE accesses the target cell, the CS connection can be established so that the UE then has a CS connection concurrently with a PS connection. After the flexible bandwidth UTRAN may release the dedicated resources assigned to the UE (radio resources and/or UE context information, for example).

Figure 32B:
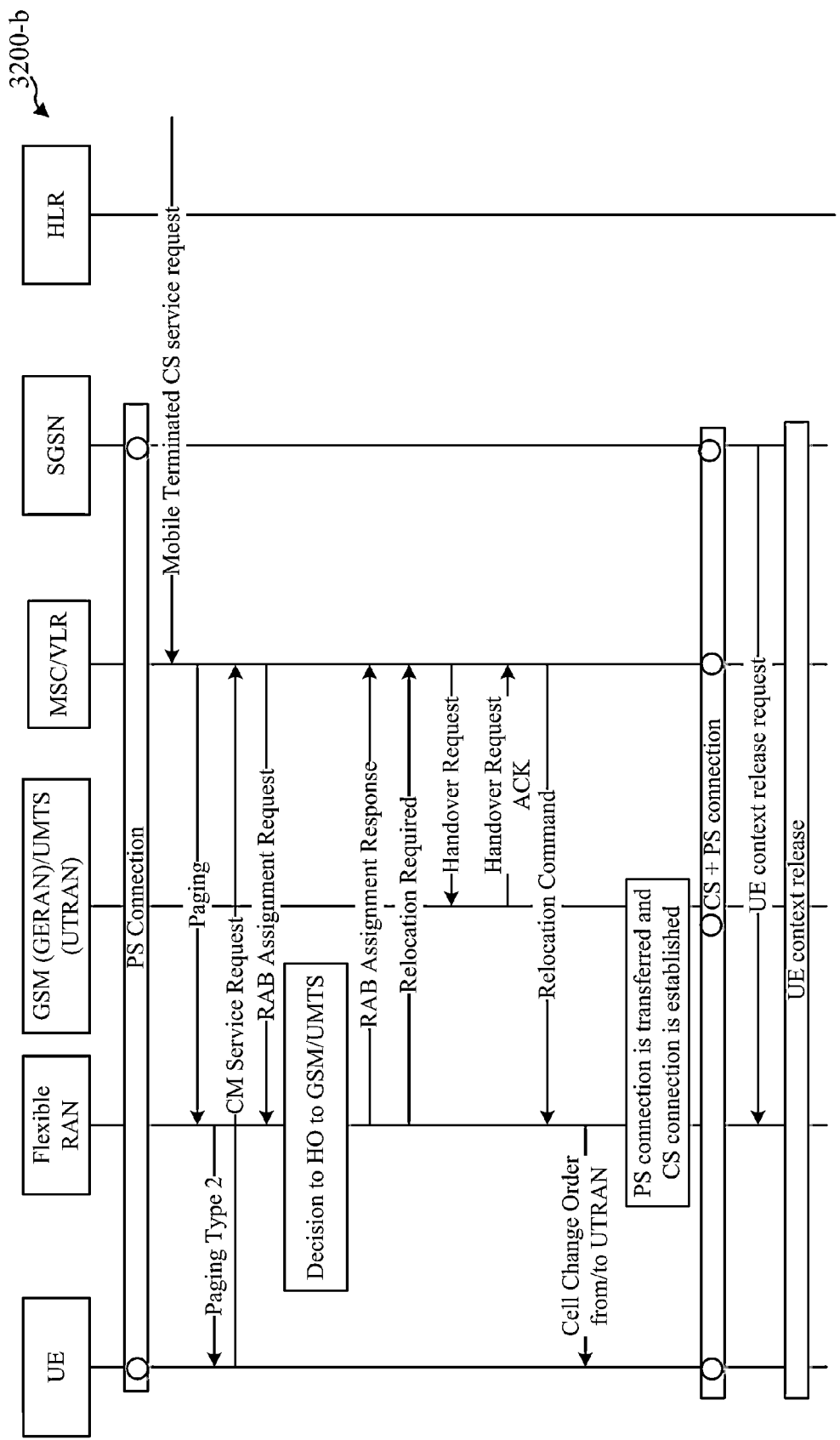
FIG. 32B shows a call flow in accordance with various embodiments.

Some embodiments utilizing cell change order involve one or more MT scenarios. FIG. 32B shows an example of a call flow 3200-b for an MT scenario in accordance with various embodiments. For a MT voice call, for example, the MSC may send Page to a flexible bandwidth RNC. The flexible bandwidth RNC may page the UE and UE may send CM Service Request. The MSC may send RAB Assignment Request to the flexible bandwidth RAN based on information. The flexible bandwidth UTRAN may send RAB Assignment Response message to MSC and may immediately after send Relocation Required message to MSC. The MSC may initiate flexible bandwidth UTRAN to GERAN handover and flexible bandwidth RNC may send Cell Change Order from/to UTRAN command to UE with "GSM Info". "UMTS Info" may be added in some cases. The Core Network may let flexible bandwidth UTRAN know that PS call may have been transferred. The flexible bandwidth UTRAN may release the dedicated resources assigned to the UE (radio resources and/or UE context information, for example).

Some embodiments provide for transitioning or fallback from a flexible bandwidth system to a non-flexible bandwidth system and/or to a circuit-switched voice supporting system utilizing service-based handover. For example, a CN may be aware that flexible bandwidth RAN, such as a flexible bandwidth UTRAN, may not support native voice (network preference). The MSC/CN may be configured to conduct SBHO to GSM (Service Based Handover) or other network for voice services. For a MT voice call, the MSC may send Page to the flexible bandwidth RNC. The flexible bandwidth UMTS RNC may page the UE and the RRC connection may be established as needed. After Direct Transfer message have been exchanged between UE and MSC, the MSC may send RAB Assignment Request (indicating handover to GSM may be performed in Service Handover IE). Flexible bandwidth UTRAN may send RAB Assignment Response message to MSC and may immediately after send Relocation Required message to MSC. MSC may initiate flexible bandwidth UTRAN to GERAN handover and flexible bandwidth RNC sends Handover from UTRAN command to UE. As discussed above, for SBHO procedures, the voice fallback decision may be made by the core network entities such as the MSC and respective RAN is notified by using the RAB assignment message with a service-based handover information element (IE). For example, a Core Network (CN) may be aware that flexible bandwidth RAN, such as a flexible UTRAN, may not support CS voice (network preference). The MSC/CN may be configured to conduct Service Based Handover (SBHO) to GSM, to normal bandwidth UTRAN or other network for voice services. For a MT voice call, the MSC may send Page to the flexible RNC. The flexible bandwidth UMTS RNC may page the user equipment and the UMTS RRC connection may be established as needed. After Direct Transfer messages have been exchanged between user equipment and MSC, the MSC may send a RAB Assignment Request (for example, indicating handover to GSM may be performed using a Service-based Handover IE). The flexible bandwidth UTRAN may send RAB Assignment Response message to MSC accepting the handover. The flexible bandwidth UTRAN may immediately after send Relocation Required message through the MSC to the to the GERAN to reserve resources for the UE. When the flexible RAN receives acknowledge that the GERAN is ready for the handover, the flexible bandwidth RNC (in the flexible RAN) may notifies the UE by sending a "Handover from UTRAN" command.

Figure 33:
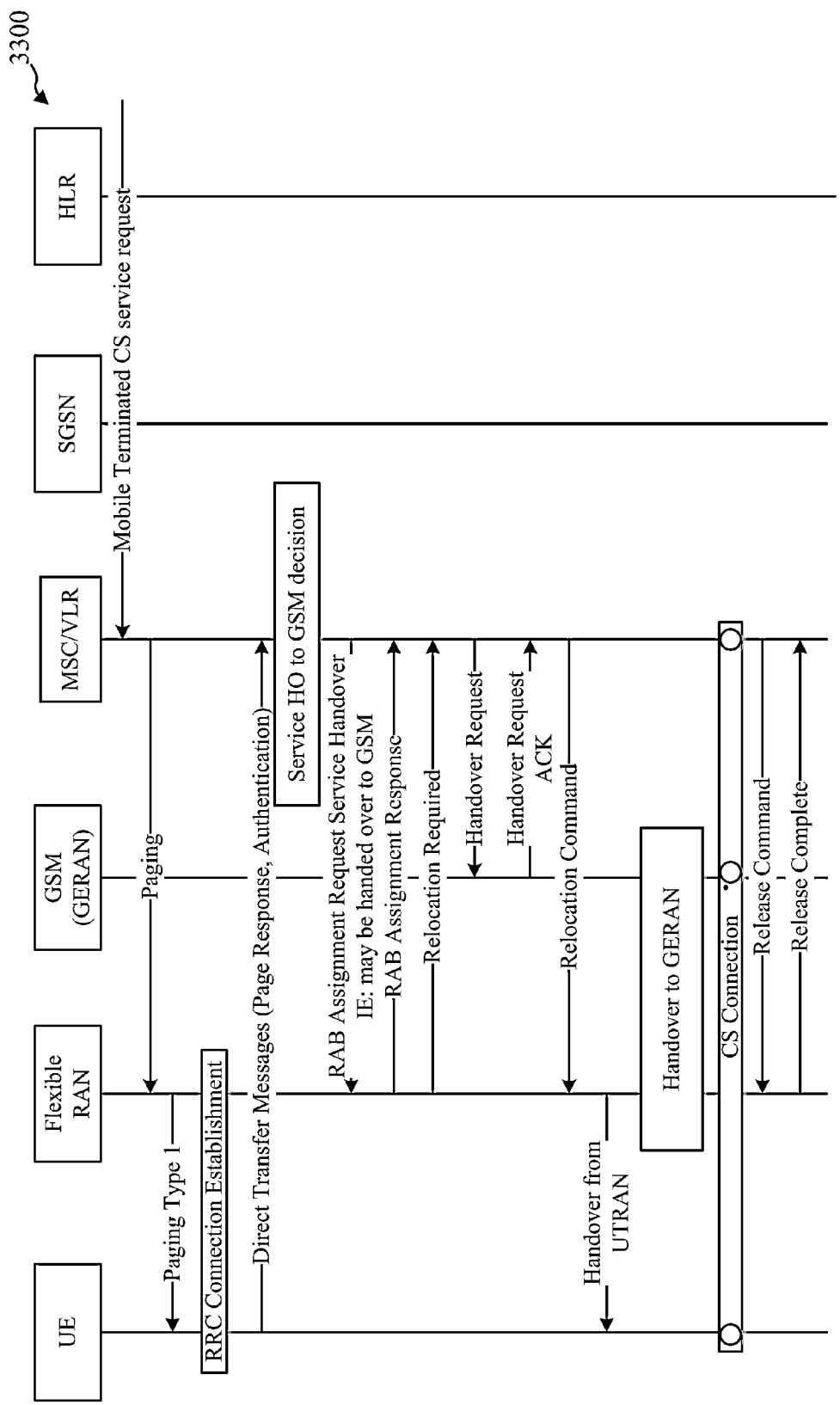
FIG. 33 shows a call flow in accordance with various embodiments.

In some cases, there may be no equivalent SBHO for flexible bandwidth UTRAN to UTRAN. FIG. 33 shows an example of a call flow 3300 for flexible bandwidth UTRAN to GERAN SBHO (for MT CS). Similar call flows may be utilized for MO CS SBHO to GSM may work for CS voice calls typically for existing networks. SMS and/or CS Data may be supported on flexible bandwidth UTRAN. SBHO may typically be exercised when there is no PS connection. With ongoing PS connection, multi RAB call setup may typically be done on UMTS. The behavior for the flexible bandwidth UTRAN may be changed.

Some embodiments provide for transitioning or fallback from a flexible bandwidth system to a non-flexible bandwidth system and/or to a circuit-switched voice supporting system utilizing RAN Redirection. For example, a UE may be camping on a flexible bandwidth RAN, such as a flexible bandwidth UTRAN. The flexible bandwidth UTRAN may handle transition or voice fallback without core network (CN) being aware that flexible bandwidth UMTS may not support voice. CN may support CS+PS Attach over flexible bandwidth UTRAN by registering the UE on flexible bandwidth UTRAN LA and RA for both CS and PS calls. When there is MO/MT CS voice call, flexible bandwidth UTRAN may redirect UE to other RANs for coverage (as if UE reached end of coverage area for flexible bandwidth UTRAN, for example) and/or capacity (as if flexible bandwidth UTRAN's admission control kicks in, for example). At the CN, the CS call may be transferred to the MSC supporting the GSM or UMTS, for example. Implementation may be easier if the same MSC serves the flexible bandwidth UTRAN and GSM or UMTS networks. It may be abstracted at that flexible bandwidth UTRAN may not support CS voice.

As discussed above, for RAN redirection procedures, the decision to fallback to another network in order to answer an MT/MO voice call may be made by the RAN and communicated to the CN and the UE. This procedure could be used in scenarios where the CN is not aware of whether or not the RAN supports voice services. For example, a user equipment may be camping on a flexible bandwidth RAN, such as a flexible bandwidth UTRAN. The flexible bandwidth UTRAN may handle transition or voice fallback without core network (CN) being aware that flexible bandwidth UTRAN may not support voice. CN may support CS and PS Attach over flexible bandwidth UTRAN by registering the user equipment on flexible bandwidth UTRAN LA and RA for both CS and PS calls. When there is a MO/MT CS voice call, the flexible bandwidth UTRAN may redirect user equipment to other RANs for reasons such as coverage (as if user equipment reached end of coverage area for flexible UTRAN, for example) and/or capacity (as if flexible bandwidth UTRAN's admission control indicates a loaded system, for example). When the CN is notified, the CS call may be transferred to a GERAN or UTRAN through the MCS, for example. Implementation may be easier if the same MSC serves the flexible bandwidth UTRAN and GERAN/UTRAN. There may be several flavors for implementing the RAN redirection. In one example, the flexible bandwidth UMTS RNC may always reject RAB Assignment request from MSC (for voice, not necessarily for SMS) and may initiate the Relocation Preparation procedure (through the MSC) with a cell on the GERAN/UTRAN. The flexible bandwidth UTRAN may order some UE measurements on cells in the GERAN/UTRAN to identify the target cell for the voice fallback. The rejection in the RAB response message to the MSC may indicate a message such as "RABs Failed To Setup Or Modify List" or "Relocation required". When the "RABs Failed To Setup Or Modify List" message is included, possible causes may include "Relocation Triggered", "Relocation desirable for radio reasons", "Directed Retry", "Reduce Load in Serving Cell", "Requested Traffic Class not Available", etc. Possible causes when the "Relocation required" message is indicated could be "Time critical Relocation", "Resource optimization relocation", "Relocation desirable for radio reasons", "Directed Retry", "Reduce Load in Serving Cell" etc. Once the Relocation procedure is completed and resources are reserved on the target cell for the UE, the flexible bandwidth user equipment may tune to GERAN/UTRAN and continue the handover to set-up the CS connection. The Directed Retry mechanism and Load Based Handover (LBHO) may work for flexible bandwidth UTRAN to GERAN mobility while Inter-Frequency Load Based HO works for flexible bandwidth UTRAN to UTRAN mobility. In another example flexible bandwidth UMTS user equipment may send RRC Connection Request to flexible bandwidth UTRAN with Establishment cause and domain type information for to initiate a fallback for an MO/MT CS voice call. In this case, the flexible bandwidth UTRAN may know whether it is originating conversational call, terminating conversational call and therefore, while set-up the RRC connection, may send a RRC Connection Reject with Redirection Info for CS voice calls only. The Rejection Cause in RRC Connection Reject may be "congestion" or "unspecified". This example may be used when there may be no ongoing PS connection, for example.

In some embodiments, an MSC may send RAB Assignment Request for CS voice call in. A RNC may reject RAB Assignment from MSC (for voice, not necessarily for SMS, for example) and may initiate the Relocation Preparation procedure. Cause for "RABs Failed To Setup Or Modify List" may be Relocation Triggered, Relocation desirable for radio reasons, Directed Retry, Reduce Load in Serving Cell, Requested Traffic Class not Available etc. Cause for Relocation Required may be "Time critical Relocation", "Resource optimisation relocation", "Relocation desirable for radio reasons", "Directed Retry", "Reduce Load in Serving Cell", etc. A flexible bandwidth capable UE may tune to GSM or UMTS frequency, for example, and may respond to page.

Figure 34:
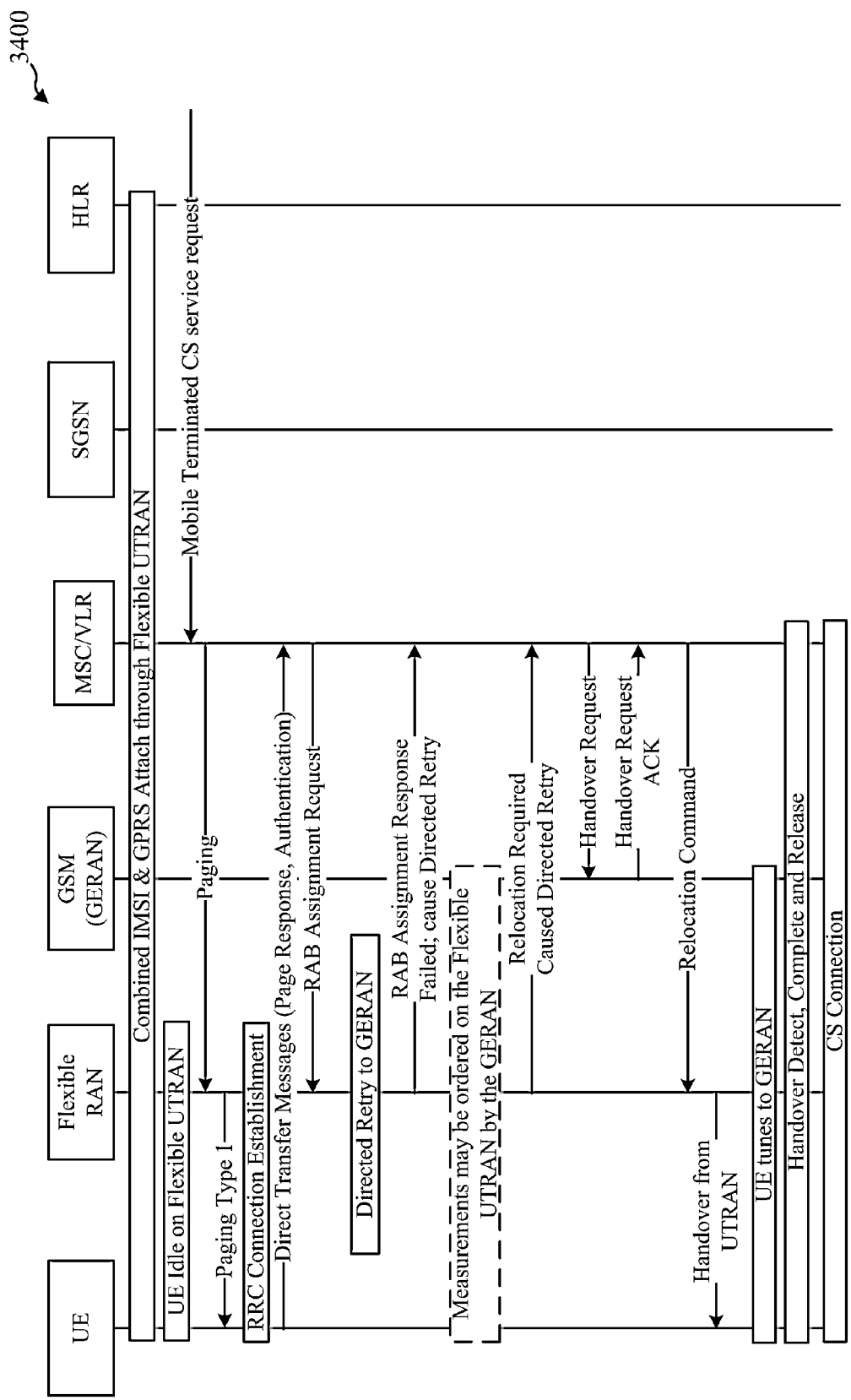
FIG. 34 shows a call flow in accordance with various embodiments.
Figure 35A:
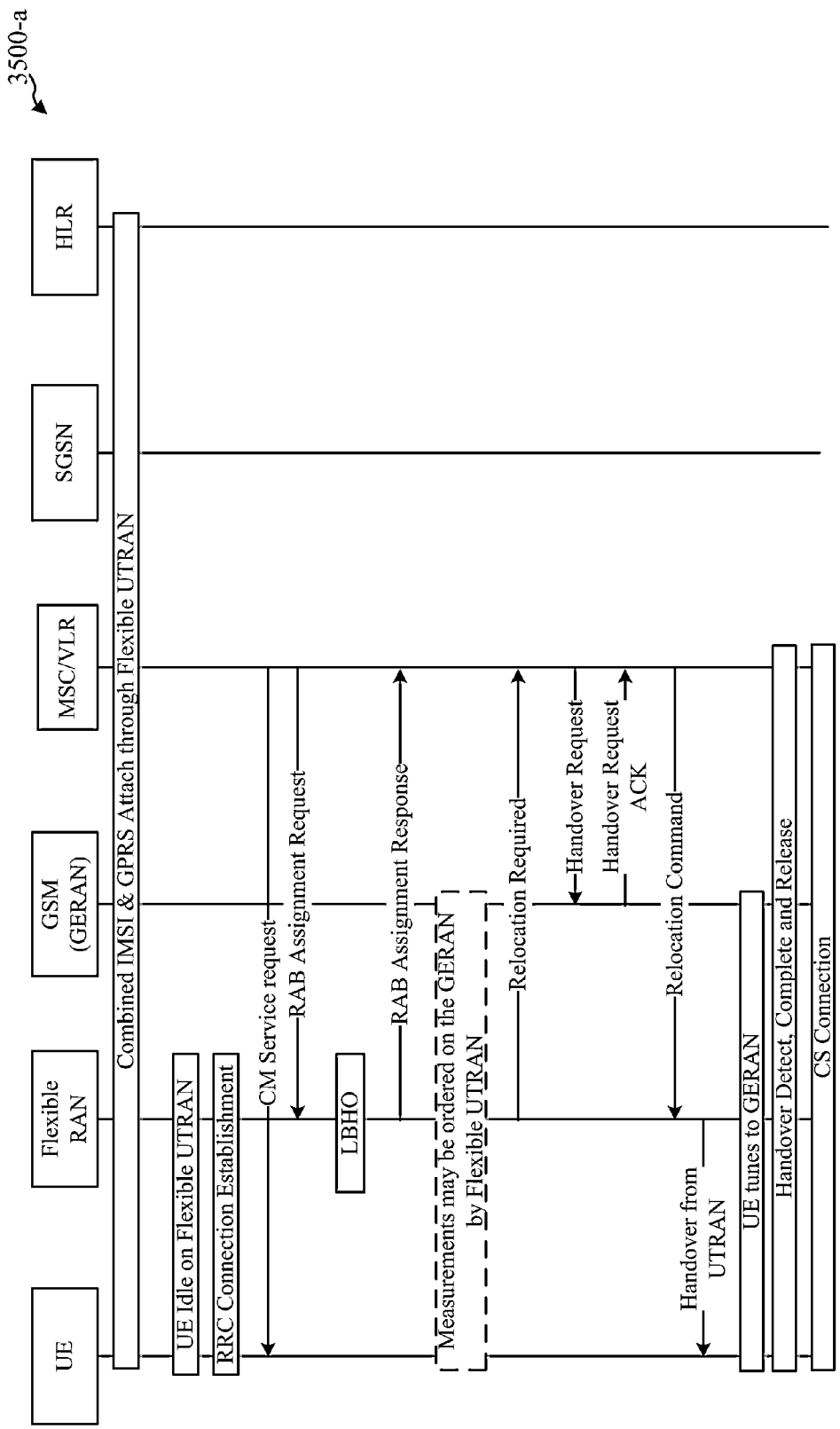
FIG. 35A shows a call flow in accordance with various embodiments.
Figure 35B:
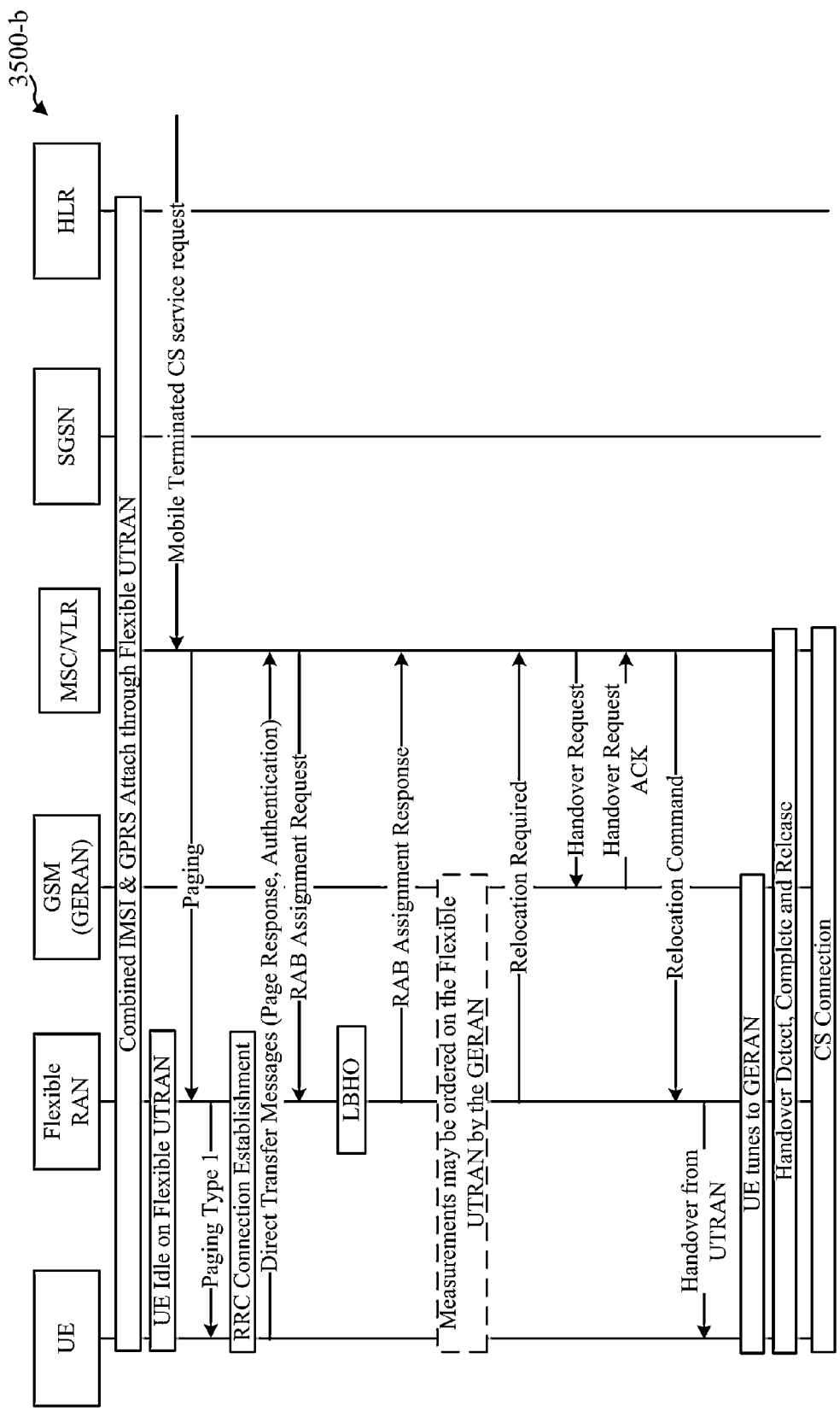
FIG. 35B shows a call flow in accordance with various embodiments.
Figure 36A:
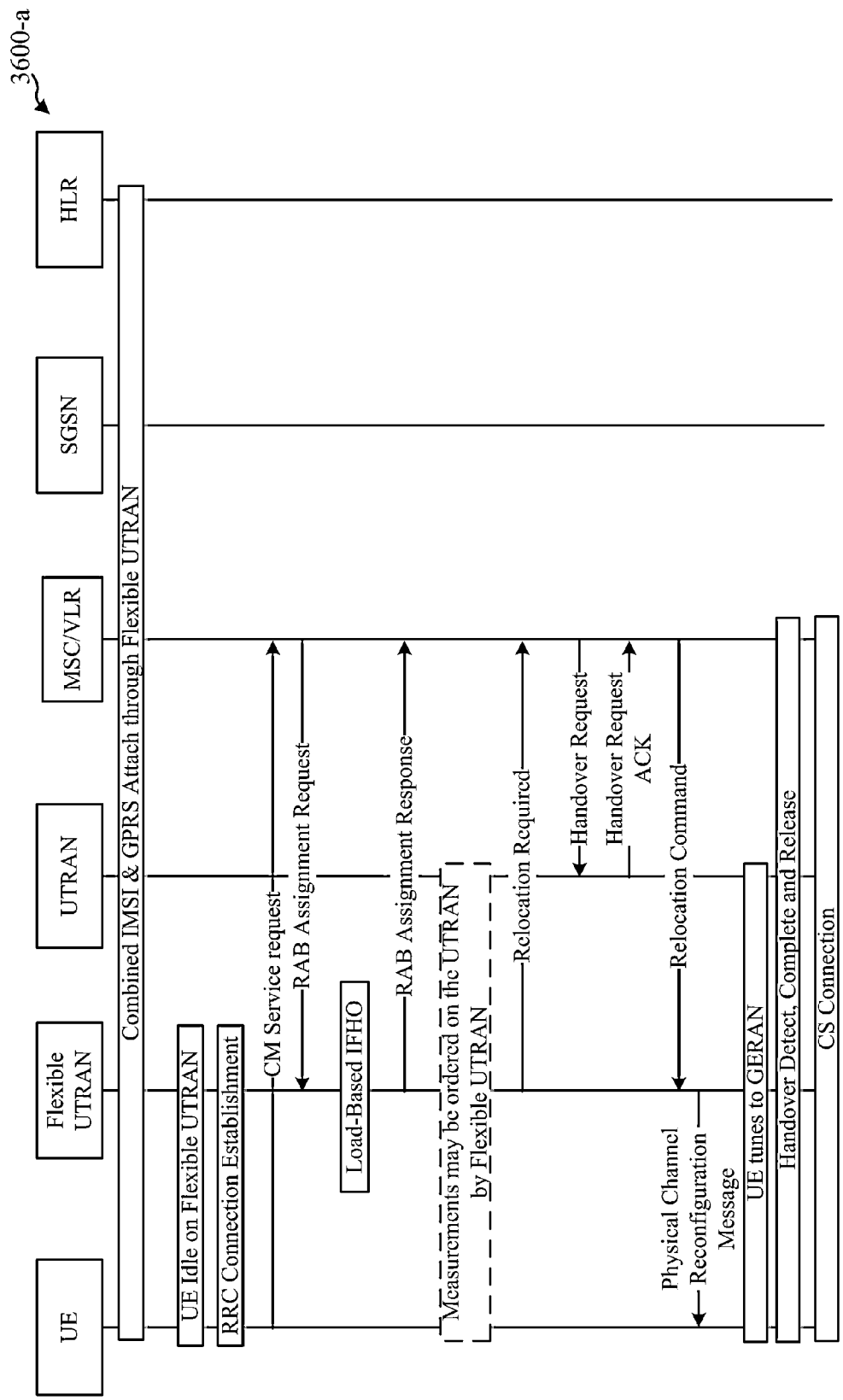
FIG. 36A shows a call flow in accordance with various embodiments.
Figure 36B:
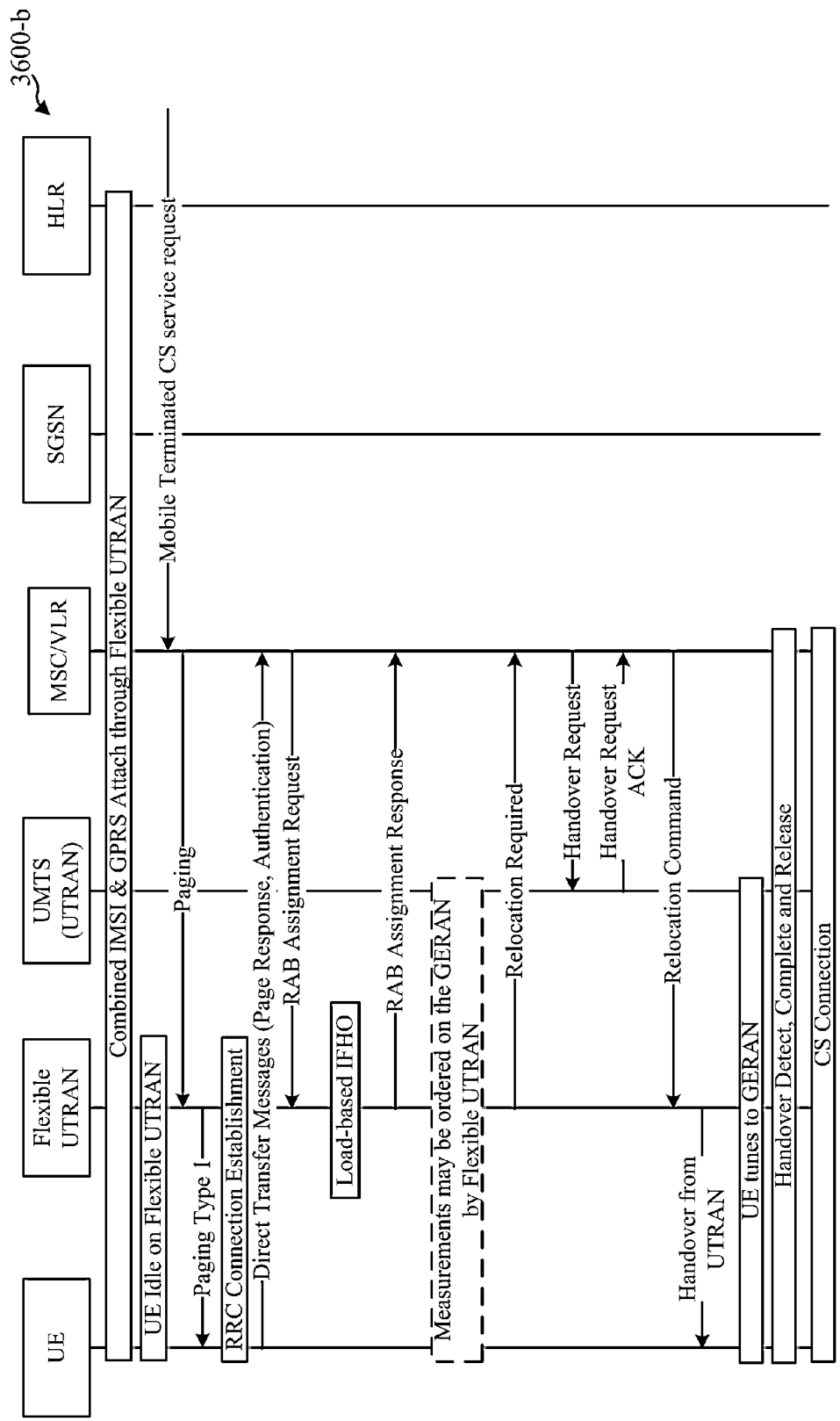
FIG. 36B shows a call flow in accordance with various embodiments.
Figure 36C:
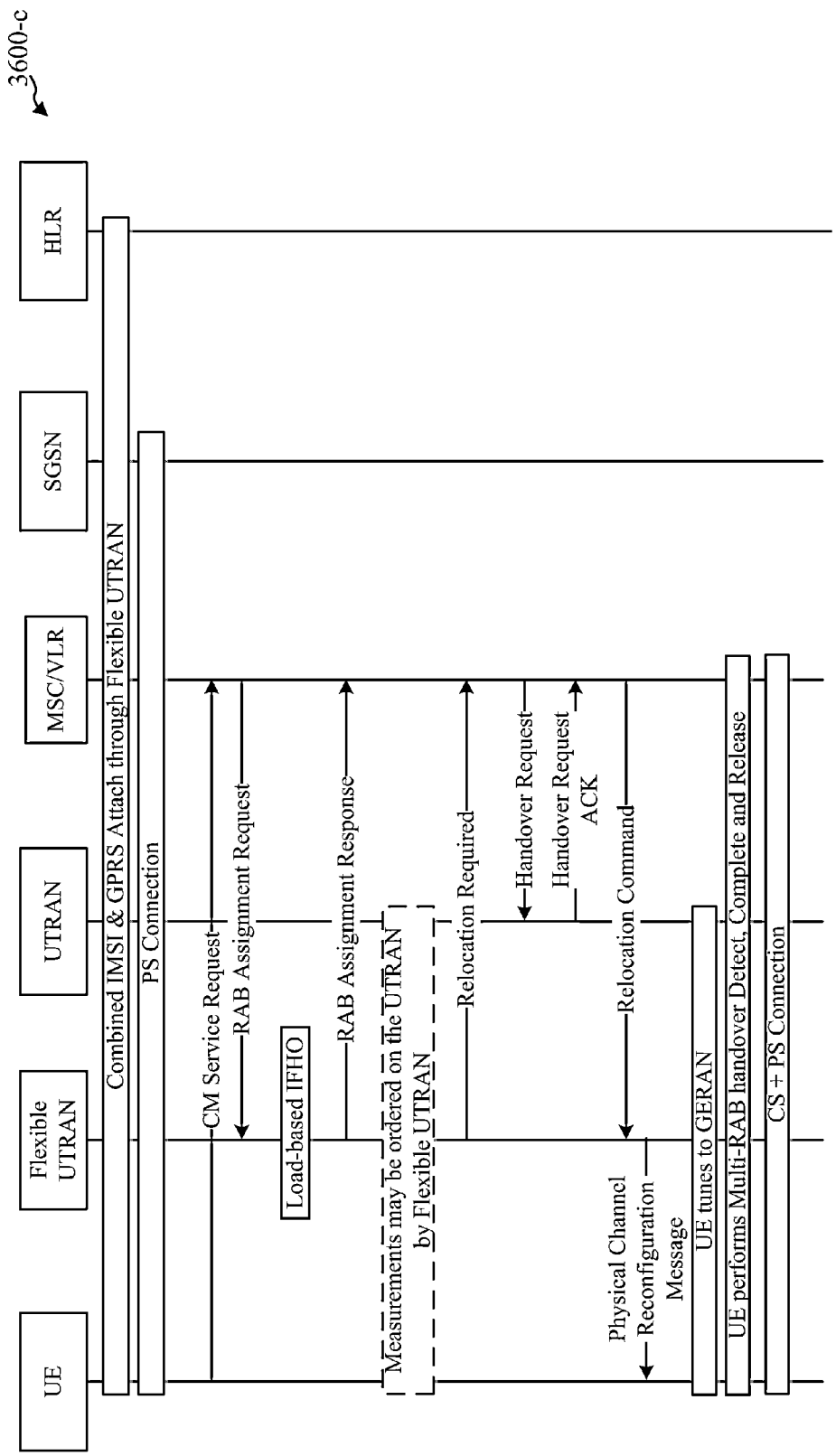
FIG. 36C shows a call flow in accordance with various embodiments.

Some embodiments may provide different options for the above RAN redirection approach. For example, some embodiments include directed retry (flexible bandwidth UTRAN to GSM, for example). Some embodiments include load-based options including, but not limited to, load-based handover (flexible bandwidth UTRAN to GERAN, for example) and/or inter-frequency load-based HO (flexible bandwidth UTRAN to UMTS, for example). These embodiments may work for CS voice calls typically for existing networks. SMS and CS Data may be supported on the flexible bandwidth UTRAN. These embodiments may be exercised when there is no PS connection, though some may be exercised when there is a PSC connection. With ongoing PS connection, multi RAB call setup may be done on UMTS. Behavior for flexible bandwidth UTRAN may be changed. FIG. 34 shows an example of a call flow 3400 for a flexible bandwidth UTRAN to GERAN utilizing directed retry for establishing an MT CS in accordance with various embodiments. FIG. 35A shows an example of a call flow 3500-*a* for a flexible bandwidth UTRAN to GERAN utilizing a load-based handover for establishing an MT CS in accordance with various embodiments. FIG. 35B shows an example of a call flow 3500-*b* in accordance with various embodiments. In call flows 1800, the RNC may send Relocation Required with cause value "Reduce Load in Serving Cell" etc. (e.g., "Time critical Relocation", "Resource optimization relocation", "Relocation desirable for radio reasons", "Directed Retry", "Reduce Load in Serving Cell", "Access Restricted Due to Shared Networks", "No Iu CS UP relocation"). FIG. 36A shows an example of a call flow 3600-*a* in accordance with various embodiments. FIG. 36B shows an example of a call flow 3600-*b* in accordance with various embodiments. FIG. 36C shows an example of a call flow 3600-*c* in accordance with various embodiments. In some embodiments, the RNC sends Relocation Required with cause value "Reduce Load in Serving Cell" etc. Some embodiments may be treated as inter-frequency hard HO between two UMTS frequencies or Inter-RAT HO to UTRAN.

Figure 37A:
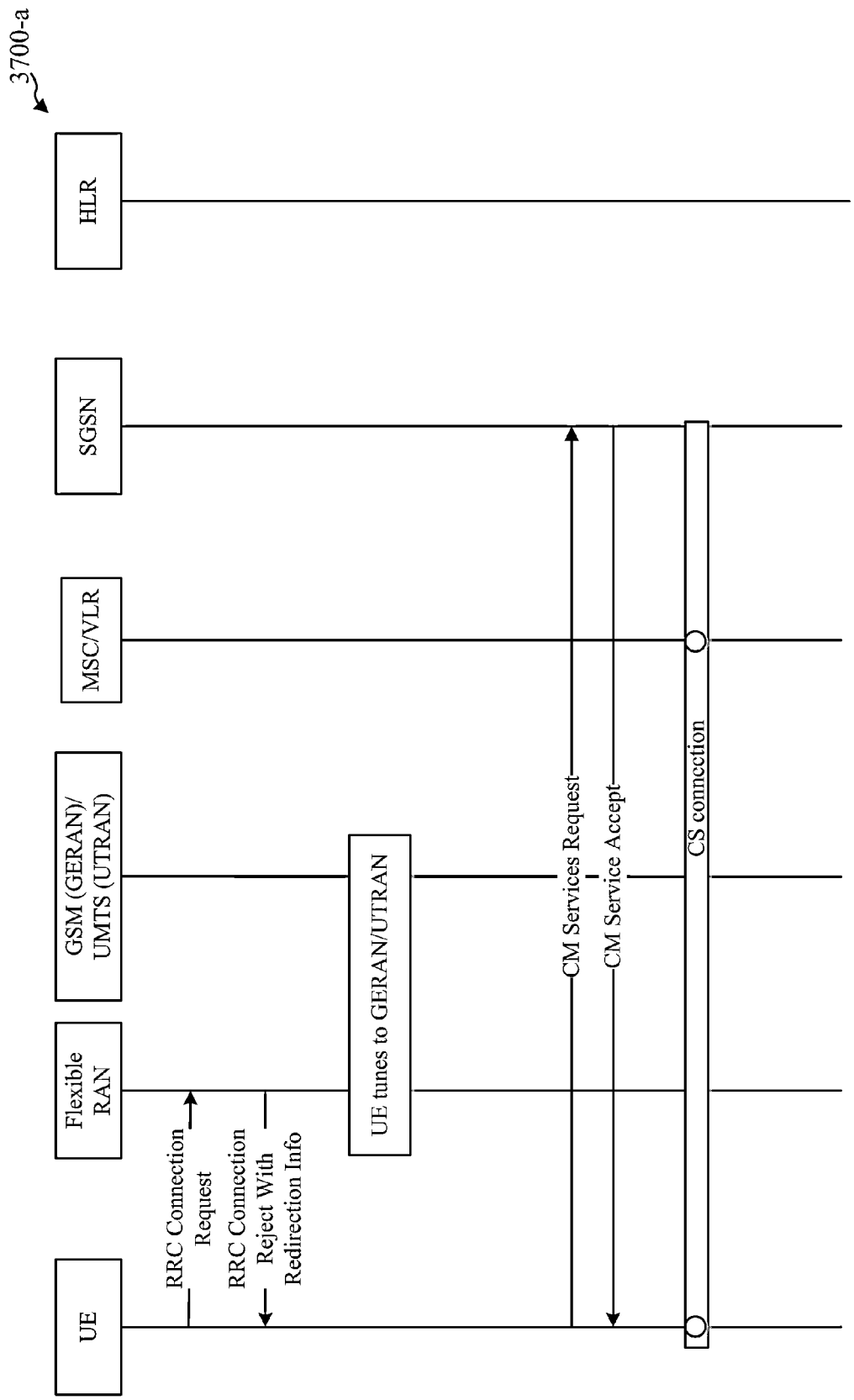
FIG. 37A shows a call flow in accordance with various embodiments.
Figure 37B:
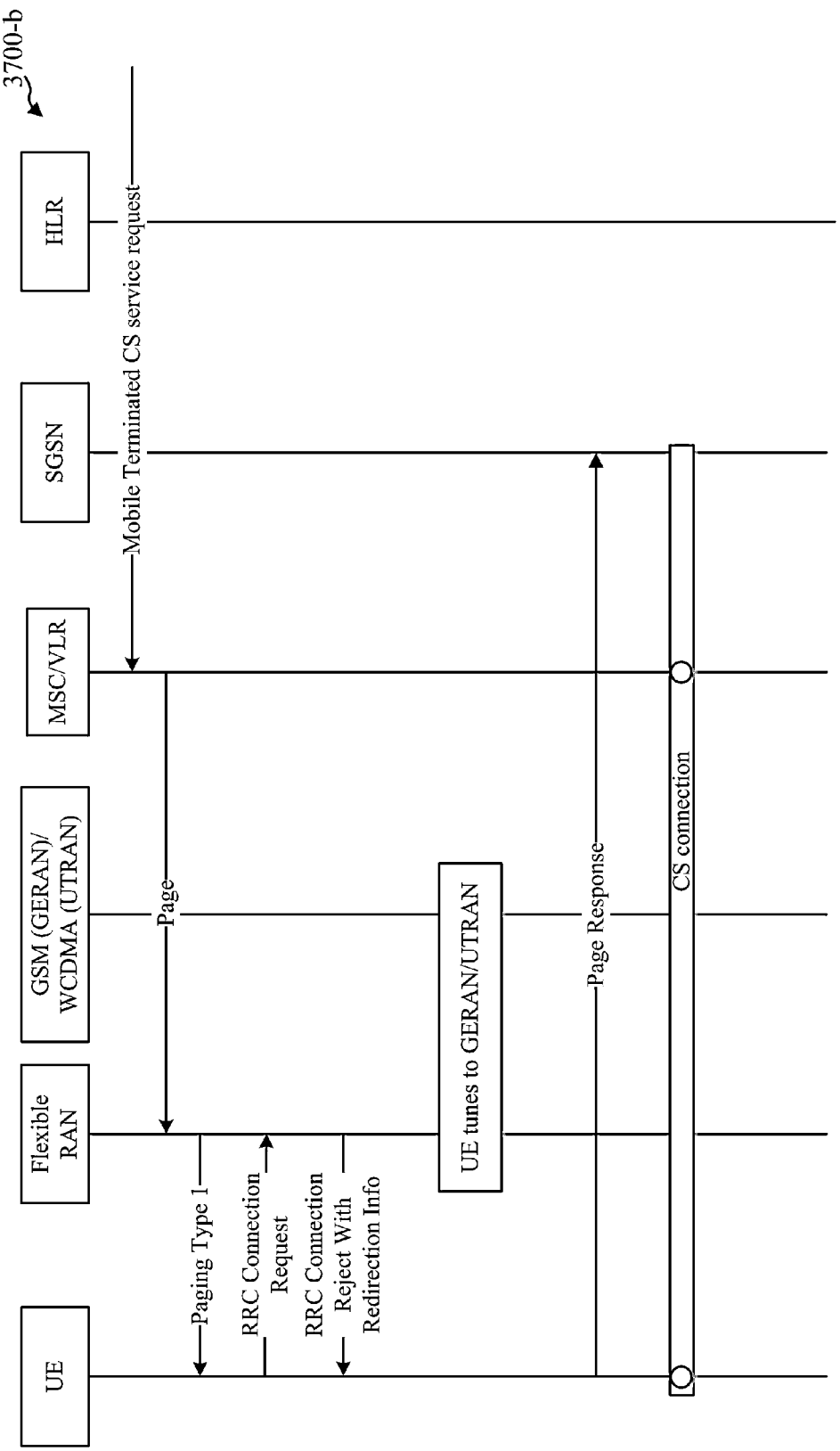
FIG. 37B shows a call flow in accordance with various embodiments.

Some embodiments utilize other RAN redirection approaches. For example, a UE may send an RRC Connection Request to flexible bandwidth RAN, such as a flexible bandwidth UTRAN. RRC Connection Request may have Establishment cause and domain type information. The flexible bandwidth UTRAN may know whether it is originating conversational call, terminating conversational call. The flexible bandwidth UTRAN may send RRC Connection Reject with Redirection Info for CS voice calls only. Rejection Cause in RRC Connection Reject may be congestion or unspecified. Some embodiments may be used when there is no ongoing PS connection, though there may be an ongoing PS connection in some cases. Some embodiments that include RAN redirection may include Redirection Info that may contain inter-RAT info; this may define target system for redirected cell selection (i.e., GSM). From Rel 6 onwards, cell specific information may be provided for target system. Some embodiments may include Redirection Info that may contain frequency information. Some of these embodiments may be treated as inter-frequency redirection. FIG. 37A shows an example of a call flow 3700-*a* for a RAN redirection approach (MO) in accordance with various embodiments. FIG. 37B shows an example of a call flow 3700-*b* for a RAN redirection approach (MT) in accordance with various embodiments.

Some embodiments provide for transitioning or fallback from a flexible bandwidth system to a non-flexible bandwidth system and/or to a circuit-switched voice supporting system utilizing tune away by the UE. For example, a UE can be idle or connected in flexible bandwidth RAN, such as flexible bandwidth UTRAN, and may tune away periodically to monitor pages in GSM or UMTS, for example. In some cases, the network may send CS pages over GSM or UMTS. The tune away may be with assistance of flexible bandwidth UTRAN where flexible bandwidth UTRAN may configure compressed mode for UE to tune away and monitor pages in GSM or UMTS. The tune away may also be without assistance from flexible bandwidth UTRAN, like 1x/DO model. Hit in connected mode for the flexible bandwidth system may be more than 1x/DO model as time may be stretched in flexible bandwidth system. The flexible bandwidth capable UE implementation may handle the voice fallback without RAN Redirection or Handover in some cases.

Furthermore, as discussed above, for these tune away procedures, a user equipment can be idle or connected mode on the flexible bandwidth RAN, such as flexible bandwidth UTRAN that does not support voice services, and may tune away periodically to monitor pages in other RATs e.g. GSM or UMTS. In some cases, the network may send CS pages over GSM or UMTS. The tune away may be with assistance of flexible bandwidth UTRAN where flexible bandwidth UTRAN may configure compressed mode for user equipment to tune away and monitor pages in GSM or UMTS. The tune away may also be without assistance from flexible bandwidth UTRAN, similar to some implementations in 1x/DO networks. The lack of coordination from the flexible bandwidth UTRAN might lead to performance degradation of the connection the flexible bandwidth UTRAN if the UE is in connected mode. This perform penalty for a UE in connected mode on the flexible system may be expected to be more than that of the 1x/DO model because of time stretched nature of the flexible system.

Figure 38:
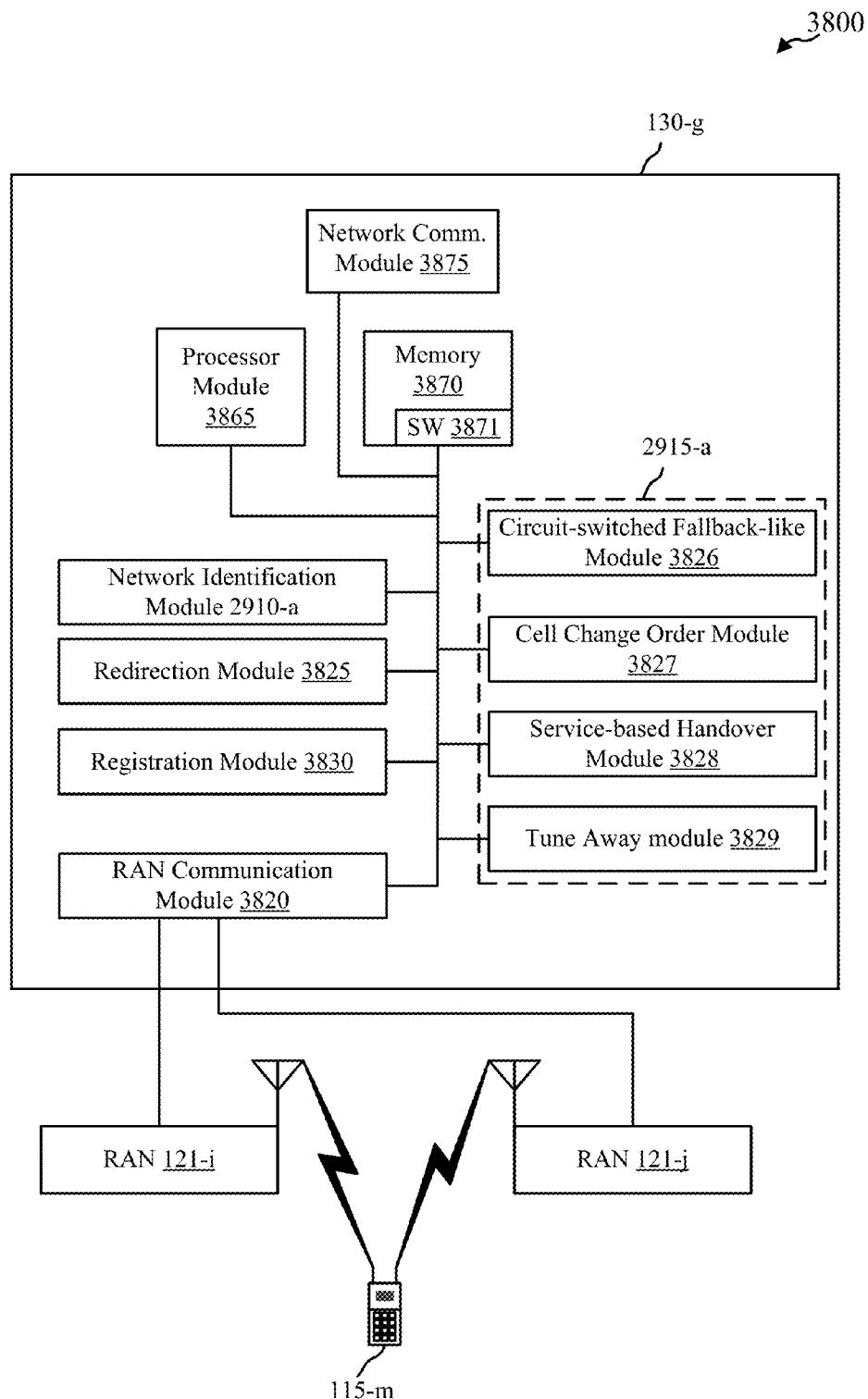
FIG. 38 shows a block diagram of a communications system configured for providing mobility for wireless communications systems in accordance with various embodiments.

FIG. 38 shows a block diagram of a communications system 3800 that may be configured for utilizing mobility for wireless communications systems in accordance with various embodiments. This system 3800 may be an example of aspects of the system 100 depicted in FIG. 1, systems 200 of FIG. 2, systems 300 of FIG. 3, and/or system 4200 of FIG. 42. The core network 130-g may include memory 3870, and a processor module 3865, which each may be in communication, directly or indirectly, with each other (e.g., over one or more buses). In some cases, the core network 130-g may communicate with other aspects of the network communications module 3875. System 3800 may be configured to implement different aspects of the call flows and/or systems as shown in FIGS. 30-37 and/or associated descriptions.

Core network 130-g may also communicate with radio access networks 121-i/121-j 105. Radio access networks 121 may be co-located in some cases, or separated located. In some cases, radio access networks 121 may include flexible capable radio access networks and/or normal radio access networks. Radio access networks 121 may be in wireless communication with user equipment 115-m, which may be flexible capable. In some cases, core network 130-g may communicate with radio access networks 121 utilizing radio access network communication module 3820. Radio access networks 121 may include aspects of base stations 105 and/or controllers 120 as show in the other figures.

The memory 3870 may include random access memory (RAM) and read-only memory (ROM). The memory 3870 may also store computer-readable, computer-executable software code 3871 containing instructions that are configured to, when executed, cause the processor module 3865 to perform various functions described herein (e.g., call processing, database management, message routing, etc.). Alternatively, the software 3871 may not be directly executable by the processor module 3865 but be configured to cause the computer, e.g., when compiled and executed, to perform functions described herein.

The processor module 3865 may include an intelligent hardware device, e.g., a central processing unit (CPU) such as those made by Intel® Corporation or AMD®, a microcontroller, an application-specific integrated circuit (ASIC), etc. The processor module 3865 may include a speech encoder (not shown) configured to receive audio via a microphone, convert the audio into packets (e.g., 20 ms in length) representative of the received audio, provide the audio packets, and provide indications of whether a user is speaking. The processor module 3865 may also include a speech decoder that may perform a reverse functionality as the speech encoder.

According to the architecture of FIG. 38, the core network 130-g may further include a RAN communications module 3820. The RAN communications management module 3820 may manage communications other aspects of communication, such as communication with user equipment 115-m and/or RANs 121-i/121-j. By way of example, the RAN communications module 3820 may be a component of the core network 130-g in communication with some or all of the other components of the core network 130-g via a bus. Alternatively, functionality of the RAN communications module 3820 may be implemented as a computer program product, and/or as one or more controller elements of the processor module 3865.

The components for core network 130-g may be configured to implement aspects discussed above with respect to device 2900 in FIG. 29 and/or device 2200 of FIG. 22 and may not be repeated here for the sake of brevity. The network identification module 2910-a may be an example of the network identification module 2900 of FIG. 29. The fallback module 2915-a may be an example of the fallback module 2915 of FIG. 29. The fallback module 2915-a may include different modules, such a circuit-switched fallback-like module 3826, a cell change order module 3827, a service based handover module 3828, and/or a tune away module 3829.

The core network 130-g may also include a redirection module 3825 that may be utilized to perform redirection procedures of the user equipment 115-m from one radio access network 121 to another. For example, the redirection module 3825 may perform a redirection procedure of the user equipment 115-m from RAN 121-i to one of the radio access networks 121, such as RAN 121-j. The core network 130-g may also include a registration module 3820 to register user equipment 115-m with respect to different RANs 121.

Figure 39:
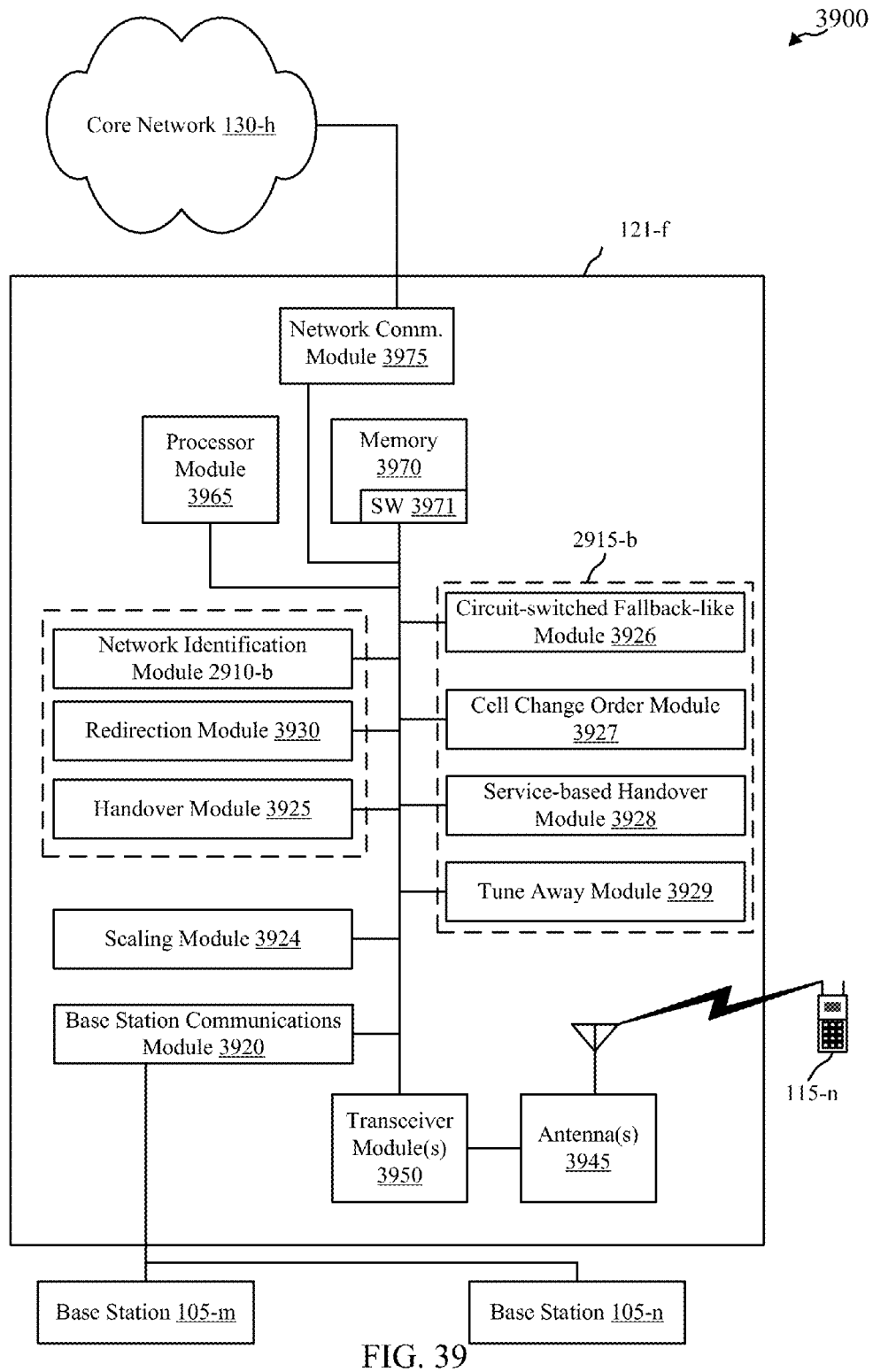
FIG. 39 shows a block diagram of a communications system configured for providing mobility for wireless communications systems in accordance with various embodiments.

FIG. 39 shows a block diagram of a communications system 3900 that may be configured for utilizing mobility for wireless communications systems in accordance with various embodiments. This system 3900 may be an example of aspects of the system 100 depicted in FIG. 1, systems 200 of FIG. 2, systems 300 of FIG. 3, and/or system 4200 of FIG. 42. The radio access network 121-f may include aspects of a base station 105 and/or a controller 120 to represent a combined system and/or separate components that may comprise part of a radio access network. The radio access network 121-f may include antennas 3945, a transceiver module 3950, memory 3970, and a processor module 3965, which each may be in communication, directly or indirectly, with each other (e.g., over one or more buses). The transceiver module 3950 may be configured to communicate bi-directionally, via the antennas 3945, with the user equipment 115-n, which may be a multi-mode user equipment. The transceiver module 3950 (and/or other components of the radio access network 121-f) may also be configured to communicate bi-directionally with one or more networks. In some cases, the radio access network 121-f may communicate with the network 130-h through network communications module 3975. Radio access network 121-f may be an example of an eNodeB base station, a Home eNodeB base station, a NodeB base station, and/or a Home NodeB base station. System 3900 may be configured to implement different aspects of the call flows and/or systems as shown in FIGS. 30-37 and/or associated description.

Radio access network 121-f may also communicate with base stations 105, such as base station 105-m and base station 105-n. Each of the base stations 105 may communicate with user equipment 115-n using different wireless communications technologies, such as different Radio Access Technologies. In some cases, radio access network 121-f may communicate with other base stations such as 105-m and/or 105-n utilizing base station communication module 3920. In some embodiments, base station communication module 3920 may provide an X2 interface within an LTE wireless communication technology to provide communication between some of the base stations 105. In some embodiments, radio access network 121-f may communicate with other base stations through network 130-h.

The memory 3970 may include random access memory (RAM) and read-only memory (ROM). The memory 3970 may also store computer-readable, computer-executable software code 3971 containing instructions that are configured to, when executed, cause the processor module 3965 to perform various functions described herein (e.g., call processing, database management, message routing, etc.). Alternatively, the software 3971 may not be directly executable by the processor module 3965 but be configured to cause the computer, e.g., when compiled and executed, to perform functions described herein.

The processor module 3965 may include an intelligent hardware device, e.g., a central processing unit (CPU) such as those made by Intel® Corporation or AMD®, a microcontroller, an application-specific integrated circuit (ASIC), etc. The processor module 3965 may include a speech encoder (not shown) configured to receive audio via a microphone, convert the audio into packets (e.g., 20 ms in length) representative of the received audio, provide the audio packets, and provide indications of whether a user is speaking. The processor module 3965 may also include a speech decoder that may perform a reverse functionality as the speech encoder.

The transceiver module 3950 may include a modem configured to modulate the packets and provide the modulated packets to the antennas 3945 for transmission, and to demodulate packets received from the antennas 3945. While some examples of the radio access network 121-f may include a single antenna 3945, the radio access network 121-f preferably includes multiple antennas 3945 for multiple links which may support carrier aggregation. For example, one or more links may be used to support macro communications with user equipment 115-n.

According to the architecture of FIG. 39, the radio access network 121-f may further include a base station communications module 3920. The base station communications management module 3920 may manage communications with other base stations 105. By way of example, the base stations communications management module 3920 may be a component of the radio access network 121-f in communication with some or all of the other components of the radio access network 121-f via a bus. Alternatively, functionality of the communications management module 3930 may be implemented as a computer program product, and/or as one or more controller elements of the processor module 3965.

The components for radio access network 121-f may be configured to implement aspects discussed above with respect to device 21900 in FIG. 29. The network identification module 2910-b may be an example of the network identification module 2900 of FIG. 29. The fallback module 2915-b may be an example of the fallback module 2915 of FIG. 29. The fallback module 2915-b may include different modules, such a circuit-switched fallback-like module 3926, a cell change order module 3927, a service based handover module 3928, and/or a tune away module 3929.

The radio access network 121-f may also include a redirection module 3930 that may be utilized to perform redirection procedures of the user equipment 115-n from base stations 105 to another. For example, the redirection module 3930 may perform a redirection procedure of the user equipment 115-n from base station 105-m to another base station 105-n. In some embodiments, a handover module 3925 may be utilized to perform handover procedures of the user equipment 115-n from one base station 105 to another. For example, the handover module 3925 may perform a handover procedure of the user equipment 115-n from radio access network 121-f to another where normal waveforms are utilized between the user equipment 115-n and one of the base stations and flexible bandwidth waveforms are utilized between the user equipment and another base station. A scaling module 3924 may be utilized to scale and/or alter chip rates to generate flexible bandwidth waveforms.

In some embodiments, the transceiver module 3950 in conjunction with antennas 3945, along with other possible components of radio access network 121-f, may transmit information regarding flexible bandwidth waveforms and/or scaling factors from the radio access network 121-f to the user equipment 115-n, to other base stations 105-m/105-n, or core network 130-h. In some embodiments, the transceiver module 3950 in conjunction with antennas 3945, along with other possible components of radio access network 121-f, may transmit information to the user equipment 115-f, to other base stations 105-m/105-n, or core network 130-h, such as flexible bandwidth waveforms and/or scaling factors, such that these devices or systems may utilize flexible bandwidth waveforms.

Figure 40:
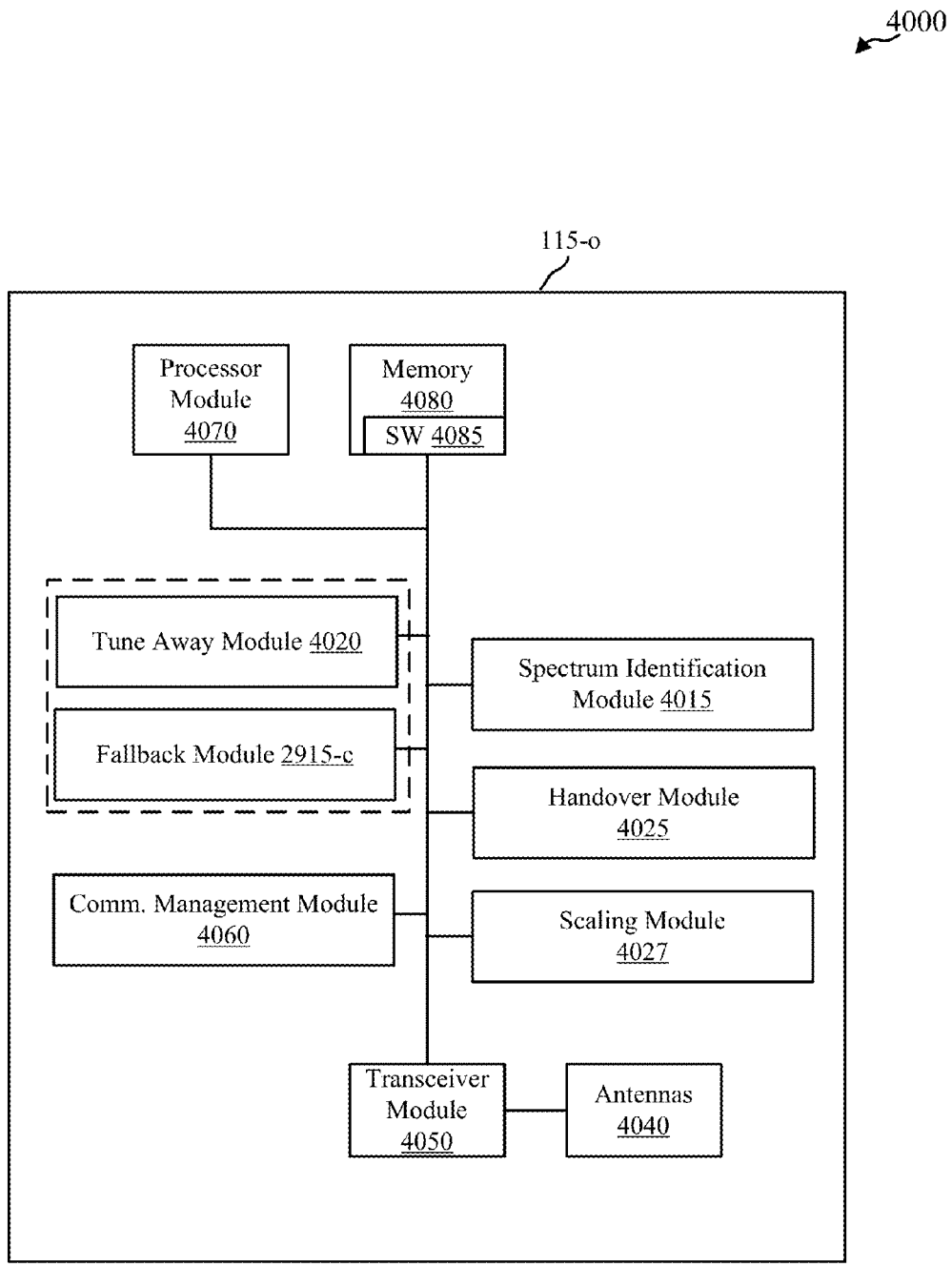
FIG. 40 shows a block diagram of a user equipment configured for mobility in accordance with various embodiments.

FIG. 40 is a block diagram 4000 of a user equipment 115-o configured for mobility in accordance with various embodiments. The user equipment 115-o may have any of various configurations, such as personal computers (e.g., laptop computers, netbook computers, tablet computers, etc.), cellular telephones, PDAs, digital video recorders (DVRs), internet appliances, gaming consoles, e-readers, etc. The user equipment 115-o may have an internal power supply (not shown), such as a small battery, to facilitate mobile operation. In some embodiments, the user equipment 115-o may be the user equipment 115 of FIG. 1, FIG. 2, FIG. 3, FIG. 38, FIG. 39, and/or FIG. 42, and/or the device 2900 of FIG. 29. The user equipment 115-o may be a multi-mode user equipment. The user equipment 115-o may be referred to as a wireless communications device in some cases. User equipment 115-o may be configured to implement different aspects of the call flows and/or systems as shown in FIGS. 30-37 and/or associated descriptions.

The user equipment 115-o may include antennas 4040, a transceiver module 4050, memory 4080, and a processor module 4070, which each may be in communication, directly or indirectly, with each other (e.g., via one or more buses). The transceiver module 4050 is configured to communicate bi-directionally, via the antennas 4040 and/or one or more wired or wireless links, with one or more networks, as described above. For example, the transceiver module 4050 may be configured to communicate bi-directionally with base stations 105 of FIG. 1, FIG. 2, FIG. 3, and/or FIG. 42; and/or the radio access networks 121 of FIG. 38 and/or FIG. 39. The transceiver module 4050 may include a modem configured to modulate the packets and provide the modulated packets to the antennas 4040 for transmission, and to demodulate packets received from the antennas 4040. While the user equipment 115-o may include a single antenna, the user equipment 115-o will typically include multiple antennas 4040 for multiple links.

The memory 4080 may include random access memory (RAM) and read-only memory (ROM). The memory 4080 may store computer-readable, computer-executable software code 4085 containing instructions that are configured to, when executed, cause the processor module 4070 to perform various functions described herein (e.g., call processing, database management, message routing, etc.). Alternatively, the software 4085 may not be directly executable by the processor module 4070 but be configured to cause the computer (e.g., when compiled and executed) to perform functions described herein.

The processor module 4070 may include an intelligent hardware device, e.g., a central processing unit (CPU) such as those made by Intel® Corporation or AMD®, a microcontroller, an application-specific integrated circuit (ASIC), etc. The processor module 4070 may include a speech encoder (not shown) configured to receive audio via a microphone, convert the audio into packets (e.g., 20 ms in length) representative of the received audio, provide the audio packets, and provide indications of whether a user is speaking. The processor module 4070 may also include a speech decoder that may perform a reverse functionality as the speech encoder.

According to the architecture of FIG. 40, the user equipment 115-o may further include a communications management module 4060. The communications management module 4060 may manage communications with base stations. By way of example, the communications management module 4060 may be a component of the user equipment 115-*o* in communication with some or all of the other components of the user equipment 115-*o* via a bus. Alternatively, functionality of the communications management module 4060 may be implemented as a component of the transceiver module 4050, as a computer program product, and/or as one or more controller elements of the processor module 4070.

The components for user equipment 115-*o* may be configured to implement aspects discussed above with respect to device 2900 in FIG. 29 and may not be repeated here for the sake of brevity. The fallback module 2915-*c* may be the fallback module 2915 of FIG. 29. User equipment 115-*o* may also include a tune away module 4020.

The user equipment 115-*o* may also include a spectrum identification module 4015. The spectrum identification module 4015 may be utilized to identify spectrum available for flexible bandwidth waveforms. In some embodiments, a handover module 4025 may be utilized to perform handover procedures of the user equipment 115-*o* from one base station to another. For example, the handover module 4025 may perform a handover procedure of the user equipment 115-*o* from one base station to another where normal waveforms are utilized between the user equipment 115-*o* and one of the base stations and flexible bandwidth waveforms are utilized between the user equipment and another base station. A scaling module 4027 may be utilized to scale and/or alter chip rates to generate flexible bandwidth waveforms.

In some embodiments, the transceiver module 4050, in conjunction with antennas 4040, along with other possible components of user equipment 115-*o*, may transmit and/or receive information regarding flexible bandwidth waveforms and/or scaling factors from the user equipment 115-*o* to base stations or a core network. In some embodiments, the transceiver module 4050, in conjunction with antennas 4040, along with other possible components of user equipment 115-*o*, may transmit and/or receive information, such flexible bandwidth waveforms and/or scaling factors, to base stations or a core network such that these devices or systems may utilize flexible bandwidth waveforms.

Figure 41A:
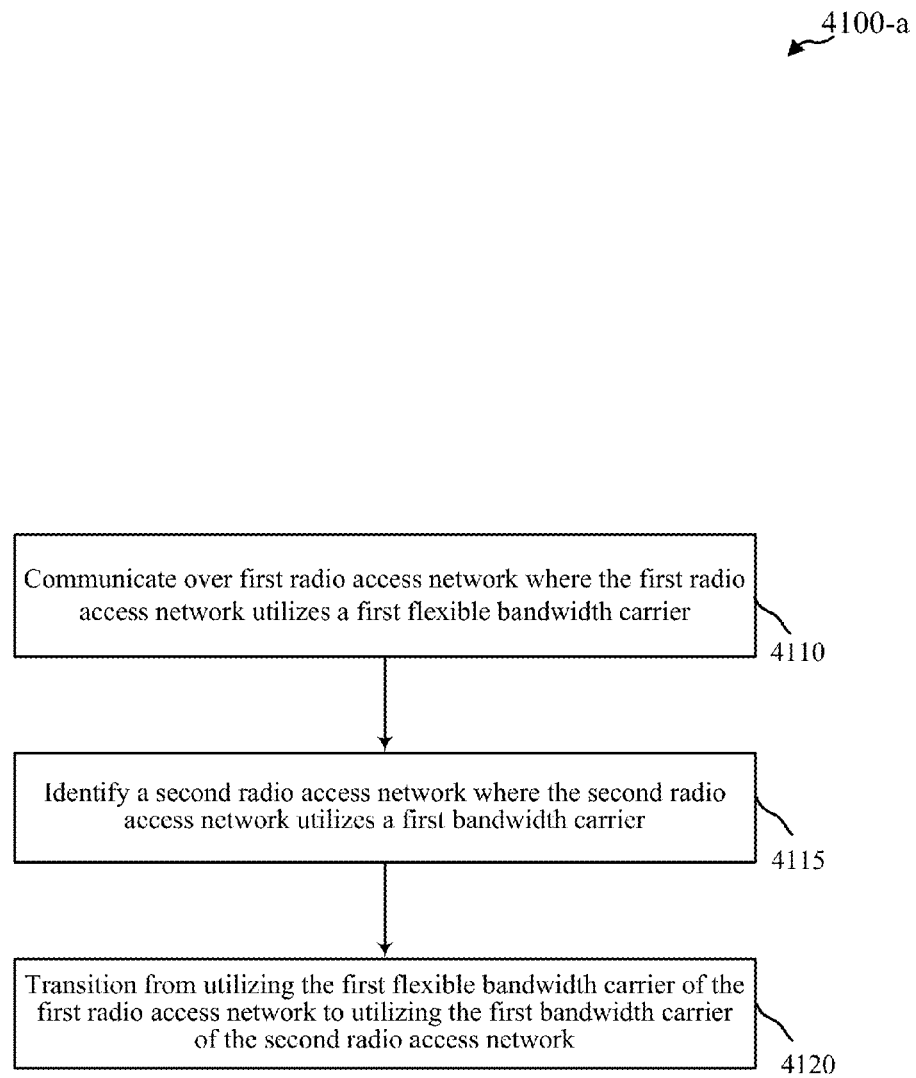
FIG. 41A shows a flow diagram of a method for providing mobility within wireless communications systems in accordance with various embodiments.

Turning to FIG. 41A, a flow diagram of a method 4100-*a* for providing mobility in a wireless communications systems in accordance with various embodiments. Method 4100-*a* may be implemented utilizing various wireless communications devices and/or systems including, but not limited to: the core networks 130 of FIG. 1, FIG. 3B, and/or FIG. 38; the user equipment 115 of FIG. 1, FIG. 2, FIG. 3, FIG. 38, FIG. 39, FIG. 40, and/or FIG. 42; radio access networks 121 of FIG. 3, FIG. 38 and/or FIG. 39; and/or device 2900 of FIG. 29. Method 4100-*a* may implement different aspects of the call flows and/or systems as shown in FIGS. 30-37 and/or associated descriptions.

Communicating over first radio access network, wherein the first radio access network utilizes a first flexible bandwidth carrier may occur at block 4110. Identifying a second radio access network may occur at block 4115. The second radio access network may utilize a first bandwidth carrier. Transitioning from utilizing the first flexible bandwidth carrier of the first radio access network to utilizing the first bandwidth carrier of the second radio access network may occur at block 4120.

Transitioning from utilizing the first flexible bandwidth carrier of the first radio access network to utilizing the first bandwidth carrier of the second radio access network may be directed at least in part by a core network. Transitioning from utilizing the first flexible bandwidth carrier of the first radio access network to utilizing the first bandwidth carrier of the second radio access network may be directed at least in part by at least one of the radio access networks. At least transitioning from utilizing the first flexible bandwidth carrier of the first radio access network to utilizing the first bandwidth carrier of the second radio access network or identifying the second radio access network may relate to a call set-up. The first bandwidth carrier of the second radio access network may include a normal bandwidth carrier or a second flexible bandwidth carrier.

At least transitioning from utilizing the first flexible bandwidth carrier of the first radio access network to utilizing the first bandwidth carrier of the second radio access network or identifying the second radio access network may relate to circuit-switched voice services for a user equipment.

At least transitioning from utilizing the first flexible bandwidth carrier of the first radio access network to utilizing the first bandwidth carrier of the second radio access network or identifying the second radio access network may include utilizing a circuit-switched fallback-like procedure. In some cases, an indicator, which may include a flag, may be utilized to signal the use of the circuit-switched fallback-like procedure. The indicator may utilize new messaging or an extension of existing messaging. In other cases, one of the radio access networks or a core network may determine that the circuit-switched fallback-like procedure is being utilized with receiving a specific indicator signaling the use of the circuit-switched fallback-like procedure. At least transitioning from utilizing the first flexible bandwidth carrier of the first radio access network to utilizing the first bandwidth carrier of the second radio access network or identifying the second radio access network may include utilizing a cell change order procedure. At least transitioning from utilizing the first flexible bandwidth carrier of the first radio access network to utilizing the first bandwidth carrier of the second radio access network or identifying the second radio access network may include utilizing a service-based handover. At least transitioning from utilizing the first flexible bandwidth carrier of the first radio access network to utilizing the first bandwidth carrier of the second radio access network or identifying the second radio access network may include utilizing a RAN redirection procedure. At least transitioning from utilizing the first flexible bandwidth carrier of the first radio access network to utilizing the first bandwidth carrier of the second radio access network or identifying the second radio access network may include utilizing a tune away procedure by a user equipment.

Figure 41B:
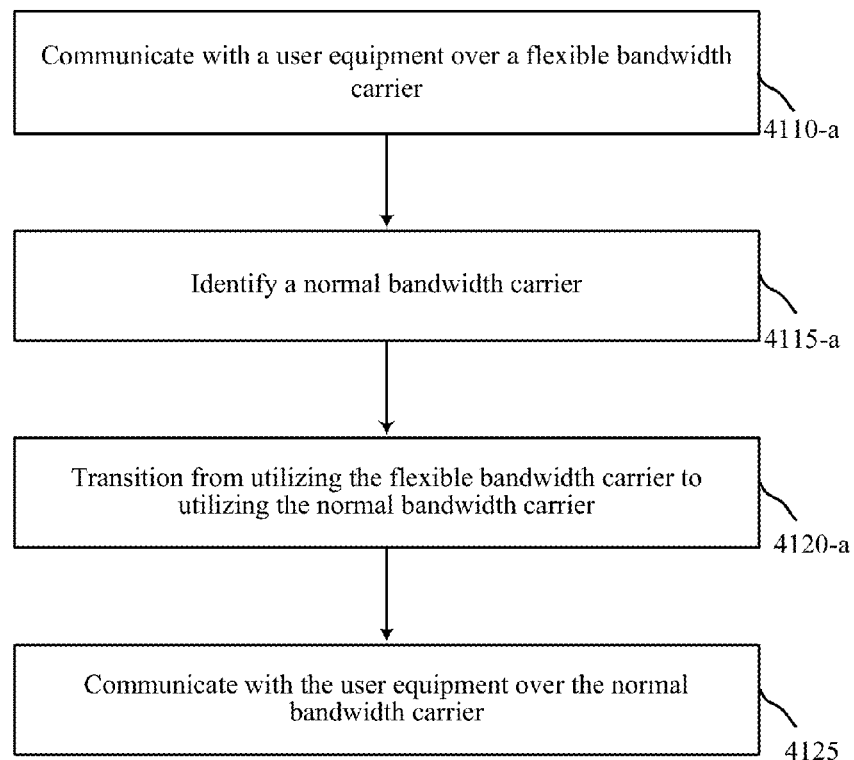
FIG. 41B shows a flow diagram of a method for providing mobility within wireless communications systems in accordance with various embodiments.

Turning to FIG. 41B, a flow diagram of a method 4100-*b* for providing mobility in a wireless communications systems in accordance with various embodiments. Method 4100-*b* may be implemented utilizing various wireless communications devices and/or systems including, but not limited to: the core networks 130 of FIG. 1, FIG. 3B, and/or FIG. 38; the user equipment 115 of FIG. 1, FIG. 2, FIG. 3, FIG. 38, FIG. 39, FIG. 40, and/or FIG. 42; radio access networks 121 of FIG. 3, FIG. 38 and/or FIG. 39; and/or device 2900 of FIG. 29. Method 4100-*b* may implement different aspects of the call flows and/or systems as shown in FIGS. 30-37 and/or associated descriptions.

Communicating with a user equipment a flexible bandwidth carrier may occur at block 4110-*a*. Identifying a normal bandwidth carrier may occur at block 4115-*a*. Transitioning from utilizing the flexible bandwidth carrier to utilizing the normal bandwidth carrier may occur at block 4120-*a*. Communication with the user equipment over the normal bandwidth carrier may occur at 4125.

Figure 41C:
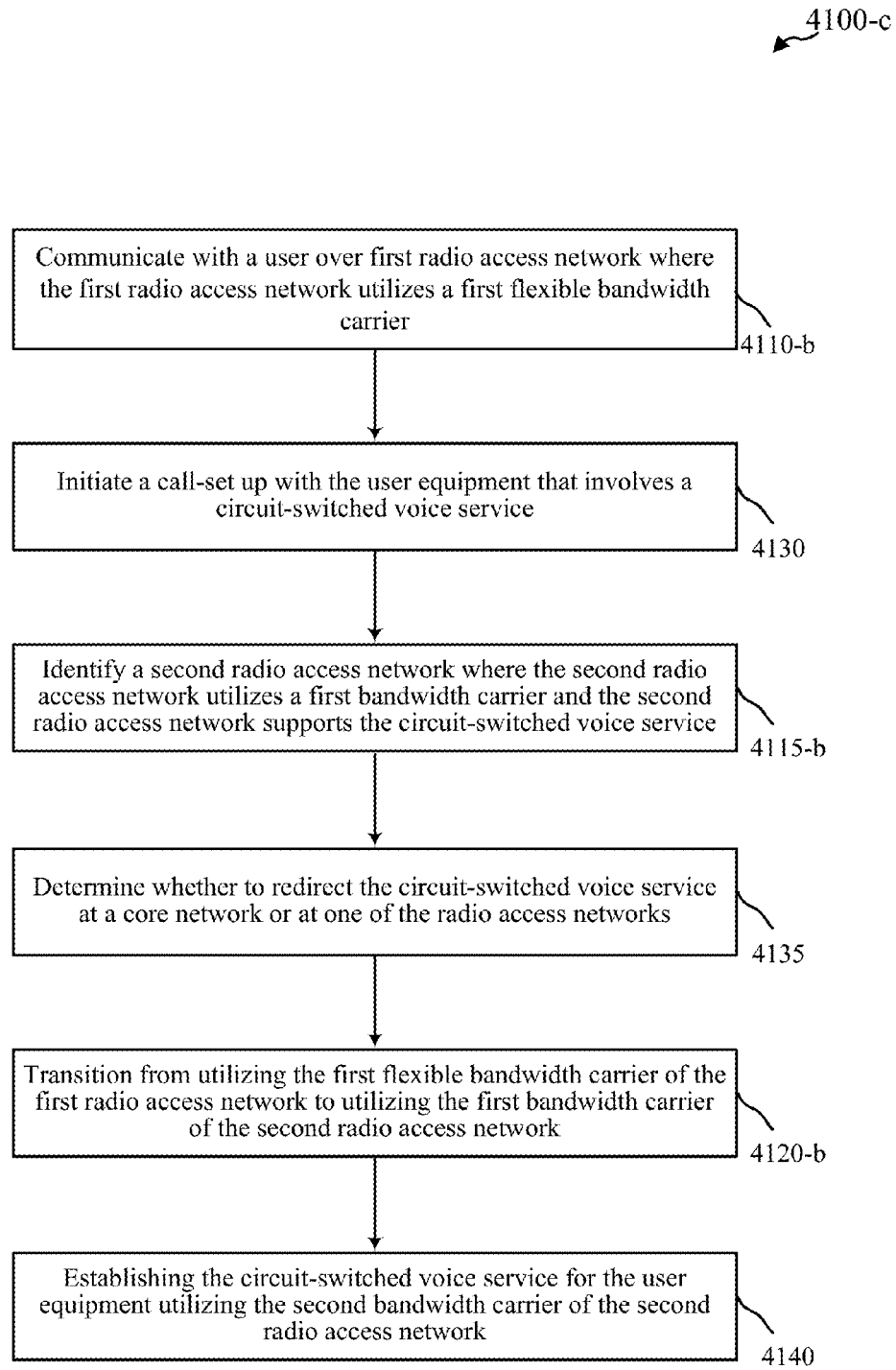
FIG. 41C shows a flow diagram of a method for providing mobility within wireless communications systems in accordance with various embodiments.

Turning to FIG. 41C, a flow diagram of a method 4100-c for providing mobility in a wireless communications systems in accordance with various embodiments. Method 4100-c may be implemented utilizing various wireless communications devices and/or systems including, but not limited to: the core networks 130 of FIG. 1, FIG. 3B, and/or FIG. 38; the user equipment 115 of FIG. 1, FIG. 2, FIG. 3, FIG. 38, FIG. 39, FIG. 40, and/or FIG. 42; radio access networks 121 of FIG. 3, FIG. 38 and/or FIG. 39; and/or device 2900 of FIG. 29. Method 4100-c may implement different aspects of the call flows and/or systems as shown in FIGS. 30-37 and/or associated descriptions. Method 4100-c may include one or more aspects of method 4100-a of FIG. 41A and/or method 4100-b of FIG. 41B.

Communicating with a user equipment over first radio access network, wherein the first radio access network utilizes a first flexible bandwidth carrier, may occur at block 4110-b. At block, a call-set up with the user equipment that involves a circuit-switched voice service may be initiated. Identifying a second radio access network may occur at block 4115-b. The second radio access network may utilize a first bandwidth carrier that supports a specific circuit-switched service, such as a CS voice service. At block 4135, it may be determined whether to redirect the specific circuit-switched service at a core network or at one of the radio access networks. Transitioning from utilizing the first flexible bandwidth carrier of the first radio access network to utilizing the first bandwidth carrier of the second radio access network may occur at block 4120-b. At block 4140, the specific circuit-switched service for the user equipment may be established utilizing the second bandwidth carrier of the second radio access network.

Figure 42:
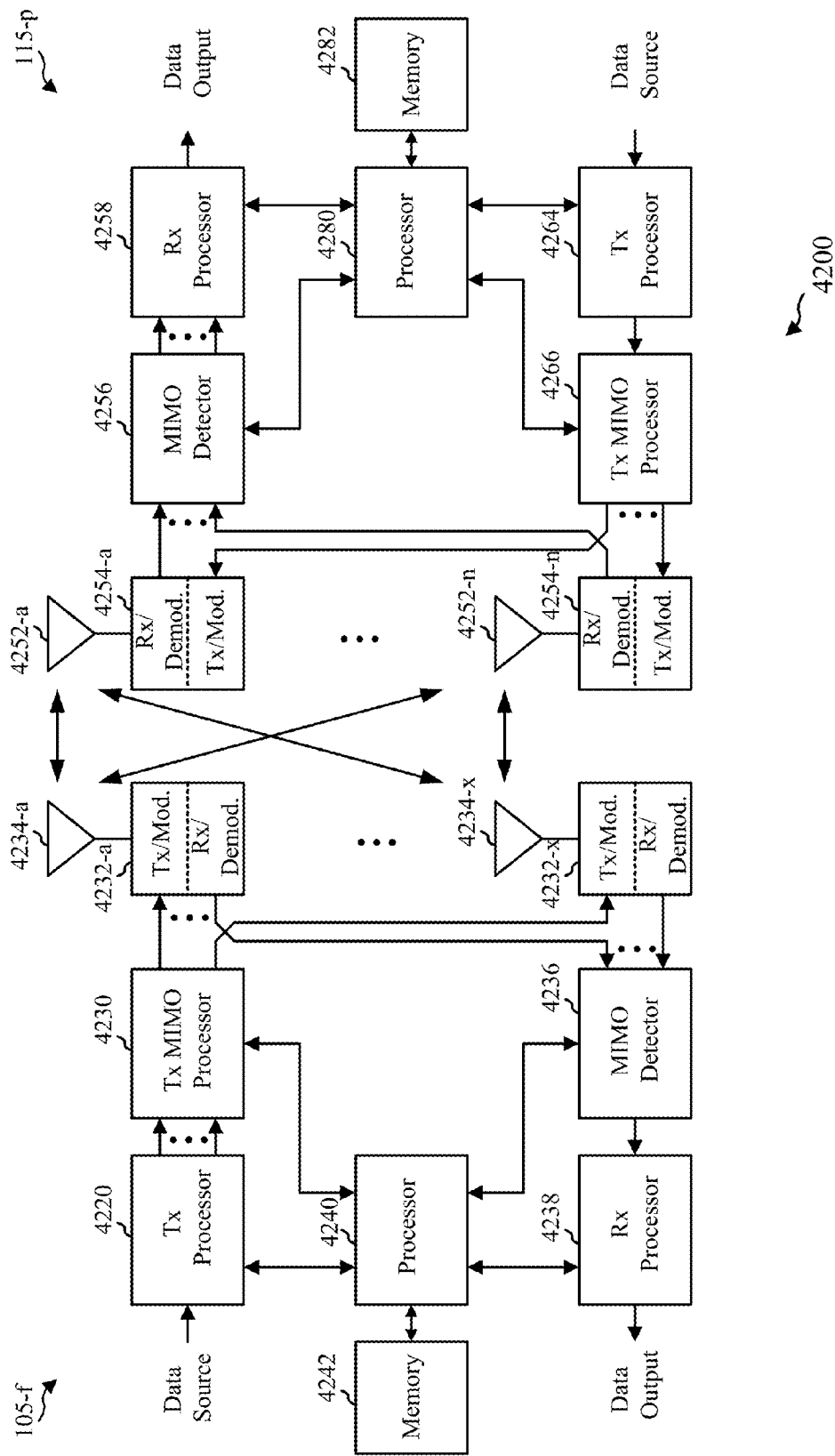
FIG. 42 shows a block diagram of a wireless communications system that includes a base station and a user equipment in accordance with various embodiments.

FIG. 42 is a block diagram of a system 4200 including a base station 105-f and a user equipment 115-p in accordance with various embodiments. This system 4200 may be an example of the system 100 of FIG. 1, systems 200 of FIG. 2, systems 300 of FIG. 3, system 700 of FIG. 7, system 1100 of FIG. 11, system 1300 of FIG. 13, system 2500 of FIG. 25, system 3800 of FIG. 38, and/or system 3900 of FIG. 39. The base station 105-f may be equipped with antennas 4234-a through 4234-x, and the user equipment 115-p may be equipped with antennas 4252-a through 4252-n. At the base station 105-f, a transmit processor 4220 may receive data from a data source. System 4200 may be configured to implement different aspects of the call flows and/or systems as shown in FIGS. 4-20 and/or associated description.

The transmit processor 4220 may process the data. The transmit processor 4220 may also generate reference symbols, and a cell-specific reference signal. A transmit (TX) MIMO processor 4230 may perform spatial processing (e.g., precoding) on data symbols, control symbols, and/or reference symbols, if applicable, and may provide output symbol streams to the transmit modulators 4232-a through 4232-x. Each modulator 4232 may process a respective output symbol stream (e.g., for OFDM, etc.) to obtain an output sample stream. Each modulator 4232 may further process (e.g., convert to analog, amplify, filter, and upconvert) the output sample stream to obtain a downlink (DL) signal. In one example, DL signals from modulators 4232-a through 4232-x may be transmitted via the antennas 4234-a through 4234-x, respectively. The transmit processor 4220 may receive information from a processor 4240. The processor 4240 may be coupled with a memory 4242. The processor 4240 may be configured to generate flexible bandwidth waveforms through altering a chip rate and/or utilizing a scaling factor. In some embodiments, the processor module 4240 may be configured for dynamically adapting flexible bandwidth in accordance with various embodiments. The processor 4240 may dynamically adjust one or more scale factors of the flexible bandwidth signal associated with transmissions between base station 105-f and user equipment 115-p. These adjustments may be made based on information such as traffic patterns, interference measurements, etc.

For example, within system 4200, the processor 4240 may configured for mobility between flexible bandwidth systems and other bandwidth systems, such as normal bandwidth systems and/or other flexible bandwidth systems. Processor 4240 may be configured to provide mobility between different bandwidth systems may facilitate supporting circuit-switched services, such as circuit-switched voice services. Processor 4240 may be configured to provide for determining flexible bandwidth capable devices, such as user equipment 115-p. Some embodiments involve core network redirection, where core network 130 may direct the handling of circuit-switched services, such as a CS voice service, when a flexible bandwidth system does not support the CS services. Processor 4240 may be configured to provide for radio access network, which may include base stations 105 and/or controller 120, directed and/or determined handling of CS services, such as CS voice services, when a flexible bandwidth system does not support the CS services. Processor 4240 may be configured to provide for transitioning or spring forward to a flexible bandwidth system. Processor 4240 may be configured to provide for transitioning or fallback from flexible bandwidth systems to non-flexible bandwidth systems that have no support for some or all CS services (e.g., CS voice), other flexible bandwidth systems, and/or systems that natively support CS voice services.

At the user equipment 115-p, the user equipment antennas 4252-a through 4252-n may receive the DL signals from the base station 105-f and may provide the received signals to the demodulators 4254-a through 4254-n, respectively. Each demodulator 4254 may condition (e.g., filter, amplify, downconvert, and digitize) a respective received signal to obtain input samples. Each demodulator 4254 may further process the input samples (e.g., for OFDM, etc.) to obtain received symbols. A MIMO detector 4256 may obtain received symbols from all the demodulators 4254-a through 4254-n, perform MIMO detection on the received symbols, if applicable, and provide detected symbols. A receive processor 4258 may process (e.g., demodulate, deinterleave, and decode) the detected symbols, providing decoded data for the user equipment 115-p to a data output, and provide decoded control information to a processor 4280, or memory 4282.

On the uplink (UL) or reverse link, at the user equipment 115-p, a transmit processor 4264 may receive and process data from a data source. The transmitter processor 4264 may also generate reference symbols for a reference signal. The symbols from the transmit processor 4264 may be precoded by a transmit MIMO processor 4266, if applicable, further processed by the demodulators 4254-a through 4254-n (e.g., for SC-FDMA, etc.), and be transmitted to the base station 105-f in accordance with the transmission parameters received from the base station 105-f. The transmit processor 4264 may also be configured to generate flexible bandwidth waveforms through altering a chip rate and/or utilizing a scaling factor; this may be done dynamically in some cases. The transmit processor 4264 may receive information from processor 4280. The processor 4280 may provide for different alignment and/or offsetting procedures. The processor 4280 may also utilize scaling and/or chip rate information to perform measurements on the other subsystems, perform handoffs to the other subsystems, perform reselection, etc. The processor 4280 may invert the effects of time stretching associated with the use of flexible bandwidth through parameter scaling. At the base station 105-*f*, the UL signals from the user equipment 115-*p* may be received by the antennas 4234, processed by the demodulators 4232, detected by a MIMO detector 4236, if applicable, and further processed by a receive processor. The receive processor 4238 may provide decoded data to a data output and to the processor 4280. In some embodiments, the processor 4280 may be implemented as part of a general processor, the transmit processor 4264, and/or the receiver processor 4258.

In some embodiments, the processor module 4280 may be configured for dynamically adapting flexible bandwidth in accordance with various embodiments. The processor 4280 may dynamically adjust one or more scale factors of the flexible bandwidth signal associated with transmissions between base station 105-*f* and user equipment 115-*p*. These adjustments may be made based on information such as traffic patterns, interference measurements, etc.

For example, within system 4200, the processor 4280 may configured for mobility between flexible bandwidth systems and other bandwidth systems, such as normal bandwidth systems and/or other flexible bandwidth systems. Processor 4280 may be configured to provide mobility between different bandwidth systems may facilitate supporting circuit-switched services, such as circuit-switched voice services. Processor 4280 may be configured to provide for determining flexible bandwidth capable devices, such as user equipment 115-*p*. Some embodiments involve core network redirection, where core network 130 may direct the handling of circuit-switched services, such as a CS voice service, when a flexible bandwidth system does not support the CS services. Processor 4280 may be configured to provide for radio access network, which may include base stations 105 and/or controller 120, directed and/or determined handling of CS services, such as CS voice services, when a flexible bandwidth system does not support the CS services. Processor 4280 may be configured to provide for transitioning or spring forward to a flexible bandwidth system. Processor 4280 may be configured to provide for transitioning or fallback from flexible bandwidth systems to non-flexible bandwidth systems that have no support for some or all CS services (e.g., CS voice), other flexible bandwidth systems, and/or systems that natively support CS voice services.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for providing mobility within wireless communications systems comprising:
   communicating with a user equipment using a flexible bandwidth radio access network from a plurality of radio access networks, the flexible bandwidth radio access network including one or more carriers whose bandwidths are scaled;
   determining that the flexible bandwidth radio access network fails to support data rates used by a circuit-switched service; and
   determining, by the flexible bandwidth radio access network, to redirect the circuit-switched service for the user equipment to a radio access network that supports the data rates used by the circuit-switched service from the plurality of radio access networks.

2. The method of claim 1, further comprising:
   redirecting, at the flexible bandwidth radio access network, the circuit-switched service for the user equipment to the radio access network that supports the circuit-switched service from the plurality of radio access networks.

3. The method of claim 1, further comprising:
   transmitting one or more messages to a core network such that the core network redirects the circuit-switched service for the user equipment to the radio access network that supports the circuit-switched service from the plurality of radio access networks.

4. The method of claim 1, further comprising:
   modifying one or more messages to a core network such that the core network redirects the circuit-switched service for the user equipment to the radio access network that supports the circuit-switched service from the plurality of radio access networks.

5. The method of claim 1, further comprising:
   handling a packet-switched service on the flexible bandwidth radio access network.

6. The method of claim 1, further comprising:
   handling another circuit-switched service on the flexible bandwidth radio access network.

7. The method of claim 6, wherein handling the other circuit-switched service includes handling a circuit-switched service other than a circuit-switched voice service.

8. The method of claim 1, wherein the circuit-switched service includes a circuit-switched voice service.

9. The method of claim 1, wherein a core network is unaware that the circuit-switched service is unsupported on the flexible bandwidth radio access network.

10. The method of claim 1, wherein a core network is aware that the circuit-switched service is unsupported on the flexible bandwidth radio access network.

11. The method of claim 1, wherein a core network is unaware of a flexible bandwidth capability of the flexible bandwidth radio access network.

12. The method of claim 1, wherein a core network is aware of a flexible bandwidth capability of the flexible bandwidth radio access network.

13. A wireless communications system configured for mobility, the system comprising:
   means for communicating with a user equipment using a flexible bandwidth radio access network from a plurality of radio access networks, the flexible bandwidth radio access network including one or more carriers whose bandwidths are scaled;
   means for determining that the flexible bandwidth radio access network fails to support data rates used by a circuit-switched service; and
   means for determining, by the flexible bandwidth radio access network, to redirect the circuit-switched service for the user equipment to a radio access network that supports the data rates used by the circuit-switched service from the plurality of radio access networks.

14. The wireless communications system of claim 13, further comprising:
   means for redirecting, at the flexible bandwidth radio access network, the circuit-switched service for the user equipment to the radio access network that supports the circuit-switched service from the plurality of radio access networks.

15. The wireless communications system of claim 13, further comprising:
   means for transmitting one or more messages to a core network such that the core network redirects the circuit-switched service for the user equipment to the radio access network that supports the circuit-switched service from the plurality of radio access networks.

16. The wireless communications system of claim 13, further comprising:
   means for handling a packet-switched service on the flexible bandwidth radio access network.

17. The wireless communications system of claim 13, further comprising:
   means for handling another circuit-switched service on the flexible bandwidth radio access network.

18. The wireless communications system of claim 13, wherein a core network is unaware that the circuit-switched service is unsupported on the flexible bandwidth radio access network.

19. The wireless communications system of claim 13, wherein a core network is unaware of a flexible bandwidth capability of the flexible bandwidth radio access network.

20. The wireless communications system of claim 13, wherein a core network is aware of a flexible bandwidth capability of the flexible bandwidth radio access network.

21. A computer program product for mobility in a wireless communications system comprising:
   a non-transitory computer-readable medium comprising:
      code for communicating with a user equipment using a flexible bandwidth radio access network from a plurality of radio access networks, the flexible bandwidth radio access network including one or more carriers whose bandwidths are scaled;
      code for determining that the flexible bandwidth radio access network fails to support data rates used by a circuit-switched service; and
      code for determining, by the flexible bandwidth radio access network, to redirect the circuit-switched service for the user equipment to a radio access network that supports the data rates used by the circuit-switched service from the plurality of radio access networks.

22. The computer program product of claim 21, further comprising:
   code for redirecting, at the flexible bandwidth radio access network, the circuit-switched service for the user equipment to the radio access network that supports the circuit-switched service from the plurality of radio access networks.

23. The computer program product of claim 21, further comprising:

code for transmitting one or more messages to a core network such that the core network redirects the circuit-switched service for the user equipment to the radio access network that supports the circuit-switched service from the plurality of radio access networks.

24. The computer program product of claim 21, further comprising:
   code for handling a packet-switched service on the flexible bandwidth radio access network.

25. The computer program product of claim 21, further comprising:
   code for handling another circuit-switched service on the flexible bandwidth radio access network.

26. The computer program product of claim 21, wherein a core network is unaware that the circuit-switched service is unsupported on the flexible bandwidth radio access network.

27. The computer program product of claim 21, wherein a core network is unaware of a flexible bandwidth capability of the flexible bandwidth radio access network.

28. The computer program product of claim 21, wherein a core network is aware of a flexible bandwidth capability of the flexible bandwidth radio access network.

29. A wireless communications device configured for mobility in a wireless communications system, the device comprising:
   at least one processor configured to:
      communicate with a user equipment using a flexible bandwidth radio access network from a plurality of radio access networks, the flexible bandwidth radio access network including one or more carriers whose bandwidths are scaled;
      determine that the flexible bandwidth radio access network fails to support data rates used by a circuit-switched service; and
      determine, by the flexible bandwidth radio access network, to redirect the circuit-switched service for the user equipment to a radio access network that supports the data rates used by the circuit-switched service from the plurality of radio access networks.

30. The wireless communications device of claim 29, wherein the at least one processor is further configured to:
   redirect, at the flexible bandwidth radio access network, the circuit-switched service for the user equipment to the radio access network that supports the circuit-switched service from the plurality of radio access networks.

31. The wireless communications device of claim 29, wherein the at least one processor is further configured to:
   transmit one or more messages to a core network such that the core network redirects the circuit-switched service for the user equipment to the radio access network that supports the circuit-switched service from the plurality of radio access networks.

32. The wireless communications device of claim 29, wherein the at least one processor is further configured to:
   handle a packet-switched service on the flexible bandwidth radio access network.

33. The wireless communications device of claim 29, wherein the at least one processor is further configured to:
   handle another circuit-switched service on the flexible bandwidth radio access network.

34. The wireless communications device of claim 29, wherein a core network is unaware that the circuit-switched service is unsupported on the flexible bandwidth radio access network.

35. The wireless communications device of claim 29, wherein a core network is unaware of a flexible bandwidth capability of the flexible bandwidth radio access network.

36. The wireless communications device of claim 29, wherein a core network is aware of a flexible bandwidth capability of the flexible bandwidth radio access network.

* * * * *